US012399567B2

(12) United States Patent
Handa et al.

(10) Patent No.: US 12,399,567 B2
(45) Date of Patent: Aug. 26, 2025

(54) VISION-BASED TELEOPERATION OF DEXTEROUS ROBOTIC SYSTEM

(71) Applicant: NVIDIA Corporation, Santa Clara, CA (US)

(72) Inventors: Ankur Handa, Seattle, WA (US); Karl Van Wyk, Lynnwood, WA (US); Wei Yang, Seattle, WA (US); Yu-Wei Chao, Seattle, WA (US); Dieter Fox, Seattle, WA (US); Qian Wan, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/932,067

(22) Filed: Jul. 17, 2020

(65) Prior Publication Data

US 2021/0086364 A1    Mar. 25, 2021

Related U.S. Application Data

(60) Provisional application No. 62/903,671, filed on Sep. 20, 2019.

(51) Int. Cl.
*G06F 3/01* (2006.01)
*B25J 9/16* (2006.01)
(Continued)

(52) U.S. Cl.
CPC ............ *G06F 3/017* (2013.01); *B25J 9/1612* (2013.01); *B25J 9/1628* (2013.01); *B25J 9/1689* (2013.01);
(Continued)

(58) Field of Classification Search
CPC ...... B25J 9/1689; B25J 9/1612; B25J 9/1628; B25J 9/1697; B25J 13/08; B25J 13/084;
(Continued)

(56) References Cited

U.S. PATENT DOCUMENTS

| 6,229,230 B1 | 5/2001 | Wing |
| 8,989,902 B1 * | 3/2015 | Crawford ............... A61B 34/30 700/257 |

(Continued)

FOREIGN PATENT DOCUMENTS

| CN | 104589356 A | 5/2015 |
| CN | 109189206 A | 1/2019 |

(Continued)

OTHER PUBLICATIONS

Zhu et al., "Kinematic Self Retargeting: A Framework for Human Pose Estimation", Computer Vision and Understanding 114, 2010, 14 Pages (Year: 2010).*

(Continued)

*Primary Examiner* — Thomas E Worden
*Assistant Examiner* — Elizabeth Rose Neleski
(74) *Attorney, Agent, or Firm* — Davis Wright Tremaine LLP

(57) ABSTRACT

A human pilot controls a robotic arm and gripper by simulating a set of desired motions with the human hand. In at least one embodiment, one or more images of the pilot's hand are captured and analyzed to determine a set of hand poses. In at least one embodiment, the set of hand poses is translated to a corresponding set of robotic-gripper poses. In at least one embodiment, a set of motions is determined that perform the set of robotic-gripper poses, and the robot is directed to perform the set of motions.

31 Claims, 57 Drawing Sheets

(51) Int. Cl.

| | | |
|---|---|---|
| *B25J 13/08* | (2006.01) | |
| *B25J 15/00* | (2006.01) | |
| *G06T 1/00* | (2006.01) | |
| *G06V 10/764* | (2022.01) | |
| *G06V 10/82* | (2022.01) | |
| *G06V 20/56* | (2022.01) | |
| *G06V 20/59* | (2022.01) | |
| *G06V 20/64* | (2022.01) | |
| *G06V 40/10* | (2022.01) | |
| *G06V 40/20* | (2022.01) | |

(52) U.S. Cl.
CPC ............. *B25J 9/1697* (2013.01); *B25J 13/08* (2013.01); *B25J 13/084* (2013.01); *B25J 15/0009* (2013.01); *G06T 1/0014* (2013.01); *G06V 10/764* (2022.01); *G06V 10/82* (2022.01); *G06V 20/56* (2022.01); *G06V 20/59* (2022.01); *G06V 20/64* (2022.01); *G06V 40/11* (2022.01); *G06V 40/28* (2022.01)

(58) Field of Classification Search
CPC ...... B25J 15/0009; B25J 9/161; B25J 9/1664; B25J 9/1671; G06F 3/017; G06T 1/0014; G06V 40/28; G06V 2201/06; G05B 2219/39122; G05B 2219/39298
See application file for complete search history.

(56) References Cited

U.S. PATENT DOCUMENTS

| | | | |
|---|---|---|---|
| 9,321,176 | B1 | 4/2016 | Sun et al. |
| 10,062,354 | B2 | 8/2018 | Dutt |
| 10,186,081 | B2* | 1/2019 | Taylor .................. G06T 17/205 |
| 10,406,686 | B2 | 9/2019 | Boca et al. |
| 10,757,861 | B2 | 9/2020 | Robertson et al. |
| 10,768,708 | B1* | 9/2020 | Sills ........................ B25J 13/00 |
| 2003/0210259 | A1 | 11/2003 | Liu et al. |
| 2013/0211592 | A1 | 8/2013 | Kim |
| 2015/0239127 | A1 | 8/2015 | Barajas et al. |
| 2015/0253864 | A1 | 9/2015 | Parkhomenko et al. |
| 2016/0335790 | A1* | 11/2016 | Fleishman .............. G06T 7/143 |
| 2019/0318659 | A1 | 10/2019 | Hamadani et al. |
| 2020/0030973 | A1* | 1/2020 | Goto ...................... B25J 9/1612 |
| 2020/0306959 | A1 | 10/2020 | Huang et al. |
| 2020/0394500 | A1 | 12/2020 | Hill et al. |
| 2022/0080581 | A1 | 3/2022 | Wang et al. |
| 2023/0226696 | A1 | 7/2023 | Mandlekar et al. |
| 2024/0180624 | A1 | 6/2024 | Xu et al. |

FOREIGN PATENT DOCUMENTS

| | | | |
|---|---|---|---|
| CN | 109934155 | A | 6/2019 |
| DE | 112004002219 | T5 | 11/2006 |
| DE | 602005006126 | T2 | 7/2009 |
| DE | 102013113459 | B4 | 5/2015 |
| DE | 102016009030 | B4 | 5/2019 |
| DE | 112019001507 | T5 | 12/2020 |
| DE | 102020124285 | A1 | 3/2021 |
| EP | 3771522 | A1 | 2/2021 |
| JP | 2153922 | A * | 2/1992 ................ B25J 1/00 |
| JP | H0446778 | A | 2/1992 |
| JP | 2011110620 | A | 6/2011 |
| JP | 2012223864 | A | 11/2012 |
| JP | 2015071206 | A | 4/2015 |
| KR | 20090118153 | A | 11/2009 |
| WO | 2019021058 | A2 | 1/2019 |

OTHER PUBLICATIONS

Ratliff et al., "Riemannian Motion Policies", arXiv:1801.02854v3, 2018, 15 Pages (Year: 2018).*

Su et al., "Learning to Switch Between Sensorimotor Primitives Using Multimodal Haptic Signals", International Conference on Simulation of Adaptive Behavior, 2017, 14 Pages (Year: 2017).*
Antotsiou et al., "Task-Oriented Hand Motion Retargeting for Dexterous Manipulation Imitation", ECCV 2018, 15 pages (Year: 2018).*
German Office Action for Application No. 102020127508.0, mailed Jan. 19, 2022, 12 pages.
Abd et al., "Direction of Slip Detection for Adaptive Grasp Force Control with a Dexterous Robotic Hand," IEEE/ASME International Conference on Advanced Intelligent Mechatronics, 2018, 22 pages.
Andrychowicz et al., "Learning Dexterous In-Hand Manipulation," Aug. 28, 2018, 27 pages.
Antotsiou et al., "Task-Oriented Hand Motion Retargeting for Dexterous Manipulation Imitation," Proceedings of the European Conference on Computer Vision, 2018, 15 pages.
A'Lvarez et al., "Tactile-Based in-Hand Object Pose Estimation," Iberian Robotics Conference, Springer, 2017, 13 pages.
Bimbo et al., "Global Estimation of an Objects Pose using Tactile Sensing," Advanced Robotics, Feb. 20, 2015, 15 pages.
Bimbo et al., "In-Hand Object Pose Estimation using Covariance-Based Tactile to Geometry Matching," IEEE Robotics and Automation Letters, Jan. 2016, 8 pages.
Cao et al., "Openpose: Realtime Multi-person 2D Pose Estimation using Part Affinity Fields," Dec. 18, 2018, 14 pages.
Chebotar et al., "BIGS: Biotac Grasp Stability Dataset," ICRA 2016 Workshop on Grasping and Manipulation Datasets, 2016, 2 pages.
Chebotar et al., "Closing the Sim-to-Real Loop: Adapting Simulation Randomization with Real World Experience," 2019 IEEE International Conference on Robotics and Automation (ICRA), May 20, 2019, 9 pages.
Chebotar et al., "Learning Robot Tactile Sensing for Object Manipulation," IROS, 2014, 8 pages.
Cheng et al., "RMPflow : A Computational Graph for Automatic Motion Policy Generation," Apr. 5, 2019, 45 pages.
Choi et al., "Using Vision for Pre-and Postgrasping Object Localization for Soft Hands," International Symposium on Experimental Robotics, Springer, 2016, 12 pages.
Corcoran et al., "A Measurement Model for Tracking Hand-Object State During Dexterous Manipulation," ICRA, 2010, 7 pages.
Cyberglove Systems "CyberGlove Systems," retrieved from Internet on May 20, 2021, from www.cyberglovesystems.com., 2017, 5 pages.
Deng et al., "PoseRBPF: A Rao-Blackwellized Particle Filter for 6D Object Pose Tracking," May 22, 2019, retreived Oct. 22, 2020, from https://arxiv.org/pdf/1905.09304.pdf, 10 pages.
Diftler et al., "Robonaut 2—Initial Activities on-board the ISS," IEEE Aerospace Conference, 2012, 12 pages.
Ding et al., "In-Hand Grasping Pose Estimation using Particle Filters in Combination with Haptic Rendering Models," International Journal of Humanoid Robotics, 2018, 20 pages.
Dorner, "Chasing the Colour Glove: Visual Hand Tracking," Ph.D. Dissertation, Simon Fraser University, 1994, 105 pages.
Duff et al., "Physical Simulation for Monocular 3D Model Based Tracking," ICRA, 2011, 8 pages.
Eade, "Lie Groups for 2D and 3D Transformations," retrieved on May 19, 2021, from http://ethaneade.com/lie.pdf, Dec. 2013, 25 pages.
Ge et al., "Point-to-Point Regression Pointnet for 3D Hand Pose Estimation," ECCV, 2018, 17 pages.
Han et al., "Online Optical Marker-Based Hand Tracking with Deep Labels," ACM TOG, 2018, 10 pages.
Handa et al., "DexPilot: Vision Based Teleoperation of Dexterous Robotic Hand-Arm System," Oct. 14, 2019, 18 pages.
Jang et al., "Hierarchical Fingertip Space: A Unified Framework for Grasp Planning and In-Hand Grasp Adaptation," IEEE Transactions on Robotics, 32(4): 2016, 13 pages.
Hansen et al., "Reducing the Time Complexity of the Derandomized Evolution Strategy with Covariance Matrix Adaptation (CMA-ES)," Evolutionary Computation, 11(1): 2003, 18 pages.
HaptX, "HaptX," retrieved from Internet on May 20, 2021, from https:/haptx.com/., 11 pages.

(56) References Cited

OTHER PUBLICATIONS

Hasson et al., "Learning Joint Reconstruction of Hands and Manipulated Objects," In Proc. CVPR, , dated Apr. 11, 2019, pp. 11807-11816.
He et al., "Deep Residual Learning for Image Recognition," CVPR, 2016, 9 pages.
Hebert et al., "Fusion of Stereo Vision, Force-Torque, and Joint Sensors for Estimation of In-Hand Object Location," ICRA, 2011, 7 pages.
Hinterstoisser et al., "Model Based Training, Detection and Pose Estimation of Texture-Less 3D Objects in Heavily Cluttered Scenes," ACCV, 2012, 14 pages.
Hu et al., "Tetrahedral Meshing in the Wild," ACM Trans. Graph, 37(4): Jul. 2018, 14 pages.
IEEE, "IEEE Standard 754-2008 (Revision of IEEE Standard 754-1985): IEEE Standard for Floating-Point Arithmetic," Aug. 29, 2008, 70 pages.
Imgaug, "Imgaug," retrieved from the Internet on May 20, 2021, from https://github.com/aleju/imgaug, Jun. 1, 2020, 25 pages.
Zatt et al., "Tracking Objects with Point Clouds from Vision and Touch," ICRA, 2017, 8 pages.
Jaderberg et al., "Population Based Training of Neural Networks," Nov. 28, 2017, 21 pages.
Javdani et al., "Efficient Touch Based Localization Through Submodularity," ICRA, 2013, 8 pages.
Johansson et al., "Coding and use of Tactile Signals from the Fingertips in Object Manipulation Tasks," Nature reviews, Neuroscience, vol. 10, May 2009, pp. 345-359.
Johansson et al., "Roles of Glabrous Skin Receptors and Sensorimotor Memory in Automatic Control of Precision Grip when Lifting Rougher or More Slippery Objects," Experimental Brain Research, vol. 56, No. 3, Oct. 1984, pp. 550-564.
Johansson et al.,"Tactile Sensory Coding in the Glabrous Skin of the Human Hand," Trends in Neurosciences, vol. 6, 1983, 6 pages.
Johnson, "The Nlopt Nonlinear-Optimization Package," retrieved from the Internet May 20, 2021, from https://github.com/stevengj/nlopt, Nov. 18, 2020, 2 pages.
Kokic et al., "Learning to Estimate Pose and Shape of Hand-Held Objects from RGB Images," Nov. 11, 2019, 8 pages.
Koval et al., "Pose Estimation for Planar Contact Manipulation with Manifold Particle Filters," The International Journal of Robotics Research, 2015, 8 pages.
Kraft, "A Software Package for Sequential Quadratic Programming," Forschungsbericht-Deutsche Forschungs- und Versuchsanstalt fur Luft- und Raumfahrt, 1988, 33 pages.
Kraft, "Algorithm 733: Tomp-Fortran Modules for Optimal Control Calculations," TOMS, 1994, 20 pages.
Kumar et al., "MuJoCo HAPTIX: A Virtual Reality System for Hand Manipulation," Humanoids, 2015, 7 pages.
Lambert et al., "Joint Inference of Kinematic and Force Trajectories with Visuo-Tactile Sensing," Mar. 8, 2019, 7 pages.
Lee et al., "Making Sense of Vision and Touch: Self-supervised Learning of Multimodal Representations for Contact-Rich Tasks," Oct. 24, 2018, 8 pages.
Li et al. "Localization and Manipulation of Small Parts Using GelSight Tactile Sensing," in IEEE/RSJ International Conference on Intelligent Robots and Systems (IROS). IEEE, Sep. 14, 2014, pp. 3988-3993.
Li et al., "A Comparative Study of Contact Models for Contact-Aware State Estimation," IROS, 2015, 6 pages.
Li et al., "DeepIM: Deep Iterative Matching for 6D Pose Estimation," ECCV, 2018, 16 pages.
German Office Action for Application No. 102020124285.9, dated Jun. 21, 2021, 7 pages.
Li et al., "Vision-Based Teleoperation of Shadow Dexterous Hand using End-to-End Deep Neural Network," ICRA, 2019, 7 pages.
Liang et al., "GPU-Accelerated Robotic Simulation for Distributed Reinforcement Learning," CoRL, Oct. 24, 2018, 14 pages.

Liu et al., "A Glove-based System for Studying Hand-Object Manipulation via Joint Pose and Force Sensing," IROS, 2017, 8 pages.
Liu et al., "High-Fidelity Grasping in Virtual Reality using a Glove-based System," ICRA, 2019, 7 pages.
Luo et al., "Robotic Tactile Perception of Object Properties: A Review," Mechatronics, Nov. 10, 2017, 17 pages.
Lynch et al., "Learning Latent Plans from Play," Dec. 20, 2019, 17 pages.
Macklin et al., "Non-Smooth Newton Methods for Deformable Multi-Body Dynamics," Jul. 10, 2019, 21 pages.
N.I. of Standards and Technology, "Robotic Grasping and Manipulation for Assembly," retrieved from the Internet on May 20, 2021, from https://www.nist.gov/el/intelligent-systems-division-73500/robotic-grasping-and-manipulation-assembly/assembly, May 23, 2018, 4 pages.
Norton et al., "Analysis of Human-Robot Interaction at the DARPA Robotics Challenge Finals," The International Journal of Robotics Research, 36(5-7): 2017, 31 pages.
Oberweger et al., "Generalized Feedback Loop for Joint Hand-Object Pose Estimation," IEEE Transactions on Pattern Analysis and Machine Intelligence, Mar. 25, 2019, 15 pages.
Oberweger et al., "Hands Deep in Deep Learning for Hand Pose Estimation," dated Feb. 24, 2015, 10 pages.
Orocos Kinematics and Dynamics, "Orocos Kinematics and Dynamics Library," retrieved from the Internet on May 20, 2021, from https://github.com/orocos/orocos_kinematics_dynamics, 2 pages.
Peters et al., "Relative Entropy Policy Search," Twenty-Fourth AAAI Conference on Artificial Intelligence, 2010, 6 pages.
Petrovskaya et al., "Global Localization of Objects via Touch," IEEE Transactions on Robotics, 2011, 17 pages.
Pezzementi et al., "Object Mapping, Recognition, and Localization from Tactile Geometry," ICRA, 2011, 7 pages.
Pfanne et al., "Fusing Joint Measurements and Visual Features for In-Hand Object Pose Estimation," IEEE Robotics and Automation Letters, Jun. 2018, 8 pages.
Platt et al., "Using Bayesian Filtering to Localize Flexible Materials During Manipulation," IEEE Transactions on Robotics, 2011, 13 pages.
Qi et al., "Pointnet++: Deep Hierarchical Feature Learning on Point Sets in a Metric Space," Jun. 7, 2017, 14 pages.
Rajeswaran et al., "Learning Complex Dexterous Manipulation with Deep Reinforcement Learning and Demonstrations," RSS, Jun. 26, 2018, 9 pages.
Ratliff et al. "Riemannian Motion Policies," arXiv:1801.02854v3, dated Jul. 25, 2018, 15 pages.
Romero et al., "Embodied Hands: Modeling and Capturing Hands and Bodies Together," ACM SIGGRAPH, 2017, 17 pages.
Saund et al., "Touch Based Localization of Parts for High Precision Manufacturing," ICRA, 2017, 8 pages.
Schmidt et al. "Depth-Based Tracking with Physical Constraints for Robot Manipulation," in IEEE Intl. Conf. on Robotics and Automation (ICRA), May 26, 2015, pp. 119-126.
Schmidt et al., "Dart: Dense Articulated Real-Time Tracking," RSS, IEEE, 2014, 9 pages.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.
Stenger et al., "Model-Based Hand Tracking using a Hierarchical Bayesian Filter," PAMI, 2006, 13 pages.
Sterbis et al., "Transcontinental Telesurgical Nephrectomy using the Da Vinci Robot in a Porcine Model," Urology, 71(5): 2008, 3 pages.
Su et al., "Force Estimation and Slip Detection/Classification for Grip Control using a Biomimetic Tactile Sensor," Humanoids, IEEE, 2015, 7 pages.

(56) References Cited

OTHER PUBLICATIONS

Sundaralingam et al., "Robust Learning of Tactile Force Estimation through Robot Interaction," International Conference on Robotics and Automation, Mar. 5, 2019, 8 pages.
Sundaram et al., "Learning the Signatures of the Human Grasp using a Scalable Tactile Glove," Nature, 569(7758): 2019, 19 pages.
Theobalt et al., "Pitching a Baseball: Tracking High-Speed Motion with Multi-Exposure Images," ACM TOG, 2004, 8 pages.
Tompson et al., "Real-Time Continuous Pose Recovery of Human Hands Using Convolutional Networks," ACM Transactions on Graphics, 2014, 10 pages.
Van Wyk et al., "Robotic Grasping and Manipulation Competition: Future Tasks to Support the Development of Assembly Robotics," Robotic Grasping and Manipulation Challenge, Springer, 2016, 11 pages.
Vardi et al., "The Multivariate L1-Median and Associated Data Depth," Proceedings of the National Academy of Sciences, 2000, 4 pages.
Vezzani et al., "Memory Unscented Particle Filter for 6-DOF Tactile Localization," IEEE Transactions on Robotics, 2016, 15 pages.
Villegas et al., "Neural Kinematic Networks for Unsupervised Motion Retargetting," Proceedings of the IEEE Conference on Computer Vision and Pattern Recognition, 2018, 10 pages.
Wang et al., "Real-Time Hand-Tracking with a Color Glove," ACM TOG, 2009, 8 pages.
Wyk et al., "Comparative Peg-in-Hole Testing of a Force-Based Manipulation Controlled Robotic Hand," IEEE Transaction on Robotics, 34(2): Apr. 2018, 8 pages.
Xhalon et al., "Online In-Hand Object Localization," IROS, 2013, 8 pages.
Xiang et al., "PoseCNN: A Convolutional Neural Network for 6D Object Pose Estimation in Cluttered Scenes," May 26, 2018, 10 pages.
Yu et al., "Realtime State Estimation with Tactile and Visual Sensing. Application to Planar Manipulation," ICRA, 2018, 8 pages.
Yuan et al., "Big-Hand2.2M Benchmark: Hand Pose Dataset and State of the Art Analysis," CVPR, 2017, 9 pages.
Zhang et al., "A Dynamic Bayesian Approach to Real-Time Estimation and Filtering in Grasp Acquisition," ICRA, 2013, 8 pages.
Zhang et al., "Deep Imitation Learning for Complex Manipulation Tasks from Virtual Reality Teleoperation," ICRA, IEEE, Mar. 6, 2018, 9 pages.
Zhang, "Making Convolutional Networks Shift-Invariant Again," ICML, 2019, 11 pages.
Zhu et al., "Dexterous Manipulation with Deep Reinforcement Learning: Efficient, General, and Low-Cost," ICRA, Oct. 14, 2018, 8 pages.
Zhuang et al., "Shared Human-Robot Proportional Control of a Dexterous Myoelectric Prosthesis," Nature Machine Intelligence, 2019, 24 pages.
Ajili et al., "Gesture Recognition for Humanoid Robot Teleoperation," 26th IEEE International Symposium on Robot and Human Interactive Communication, 2017, 7 pages.
Aronson et al., "Gaze Complements Control Input for Goal Prediction During Assisted Teleoperation," Robotics Science and Systems, 2022, 12 pages.
Arunachalam et al., "Dexterous Imitation Made Easy: A Learning-Based Framework for Efficient Dexterous Manipulation," 2022, 9 pages.
Arunachalam et al., "Holo-Dex: Teaching Dexterity with Immersive Mixed Reality," 2022, 12 pages.
Chen et al., "ASHA: Assistive Teleoperation via Human-in-the-Loop Reinforcement Learning," ICRA, 2022, 19 pages.
Coumans et al., "PyBullet, A Python Module for Physics Simulation for Games," Robotics and Machine Learning, retrieved http://pybullet.org, 2016, 10 pages.
Danchilla et al., "Three.js Framework," Beginning WebGL for HTML5, 2012, 31 pages.
Deits, "Meshcat," GitHub, retrieved from https://github.com/rdeits/, 2018, 3 pages.
Du et al., "Markerless kinect-based hand tracking for robot teleoperation," International Journal of Advanced Robotic Systems, 9(2):36, 2012, 10 pages.
Elsner et al., "PARTI-A Haptic Virtual Reality Control Station for Model-Mediated Robotic Applications" Frontiers in Virtual Reality, Jul. 2022, 10 pages.
Fang et al., "Vision-based Posture-Consistent Teleoperation of Robotic Arm Using Multi-stage Deep Neural Network," Robotics and Autonomous Systems, 2020, 8 pages.
Gan et al., "ThreeDWorld: A Platform for Interactive Multi-Modal Physical Simulation," 2020, 23 pages.
Gharaybeh et al., "Telerobotic Control in Virtual Reality," IEEE, 2019, 8 pages.
Handa et al., "DexPilot: Vision Based Teleoperation of Dexterous Robotic Hand-Arm System," 2019, 18 pages.
Hedayati et al., "Improving Collocated Robot Teleoperation with Augmented Reality," International Conference on Human Robot Interaction, 2018, 10 pages.
Huang et al., "A Novel Training and Collaboration Integrated Framework for Human-Agent Teleoperation," Sensors, 21(24): 2021, 15 pages.
IEEE "IEEE Standard for Floating-Point Arithmetic", Microprocessor Standards Committee of the IEEE Computer Society, IEEE Std 754-2008, dated Jun. 12, 2008, 70 pages.
Jang et al., "BC-Z: Zero-Shot Task Generalization with Robotic Imitation Learning," Feb. 4, 2022, 23 Pages.
Khadir et al., "Teleoperator Imitation with Continuous-time Safety," 2019, 9 pages.
Kofman et al., "Robot-Manipulator Teleoperation by Markerless Vision-Based Hand-Arm Tracking," International Journal of Optomechatronics, 2007, 28 pages.
Kofman et al., "Teleoperation of a Robot Manipulator Using a Vision-Based Human-Robot," IEEE transactions on industrial electronics, 52(5): Oct. 2005, 14 pages.
Kumar et al., "MuJoCo HAPTIX: A Virtual Reality System for Hand Manipulation," International Conference on Humanoid Robots, 2015, 7 pages.
Li et al., "A Dexterous Hand-Arm Teleoperation System Based on Hand Pose Estimation and Active Vision," IEEE Transactions on Cybernetics, 2022, 12 pages.
Li et al., "A Mobile Robot Hand-Arm Teleoperation System by Vision and IMU," 2020, 7 pages.
Liang et al., " In-Hand Object Pose Tracking via Contact Feedback and GPU-Accelerated Robotic Simulation," IEEE International Conference on Robotics and Automation, 2020, 7 pages.
Lipton et al., "Baxter's Homunculus: Virtual Reality Spaces for Teleoperation in Manufacturing" IEEE Robotics and Automation Letters, 3(1): 2017, 8 pages.
Liu et al., "Semi-Supervised 3D Hand-Object Poses Estimation with Interactions in Time," Jun. 9, 2021, 13 Pages.
Makoviychuk et al., "Isaac Gym: High Performance GPU-Based Physics Simulation For Robot Learning," Aug. 25, 2021, 32 pages.
Mandlekar et al., "Human-in-the-Loop Imitation Learning using Remote Teleoperation," Dec. 12, 2020, 8 Pages.
Mandlekar et al., "Roboturk: A Crowdsourcing Platform for Robotic Skill Learning through Imitation," Conference on Robot Learning, Nov. 7, 2018, 15 pages.
Meeker et al., "A Continuous Teleoperation Subspace with Empirical and Algorithmic Mapping Algorithms for Non-Anthropomorphic Hands," IEEE Transactions on Automation Science and Engineering, 19(1): 2020, 14 pages.
Mizera et al., "Evaluation of Hand-Tracking Systems in Teleoperation and Virtual Dexterous Manipulation," IEEE Sensors Journal, 20(3): 2020, 14 pages.
Mosbach et al., "Accelerating Interactive Human-like Manipulation Learning with GPU-based Simulation and High-quality Demonstrations," Humanoids, Nov. 2022, 7 pages.
Muelling et al., "Autonomy Infused Teleoperation with Application to BCI Manipulation," 2015, 10 pages.
Niemeyer et al., "Telerobotics," Springer Handbook of Robotics, 2016, 17 pages.

(56) References Cited

OTHER PUBLICATIONS

Pavlakos et al., "Expressive Body Capture: 3D Hands, Face, and Body from a Single Image," CVPR, 2019, pp. 10975-10985.
Ponomareva et al., "GraspLook: a VR-based Telemanipulation System with R-CNN-driven Augmentation of Virtual Environment," International Conference on Advanced Robotics, 2021, 6 pages.
Qin et al., "Object-Independent Human-to-Robot Handovers using Real Time Robotic Vision" 2020, 7 pages.
Radosavovic et al., "Real-World Robot Learning with Masked Visual Pre-training," 2022, 13 pages.
Rakita et al., "A Motion Retargeting Method for Effective Mimicry-based Teleoperation of Robot Arms," ACM/IEEE International Conference on Human-Robot Interaction, 2017, 10 pages.
Rakita et al., "Remote Telemanipulation with Adapting Viewpoints in Visually Complex Environments," Robotics: Science and Systems XV, 2019, 10 pages.
Rong et al., "FrankMocap: Fast Monocular 3D Hand and Body Motion Capture by Regression and Integration," 2020, 13 pages.
Rosen et al., "Mixed Reality as a Bidirectional Communication Interface for Human-Robot Interaction," IEEE/RSJ International Conference on Intelligent Robots and Systems, 2020, 8 pages.
Salvato et al., "Predicting Hand-Object Interaction for Improved Haptic Feedback in Mixed Reality," Robotics and Automation Letters, 7(2): 2022, 7 pages.
Shaw et al., "VideoDex: Learning Dexterity from Internet Videos," 2022, 17 pages.
Sivakumar et al., "Robotic Telekinesis: Learning a Robotic Hand Imitator by Watching Humans on Youtube," 2022, 15 pages.
Son et al., "Human-Centered Design and Evaluation of Haptic Cueing for Teleoperation of Multiple Mobile Robots," IEEE Transactions on Cybernetics, 43(2): 2013, 13 pages.
Sundaralingam et al., "Curobo: Parallelized collision free robot motion generation," Proceedings of the IEEE International Conference on Robotics and Automation, Jun. 2023, 8 pages.
Todorov et al., "MuJoCo : A Physics Engine for Model-Based Control," 2012, 8 pages.
Tung et al., "Learning Multi-Arm Manipulation Through Collaborative Teleoperation," Dec. 12, 2020, 7 Pages.
Xiang et al., "SAPIEN: A SimulAted Part-based Interactive ENvironment," Mar. 19, 2020, 16 pages.
Zhang et al., "A Feasibility Study on an Intuitive Teleoperation System Combining IMU with sEMG Sensors," Intelligent Robotics and Applications: 11th International Conference, 2018, 11 pages.
Zhang et al., "Human Robot Motion Retargeting via Neural Latent Optimization," 2021, 8 pages.
Zhang et al., "MediaPipe Hands: On-device Real-time Hand Tracking," 2020, 5 pages.
Zhao et al., "Combining Marker-based Mocap and RGB-D Camera for Acquiring High-fidelity Hand Motion Data" Proceedings of the ACM SIGGRAPH/Eurographics Symposium on Computer Animation, 2012, 10 pages.
Office Action for Chinese Application No. 202010973239.2, mailed Mar. 27, 2024, 29 pages.
Lei et al., "Inverse Kinematics Algorithm for Industrial Robot of ABB1410 Based on Screw Theory," Machinery Design & Manufacture, 2016, 4 pages.
Office Action for Chinese Application No. 202010973239.2, mailed Jun. 25, 2024, 17 pages.
Yang et al., "Online Retargeting for Multi-lateral Teleoperation," International Conference on Ubiquitous Robots and Ambient Intelligence, 2013, 3 pages.
Ankur Handa et al., U.S. Appl. No. 16/863,111, filed Apr. 30, 2020.
Notice of Decision to Grant for Chinese Application No. 202010973239.2, mailed Aug. 22, 2024, 6 Pages.

* cited by examiner

VISION-BASED TELEOPERATION OF DEXTEROUS ROBOTIC SYSTEM

CROSS-REFERENCE TO RELATED APPLICATIONS

This application claims the benefit of U.S. Provisional Patent Application No. 62/903,671, filed Sep. 20, 2019, entitled "DEPTH BASED TELEOPERATION OF DEXTEROUS ROBOTIC HAND ARM SYSTEM," the disclosure of which is incorporated herein by reference in its entirety. This application also incorporates by reference for all purposes the full disclosure of co-pending U.S. patent application Ser. No. 16/863,111, filed Apr. 30, 2020, entitled "IN-HAND OBJECT POSE TRACKING," and U.S. Provisional Patent Application No. 62/925,669, filed Oct. 24, 2019, entitled "IN-HAND OBJECT POSE TRACKING VIA CONTACT FEEDBACK AND GPU-ACCELERATED ROBOTIC SIMULATION."

TECHNICAL FIELD

At least one embodiment pertains to the use of robots to perform and facilitate tasks under the control of a human operator. For example, at least one embodiment pertains to controlling a robotic arm by mimicking the action of a human hand according to various novel techniques described herein.

BACKGROUND

Controlling robots to perform tasks can be a difficult and challenging problem. One method of controlling a robot is via direct human control. For example, some robotic systems provide a human operator with a joystick or programmatic interface that allows the operator to move the robot. However, such interfaces are generally non-intuitive and difficult to use, requiring significant training and practice to use. This is particularly true when the operator is attempting to perform a complex task such as interacting with other objects. Therefore, improving teleoperation interfaces is an important area of study in the field of robotic control.

DETAILED DESCRIPTION

Figure 1:
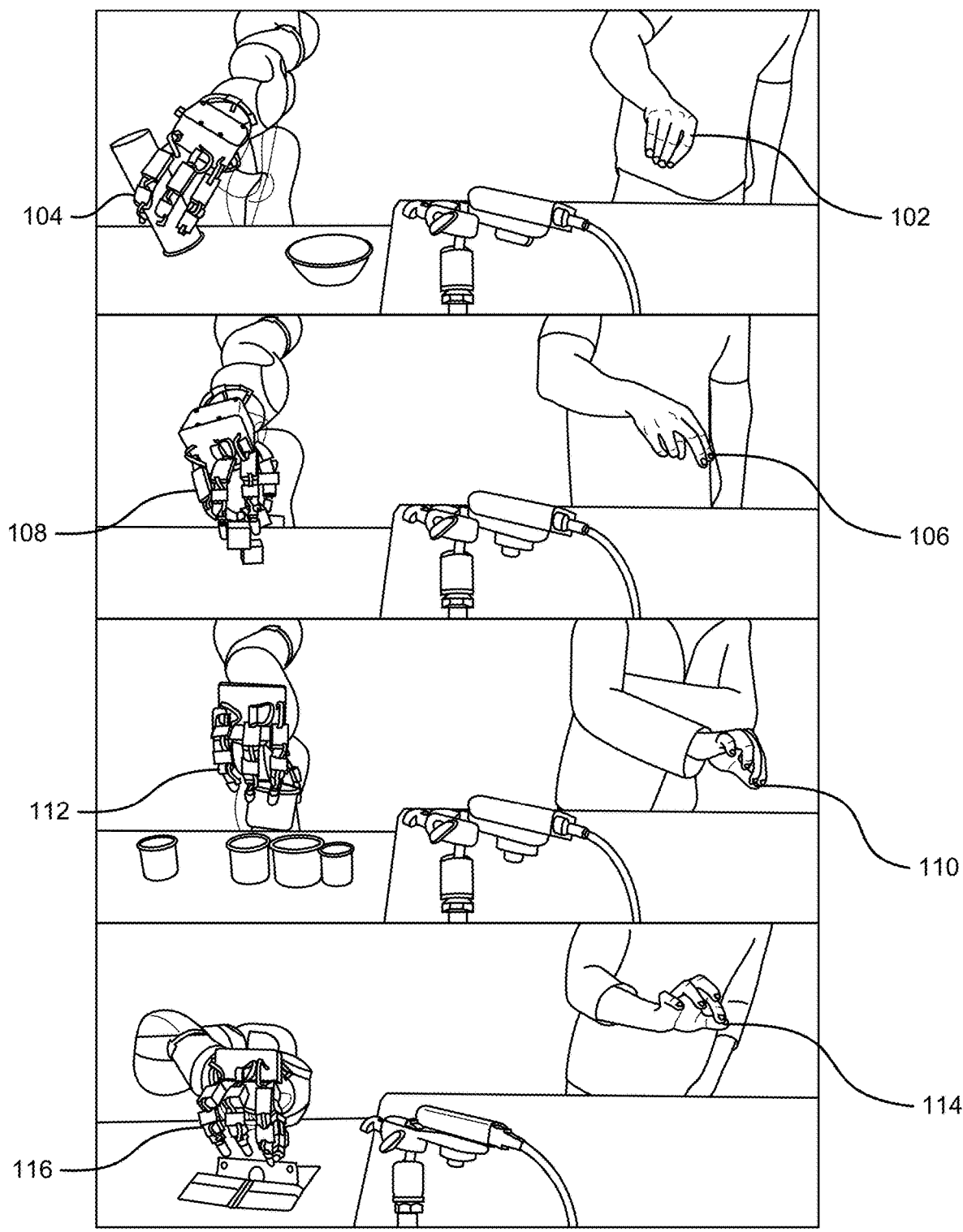
FIG. 1 illustrates an example of teleoperation across various tasks, according to at least one embodiment.

The present document describes a system and method for controlling a robot via teleoperation. In at least one embodiment, the system estimates the pose of a human hand, and then directs a robot to a corresponding pose. In one example, when a human operator performs a motion with their hand, the motion is captured with a depth camera, and the system uses the data from the depth camera to produce a point cloud. The point cloud is processed to determine a pose of the hand. The pose of the hand identifies the location of the fingertips of the hand and an approximation of the joint angles and bones in the hand. The system then translates the pose of the hand into a corresponding pose of a robotic hand. In some examples, the system corrects for differences in the size of the robotic hand, and differences in the number of digits between the human hand and the robotic hand. In some examples, the pose of the human hand may be translated to a robotic hand having a larger or smaller number of digits. In some examples, the pose of the human hand can be translated to the pose of an excavator, industrial robot, or vehicle. For example, a human can mimic the shape of a claw or bucket on earth moving equipment and the system can translate the pose of the hand to a corresponding pose of the claw or bucket, thereby providing intuitive control of the machine. The human pilot may view the robot either directly or remotely via a video display, and is able to direct the robot to perform a task by duplicating the requested motion in real time.

In at least one embodiment, teleoperation offers the possibility of imparting robotic systems with sophisticated reasoning skills, intuition, and creativity to perform tasks. At least one example described herein provides a low-cost, vision based teleoperation system, that allows for complete control over the full 23 DoA robotic system by observing the bare human hand. Some examples enable operators to carry out a variety of complex manipulation tasks that go beyond simple pick-and-place operations. At least one embodiment allows for collection of high dimensional, multi-modality, state-action data that can be leveraged in the future to learn sensorimotor policies for challenging manipulation tasks. The system performance of at least one embodiment is measured through speed and reliability metrics across two human demonstrators on a variety of tasks. In various embodiments, the system may be implemented by one or more systems as described/depicted in FIGS. 15-43.

Various embodiments may be applied to the fields of search and rescue, space, medicine, prosthetics, and applied machine learning. In at least one embodiment, teleoperation allows a robot system to perform complex tasks by harnessing the cognition, creativity, and reactivity of humans through a human-machine interface ("HMI"). At least one embodiment relies on the incorporation of haptic feedback and improved human skeletal and finger tracking. At least one embodiment provides a low-cost, markerless, glove-free teleoperation solution that leverages innovations in machine vision, optimization, motion generation, and GPU computing. At least one embodiment retains the ability to capture and relay fine dexterous manipulation to drive a highly actuated robot system to solve a wide variety of grasping and manipulation tasks. In one example, four Intel RealSense depth cameras and two NVIDIA GPUs in combination with deep learning and nonlinear optimization produced a minimal-footprint, dexterous teleoperation system. Despite the lack of tactile feedback, examples of the system is highly capable and effective through human cognition. In at least one embodiment, this result corroborates human gaze studies that indicate that humans learn to leverage vision for planning, control, and state prediction of hand actions prior to accurate hand control. In some examples, the depth cameras can be RADAR based or LIDAR based imaging systems, or medical imaging systems such as magnetic resonance imaging machines or x-ray imaging machines.

In various examples, the teleoperation system exploits the human ability to plan, move, and predict the consequence of their physical actions from vision alone, a sufficient condition for solving a variety of tasks. Various embodiments have one or more of the following advantages listed: markerless, glove-free and entirely vision-based teleoperation system that dexterously articulates a highly-actuated robotic hand-arm system with direct imitation, a novel cost function and projection scheme for kinematically retargeting human hand joints to robotic hand joints that preserve hand dexterity and feasibility of precision grasps in the presence of hand joint tracking error, demonstration of teleoperation system on a wide variety of tasks particularly involving fine manipulations and dexterity, and system assessment across two trained human demonstrators (also called pilots) revealed that high task success rates can be achieved despite the lack of tactile feedback.

The developed system, in various embodiments, enables such dexterous robot manipulation using multi-camera depth observations of the bare human hand. In some examples, the system may be a glove-free and entirely vision-based teleoperation system that dexterously articulates a highly-actuated robotic hand-arm system through direct imitation. The system may also demonstrate a range of tasks particularly involving fine manipulation and dexterity (e.g., extracting paper money from a wallet and concurrently picking two cubes with four fingers as depicted in FIG. 1).

FIG. 1 illustrates an example of teleoperation across various tasks, according to at least one embodiment. In one example, a robotic gripper 104 grasps a cylinder using a grasp pose based on a human hand 102. In another example, a robotic gripper 108 grasps a cube using a grasp pose based on a human hand 106. In another example, a robotic gripper 112 grasps a cup using a grasp pose based on a human hand 110. In another example, a robotic gripper 116 grasps a wallet using a grasp pose based on a human hand 114.

Figure 2:
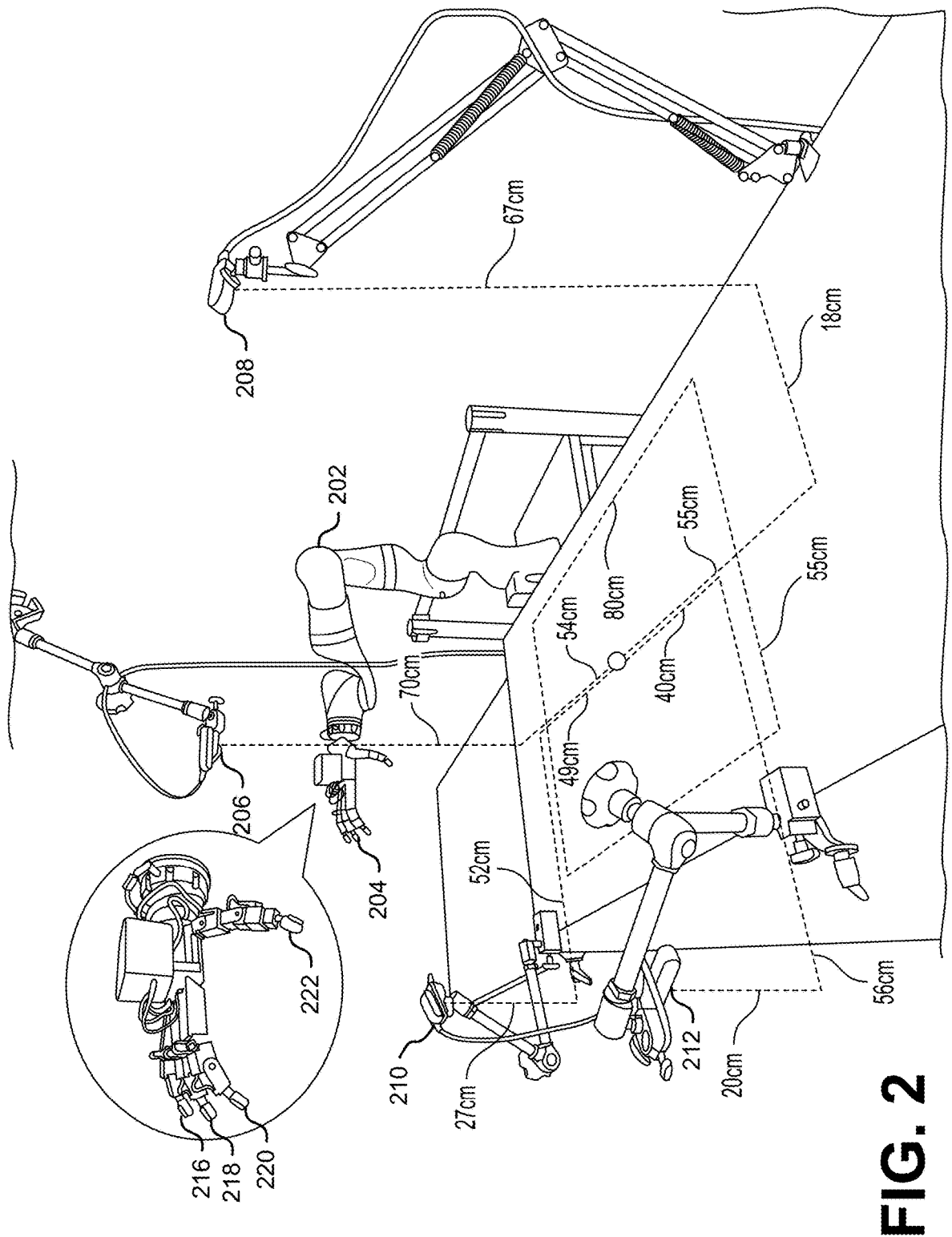
FIG. 2 illustrates an example of a robotic arm and hand, according to at least one embodiment.

The teleoperation setup may comprise a robot system and an adjacent human pilot arena as shown in FIG. 2. FIG. 2 illustrates an example of a robot with tactile sensors, according to at least one embodiment. In at least one embodiment, a robot 202 has a robotic gripper 204 that is used to grasp objects. In at least one embodiment a set of cameras 206, 208, 210, and 212 are used to observe the workspace of the robot 202. In at least one embodiment, the gripper 204 includes a set of tactile sensors 216, 218, 220, and 222 that provide sensory information to a control computer system. In at least one embodiment, the tactile sensors may be covered with a friction material to enhance and/or improve the robot's ability to grip an object.

In some embodiments, as depicted in FIG. 2, the robot system may be a KUKA LBR iiwa7 R800 series Arm with a Wonik Robotics Allegro hand retrofitted with four SynTouch BioTac tactile sensors at the fingertips and 3M TB641 grip tape applied to the inner surfaces of the phalanges and palm, in which the rubbery surfaces of both the BioTac sensors and 3M tape may improve friction of the hand while the BioTacs themselves may produce 23 signals that can later be used to learn sensorimotor control from demonstrations. The human arena may be a black-clothed table surrounded by four calibrated and time-synchronized cameras, such as Intel RealSense RGB-D cameras, which may be spatially arranged to cover a workspace of 80 cm×55 cm×38 cm. In some examples, the cameras may be directly adjacent to the robot to improve line-of-sight and visual proximity since teleoperation is entirely based on human vision and spatial reasoning. It should be noted that FIG. 2 is intended to be an illustrative example and, in various embodiments, the system may include any robot system utilizing any robot components (e.g., various types of robot arms, hands, tactile sensors, grip, other sensors, cameras, and/or variations thereof) in any suitable environment.

To produce a natural-feeling teleoperation system, an imitation-type paradigm may be adopted. The bare human hand motion—pose and finger configuration—may be constantly observed and measured by a visual perception module. The human hand motion may then be relayed to the robot system in such a way that the copied motion is self-evident. This approach may enable a human pilot to curl and arrange their fingers, form grasps, reorient and translate their palms, with the robot system following in a similar manner. In at least one embodiment, the system relies heavily on Dense Articulated Real-Time Tracking ("DART"), which may form backbone of tracking the pose and joint angles of the human hand. The system architecture and component connections are depicted in FIG. 3, in an embodiment.

Figure 3:
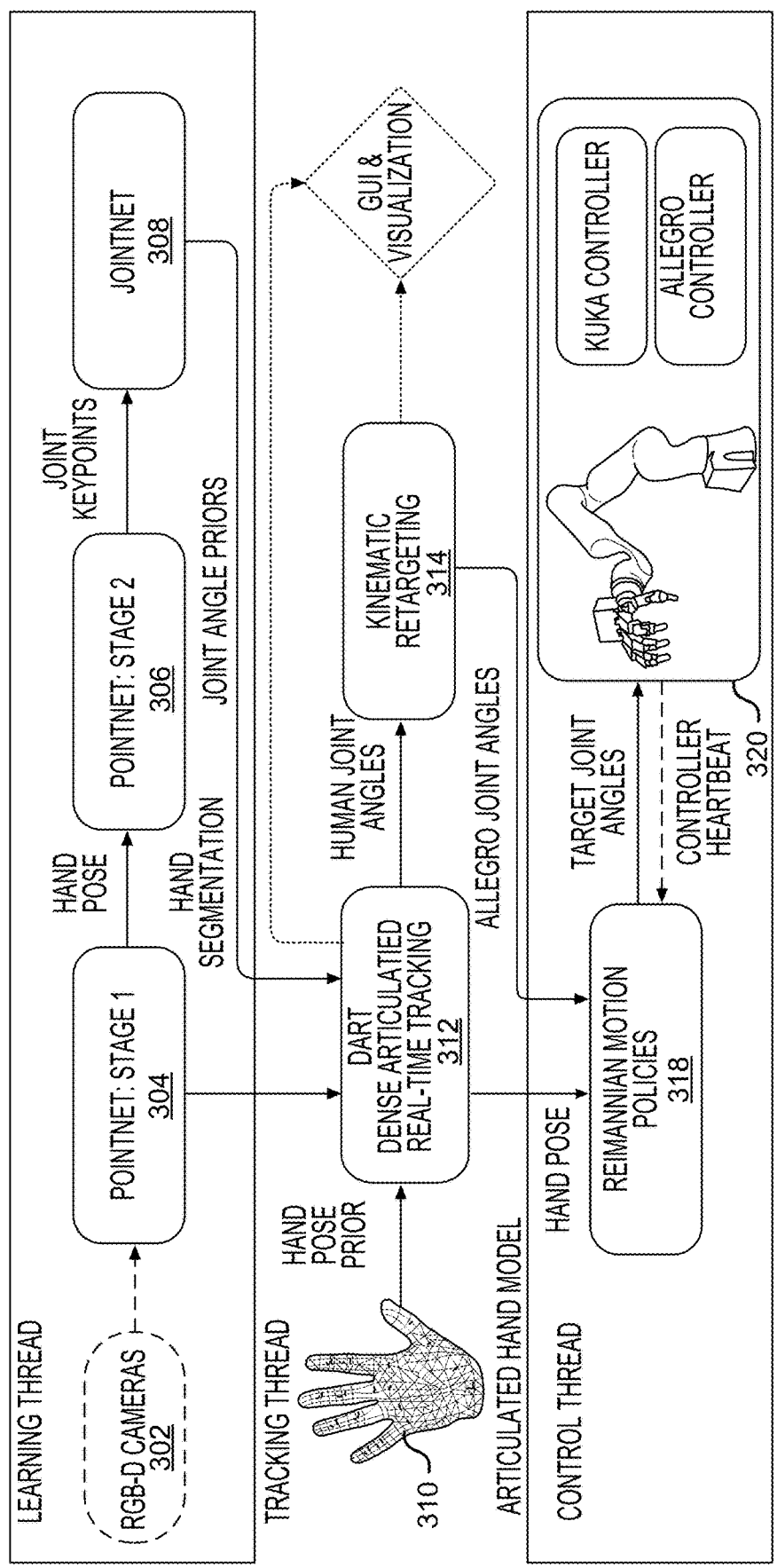
FIG. 3 illustrates an example of a system that tracks motion of a human hand and translates the motions to corresponding motions of a robotic arm, according to at least one embodiment.

FIG. 3 illustrates an example of a system that tracks a human hand in real-time and controls a robot to perform a corresponding motion, according to at least one embodiment. In at least one embodiment, the system operates using three threads, which are independent processes running on one or more processors of a computer system. In at least one embodiment, the learning thread provides hand pose and joint angle priors using fused input point cloud coming from four cameras from the studio. In at least one embodiment, the tracking thread runs DART for hand tracking with the priors as well as kinematic retargeting needed to map human hand configuration to allegro hand. In at least one embodiment, the control thread runs the Riemannian motion policies to provide the target joint commands to the KUKA and allegro hand given the hand pose and joint angles.

In at least one embodiment, one or more images of a hand are obtained from RGB-Depth ("RGB-D") cameras 302. The images are processed by a pointnet:stage 1 304, a pointnet:stage 2 306, and a jointnet 308 to produce a hand pose for the hand in the images. In at least one embodiment, an articulated hand model 310 and the hand pose are processed using DART 312 and kinematic retargeting 314 to produce a corresponding hand pose for a robotic gripper. In at least one embodiment, a control thread applies Riemannian motion policies 318 to the gripper hand pose, and the resulting information is used to control the robot 320.

FIG. 3 illustrates an embodiment that includes the following components: 1) DART for hand tracking, 2) deep neural networks for human hand state estimation and robustifying DART, 3) human hand state refinement with DART and its conversion through nonlinear optimization to Allegro hand states, and 4) motion generation and control through Riemannian Motion Policies (RMPs) and torque-level impedance controllers. An embodiment is shown in FIG. 3 where the above components are daisy chained. In at least one embodiment, altogether, the system produces a latency of about one second.

In at least one embodiment, DART is used for continuous pose and joint angle tracking of a human hand. In at least one embodiment, DART uses an articulated model of the hand that is registered against an input point cloud. A human hand model may be obtained and turned into a single mesh model. Utilizing computer-aided design ("CAD") software, the fingers of the mesh model may be separated into their respective proximal, medial, and distal links, and re-exported as separate meshes along with an associated extensible markup language ("XML") file that describes their kinematic arrangement. In total, the human hand model may possess 20 revolute joints: four joints per finger with one abduction joint and three flexion joints.

In at least one embodiment, DART is a model-based tracker that relies on non-linear optimization and initialization (e.g., from the previous frame or an initial guess). In some examples, if this initialization is not within the basin of convergence, the tracker can fail to converge to the correct solution. In various embodiments, when tracking the human hand model with point cloud data, the hand model may often snap to spurious local minima leading to tracking failures every few minutes. Therefore, to reliably track the human hand over long periods of time—useful for teleoperation—it may be desirable to have reliable hand pose priors, clean hand segmentation, and a multi-view camera studio to prevent the hand model from snapping onto unexpected local minima. In various embodiments, one method for generating hand pose priors is training a neural network on a large dataset of human hand poses given camera images.

Figure 4:
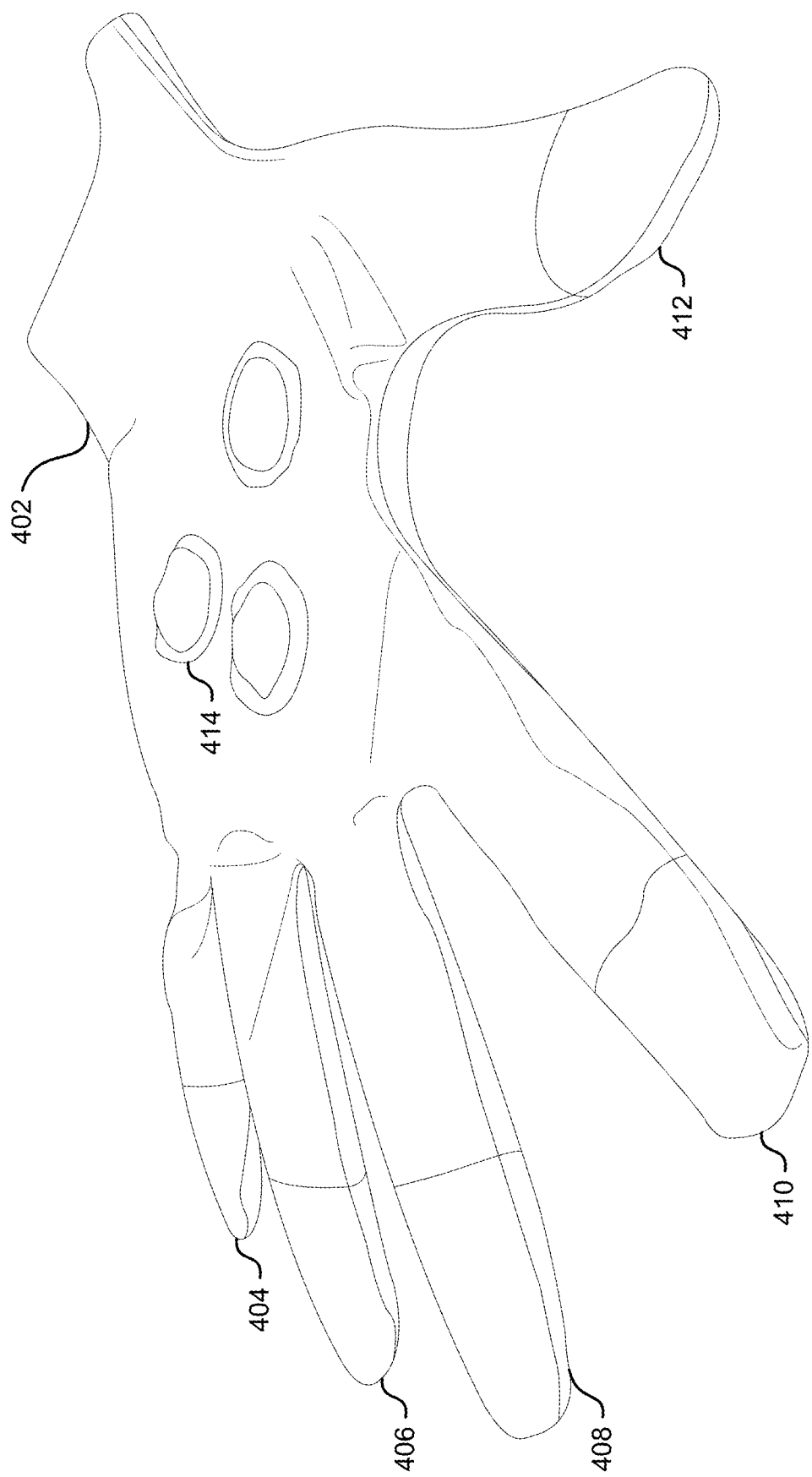
FIG. 4 illustrates an example of a glove usable for aiding in the estimation of a hand pose, according to at least one embodiment.

FIG. 4 illustrates an example of a color glove used to obtain hand pose and segmentation. In at least one embodiment, a glove 402 includes five fingers 404, 406, 408, 410, and 412, each of which is colored with a different color fabric. In at least one embodiment, unique colors are printed such that annotation generation is trivial with OpenCV color thresholding. In at least one embodiment, colors on the back of the palm 414 uniquely determine the pose of the hand.

In at least one embodiment, a fabric glove (such as shown in FIG. 4) with colored blobs is initially used as an effective solution for obtaining a hand pose prior with a deep neural network. In at least one embodiment, the data collection proceeds in two phases. In at least one embodiment, in the first phase, the user wears the glove to obtain hand pose priors for DART to track human hand robustly. In at least one embodiment, this process generates hand pose and joint angle annotations for raw depth maps from the RGB-D cameras for the second phase. In at least one embodiment, the second phase uses these annotations and operates on raw point cloud from corresponding depth maps and frees the user from having to wear the glove.

In at least one embodiment, the color glove is used it for hand tracking. In at least one embodiment, the glove has colored blobs at the finger tips and three at the back of the palm. In at least one embodiment, hand tracking includes both the hand pose and the joint angles of the fingers. In at least one embodiment, the user moves their hand over a table in a multi-camera studio with four Intel RealSense D415 RGB-D cameras pointing downwards to the table. In at least one embodiment, the problem of hand pose estimation with glove is formulated via keypoint localization. In at least one embodiment, ResNet-50 with spatial-softmax is used to regress from an RGB image to the 2D locations of the centers of the colored blobs on the glove, called GloveNet. In at least one embodiment, the colored blobs at finger-tips are also regressed but were found to be not helpful in full hand tracking in the end and the predictions of the blobs on the back of the palm are used for hand pose estimation.

In at least one embodiment, the hand pose can be estimated by three unique keypoints as indicated by three different colored blobs at the back of the palm of the glove. In at least one embodiment, to obtain annotations for the centers of the blobs, HSV thresholding in OpenCV is used to generate segmentations and compute the centroids of these segmented colored blobs. In at least one embodiment, to aid segmentation for high quality annotations, the user wears a black glove with colored blobs and moves the hand over a table also covered with black cloth. In at least one embodiment, the pose of the hand can be obtained via predicted 2D locations of the blobs from all four cameras: the 2D keypoints are converted to their corresponding 3D locations using the depth values resulting in each blob having four 3D predictions in total from four cameras. In at least one embodiment, these 3D locations are filtered and temporally smoothed to obtain the hand pose. In at least one embodiment, hand segmentation is also obtained by removing the 3D points that fall outside the bounding volume of the hand. In at least one embodiment, the dimensions of this volume were obtained heuristically from the hand pose obtained from the neural network predictions. In at least one embodiment, crucially, DART now only optimizes on the segmented hand points, preventing the hand model from sliding out to points on the arm as often observed when a full point cloud is used. In at least one embodiment, DART does not use RGB images—the glove only provides pose priors and aided hand segmentation—and therefore the result of DART with hand pose priors and segmentation in the first phase is generating annotations for raw point cloud captured with the cameras for a second phase which can operate on the bare human hand.

In at least one embodiment, in a second phase, it is desirable to free the user from having to wear glove in the future for any teleoperation. In at least one embodiment, while the first phase operates on RGB image, the second phase operates directly on fused point cloud of bare human hand obtained by back-projecting four depth maps from extrinsically calibrated cameras into a global reference frame. In at least one embodiment, the annotations for this phase come from the data generated in the first phase. In at least one embodiment, since the camera also provides synchronized depth images, tracking results of the first phase can provide annotations for point clouds.

In at least one embodiment, the fused point cloud contains both the points on table as well as human body and arm it becomes imperative to first localize the hand. In at least one embodiment, points on the table are removed by fitting a plane and the remaining points—containing the arm and human body—are fed an architecture that localizes the hand as well as provides the hand pose. In at least one embodiment, the network estimates hand pose via a voting based regression to the 3D positions of specified keypoints on the hand. In at least one embodiment, it is trained to predict 3D coordinates of 23 keypoints specified on the hand—4 joint keypoints each on 5 fingers and 3 at the back of the palm for hand pose estimation. In at least one embodiment, the loss function is standard Euclidean loss between predicted and the ground truth keypoints together with the voting loss. In at least one embodiment, an auxiliary segmentation loss is also added to obtain hand segmentation. In at least one embodiment, for efficiency reasons, any input point cloud of size N×3 is sub-sampled uniformly to a fixed 8192×3 size before feeding to a network.

Figure 5:
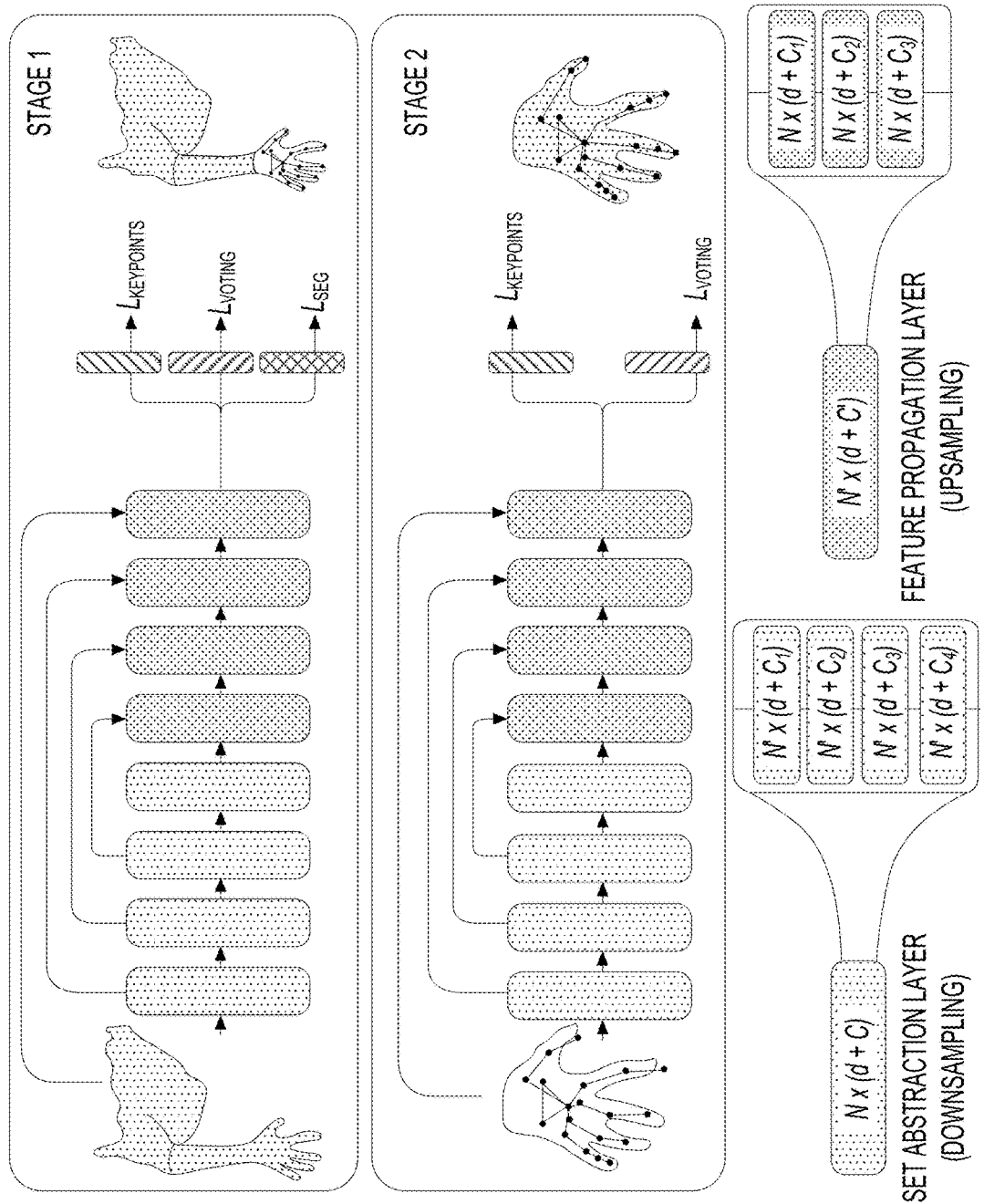
FIG. 5 illustrates an example of an architecture of a system that determines a hand pose, according to at least one embodiment.
Figure 7:
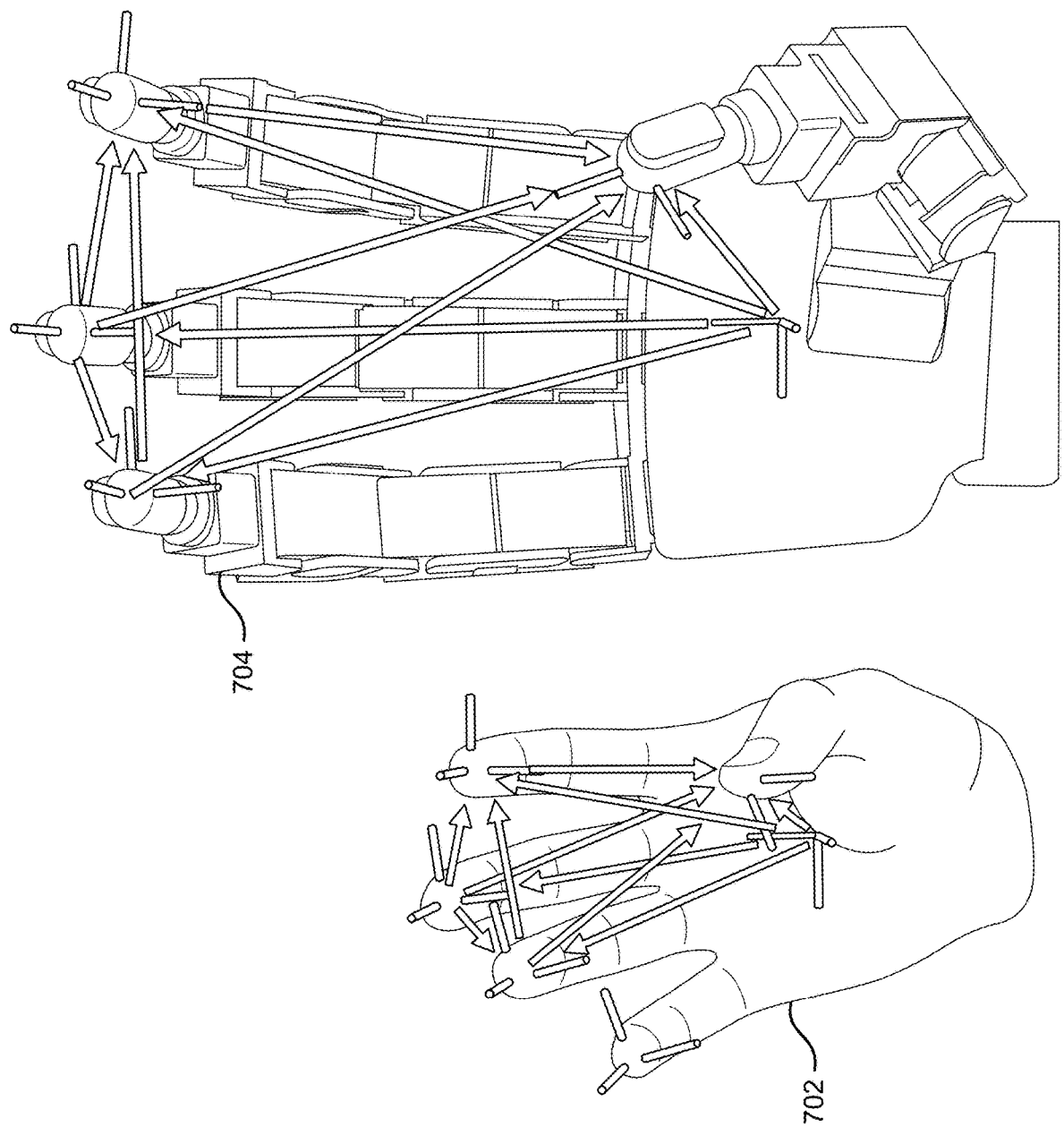
FIG. 7 illustrates an example of a human hand pose, and a robotic gripper performing a corresponding pose, according to at least one embodiment.

In at least one embodiment, while reasonable hand pose estimation and segmentation is achieved, getting high quality predictions for the 20 joint keypoints on the fingers remains difficult with this network. In at least one embodiment, the uniform sub-sampling used at the input means that points on the fingers are not densely sampled and therefore a second stage refinement is needed which resamples points on the hand from the original raw point cloud given the pose and segmentation of the first stage. In at least one embodiment, the overall network architecture is shown in FIG. 5. In at least one embodiment, the second stage is trained on only the loss functions pertaining to the keypoints and no segmentation is needed. In at least one embodiment, it uses the points sampled on the hand instead and predicts accurately the 23 keypoints. In at least one embodiment, to enable robustness to any inaccuracies in the hand pose from the first stage, additional randomization is added to the hand pose for second stage. In at least one embodiment, the FIG. 7 shows how the second stage refinement improves the system. In at least one embodiment, both stages of a network are trained on 100K point clouds collected over a batch of 30-45 minutes each for 7-8 hours in total by running DART with priors from the glove. In at least one embodiment, together they provide annotations for keypoints, joint angles and segmentation. The training takes 15 hours in total on a single NVIDIA TitanXp GPU.

In at least one embodiment, while keypoints are a natural representation for Euclidean space as used in PointNet++ architectures, most articulated models use joints as a natural parameterization. In at least one embodiment, it is desirable to have output in joint space which can serve as joint priors to DART. In at least one embodiment, a third neural network is trained that maps 23 keypoint locations predicted by PointNet++ inspired architecture to corresponding joint angles. In at least one embodiment, this neural network, called JointNet, is a two-layer fully connected network that takes input of size 23×3 and predicts 20-dimensional vector of joint angles for fingers.

In at least one embodiment, the neural networks are trained on data collected within the limits of the studio work volume across multiple human hands, ensuring accurate pose fits for this application and enabling sensible priors for DART. In at least one embodiment, qualitatively, the hand tracker worked well for hands geometrically close to the DART human hand model. In at least one embodiment, average keypoint error on a validation set of seven thousand images of differing hand poses and finger configurations was 9.7 mm and joint error was 1.33 degrees per joint.

In FIG. 5, the PointNet++ inspired architecture operates in two stages. The first stage segments the hand (as shown in pink color) as well as provides a rough hand pose. The second stage refines the hand pose given the hand segmentation and pose from the first stage. The loss functions include the segmentation loss, the Euclidean loss between the predicted keypoints and ground truth keypoints, and the voting loss as used in [11]. Since the second stage refines keypoints, the segmentation loss is not needed. The set abstraction takes an input of size N×(d+C) and outputs N'×(d+$C_4$) while the feature propagation layer takes N'×(d+C') input and outputs a tensor of size N×(d+$C_3$). Together these two form the backbone of the network. MLPs are used to map the embeddings of PointNet++ backbone to the corresponding desired outputs. More details of the network are in the Appendix.

Figure 6:
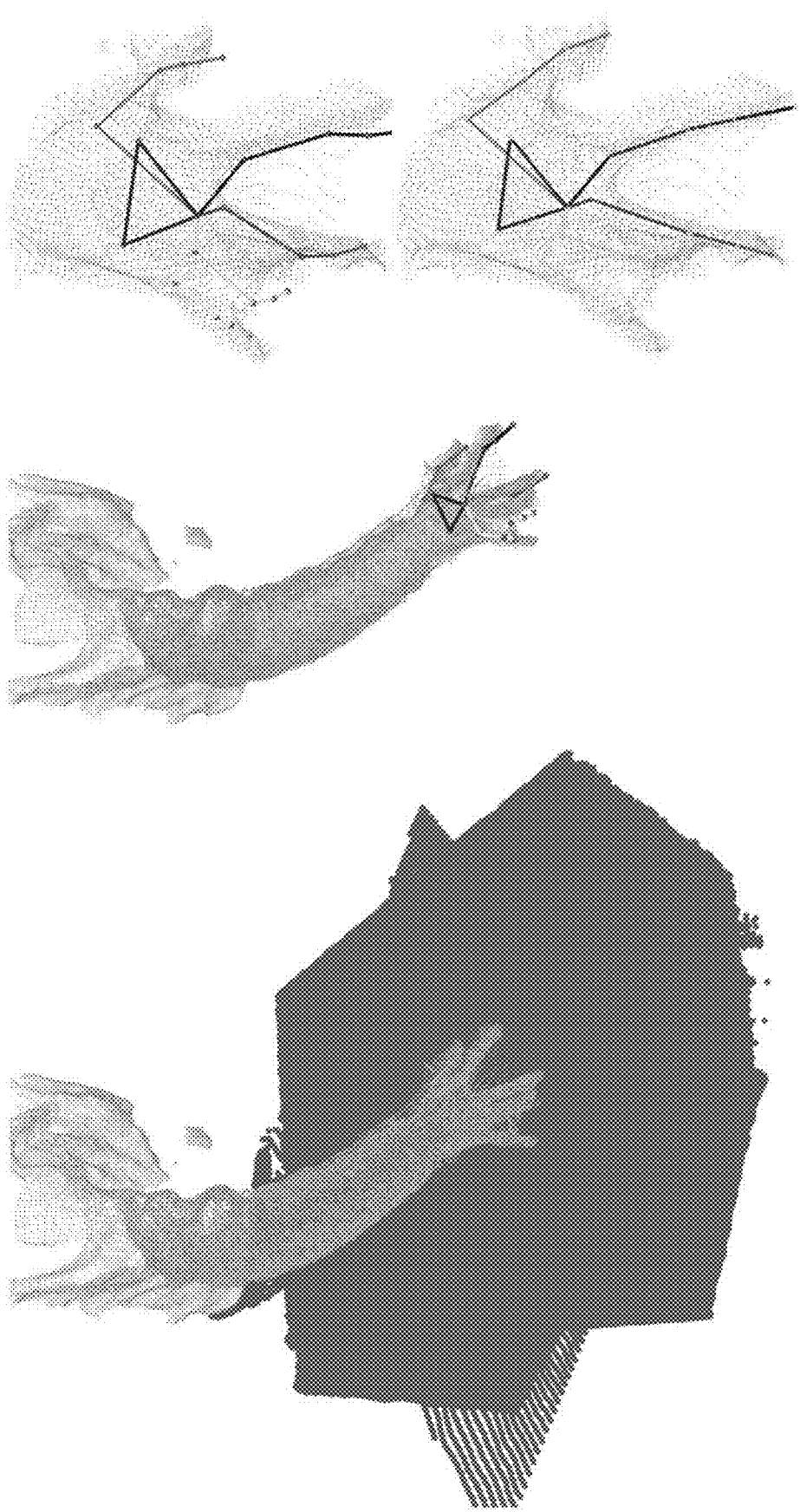
FIG. 6 illustrates an example of estimating a hand pose from a point cloud, according to at least one embodiment.

In FIG. 6, the input point cloud has points both from the table as well as the human body and arm, in an embodiment. In at least one embodiment, a plane was fit to remove points on the table and the remaining points are input to the first stage of a network that recovers the pose of the hand. In at least one embodiment, the second stage refines the pose and provides a more accurate result. In at least one embodiment, the hand images on the right show the result from stage 1 and stage 2 in FIG. 5.

In at least one embodiment, data collection is initiated with DART and no hand pose priors, seeding the training of an initial network to produce hand priors. Subsequently, DART and the latest trained neural network may generate increasing amounts of data. In at least one embodiment, the network is perpetually updated with the latest datasets to generate increasingly better priors for DART, which may ultimately extend the range over which DART can operate without any failures. In some examples, the hand pose neural network may be a PointNet-based architecture which operates directly on fused point cloud data obtained by back-projecting depth images from extrinsically calibrated depth cameras into a single global reference frame with annotations provided by DART. In various embodiments, since the fused point cloud contains both the points on table as well as human body and arm, it may be imperative to first localize the hand. Points may be removed from the table by fitting a plane and feeding the remaining points containing the arm and human body to PointNet which may localize the hand as well as provide the hand pose. PointNet may be based on estimating hand pose via a vote-based regression scheme to the 3D positions of specified keypoints on the hand, a technique which may be associated with spatial-softmax often used in 2D keypoint localization. In various embodiments, PointNet may be trained to predict 3D coordinates of 23 keypoints specified on the hand—four joint keypoints for each of the five fingers and three keypoints on the back of the hand for hand pose estimation. The loss function may be the Euclidean distance between predicted and the ground truth keypoints. Additionally, an auxiliary segmentation loss may be included to obtain hand segmentation. For efficiency reasons, any input point cloud may be sub-sampled uniformly to a fixed 8192×3 size before being fed to PointNet. In at least one embodiment, while reasonable hand pose estimation and segmentation may be achieved, high quality predictions for the 20 joint keypoints on the fingers may not yet be achieved. In at least one embodiment, the uniform sub-sampling used at the input may indicate that points on the fingers are not densely sampled, and therefore a second stage refinement may be needed which resamples points on the hand from the original raw point cloud given the pose and segmentation of the first stage. In at least one embodiment, the second stage may be trained on the same loss functions, but may only use the points sampled on the hand instead to predict accurately the 23 keypoints. In at least one embodiment, to enable robustness to any inaccuracies in the hand pose from the first stage, random perturbations may be added to the hand pose for second stage. FIG. 4 depicts the second stage refinement within the system, in accordance with at least one embodiment. In at least one embodiment, both stages of PointNet may be trained on 100K point clouds collected over a batch of 30-45 minutes each for 7-8 hours in total by running DART to provide annotations for keypoints, joint angles and segmentation. In at least one embodiment, to provide joint angle priors for fingers, a third neural network may be trained that maps keypoint locations predicted by PointNet to corresponding joint angles. This neural network, which may be referred to as JointNet, may be a two-layer fully connected network that takes input of size 23×3 and predicts 20-dimensional vector of joint angles for fingers.

In at least one embodiment, the neural networks are trained on data collected across multiple human hands, ensuring accurate pose fits for this system and enabling sensible priors for DART. In some embodiments, the hand tracker may work better for hands geometrically close to the DART human hand model.

In at least one embodiment, teleoperation of a robotic hand that is kinematically disparate from the human hand may require a module that can map the observed human hand joints to the robot hand joints, which can be referred to in some embodiments as the Allegro hand joints. FIG. 7 illustrates an example of a human hand pose 702, and a robotic gripper 704 performing a corresponding pose, according to at least one embodiment. There may be many different approaches to kinematic retargeting. For instance, in at least one embodiment, a module may be used to match the positions from the palm to the fingertips and medial joints, and the directionality of proximal phalanges and thumb distal phalange. In at least one embodiment, the optimized mapping may be used to label human depth images such that a deep network can ingest a depth image and output joint angles. In at least one embodiment, motion retargeting is also utilized. For instance, a deep recurrent neural network may be trained unsupervised to retarget motion between skeletons. In at least one embodiment, the system utilizes fingertip task-space metrics because distal regions may be of the highest priority in grasping and manipulation tasks as measured by their contact prevalence, degree of innervation, and heightened controllability for fine, in-hand manipulation skill. In at least one embodiment, the joint axes and locations between two hands may be different and, therefore, no metrics directly comparing joint angles between the two hands may be used. In at least one embodiment, to capture and optimize for the positioning of fingertips, both distance and direction among fingertips are considered. Specifically, in at least one embodiment, the cost function for kinematic retargeting may be chosen as:

$$C(q_h, q_a) = \frac{1}{2}\sum_{i=0}^{N} s(d_i)\|r_i(q_a) - f(d_i)\hat{r}_i(q_h)\|^2 + \gamma\|q_a\|^2$$

where $q_h$, $q_a$ may be the angles of the human hand model and Allegro hand, respectively, $r_i \in R^3$ may be the vector pointing from the origin of one coordinate system to another, expressed in the origin coordinate system (see FIG. 7). Furthermore, in at least one embodiment, $d_i = \|r_i(q_h)\|$ and $$\hat{r}_i(q_h) = \frac{r_i(q_h)}{\|r_i(q_h)\|}.$$

The switching weight function $s(d_i)$ may be defined as:

$$s(d_i) = \begin{cases} 1, & d_i > \epsilon \\ 200, & d_i \le \epsilon \wedge r_i(q_h) \in S_1 \\ 400, & d_i \le \epsilon \wedge r_i(q_h) \in S_2 \end{cases}$$

where $S_1$ may be vectors that originate from a primary finger (index, middle, ring) and point to the thumb, and $S_2$ may be vectors between two primary fingers when both primary fingers have associated vectors $\in S_1$ (e.g., both primary fingers are being projected with the thumb). In at least one embodiment, the distancing function, $f(d_i) \in R$ is defined as:

$$f(d_i) = \begin{cases} \beta d_i, & d_i > \epsilon \\ \eta_1, & d_i \le \epsilon \wedge r_i(q_h) \in S_1 \\ \eta_2, & d_i \le \epsilon \wedge r_i(q_h) \in S_2 \end{cases}$$

where $\beta = 1.6$ may be a scaling factor, $\eta_1 = 1 \times 10^{-4}$ m may be a distance between a primary finger and the thumb, and $\eta_2 = 3 \times 10^{-2}$ m may be a minimum separation distance between two primary fingers when both primary fingers are being projected with the thumb.

| Set | Description |
| --- | --- |
| $S_1$ | Vectors that originate from a primary finger (index, middle, ring) and point to the thumb. |
| $S_2$ | Vectors between two primary fingers when both primary fingers have associated vectors $\epsilon$ $S_1$, e.g., both primary fingers are being projected with the thumb. |

Figure 8:
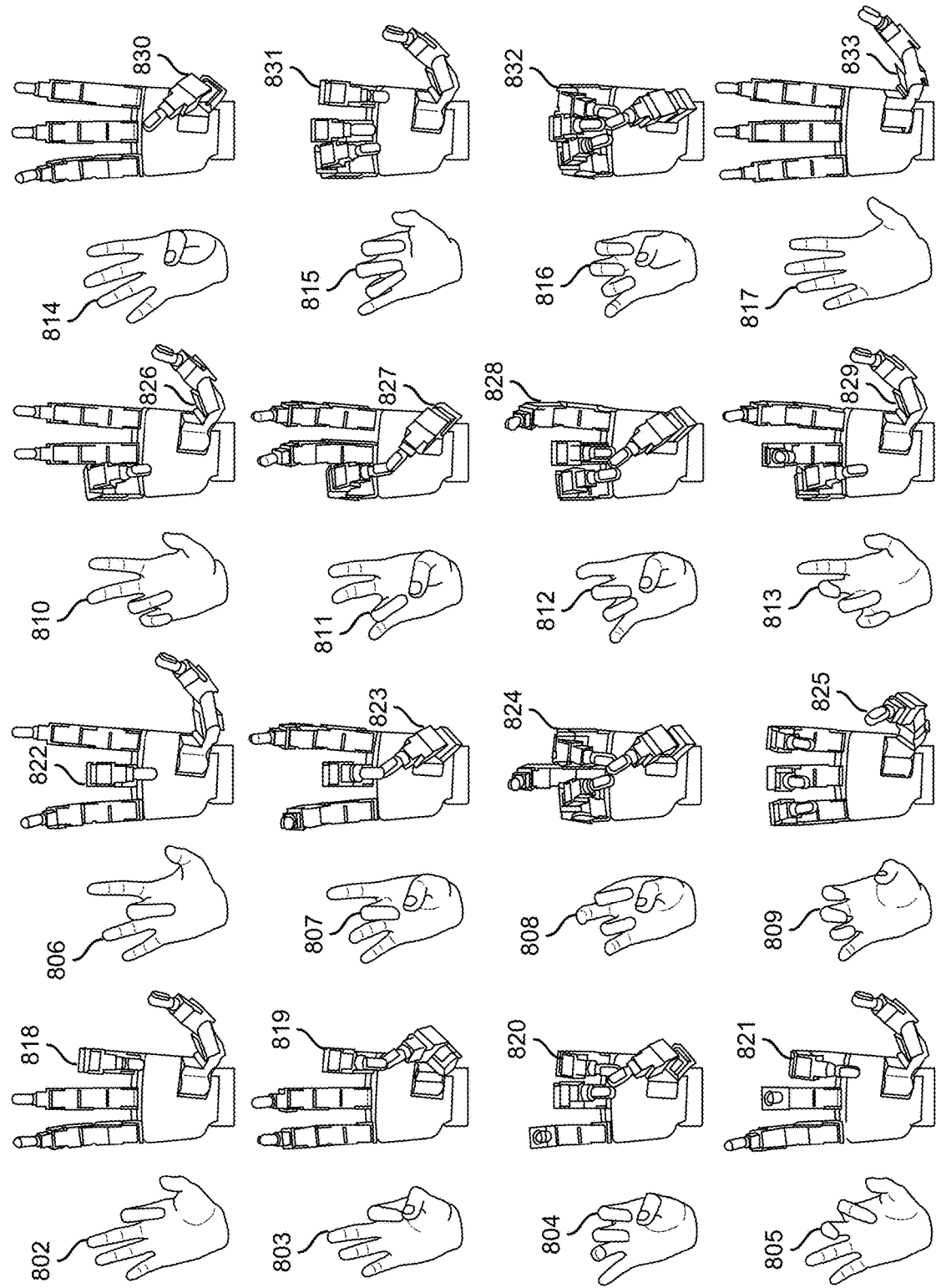
FIG. 8 illustrates an example of human hand poses, and corresponding robot gripper poses, according to at least one embodiment.

In at least one embodiment, these projections ensure that contacts between primary fingers and the thumb are close without inducing primary finger collisions in a precision grasp. In at least one embodiment, this may be particularly useful in the presence of visual finger tracking inaccuracies. In some examples, the vectors $r_i$ may not only capture distance and direction from one task space to another, but their expression in local coordinates may further contain information on how the coordinate systems, and thereby fingertips, are oriented with one another. In at least one embodiment, the coordinate systems of the human hand model may therefore have equivalent coordinate systems on the Allegro model with similarity in orientation and placement. The vectors shown in FIG. 7 may form a minimal set that produces the desired retargeting behavior. In some embodiments, $\gamma = 2.5 \times 10^{-3}$ may be a weight on regularizing the Allegro angles to zero (equivalent to fully opened the hand). In at least one embodiment, this term helps with reducing redundancy in solution and ensure that the hand never enters strange minima that may be difficult to recover from (e.g., the fingers embedding themselves into the palm). In at least one embodiment, various mappings from human hand 602-617 to an Allegro robotic hand 618-633 as produced by the kinematic retargeting are shown in FIG. 8. FIG. 8 illustrates a collection of human hand poses 802-817 and corresponding poses for a robotic gripper 818-833.

In at least one embodiment, the above cost function is minimized in real-time using the Sequential Least-Squares Quadratic Programming ("SLSQP") algorithm. In at least one embodiment, the routine is initiated with Allegro joint angles set to zero, and every solution thereafter may be initiated with the preceding solution. In at least one embodiment, the forward kinematic calculations between the various coordinate systems of both the human hand model and Allegro hand are found. In at least one embodiment, a first-order low-pass filter is applied to the raw retargeted joint angles in order to remove high-frequency noise present in tracking the human hand and to smooth discrete events, like the projection algorithm inducing step-response changes in retargeted angles.

In at least one embodiment, Riemannian Motion Policies ("RMPs") are real-time motion generation methods that calculate acceleration fields from potential function gradients and corresponding Riemannian metrics. In at least one embodiment, RMPs combine the generation of multi-priority Cartesian trajectories and collision avoidance behaviors together in one cohesive framework. In at least one embodiment, they are used to control the Cartesian pose of the Allegro palm given the observed human hand pose while avoiding arm-palm collisions with the table or operator using collision planes. In at least one embodiment, given these objectives, the RMPs generated target arm joint trajectories that were sent to the arm's torque-level impedance controller at 200 Hz. In at least one embodiment, the kinematically retargeted Allegro angles were sent to the torque-level joint controller at 30 Hz. In at least one embodiment, one final calibration detail involves registering human hand pose movements with the robot system. In at least one embodiment, this is accomplished by finding the transformation from the robot coordinate system to the camera coordinate system. In at least one embodiment, this transformation is calculated using the initial view of the human hand and an assumed initial pose of the robot hand. In at least one embodiment, to facilitate spatial reasoning of the pilot, the desired initial hand pose of the pilot is a fully open hand with the palm parallel to the table and fingers pointing forwards. In at least one embodiment, the assumed initial pose of the robot mimics this pose. In at least one embodiment, in this way, the robot moves in the same direction as the pilot's hand, enabling intuitive spatial reasoning.

Overall, the system can be reliably used to solve a variety of tasks spanning a range of difficulty. In some examples, the ability to solve these tasks reveals that the system may have the dexterity to exhibit precision and power grasps, multi-fingered prehensile and non-prehensile manipulation, in-hand finger gaiting, and compound in-hand manipulation (e.g., grasping with two fingers while simultaneously manipulating with the remaining fingers).

Figure 9:
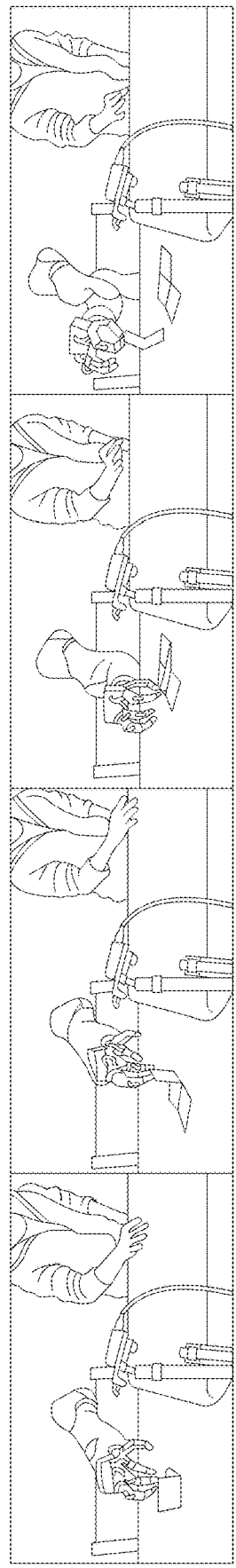
FIG. 9 illustrates an example of a task where a robot is controlled to take paper out of a folded wallet, according to at least one embodiment.

FIG. 9 illustrates an example of a task where a robot is controlled to take paper out of a folded wallet, according to at least one embodiment. In at least one embodiment, the pilot has to open the wallet first and move it to a particular vantage location in order to pull out paper currency. In at least one embodiment, the hand is able to keep the paper by pinching fingers against each other.

Figure 10:
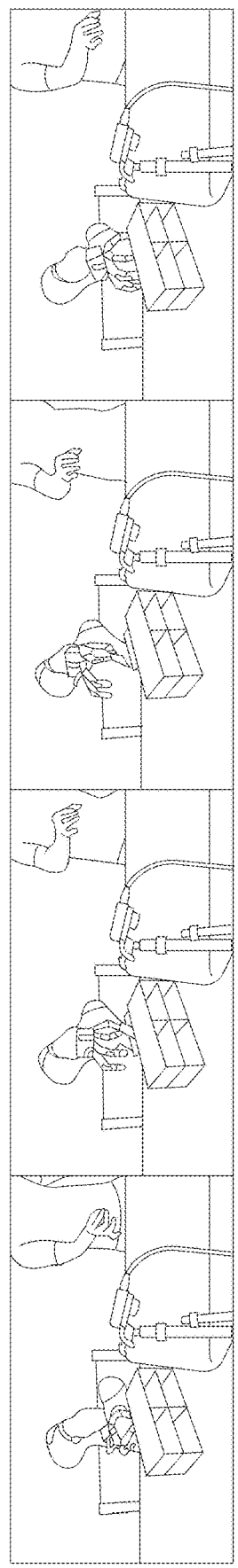
FIG. 10 illustrates an example of a task where a robot is controlled to remove an object from a drawer, according to at least one embodiment.

FIG. 10 illustrates an example of a task where a robot is controlled to remove an object from a drawer, according to at least one embodiment. In at least one embodiment, this is a somewhat long horizon task and requires dexterity in opening the drawer and holding onto the tea bag.

Figure 11:
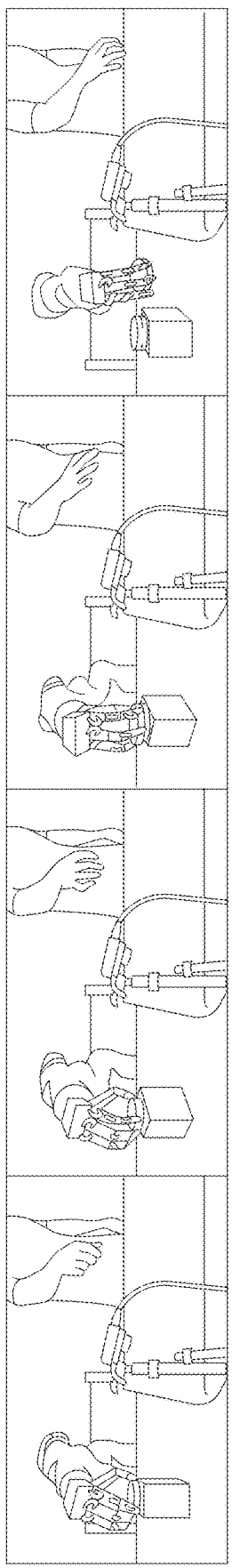
FIG. 11 illustrates an example of a task where a robot is controlled to open ajar, according to at least one embodiment.

FIG. 11 illustrates an example of a task where a robot is controlled to open ajar, according to at least one embodiment. In at least one embodiment, the task requires rotating the cap multiple times in order to open while maintaining the contacts.

Figure 12:
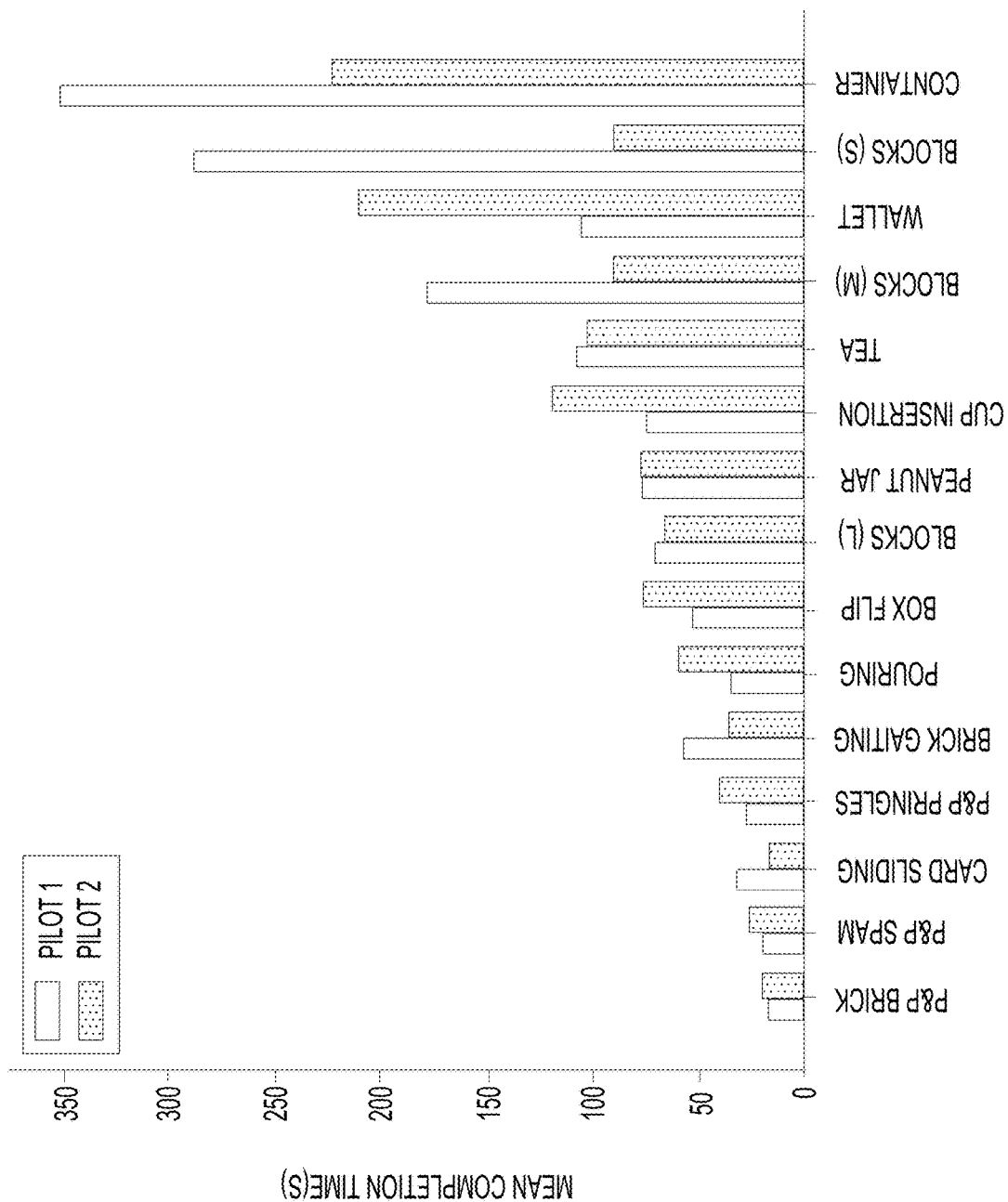
FIG. 12 illustrates an example of completion time of teleoperation tasks, in accordance with an embodiment.
Figure 13:
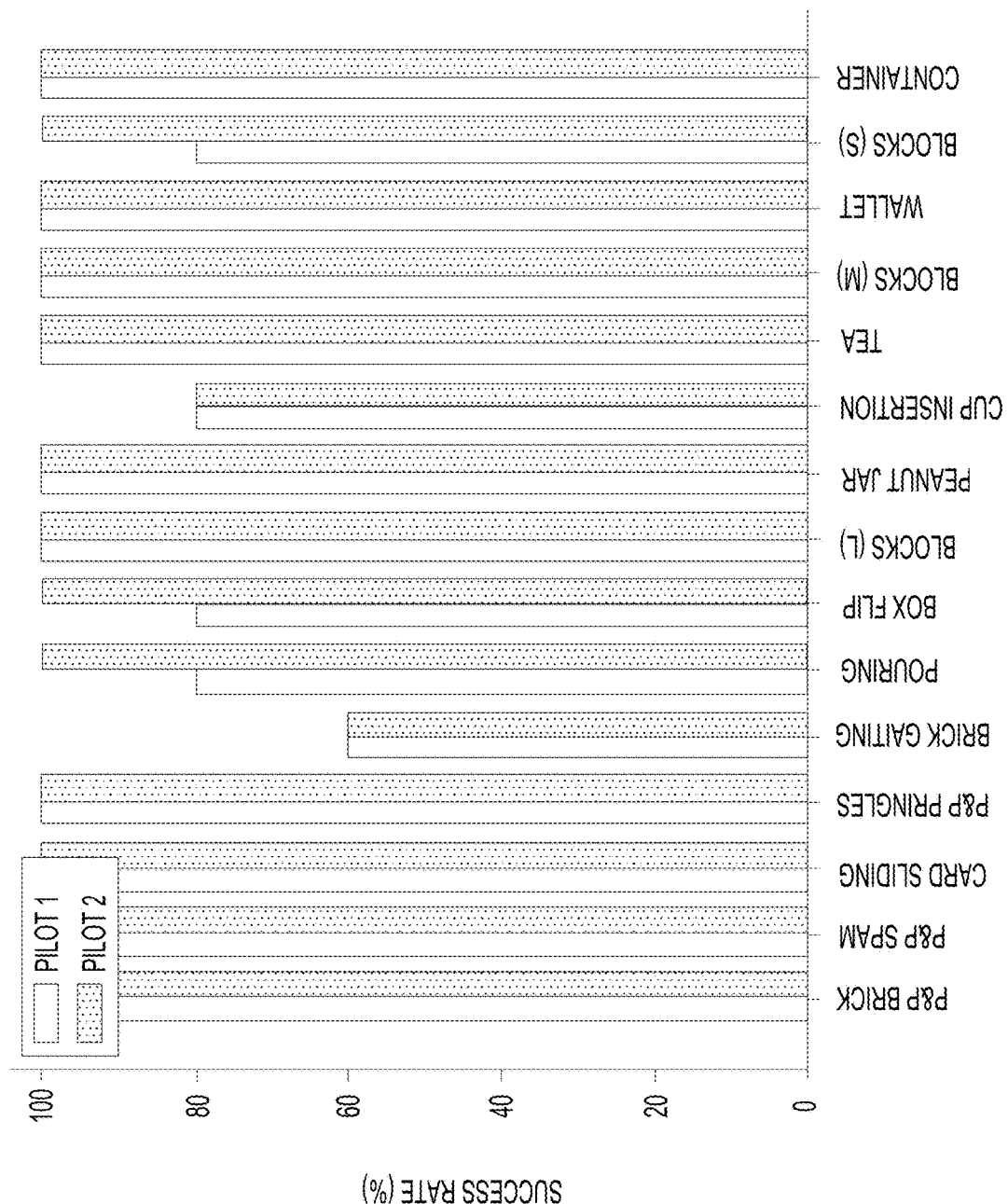
FIG. 13 illustrates an example of the success rate of teleoperation tasks, in accordance with an embodiment.

The table below describes examples of 15 different tasks of varying complexity ranging from classic pick and place to multi-step, long horizon tasks. In at least one embodiment, each of these tasks is operated with five (5) consecutive trials to avoid preferential selection, and success rate is reported accordingly. In at least one embodiment, if the object falls out of the workspace volume, the trial is considered a failure. The last column represents the skills needed for teleoperation as the hand changes its state over time.

cess rate which capture speed and reliability of the teleoperation system. The system was tested with two pilots and the performance measures are reported in FIGS. 12 and 13.

In at least one embodiment, the system can be reliably used to solve a variety of tasks with a range of difficulty. In at least one embodiment, differences in mean CT across tasks indicate the effects of task complexity and horizon scale. In at least one embodiment, discrepancies in mean CT across pilots per task indicate that there does exist a dependency on pilot behavior. In at least one embodiment, effects include fatigue, training, creativity, and motivation. In at least one embodiment, the ability to solve these tasks reveals that the teleoperation system has the dexterity to exhibit precision and power grasps, multi-fingered prehensile and non-prehensile manipulation, in-hand finger gaiting, and compound in-hand manipulation (e.g., grasping with two fingers while simultaneously manipulating with the remaining fingers). In at least one embodiment, note, certain tasks, e.g. Container and Wallet, take a particularly long time to teleoperate largely due to the fact that these tasks are multi-stage tasks. On the other hand, the task requiring picking small cubes can be particularly challenging because the behavior of releasing the grasps on these objects with the projection scheme used in kinematic retargeting can be unpredictable. Nevertheless, such a rich exhibition of dexterous skill transferred solely through the observation of the bare human hand provides empirical evidence that the approach and architecture herein works well, in various

| Task | Description | Required Skills |
|---|---|---|
| Pick and Place<br>Foam brick<br>Pringles can<br>Spam box | Pick object on the table and place it in a red bowl. | grasping, releasing |
| Block Stacking<br>Large (L)<br>(6.3 cm)<br>Medium (M)<br>(3.8 cm)<br>Small (S)<br>(2.3 cm) | Stacking three blocks on top of each other. | precision grasping,<br>precision releasing |
| Pouring Beads | Pour beads from a cup into a bowl. | grasping, pouring |
| Opening Jar | Open peanut jar and place lid on table. | finger gaiting, grasping, releasing |
| Brick Gaiting | Pick up and in-hand rotate brick 180 degrees and place back down. | grasping, in-hand manipulation, releasing |
| Container | Open plastic container, extract and open cardboard box. | twisting, pulling, pushing, grasping, in-hand manipulation |
| Cup Insertion | Inserting concentric cups inside each other. | grasping, releasing |
| Tea Drawer | Pull open tea drawer, extract single bag of tea and place on table, close tea drawer. | precision grasping, pulling, pushing, releasing |
| Card Sliding | Slide a card along the box and pick it up with two fingers. | sliding, precision grasping, releasing |
| Wallet | Open the wallet and pull out paper money. | precision grasping, pulling, pushing, in-hand manipulation |
| Box Flip | Flip the box by 90 degrees and place it on the designated goal. | pushing, grasping, releasing |

In one experiment, the pilots went through a warm-up training phase where they tried to solve the task with three to five (3-5) nonconsecutive attempts. Later, five consecutive test trials were conducted by each pilot for each task to avoid preferential selection of results and pilots were graded based on their performance. The performance metrics for these tasks include mean completion time ("CT") and success embodiments. In at least one embodiment, an important aspect that is worth highlighting is that although the full teleoperation process for a particular task may not be perfect (e.g., the pilot may lose an object in hand but fetches it again to accomplish the task), the data collected is still equally valuable in helping the robot learn to recover from failures. In at least one embodiment, the data can be regarded as play data which is useful to learn long-range planning. In at least one embodiment, discrete events like intermittent finger-object contacts can be observed in the tactile signals. In at least one embodiment, undulations in these state-action signals reveal the rich, complex behavior evoked in the system through this embodied setting. In at least one embodiment, force estimates can also be obtained. In at least one embodiment, this data can now be generated on demand for a particular task with the hope that functional sensorimotor patterns may be gleaned and imparted to the system in an autonomous setting.

In at least one embodiment, the system may enable a highly-actuated hand-arm system to find a motor solution to a variety of manipulation tasks by translating observed human hand and finger motion to robot arm and finger motion. In at least one embodiment, several tasks, like extracting paper money from a wallet and opening a cardboard box within a plastic container, may be so complex that hand-engineering a robot solution or applying learning methods directly may be likely intractable. Solving these tasks and others through the embodied robotic may allow for these solutions to be generated on demand for many demonstrations. Furthermore, creating these solutions on the system itself may allow for the reading, access, and storage of the various tactile signals in the robot's fingertips, various commanded and measured joint position and velocity signals through the hand and arm, various torque commands throughout the system, and any camera feeds associated with the system. In at least one embodiment, this rich source of data together with demonstrations of tasks may be used to solve complex, multi-stage, long-horizon tasks.

The techniques described herein provide, in at least one embodiment, a viable, low-cost solution for teleoperating a high DoA robotic system. In at least one embodiment, the observable work volume of the pilot could be enlarged to allow for tasks that cover greater distances with better RGB-D cameras. In at least one embodiment, the projection schemes in kinematic retargeting enable successful manipulation of small objects but can interfere with finger-gaiting tasks and timely releasing grasps on small objects. In at least one embodiment, this issue is solved entirely with hand tracking that can accurately resolve situations where the human hand fingertips are making contact. In at least one embodiment, human hand tracking is further improved with enhanced robustness across size and shape of the pilot's hand. The lack of tactile feedback may make precision tasks difficult to complete. To compensate, in at least one embodiment, building in autonomous control features alleviates some of the control burden on the pilot. In at least one embodiment, the system latency is reduced and the responsiveness of the RMP motion generator is tuned for faster reactions. In at least one embodiment, high-precision tasks like slip-fit peg-in-hole insertions pose a challenge. In at least one embodiment, the difficulty of completing tasks is significantly reduced with improved hand tracking performance, automated precision grip control on the assembly objects, and improved sight to the small parts and insertion locations.

In at least one embodiment, the input to the system is a point cloud of the hand of the human demonstrator. In at least one embodiment, a neural network, such as a neural network based on the PointNet++ neural network, maps the point cloud to an estimate of the hand's pose relative to the camera as well as the joint angles of the hand. In at least one embodiment, these estimates along with an articulated hand model and the original point cloud is then given to DART, which performs tracking by refining upon the neural network estimates. Finally, to perform kinematic retargeting, an optimization problem is solved that finds the Allegro hand joint angles that result in fingertip poses close to those of the human hand, in an embodiment.

In at least one embodiment, hand tracking with a glove is done via keypoint detection with neural networks. In at least one embodiment, the user wears a black glove with colored blobs and moves the hand on a table covered with black cloth, i.e., the scene is instrumented in a way that aids hand tracking. In at least one embodiment, since the colors are distinct and most of the background is black, OpenCV HSV color thresholding is used to generate annotations for these colored blobs. In at least one embodiment, the HSV thresholds vary with the time of the day and therefore data is collected across days to build a big dataset of 50K images. At least one embodiment uses a neural network to fit this data which makes the whole process robust to lighting changes and bad annotations and avoids the burden on the user to find the appropriate thresholds at test time. In at least one embodiment, the network, called GloveNet, uses four (4) layers of ResNet-50 with spatial-softmax at the end to regress to the 2D locations of finger-tips. At least one embodiment uses anti-aliased ResNet-50 for accurate and consistent predictions. Various stages of the pipeline are explained below.

At least one embodiment uses imgaug and applies various data augmentations while training. At least one embodiment focuses on the hand moving on the table. For each training image, at least one embodiment sets the color values of all pixels with depth beyond a threshold to zero. At training time, at least one embodiment either fills these zeroed-out values with any of the colors on the glove or leaves the image unchanged based on a random number generator. At least one embodiment also replaces these zeroed-out values random noise based on some probability. In at least one embodiment, the network learns to ignore the colors in the background that look similar to the colors on the glove.

At least one embodiment obtains confidence for each predicted finger-tip location using test-time augmentation ("TTA"). At least one embodiment generates new images by shifting the original image by random shifts and passing them all through the network in one batch. At least one embodiment then subtracts the applied random shifts from the predicted positions for each image to bring them into the reference frame of the original image and average them out to obtain the mean and standard deviation. At least one embodiment uses the standard deviation as a confidence measure. At least one embodiment also uses this to clean up the ground truth data that is noisy.

At test time, at least one embodiment generates four randomly shifted images per camera image and a combined total of 16 images from all four cameras. At least one embodiment computes the predicted finger-tip locations and their confidence measures and discards those that have low confidence. Of the confident ones, at least one embodiment computes the Euclidean distances $d_i$ between them and the previous finger-tip locations and turns them into probabilities $p_i$ via softmax:

$$p_i = \frac{\exp(-\alpha(d_i - \min_i d_i))}{\Sigma_{i=0}^{N} \exp(-\alpha(d_i - \min_i d_i))}$$

At least one embodiment pushes the predicted locations that have probability $p_i > 0.2$ in a rolling buffer and computes the geometric median to obtain the final predicted location of the fingertip in 3D. The hyper-parameter α=500.

| layer name | output size | parameters |
|---|---|---|
| input | 320 × 240 | — |
| conv1 | 160 × 120 | 7 × 7, 64, stride 2 |
|  |  | 3 × 3 max pool, stride 2 |
| conv2 | 80 × 60 | $\begin{bmatrix} 1\times 1, 64 \\ 3\times 3, 64 \\ 1\times 1, 256 \end{bmatrix} \times 3$ |
| conv3 | 40 × 30 | $\begin{bmatrix} 1\times 1, 128 \\ 3\times 3, 128 \\ 1\times 1, 512 \end{bmatrix} \times 4$ |
| conv_transpose | 80 × 60 | 3 × 3, 8 |
| spatial_softmax | 8 × 2 | β = 50 |

In at least one embodiment, the predictions of the blobs at the back of the palm were stable, but the predictions of finger-tips blobs tended to be quite inconsistent across time. In at least one embodiment, since the annotations were generated by computing the center of mass ("CoM") of the segmented blob using the HSV color thresholding in OpenCV, the CoM of the finger-tip were somewhat inconsistent across frames due to occlusions. Therefore, at least one embodiment relies only on the hand pose estimate provided by the blobs at the back of the palm.

| layer name | mlp features | radius | num points |
|---|---|---|---|
| $SA_1$ | [13, 64, 64, 128] | 0.2 | 2048 |
| $SA_2$ | [128, 128, 128, 256] | 0.4 | 1024 |
| $SA_3$ | [256, 128, 128, 256] | 0.8 | 512 |
| $SA_4$ | [256, 128, 128, 256] | 1.2 | 256 |
| $FP_4$ | [256 + 256, 256, 256] |  | 512 |
| $FP_3$ | [256 + 256, 256, 256] |  | 1024 |
| $FP_2$ | [256 + 128, 256, 256] |  | 2048 |
| $FP_1$ | [256 + 3, 256, 256] |  | 8192 |

In at least one embodiment, the architecture is composed of four (4) set abstraction layers, SAi and four (4) feature propagation layers, FPj. In at least one embodiment, the set abstraction layer sub-samples the points while the feature propagation layer interpolates features at a higher resolution.

In at least one embodiment, a set abstraction level takes N×(d+C) as input of N points with d-dim coordinates and C-dim point feature. At least one embodiment outputs tensor of N'×(d+C') where N' sub-sampled points with d-dim coordinates and new C'-dim feature vectors summarize local context.

In at least one embodiment, in a feature propagation level, point features are propagated from $N_i \times (d+C)$ points to $N_{i-1}$ points where $N_{i-1}$ and $N_i$ (with $N_i \leq N_{i-1}$) are point set size of input and output of set abstraction level i. In at least one embodiment, it is achieved by interpolating feature values of $N_i$ points at coordinates of the points. In at least one embodiment, the interpolated features on $N_{i-1}$ points are then concatenated with skip linked point features from the set abstraction level.

In at least one embodiment, the backbone of the hand pose estimation is an architecture which returns an embedding, f, of size N×C. Different MLPs are used to map this embedding to the corresponding desired outputs.

$$z = \text{mlp\_layer1}(f)$$

$$\delta_{xyz} = \text{voting}(z)$$

$$\text{cords} = \text{input}_{xyz} + \delta_{xyz}$$

$$\text{JointMask}_{xyz} = \text{sigmoid}(\text{seg}(z))$$

$$\text{HandSeg}_{xyz} = \text{cls}(z)$$

$$\text{HandSegProb}_{xyz} = \text{sigmoid}(\text{HandSeg}_{xyz})$$

$$\text{weights} = \text{HandSegProb}_{xyz} \text{JointMask}_{xyz}$$

$$\text{Keypoints} = \frac{\sum \text{weights} \cdot \text{coords}}{\sum \text{weights}}$$

| layer name | parameters |
|---|---|
| mlp layer1 | [256, 256, 256] |
| voting | [256, 23 × 3] |
| seg | [256, 23] |
| cls | [256, 2] |

In at least one embodiment, the voting layer obtains the relative positions, $\delta_{xyz}$, of the 23 keypoints with respect to each point. The seg layer obtains the masks for each keypoint i.e. the neighborhood of points that contribute to the location of a keypoint. In at least one embodiment, the HandSeg layer segments the hand from the background. At least one embodiment uses Euclidean losses for both voting as well as Keypoints while a sigmoid cross-entropy is used for HandSeg.

In at least one embodiment, the 23×3 keypoint locations are unrolled to a 69-dimensional vector before feeding to the JointNet which returns a 20-dimensional vector of joint angles. In at least one embodiment, of all the hand-designed architectures tried, this particular architecture proved to be an effective trade-off between accuracy and efficiency.

| layer name | parameters |
|---|---|
| linear1 | 69 × 128 |
| linear2 | 128 × 256 |
| linear3 | 256 × 20 |

The completion times for the five (5) consecutive trials for each of the tasks are shown, for an embodiment. In at least one embodiment, the failed trial is denoted by F. In at least one embodiment, for most of the trials, the pilot only used three to four (3-4) training trails to warm up. In at least one embodiment, these five (5) consecutive trials allow for testing both the ability to carry out a certain task without getting tired as well as showcasing that the tracking works without failures. In at least one embodiment, the performance can vary depending on the pilot and how they are feeling on a given day, but experiments have revealed that the performance is in general quite similar.

| Task | Pilots | Completion Times for 5 Consecutive Trials(s) | | | | | Mean | Std. |
|---|---|---|---|---|---|---|---|---|
| Pick and Place: Brick | Pilot 1 | 19 | 16 | 17 | 11 | 18 | 16 | 3.11 |
| Pick and Place: Brick | Pilot 2 | 22 | 22 | 19 | 16 | 14 | 19 | 3.57 |

-continued

| Task | Pilots | Completion Times for 5 Consecutive Trials(s) | | | | | Mean | Std. |
|---|---|---|---|---|---|---|---|---|
| Pick and Place: Spam | Pilot 1 | 28 | 14 | 15 | 16 | 23 | 19 | 6.05 |
| Pick and Place: Spam | Pilot 2 | 23 | 23 | 28 | 29 | 20 | 25 | 3.78 |
| Card Sliding | Pilot 1 | 27 | 26 | 32 | 38 | 35 | 32 | 5.12 |
| Card Sliding | Pilot 2 | 18 | 12 | 18 | 15 | 17 | 16 | 2.54 |
| Pick and Place: Pringles | Pilot 1 | 50 | 18 | 20 | 29 | 18 | 27 | 13.6 |
| Pick and Place: Pringles | Pilot 2 | 25 | 53 | 29 | 36 | 63 | 41 | 16.22 |
| Brick Gaiting | Pilot 1 | 48 | 67 | F | F | 58 | 58 | 9.50 |
| Brick Gaiting | Pilot 2 | 37 | 44 | F | F | 28 | 36 | 8.02 |
| Pouring | Pilot 1 | 38 | 42 | 32 | F | 28 | 35 | 6.21 |
| Pouring | Pilot 2 | 73 | 56 | 62 | 50 | 57 | 60 | 8.61 |
| Box Flip | Pilot 1 | 51 | 39 | 45 | F | 77 | 53 | 16.73 |
| Box Flip | Pilot 2 | 174 | 26 | 90 | 30 | 67 | 77 | 60.18 |
| Blocks (L) | Pilot 1 | 41 | 49 | 54 | 45 | 165 | 71 | 52.87 |
| Blocks (L) | Pilot 2 | 53 | 93 | 79 | 43 | 61 | 66 | 20.12 |
| Peanut Jar | Pilot 1 | 89 | 66 | 79 | 77 | 75 | 77 | 8.25 |
| Peanut Jar | Pilot 2 | 68 | 105 | 84 | 87 | 57 | 80 | 18.45 |
| Cup Insertion | Pilot 1 | 64 | 94 | 70 | F | 71 | 75 | 13.2 |
| Cup Insertion | Pilot 2 | 125 | F | 124 | 124 | 112 | 121 | 6.18 |
| Tea | Pilot 1 | 48 | 115 | 170 | 58 | 154 | 109 | 55.00 |
| Tea | Pilot 2 | 54 | 48 | 99 | 105 | 213 | 104 | 66.22 |
| Blocks (M) | Pilot 1 | 179 | 278 | 64 | 80 | 298 | 180 | 108.37 |
| Blocks (M) | Pilot 2 | 99 | 48 | 82 | 75 | 152 | 91 | 38.63 |
| Wallet | Pilot 1 | 105 | 66 | 195 | 96 | 63 | 105 | 61.82 |
| Wallet | Pilot 2 | 321 | 92 | 328 | 100 | 218 | 212 | 114.36 |
| Blocks (S) | Pilot 1 | 136 | 371 | 169 | F | 484 | 290 | 165.88 |
| Blocks (S) | Pilot 2 | 113 | 89 | 69 | 117 | 67 | 91 | 23.57 |
| Container | Pilot 1 | 442 | 271 | 375 | 297 | 405 | 358 | 72.18 |
| Container | Pilot 2 | 189 | 212 | 258 | 238 | 243 | 228 | 27.39 |

In at least one embodiment, retargeting with neural networks produces unsatisfactory results—it does not provide the accuracy commensurate with the online optimization with sequential least squares. In at least one embodiment, the projection threshold used in retargeting can require some tuning when grasping small objects, and therefore it becomes cumbersome to train a neural network for a new arbitrary task.

In at least one embodiment, a hand-tracking system relies on a combination of model-based and model-free tracking. In at least one embodiment, model-based tracking systems tend to be more accurate as they optimize online on the input observations given the model. In at least one embodiment, however, since the optimization tends to be highly nonlinear, they also need a good initialization to find a sensible solution. In at least one embodiment, at least one embodiment uses a model-free system which can provide good initialization. In at least one embodiment, a model-free system is a neural network trained on the data generated by a model-based system.

In at least one embodiment, a model-based tracker in DART [27] is used and data is collected in the regions where it works reliably, and this is done repeatedly to cover a wide range of poses. In at least one embodiment, the performance of DART can be stochastic: it may work for the same motion reliably at times and fail catastrophically at other times due to spurious local minima in the optimization given the input point cloud. In at least one embodiment, however, if data is collected for the scenarios where it works reasonably well, a neural network can be used to fit this data and ensure that it can provide good initialization for DART preventing it from falling into the spurious local minima in future. In at least one embodiment, this is incumbent on the fact that neural networks can generalize slightly outside the range of training set. In at least one embodiment, this procedure of data collection and neural network fitting is performed repeatedly and improves the performance of DART such that tracking works without any failures for a long duration. In at least one embodiment, a two-stage PointNet++ based architecture is trained on the annotations generated by DART and allows at least one embodiment to make the tracking both robust and accurate by providing good initialization.

Figure 14:
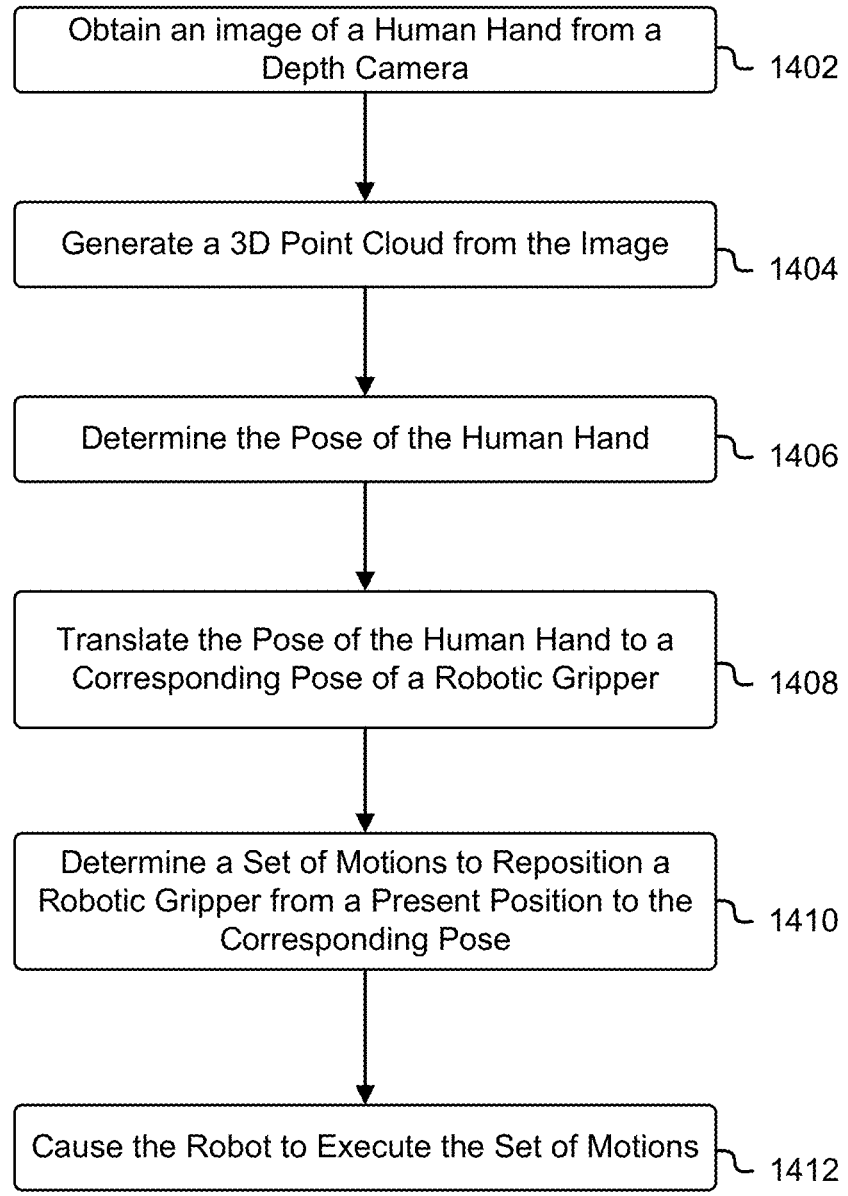
FIG. 14 illustrates an example of a process that, as a result of being performed by a computer system, directs a robotic arm to perform a task by emulating the motion of a human hand.
Figure 21:
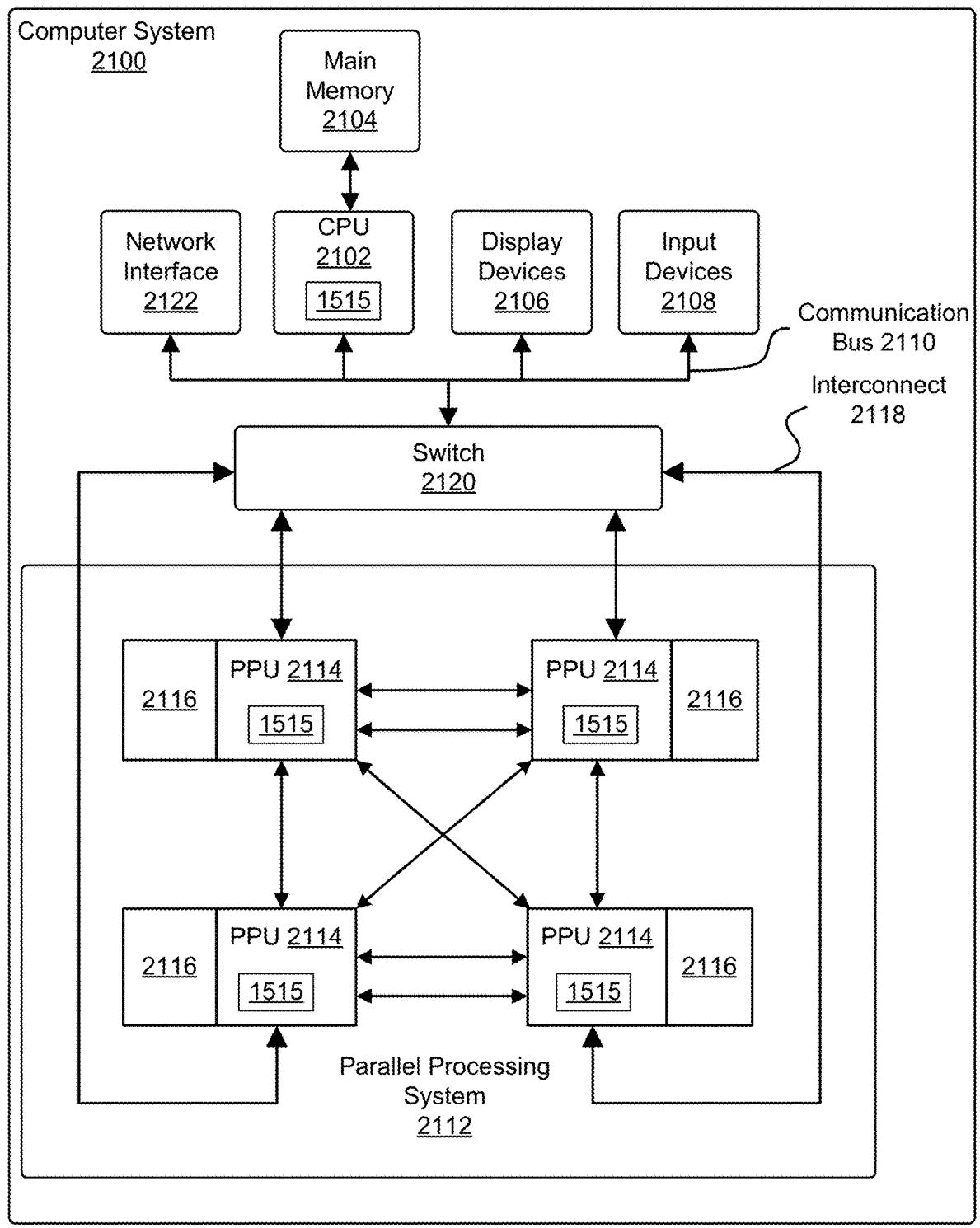
FIG. 21 illustrates a computer system, according to at least one embodiment.
Figure 22:
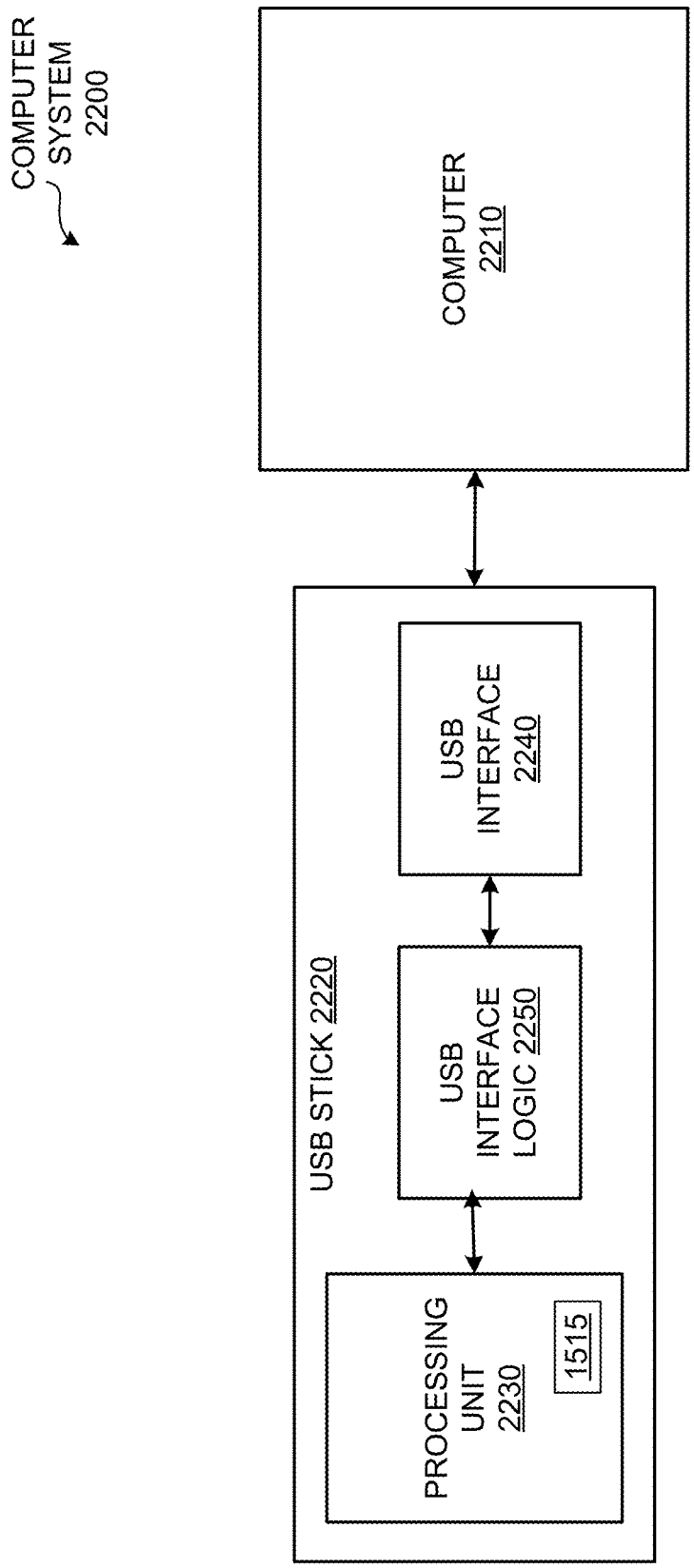
FIG. 22 illustrates a computer system, according at least one embodiment.

FIG. 14 illustrates an example of a process that, as a result of being performed by a computer system, directs a robotic arm to perform a task by emulating the motion of a human hand. In at least one embodiment, the computer system is a computer system as shown in FIGS. 21-23. In at least one embodiment, the computer system includes a processor and memory, where the memory stores executable instructions that, as a result of being executed by the processor, cause the system to perform the operations shown in FIG. 14 and described in the description below. In at least one embodiment, the processor is a plurality of processors or a specialized processor such as a GPU as shown in FIGS. 15-43 and described below.

In at least one embodiment, at block 1402, the computer system obtains an image of a human hand from a depth camera. In various embodiments, the depth camera can be an RGB depth camera, a binocular camera, a radar or laser-based imager, or a medical imaging system such as an MRI, x-ray, a computerized tomography, or computerized axial tomography scanner. In at least one embodiment, at block 1404, the computer system generates a point cloud of the human hand from the image. The point cloud provides three-dimensional data describing the hand from which a pose can be determined. In at least one embodiment, at block 1406, the computer system analyzes the point cloud to determine a joint structure and joint angles for the hand. This, in various embodiments, in combination with the location of the hand in space comprises the pose of the hand.

In at least one embodiment, at block 1408, the computer system translates the pose of the human hand into a corresponding pose of a robotic gripper. In at least one embodiment, the robotic gripper can be an articulated robotic hand similar to that of a human hand. The articulated robotic hand may have fewer or greater digits than a human hand, and each digit of the articulated robotic hand may have one or more articulated segments. In at least one embodiment, the pose of the human hand includes a set of articulated segments and joint angles as well as an overall position of the human hand, and the pose of the robotic gripper is determined by duplicating the joint angles of the human hand pose using the robotic hand. In at least one embodiment, the robotic hand has fewer digits than the human hand, and poses associated with a subset of the human digits are used to determine the corresponding pose of the robotic gripper. In at least one embodiment, the robotic gripper may be larger or smaller than the human hand, and a scale factor is applied to the pose of the human hand when determining a corresponding pose of the robotic gripper. In at least one embodiment, the pose of the human hand includes a location of the hand, and a corresponding location for the robotic hand is determined by translating a coordinate system from one respective to the human pilot to that of the robot. In some examples, a scale factor may be applied to the location aspect of the pose. For example, a six-inch movement of the human hand may correspond to a six-foot movement of the robotic gripper.

In at least one embodiment, at block 1410, the computer system determines a set of motions to reposition the robotic gripper from a present position to the corresponding pose determined at block 1408. In at least one embodiment, the system determines a path of motion for the robotic hand that changes the robotic hand from its present pose to the pose determined at block 1408. In at least one embodiment, these motions are determined in accordance with Reimannian motion policies. In at least one embodiment, at block 1412, the computer system causes the robot to perform the set of motions determined at block 1410. In at least one embodiment, as a result, the robotic gripper moves to assume the pose corresponding to that of the human hand. In various embodiments, using these techniques, a pilot is able to direct the motion of the robot intuitively through motions of the pilot's hand. In at least one embodiment, no glove or worn apparatuses is required.

Inference and Training Logic

Figure 15A:
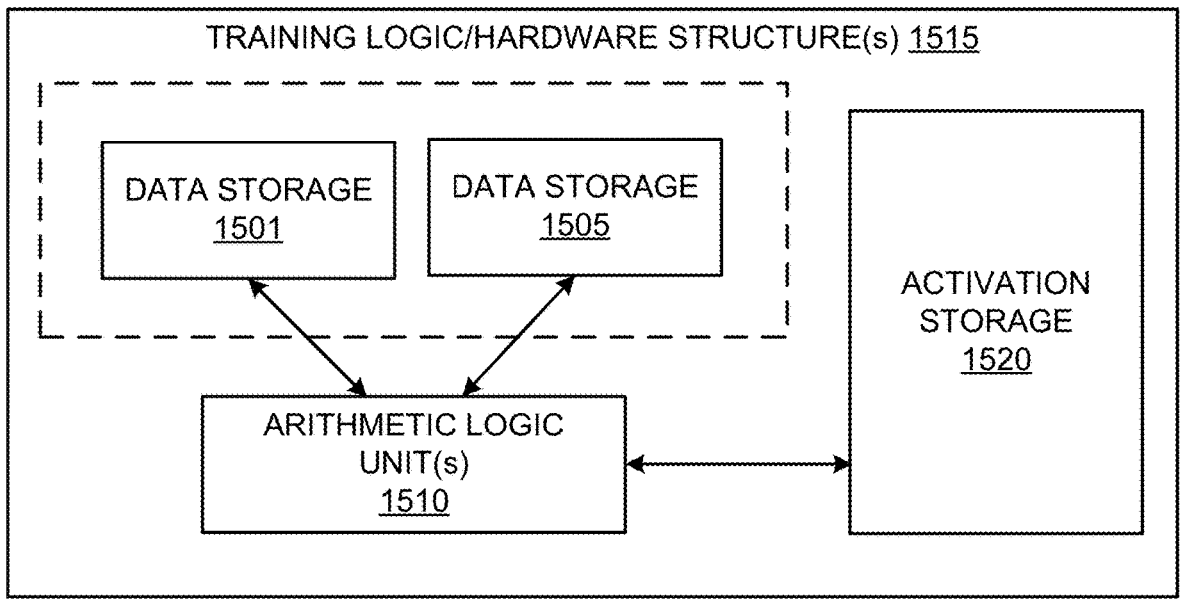
FIG. 15A illustrates inference and/or training logic, according to at least one embodiment.

FIG. 15A illustrates inference and/or training logic 1515 used to perform inferencing and/or training operations associated with one or more embodiments. Details regarding inference and/or training logic 1515 are provided below in conjunction with FIGS. 15A and/or 15B.

In at least one embodiment, inference and/or training logic 1515 may include, without limitation, code and/or data storage 1501 to store forward and/or output weight and/or input/output data, and/or other parameters to configure neurons or layers of a neural network trained and/or used for inferencing in aspects of one or more embodiments. In at least one embodiment, training logic 1515 may include, or be coupled to code and/or data storage 1501 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment code and/or data storage 1501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1501 may be included with other on-chip or off-chip data storage, including a processor's L1, L2, or L3 cache or system memory.

In at least one embodiment, any portion of code and/or data storage 1501 may be internal or external to one or more processors or other hardware logic devices or circuits. In at least one embodiment, code and/or code and/or data storage 1501 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1515 may include, without limitation, a code and/or data storage 1505 to store backward and/or output weight and/or input/output data corresponding to neurons or layers of a neural network trained and/or used for inferencing in aspects of one or more embodiments. In at least one embodiment, code and/or data storage 1505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1515 may include, or be coupled to code and/or data storage 1505 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1505 may be included with other on-chip or off-chip data storage, including a processor's L1, L2, or L3 cache or system memory. In at least one embodiment, any portion of code and/or data storage 1505 may be internal or external to on one or more processors or other hardware logic devices or circuits. In at least one embodiment, code and/or data storage 1505 may be cache memory, DRAM, SRAM, non-volatile memory (e.g., Flash memory), or other storage. In at least one embodiment, choice of whether code and/or data storage 1505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1501 and code and/or data storage 1505 may be separate storage structures. In at least one embodiment, code and/or data storage 1501 and code and/or data storage 1505 may be same storage structure. In at least one embodiment, code and/or data storage 1501 and code and/or data storage 1505 may be partially same storage structure and partially separate storage structures. In at least one embodiment, any portion of code and/or data storage 1501 and code and/or data storage 1505 may be included with other on-chip or off-chip data storage, including a processor's L1, L2, or L3 cache or system memory.

In at least one embodiment, inference and/or training logic 1515 may include, without limitation, one or more arithmetic logic unit(s) ("ALU(s)") 1510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1520 that are functions of input/output and/or weight parameter data stored in code and/or data storage 1501 and/or code and/or data storage 1505. In at least one embodiment, activations stored in activation storage 1520 are generated according to linear algebraic and or matrix-based mathematics performed by ALU(s) 1510 in response to performing instructions or other code, wherein weight values stored in code and/or data storage 1505 and/or data 1501 are used as operands along with other values, such as bias values, gradient information, momentum values, or other parameters or hyperparameters, any or all of which may be stored in code and/or data storage 1505 or code and/or data storage 1501 or another storage on or off-chip.

In at least one embodiment, ALU(s) 1510 are included within one or more processors or other hardware logic devices or circuits, whereas in another embodiment, ALU(s) 1510 may be external to a processor or other hardware logic device or circuit that uses them (e.g., a co-processor). In at least one embodiment, ALUs 1510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 1501, code and/or data storage 1505, and activation storage 1520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1520 may be cache memory, DRAM, SRAM, non-volatile memory (e.g., Flash memory), or other storage. In at least one embodiment, activation storage 1520 may be completely or partially within or external to one or more processors or other logical circuits. In at least one embodiment, choice of whether activation storage 1520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1515 illustrated in FIG. 15A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1515 illustrated in FIG. 15A may be used in conjunction with central processing unit ("CPU") hardware, graphics processing unit ("GPU") hardware or other hardware, such as field programmable gate arrays ("FPGAs").

Figure 15B:
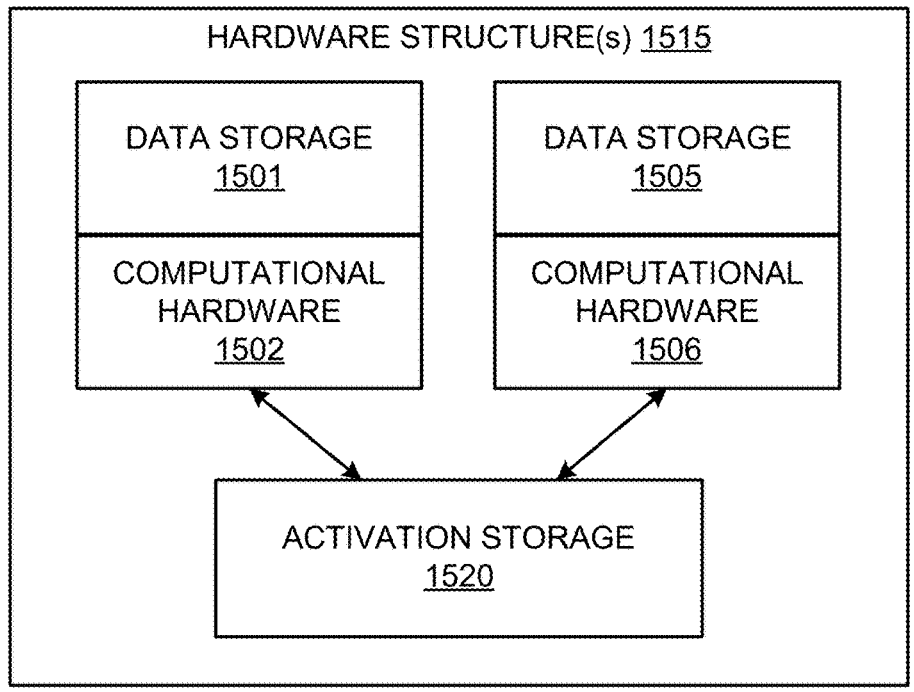
FIG. 15B illustrates inference and/or training logic, according to at least one embodiment.

FIG. 15B illustrates inference and/or training logic 1515, according to at least one embodiment various. In at least one embodiment, inference and/or training logic 1515 may include, without limitation, hardware logic in which computational resources are dedicated or otherwise exclusively used in conjunction with weight values or other information corresponding to one or more layers of neurons within a neural network. In at least one embodiment, inference and/or training logic 1515 illustrated in FIG. 15B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1515 illustrated in FIG. 15B may be used in conjunction with central processing unit (CPU) hardware, graphics processing unit (GPU) hardware or other hardware, such as field programmable gate arrays (FPGAs). In at least one embodiment, inference and/or training logic 1515 includes, without limitation, code and/or data storage 1501 and code and/or data storage 1505, which may be used to store code (e.g., graph code), weight values and/or other information, including bias values, gradient information, momentum values, and/or other parameter or hyperparameter information. In at least one embodiment illustrated in FIG. 15B, each of code and/or data storage 1501 and code and/or data storage 1505 is associated with a dedicated computational resource, such as computational hardware 1502 and computational hardware 1506, respectively. In at least one embodiment, each of computational hardware 1502 and computational hardware 1506 comprises one or more ALUs that perform mathematical functions, such as linear algebraic functions, only on information stored in code and/or data storage 1501 and code and/or data storage 1505, respectively, result of which is stored in activation storage 1520.

In at least one embodiment, each of code and/or data storage 1501 and 1505 and corresponding computational hardware 1502 and 1506, respectively, correspond to different layers of a neural network, such that resulting activation from one "storage/computational pair 1501/1502" of code and/or data storage 1501 and computational hardware 1502 is provided as an input to next "storage/computational pair 1505/1506" of code and/or data storage 1505 and computational hardware 1506, in order to mirror conceptual organization of a neural network. In at least one embodiment, each of storage/computational pairs 1501/1502 and 1505/1506 may correspond to more than one neural network layer. In at least one embodiment, additional storage/computation pairs (not shown) subsequent to or in parallel with storage computation pairs 1501/1502 and 1505/1506 may be included in inference and/or training logic 1515.

Neural Network Training and Deployment

Figure 16:
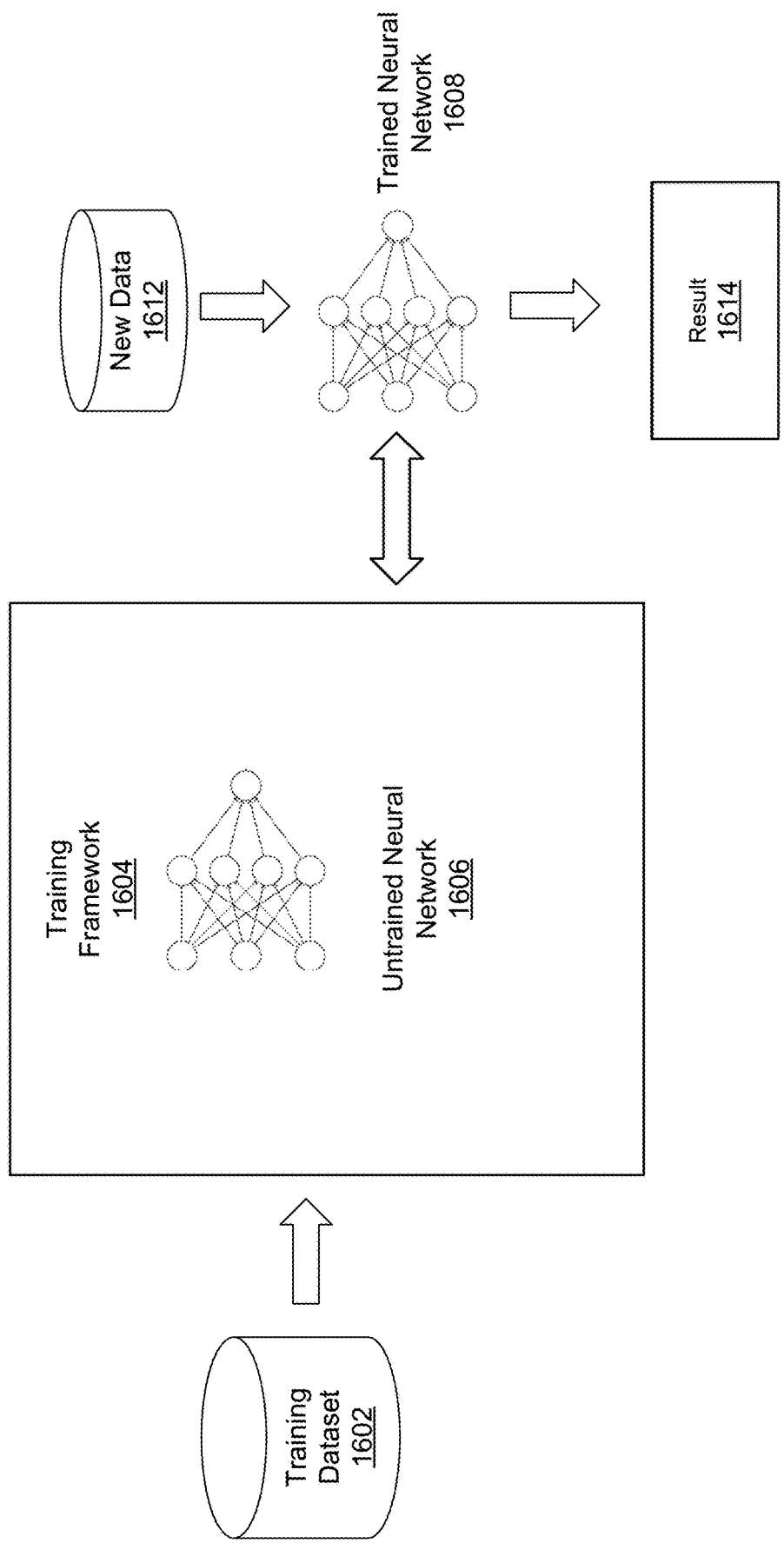
FIG. 16 illustrates training and deployment of a neural network, according to at least one embodiment.

FIG. 16 illustrates training and deployment of a deep neural network, according to at least one embodiment. In at least one embodiment, untrained neural network 91606 is trained using a training dataset 1602. In at least one embodiment, training framework 1604 is a PyTorch framework, whereas in other embodiments, training framework 1604 is a Tensorflow, Boost, Caffe, Microsoft Cognitive Toolkit/CNTK, MXNet, Chainer, Keras, Deeplearning4j, or other training framework. In at least one embodiment training framework 1604 trains an untrained neural network 1606 and enables it to be trained using processing resources described herein to generate a trained neural network 1608. In at least one embodiment, weights may be chosen randomly or by pre-training using a deep belief network. In at least one embodiment, training may be performed in either a supervised, partially supervised, or unsupervised manner.

In at least one embodiment, untrained neural network 1606 is trained using supervised learning, wherein training dataset 1602 includes an input paired with a desired output for an input, or where training dataset 1602 includes input having a known output and an output of neural network 1606 is manually graded. In at least one embodiment, untrained neural network 1606 is trained in a supervised manner processes inputs from training dataset 1602 and compares resulting outputs against a set of expected or desired outputs. In at least one embodiment, errors are then propagated back through untrained neural network 1606. In at least one embodiment, training framework 1604 adjusts weights that control untrained neural network 1606. In at least one embodiment, training framework 1604 includes tools to monitor how well untrained neural network 1606 is converging towards a model, such as trained neural network 1608, suitable to generating correct answers, such as in result 1614, based on known input data, such as new data 1612. In at least one embodiment, training framework 1604 trains untrained neural network 1606 repeatedly while adjust weights to refine an output of untrained neural network 1606 using a loss function and adjustment algorithm, such as stochastic gradient descent. In at least one embodiment, training framework 1604 trains untrained neural network 1606 until untrained neural network 1606 achieves a desired accuracy. In at least one embodiment, trained neural network 1608 can then be deployed to implement any number of machine learning operations.

In at least one embodiment, untrained neural network 1606 is trained using unsupervised learning, wherein untrained neural network 1606 attempts to train itself using unlabeled data. In at least one embodiment, unsupervised learning training dataset 1602 will include input data without any associated output data or "ground truth" data. In at least one embodiment, untrained neural network 1606 can learn groupings within training dataset 1602 and can determine how individual inputs are related to untrained dataset 1602. In at least one embodiment, unsupervised training can be used to generate a self-organizing map, which is a type of trained neural network 1608 capable of performing operations useful in reducing dimensionality of new data 1612. In at least one embodiment, unsupervised training can also be used to perform anomaly detection, which allows identification of data points in a new dataset 1612 that deviate from normal patterns of new dataset 1612.

In at least one embodiment, semi-supervised learning may be used, which is a technique in which in training dataset 1602 includes a mix of labeled and unlabeled data. In at least one embodiment, training framework 1604 may be used to perform incremental learning, such as through transferred learning techniques. In at least one embodiment, incremental learning enables trained neural network 1608 to adapt to new data 1612 without forgetting knowledge instilled within network during initial training.

Data Center

Figure 17:
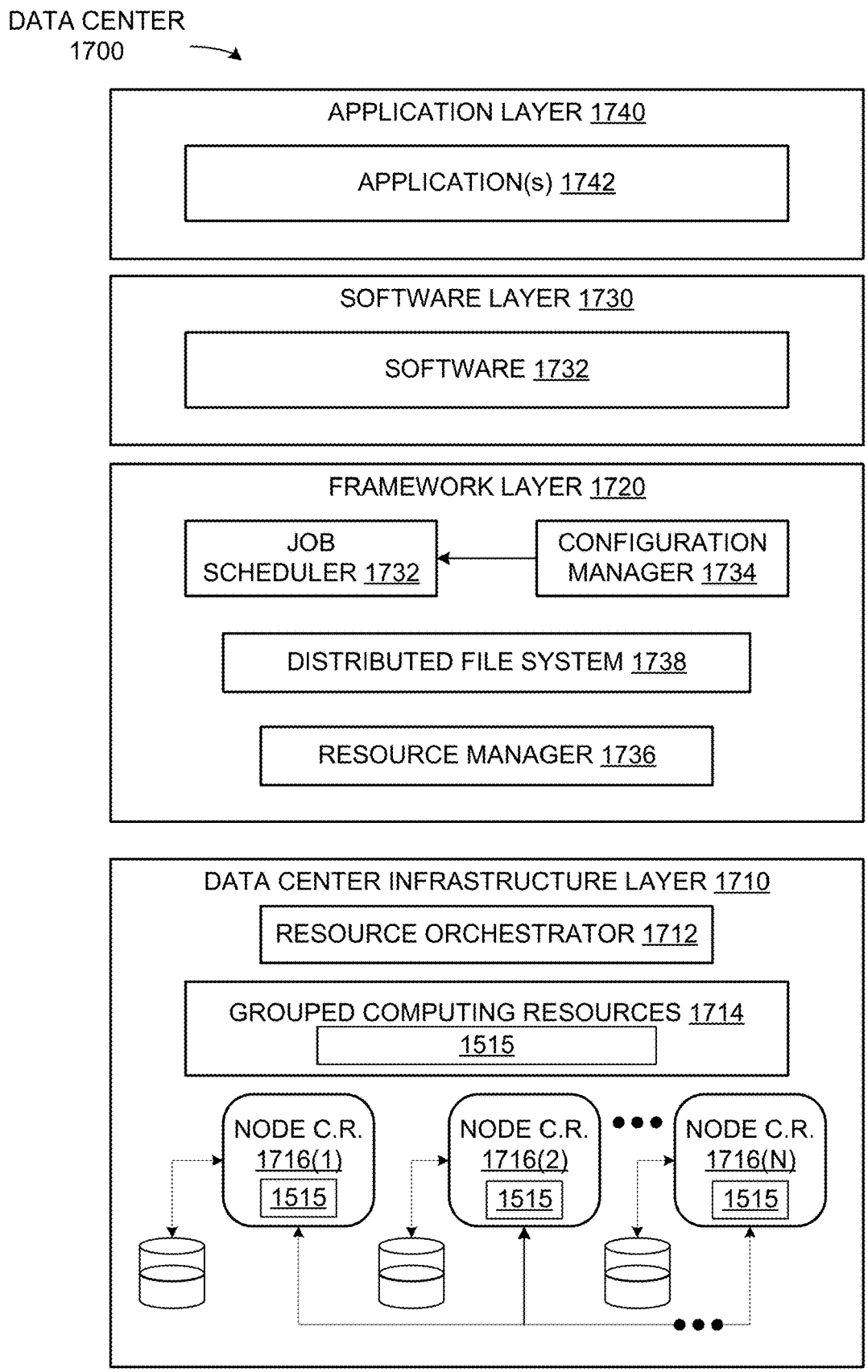
FIG. 17 illustrates an example data center system, according to at least one embodiment.

FIG. 17 illustrates an example data center 1700, in which at least one embodiment may be used. In at least one embodiment, data center 1700 includes a data center infrastructure layer 1710, a framework layer 1720, a software layer 1730 and an application layer 1740.

In at least one embodiment, as shown in FIG. 17, data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1716(1)-1716(N) may be a server having one or more of above-mentioned computing resources.

In at least one embodiment, grouped computing resources 1714 may include separate groupings of node C.R.s housed within one or more racks (not shown), or many racks housed in data centers at various geographical locations (also not shown). Separate groupings of node C.R.s within grouped computing resources 1714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1712 may configure or otherwise control one or more node C.R.s 1716(1)-1716(N) and/or grouped computing resources 1714. In at least one embodiment, resource orchestrator 1712 may include a software design infrastructure ("SDI") management entity for data center 1700. In at least one embodiment, resource orchestrator may include hardware, software or some combination thereof.

In at least one embodiment, as shown in FIG. 17, framework layer 1720 includes a job scheduler 1732, a configuration manager 1734, a resource manager 1736 and a distributed file system 1738. In at least one embodiment, framework layer 1720 may include a framework to support software 1732 of software layer 1730 and/or one or more application(s) 1742 of application layer 1740. In at least one embodiment, software 1732 or application(s) 1742 may respectively include web-based service software or applications, such as those provided by Amazon Web Services, Google Cloud and Microsoft Azure. In at least one embodiment, framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1732 may include a Spark driver to facilitate scheduling of workloads supported by various layers of data center 1700. In at least one embodiment, configuration manager 1734 may be capable of configuring different layers such as software layer 1730 and framework layer 1720 including Spark and distributed file system 1738 for supporting large-scale data processing. In at least one embodiment, resource manager 1736 may be capable of managing clustered or grouped computing resources mapped to or allocated for support of distributed file system 1738 and job scheduler 1732. In at least one embodiment, clustered or grouped computing resources may include grouped computing resource 1714 at data center infrastructure layer 1710. In at least one embodiment, resource manager 1736 may coordinate with resource orchestrator 1712 to manage these mapped or allocated computing resources.

In at least one embodiment, software 1732 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716 (1)-1716(N), grouped computing resources 1714, and/or distributed file system 1738 of framework layer 1720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1734, resource manager 1736, and resource orchestrator 1712 may implement any number and type of self-modifying actions based on any amount and type of data acquired in any technically feasible fashion. In at least one embodiment, self-modifying actions may relieve a data center operator of data center 1700 from making possibly bad configuration decisions and possibly avoiding underutilized and/or poor performing portions of a data center.

In at least one embodiment, data center 1700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1700. In at least one embodiment, trained machine learning models corresponding to one or more neural networks may be used to infer or predict information using resources described above with respect to data center 1700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 17 for inferencing or predicting operations based, at least in part, on weight parameters calculated using neural network training operations, neural network functions and/or architectures, or neural network use cases described herein.

Autonomous Vehicle

Figure 18A:
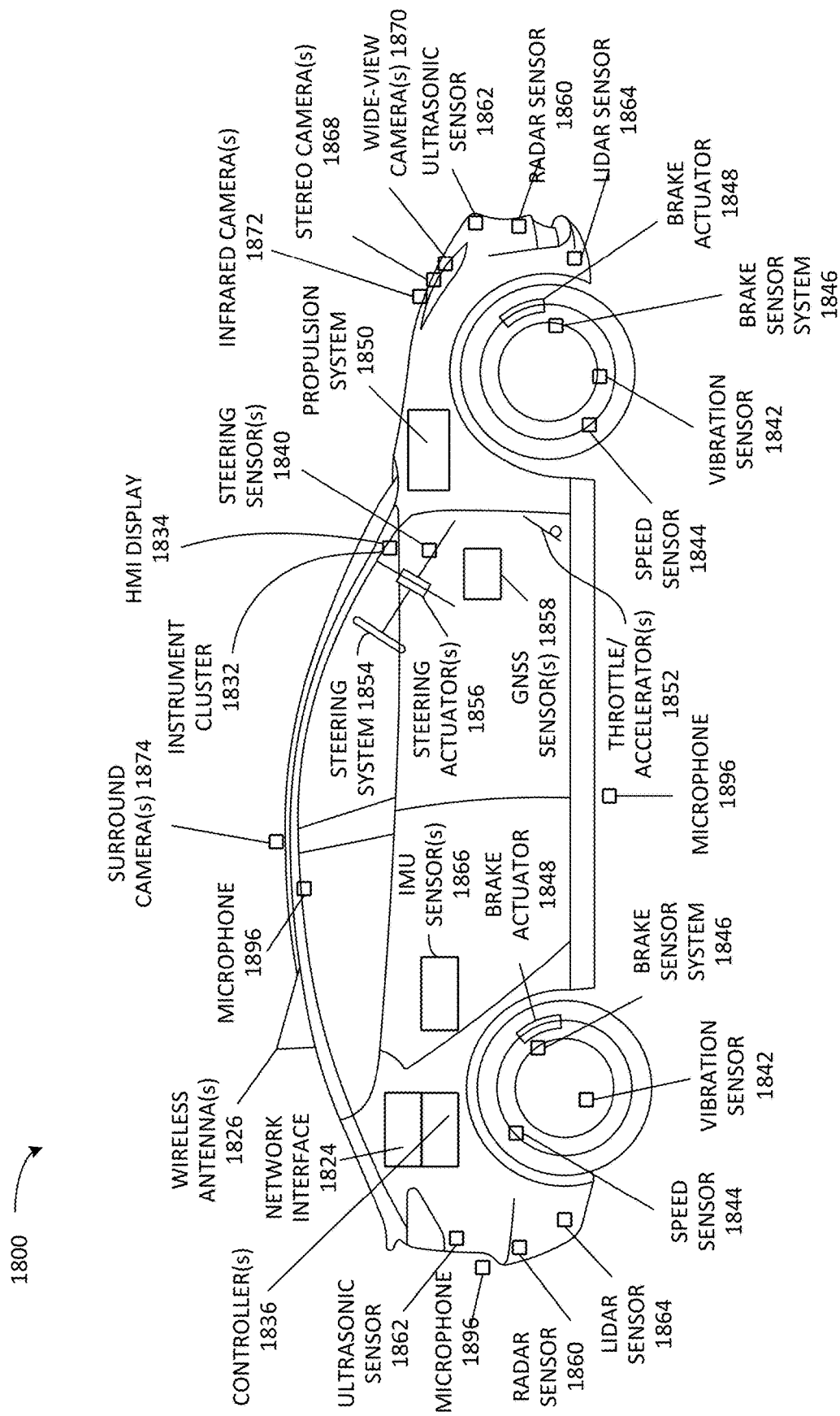
FIG. 18A illustrates an example of an autonomous vehicle, according to at least one embodiment.

FIG. 18A illustrates an example of an autonomous vehicle 1800, according to at least one embodiment. In at least one embodiment, autonomous vehicle 1800 (alternatively referred to herein as "vehicle 1800") may be, without limitation, a passenger vehicle, such as a car, a truck, a bus, and/or another type of vehicle that accommodates one or more passengers. In at least one embodiment, vehicle 1800 may be a semi-tractor-trailer truck used for hauling cargo. In at least one embodiment, vehicle 1800 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1800 may be capable of functionality in accordance with one or more of level 1-level 5 of autonomous driving levels. For example, in at least one embodiment, vehicle 1800 may be capable of conditional automation (Level 3), high automation (Level 4), and/or full automation (Level 5), depending on embodiment.

In at least one embodiment, vehicle 1800 may include, without limitation, components such as a chassis, a vehicle body, wheels (e.g., 2, 4, 6, 8, 18, etc.), tires, axles, and other components of a vehicle. In at least one embodiment, vehicle 1800 may include, without limitation, a propulsion system 1850, such as an internal combustion engine, hybrid electric power plant, an all-electric engine, and/or another propulsion system type. In at least one embodiment, propulsion system 1850 may be connected to a drive train of vehicle 1800, which may include, without limitation, a transmission, to enable propulsion of vehicle 1800. In at least one embodiment, propulsion system 1850 may be controlled in response to receiving signals from a throttle/accelerator(s) 1852.

In at least one embodiment, a steering system 1854, which may include, without limitation, a steering wheel, is used to steer a vehicle 1800 (e.g., along a desired path or route) when a propulsion system 1850 is operating (e.g., when vehicle is in motion). In at least one embodiment, a steering system 1854 may receive signals from steering actuator(s) 1856. Steering wheel may be optional for full automation (Level 5) functionality. In at least one embodiment, a brake sensor system 1846 may be used to operate vehicle brakes in response to receiving signals from brake actuator(s) 1848 and/or brake sensors.

In at least one embodiment, controller(s) 1836, which may include, without limitation, one or more system on chips ("SoCs") (not shown in FIG. 18A) and/or graphics processing unit(s) ("GPU(s)"), provide signals (e.g., representative of commands) to one or more components and/or systems of vehicle 1800. For instance, in at least one embodiment, controller(s) 1836 may send signals to operate vehicle brakes via brake actuators 1848, to operate steering system 1854 via steering actuator(s) 1856, to operate propulsion system 1850 via throttle/accelerator(s) 1852. Controller(s) 1836 may include one or more onboard (e.g., integrated) computing devices (e.g., supercomputers) that process sensor signals, and output operation commands (e.g., signals representing commands) to enable autonomous driving and/or to assist a human driver in driving vehicle 1800. In at least one embodiment, controller(s) 1836 may include a first controller 1836 for autonomous driving functions, a second controller 1836 for functional safety functions, a third controller 1836 for artificial intelligence functionality (e.g., computer vision), a fourth controller 1836 for infotainment functionality, a fifth controller 1836 for redundancy in emergency conditions, and/or other controllers. In at least one embodiment, a single controller 1836 may handle two or more of above functionalities, two or more controllers 1836 may handle a single functionality, and/or any combination thereof.

In at least one embodiment, controller(s) 1836 provide signals for controlling one or more components and/or systems of vehicle 1800 in response to sensor data received from one or more sensors (e.g., sensor inputs). In at least one embodiment, sensor data may be received from, for example and without limitation, global navigation satellite systems ("GNSS") sensor(s) 1858 (e.g., Global Positioning System sensor(s)), RADAR sensor(s) 1860, ultrasonic sensor(s) 1862, LIDAR sensor(s) 1864, inertial measurement unit ("IMU") sensor(s) 1866 (e.g., accelerometer(s), gyroscope(s), magnetic compass(es), magnetometer(s), etc.), microphone(s) 1896, stereo camera(s) 1868, wide-view camera(s) 1870 (e.g., fisheye cameras), infrared camera(s) 1872, surround camera(s) 1874 (e.g., 360 degree cameras), long-range cameras (not shown in FIG. 18A), mid-range camera(s) (not shown in FIG. 18A), speed sensor(s) 1844 (e.g., for measuring speed of vehicle 1800), vibration sensor(s) 1842, steering sensor(s) 1840, brake sensor(s) (e.g., as part of brake sensor system 1846), and/or other sensor types.

In at least one embodiment, one or more of controller(s) 1836 may receive inputs (e.g., represented by input data) from an instrument cluster 1832 of vehicle 1800 and provide outputs (e.g., represented by output data, display data, etc.) via a human-machine interface ("HMI") display 1834, an audible annunciator, a loudspeaker, and/or via other components of vehicle 1800. In at least one embodiment, outputs may include information such as vehicle velocity, speed, time, map data (e.g., a High Definition map (not shown in FIG. 18A), location data (e.g., vehicle's 1800 location, such as on a map), direction, location of other vehicles (e.g., an occupancy grid), information about objects and status of objects as perceived by controller(s) 1836, etc. For example, in at least one embodiment, HMI display 1834 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1800 further includes a network interface 1824 which may use wireless antenna(s) 1826 and/or modem(s) to communicate over one or more networks. For example, in at least one embodiment, network interface 1824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1826 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 18A for inferencing or predicting operations based, at least in part, on weight parameters calculated using neural network training operations, neural network functions and/or architectures, or neural network use cases described herein.

Figure 18B:
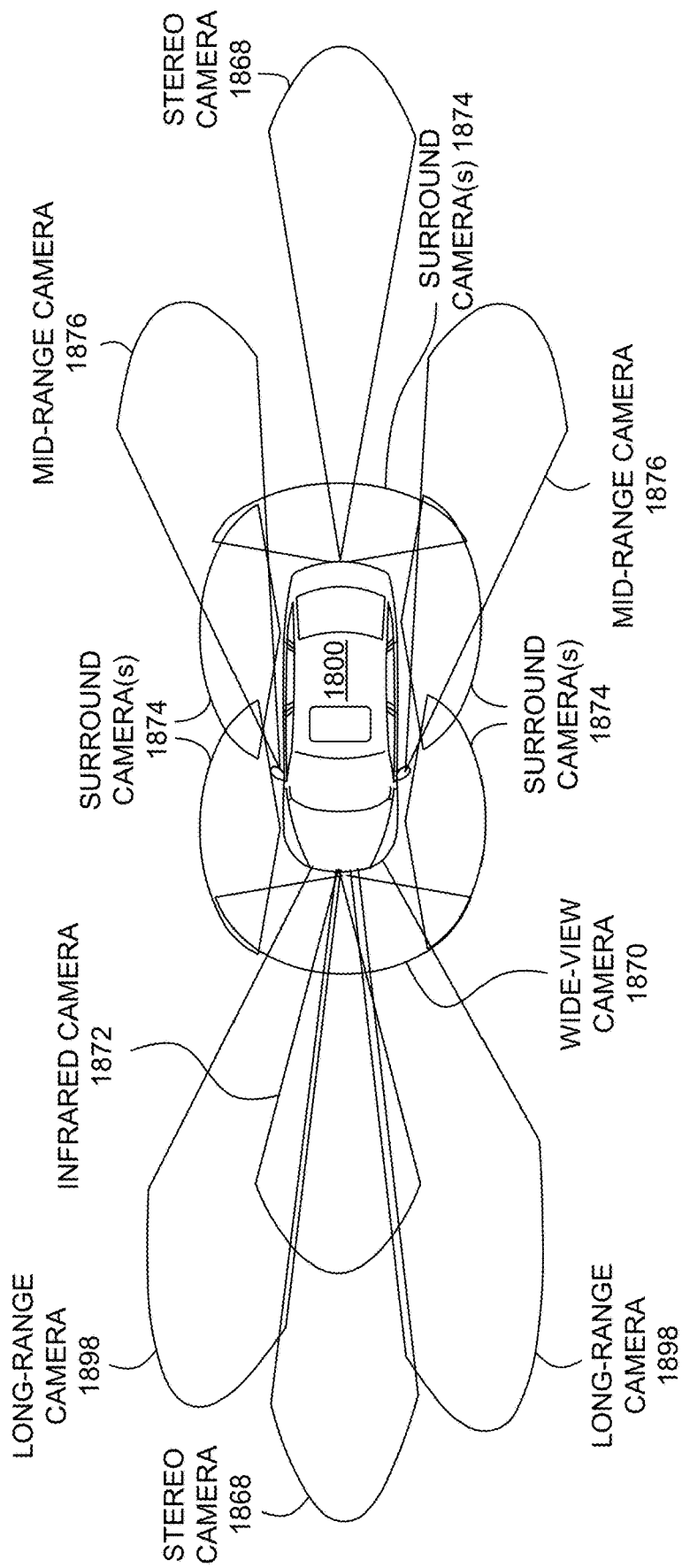
FIG. 18B illustrates an example of camera locations and fields of view for the autonomous vehicle of FIG. 18A, according to at least one embodiment.

FIG. 18B illustrates an example of camera locations and fields of view for autonomous vehicle 1800 of FIG. 18A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1800.

In at least one embodiment, camera types for cameras may include, but are not limited to, digital cameras that may be adapted for use with components and/or systems of vehicle 1800. Camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cabin at least one embodiment.

In at least one embodiment, cameras with a field of view that include portions of environment in front of vehicle 1800 (e.g., front-facing cameras) may be used for surround view, to help identify forward facing paths and obstacles, as well as aid in, with help of one or more of controllers 1836 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1870 may be used to perceive objects coming into view from periphery (e.g., pedestrians, crossing traffic or bicycles). Although only one wide-view camera 1870 is illustrated in FIG. 18B, in other embodiments, there may be any number (including zero) of wide-view camera(s) 1870 on vehicle 1800. In at least one embodiment, any number of long-range camera(s) 1898 (e.g., a long-view stereo camera pair) may be used for depth-based object detection, especially for objects for which a neural network has not yet been trained. In at least one embodiment, long-range camera(s) 1898 may also be used for object detection and classification, as well as basic object tracking.

In at least one embodiment, any number of stereo camera(s) 1868 may also be included in a front-facing configuration. In at least one embodiment, one or more of stereo camera(s) 1868 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1800, including a distance estimate for all points in image. In at least one embodiment, one or more of stereo camera(s) 1868 may include, without limitation, compact stereo vision sensor(s) that may include, without limitation, two camera lenses (one each on left and right) and an image processing chip that may measure distance from vehicle 1800 to target object and use generated information (e.g., metadata) to activate autonomous emergency braking and lane departure warning functions. In at least one embodiment, other types of stereo camera(s) 1868 may be used in addition to, or alternatively from, those described herein.

In at least one embodiment, cameras with a field of view that include portions of environment to side of vehicle 1800 (e.g., side-view cameras) may be used for surround view, providing information used to create and update occupancy grid, as well as to generate side impact collision warnings. For example, in at least one embodiment, surround camera(s) 1874 (e.g., four surround cameras 1874 as illustrated in FIG. 18B) could be positioned on vehicle 1800. Surround camera(s) 1874 may include, without limitation, any number and combination of wide-view camera(s) 1870, fisheye camera(s), 360 degree camera(s), and/or like. For instance, in at least one embodiment, four fisheye cameras may be positioned on front, rear, and sides of vehicle 1800. In at least one embodiment, vehicle 1800 may use three surround camera(s) 1874 (e.g., left, right, and rear), and may leverage one or more other camera(s) (e.g., a forward-facing camera) as a fourth surround-view camera.

In at least one embodiment, cameras with a field of view that include portions of environment to rear of vehicle 1800 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1898 and/or mid-range camera(s) 1876, stereo camera(s) 1868), infrared camera(s) 1872, etc.), as described herein.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 18B for inferencing or predicting operations based, at least in part, on weight parameters calculated using neural network training operations, neural network functions and/or architectures, or neural network use cases described herein.

Figure 18C:
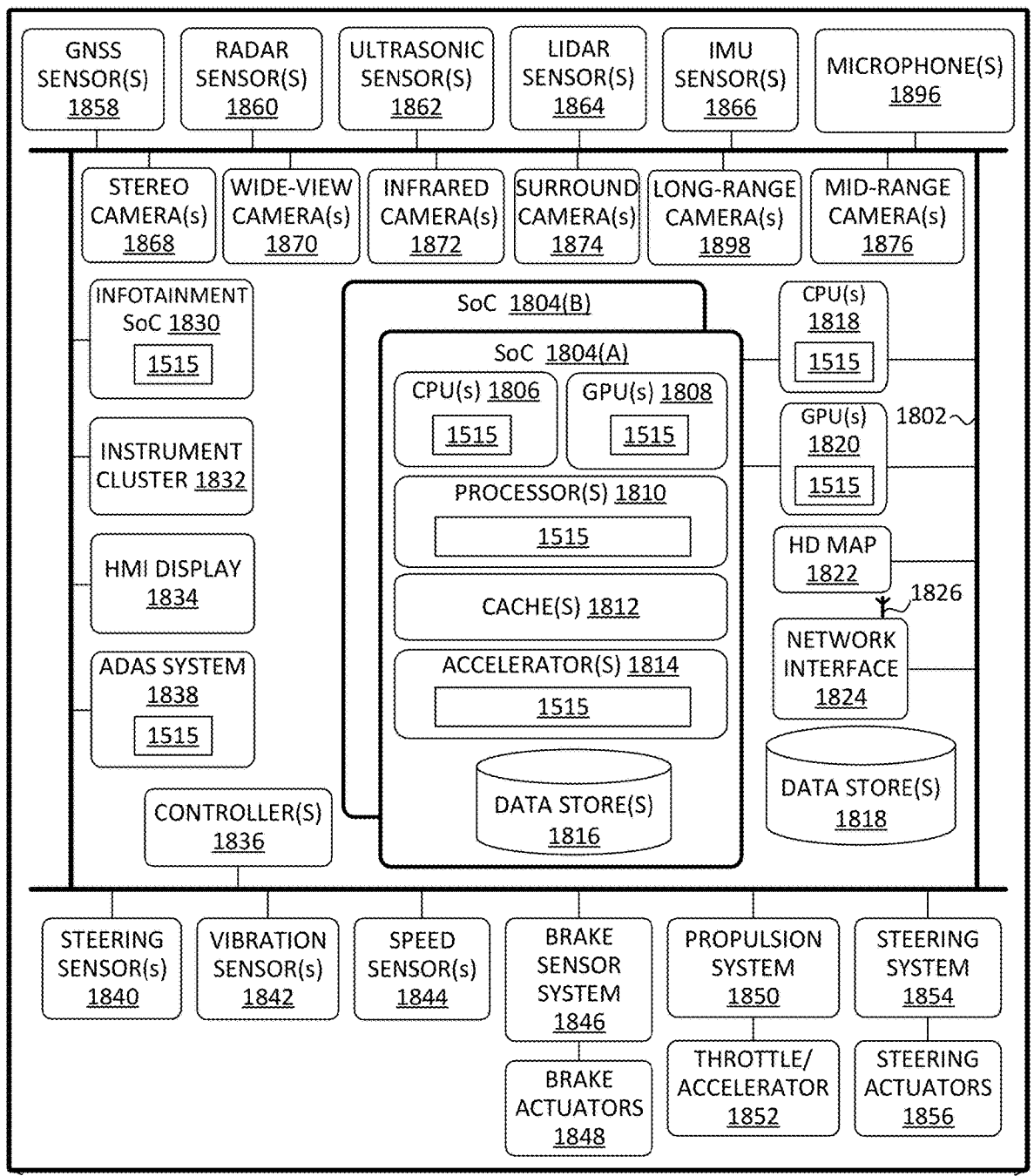
FIG. 18C is a block diagram illustrating an example system architecture for the autonomous vehicle of FIG. 18A, according to at least one embodiment.

FIG. 18C is a block diagram illustrating an example system architecture for autonomous vehicle 1800 of FIG. 18A, according to at least one embodiment. In at least one embodiment, each of components, features, and systems of vehicle 1800 in FIG. 18C are illustrated as being connected via a bus 1802. In at least one embodiment, bus 1802 may include, without limitation, a CAN data interface (alternatively referred to herein as a "CAN bus"). In at least one embodiment, a CAN may be a network inside vehicle 1800 used to aid in control of various features and functionality of vehicle 1800, such as actuation of brakes, acceleration, braking, steering, windshield wipers, etc. In at least one embodiment, bus 1802 may be configured to have dozens or even hundreds of nodes, each with its own unique identifier (e.g., a CAN ID). In at least one embodiment, bus 1802 may be read to find steering wheel angle, ground speed, engine revolutions per minute ("RPMs"), button positions, and/or other vehicle status indicators. In at least one embodiment, bus 1802 may be a CAN bus that is ASIL B compliant.

In at least one embodiment, in addition to, or alternatively from CAN, FlexRay and/or Ethernet may be used. In at least one embodiment, there may be any number of busses 1802, which may include, without limitation, zero or more CAN busses, zero or more FlexRay busses, zero or more Ethernet busses, and/or zero or more other types of busses using a different protocol. In at least one embodiment, two or more busses 1802 may be used to perform different functions, and/or may be used for redundancy. For example, a first bus 1802 may be used for collision avoidance functionality and a second bus 1802 may be used for actuation control. In at least one embodiment, each bus 1802 may communicate with any of components of vehicle 1800, and two or more busses 1802 may communicate with same components. In at least one embodiment, each of any number of system(s) on chip(s) ("SoC(s)") 1804, each of controller(s) 1836, and/or each computer within vehicle may have access to same input data (e.g., inputs from sensors of vehicle 1800), and may be connected to a common bus, such CAN bus.

In at least one embodiment, vehicle 1800 may include one or more controller(s) 1836, such as those described herein with respect to FIG. 18A. Controller(s) 1836 may be used for a variety of functions. In at least one embodiment, controller(s) 1836 may be coupled to any of various other components and systems of vehicle 1800, and may be used for control of vehicle 1800, artificial intelligence of vehicle 1800, infotainment for vehicle 1800, and/or like.

In at least one embodiment, vehicle 1800 may include any number of SoCs 1804. Each of SoCs 1804 may include, without limitation, central processing units ("CPU(s)") 1806, graphics processing units ("GPU(s)") 1808, processor(s) 1810, cache(s) 1812, accelerator(s) 1814, data store(s) 1816, and/or other components and features not illustrated. In at least one embodiment, SoC(s) 1804 may be used to control vehicle 1800 in a variety of platforms and systems. For example, in at least one embodiment, SoC(s) 1804 may be combined in a system (e.g., system of vehicle 1800) with a High Definition ("HD") map 1822 which may obtain map refreshes and/or updates via network interface 1824 from one or more servers (not shown in FIG. 18C).

In at least one embodiment, CPU(s) 1806 may include a CPU cluster or CPU complex (alternatively referred to herein as a "CCPLEX"). In at least one embodiment, CPU(s) 1806 may include multiple cores and/or level two ("L2") caches. For instance, in at least one embodiment, CPU(s) 1806 may include eight cores in a coherent multi-processor configuration. In at least one embodiment, CPU(s) 1806 may include four dual-core clusters where each cluster has a dedicated L2 cache (e.g., a 2 MB L2 cache). In at least one embodiment, CPU(s) 1806 (e.g., CCPLEX) may be configured to support simultaneous cluster operation enabling any combination of clusters of CPU(s) 1806 to be active at any given time.

In at least one embodiment, one or more of CPU(s) 1806 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1806 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1808 may include an integrated GPU (alternatively referred to herein as an "iGPU"). In at least one embodiment, GPU(s) 1808 may be programmable and may be efficient for parallel workloads. In at least one embodiment, GPU(s) 1808, in at least one embodiment, may use an enhanced tensor instruction set. In on embodiment, GPU(s) 1808 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1808 may include at least eight streaming microprocessors. In at least one embodiment, GPU(s) 1808 may use compute application programming interface(s) (API(s)). In at least one embodiment, GPU(s) 1808 may use one or more parallel computing platforms and/or programming models (e.g., NVIDIA's CUDA).

In at least one embodiment, one or more of GPU(s) 1808 may be power-optimized for best performance in automotive and embedded use cases. For example, in on embodiment, GPU(s) 1808 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1808 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1808 may include unified memory technology. In at least one embodiment, address translation services ("ATS") support may be used to allow GPU(s) 1808 to access CPU(s) 1806 page tables directly. In at least one embodiment, embodiment, when GPU(s) 1808 memory management unit ("MMU") experiences a miss, an address translation request may be transmitted to CPU(s) 1806. In response, CPU(s) 1806 may look in its page tables for virtual-to-physical mapping for address and transmits translation back to GPU(s) 1808, in at least one embodiment. In at least one embodiment, unified memory technology may allow a single unified virtual address space for memory of both CPU(s) 1806 and GPU(s) 1808, thereby simplifying GPU(s) 1808 programming and porting of applications to GPU(s) 1808.

In at least one embodiment, GPU(s) 1808 may include any number of access counters that may keep track of frequency of access of GPU(s) 1808 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1804 may include any number of cache(s) 1812, including those described herein. For example, in at least one embodiment, cache(s) 1812 could include a level three ("L3") cache that is available to both CPU(s) 1806 and GPU(s) 1808 (e.g., that is connected both CPU(s) 1806 and GPU(s) 1808). In at least one embodiment, cache(s) 1812 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1804 may include one or more accelerator(s) 1814 (e.g., hardware accelerators, software accelerators, or a combination thereof). In at least one embodiment, SoC(s) 1804 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1808 and to off-load some of tasks of GPU(s) 1808 (e.g., to free up more cycles of GPU(s) 1808 for performing other tasks). In at least one embodiment, accelerator(s) 1814 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1814 (e.g., hardware acceleration cluster) may include a deep learning accelerator(s) ("DLA"). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1896; a CNN for facial recognition and vehicle owner identification using data from camera sensors; and/or a CNN for security and/or safety related events.

In at least one embodiment, DLA(s) may perform any function of GPU(s) 1808, and by using an inference accelerator, for example, a designer may target either DLA(s) or GPU(s) 1808 for any function. For example, in at least one embodiment, designer may focus processing of CNNs and floating point operations on DLA(s) and leave other functions to GPU(s) 1808 and/or other accelerator(s) 1814.

In at least one embodiment, accelerator(s) 1814 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1838, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1806. In at least one embodiment, DMA may support any number of features used to provide optimization to PVA including, but not limited to, supporting multidimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1814 (e.g., hardware acceleration cluster) may include a computer vision network on-chip and static random-access memory ("SRAM"), for providing a high-bandwidth, low latency SRAM for accelerator(s) 1814. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1804 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1814 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1800, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1866 that correlates with vehicle 1800 orientation, distance, 3D location estimates of object obtained from neural network and/or other sensors (e.g., LIDAR sensor(s) 1864 or RADAR sensor(s) 1860), among others.

In at least one embodiment, one or more of SoC(s) 1804 may include data store(s) 1816 (e.g., memory). In at least one embodiment, data store(s) 1816 may be on-chip memory of SoC(s) 1804, which may store neural networks to be executed on GPU(s) 1808 and/or DLA. In at least one embodiment, data store(s) 1816 may be large enough in capacity to store multiple instances of neural networks for redundancy and safety. In at least one embodiment, data store(s) 1812 may comprise L2 or L3 cache(s).

In at least one embodiment, one or more of SoC(s) 1804 may include any number of processor(s) 1810 (e.g., embedded processors). Processor(s) 1810 may include a boot and power management processor that may be a dedicated processor and subsystem to handle boot power and management functions and related security enforcement. In at least one embodiment, boot and power management processor may be a part of SoC(s) 1804 boot sequence and may provide runtime power management services. In at least one embodiment, boot power and management processor may provide clock and voltage programming, assistance in system low power state transitions, management of SoC(s) 1804 thermals and temperature sensors, and/or management of SoC(s) 1804 power states. In at least one embodiment, each temperature sensor may be implemented as a ring-oscillator whose output frequency is proportional to temperature, and SoC(s) 1804 may use ring-oscillators to detect temperatures of CPU(s) 1806, GPU(s) 1808, and/or accelerator(s) 1814. In at least one embodiment, if temperatures are determined to exceed a threshold, then boot and power management processor may enter a temperature fault routine and put SoC(s) 1804 into a lower power state and/or put vehicle 1800 into a chauffeur to safe stop mode (e.g., bring vehicle 1800 to a safe stop).

In at least one embodiment, processor(s) 1810 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1810 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1810 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1810 may further include a real-time camera engine that may include, without limitation, a dedicated processor subsystem for handling real-time camera management. In at least one embodiment, processor(s) 1810 may further include a high-dynamic range signal processor that may include, without limitation, an image signal processor that is a hardware engine that is part of camera processing pipeline.

In at least one embodiment, processor(s) 1810 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1870, surround camera(s) 1874, and/or on in-cabin monitoring camera sensor(s). In at least one embodiment, in-cabin monitoring camera sensor(s) are preferably monitored by a neural network running on another instance of SoC 1804, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1808 are not required to continuously render new surfaces. In at least one embodiment, when GPU(s) 1808 are powered on and active doing 3D rendering, video image compositor may be used to offload GPU(s) 1808 to improve performance and responsiveness.

In at least one embodiment, one or more of SoC(s) 1804 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1804 may further include an input/output controller(s) that may be controlled by software and may be used for receiving I/O signals that are uncommitted to a specific role.

In at least one embodiment, one or more of SoC(s) 1804 may further include a broad range of peripheral interfaces to enable communication with peripherals, audio encoders/decoders ("codecs"), power management, and/or other devices. SoC(s) 1804 may be used to process data from cameras (e.g., connected over Gigabit Multimedia Serial Link and Ethernet), sensors (e.g., LIDAR sensor(s) 1864, RADAR sensor(s) 1860, etc. that may be connected over Ethernet), data from bus 1802 (e.g., speed of vehicle 1800, steering wheel position, etc.), data from GNSS sensor(s) 1858 (e.g., connected over Ethernet or CAN bus), etc. In at least one embodiment, one or more of SoC(s) 1804 may further include dedicated high-performance mass storage controllers that may include their own DMA engines, and that may be used to free CPU(s) 1806 from routine data management tasks.

In at least one embodiment, SoC(s) 1804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1804 may be faster, more reliable, and even more energy-efficient and space-efficient than conventional systems. For example, in at least one embodiment, accelerator(s) 1814, when combined with CPU(s) 1806, GPU(s) 1808, and data store(s) 1816, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1820) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1808.

In at least one embodiment, a CNN for facial recognition and vehicle owner identification may use data from camera sensors to identify presence of an authorized driver and/or owner of vehicle 1800. In at least one embodiment, an always on sensor processing engine may be used to unlock vehicle when owner approaches driver door and turn on lights, and, in security mode, to disable vehicle when owner leaves vehicle. In this way, SoC(s) 1804 provide for security against theft and/or carjacking.

In at least one embodiment, a CNN for emergency vehicle detection and identification may use data from microphones 1896 to detect and identify emergency vehicle sirens. In at least one embodiment, SoC(s) 1804 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1858. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1862, until emergency vehicle(s) passes.

In at least one embodiment, vehicle 1800 may include CPU(s) 1818 (e.g., discrete CPU(s), or dCPU(s)), that may be coupled to SoC(s) 1804 via a high-speed interconnect (e.g., PCIe). In at least one embodiment, CPU(s) 1818 may include an X86 processor, for example. CPU(s) 1818 may be used to perform any of a variety of functions, including arbitrating potentially inconsistent results between ADAS sensors and SoC(s) 1804, and/or monitoring status and health of controller(s) 1836 and/or an infotainment system on a chip ("infotainment SoC") 1830, for example.

In at least one embodiment, vehicle 1800 may include GPU(s) 1820 (e.g., discrete GPU(s), or dGPU(s)), that may be coupled to SoC(s) 1804 via a high-speed interconnect (e.g., NVIDIA's NVLINK). In at least one embodiment, GPU(s) 1820 may provide additional artificial intelligence functionality, such as by executing redundant and/or different neural networks, and may be used to train and/or update neural networks based at least in part on input (e.g., sensor data) from sensors of vehicle 1800.

In at least one embodiment, vehicle 1800 may further include network interface 1824 which may include, without limitation, wireless antenna(s) 1826 (e.g., one or more wireless antennas 1826 for different communication protocols, such as a cellular antenna, a Bluetooth antenna, etc.). In at least one embodiment, network interface 1824 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 180 and other vehicle and/or an indirect link may be established (e.g., across networks and over Internet). In at least one embodiment, direct links may be provided using a vehicle-to-vehicle communication link. Vehicle-to-vehicle communication link may provide vehicle 1800 information about vehicles in proximity to vehicle 1800 (e.g., vehicles in front of, on side of, and/or behind vehicle 1800). In at least one embodiment, aforementioned functionality may be part of a cooperative adaptive cruise control functionality of vehicle 1800.

In at least one embodiment, network interface 1824 may include an SoC that provides modulation and demodulation functionality and enables controller(s) 1836 to communicate over wireless networks. In at least one embodiment, network interface 1824 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1800 may further include data store(s) 1828 which may include, without limitation, off-chip (e.g., off SoC(s) 1804) storage. In at least one embodiment, data store(s) 1828 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1800 may further include GNSS sensor(s) 1858 (e.g., GPS and/or assisted GPS sensors), to assist in mapping, perception, occupancy grid generation, and/or path planning functions. In at least one embodiment, any number of GNSS sensor(s) 1858 may be used, including, for example and without limitation, a GPS using a USB connector with an Ethernet to Serial (e.g., RS-232) bridge.

In at least one embodiment, vehicle 1800 may further include RADAR sensor(s) 1860. RADAR sensor(s) 1860 may be used by vehicle 1800 for long-range vehicle detection, even in darkness and/or severe weather conditions. In at least one embodiment, RADAR functional safety levels may be ASIL B. RADAR sensor(s) 1860 may use CAN and/or bus 1802 (e.g., to transmit data generated by RADAR sensor(s) 1860) for control and to access object tracking data, with access to Ethernet to access raw data in some examples. In at least one embodiment, wide variety of RADAR sensor types may be used. For example, and without limitation, RADAR sensor(s) 1860 may be suitable for front, rear, and side RADAR use. In at least one embodiment, one or more of RADAR sensors(s) 1860 are Pulse Doppler RADAR sensor(s).

In at least one embodiment, RADAR sensor(s) 1860 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1860 may help in distinguishing between static and moving objects, and may be used by ADAS system 1838 for emergency brake assist and forward collision warning. Sensors 1860(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1800 surroundings at higher speeds with minimal interference from traffic in adjacent lanes. In at least one embodiment, other two antennae may expand field of view, making it possible to quickly detect vehicles entering or leaving vehicle's 1800 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1860 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1838 for blind spot detection and/or lane change assist.

In at least one embodiment, vehicle 1800 may further include ultrasonic sensor(s) 1862. Ultrasonic sensor(s) 1862, which may be positioned at front, back, and/or sides of vehicle 1800, may be used for park assist and/or to create and update an occupancy grid. In at least one embodiment, a wide variety of ultrasonic sensor(s) 1862 may be used, and different ultrasonic sensor(s) 1862 may be used for different ranges of detection (e.g., 2.5 m, 4 m). In at least one embodiment, ultrasonic sensor(s) 1862 may operate at functional safety levels of ASIL B.

In at least one embodiment, vehicle 1800 may include LIDAR sensor(s) 1864. LIDAR sensor(s) 1864 may be used for object and pedestrian detection, emergency braking, collision avoidance, and/or other functions. In at least one embodiment, LIDAR sensor(s) 1864 may be functional safety level ASIL B. In at least one embodiment, vehicle 1800 may include multiple LIDAR sensors 1864 (e.g., two, four, six, etc.) that may use Ethernet (e.g., to provide data to a Gigabit Ethernet switch).

In at least one embodiment, LIDAR sensor(s) 1864 may be capable of providing a list of objects and their distances for a 360-degree field of view. In at least one embodiment, commercially available LIDAR sensor(s) 1864 may have an advertised range of approximately 100 m, with an accuracy of 2 cm-3 cm, and with support for a 100 Mbps Ethernet connection, for example. In at least one embodiment, one or more non-protruding LIDAR sensors 1864 may be used. In such an embodiment, LIDAR sensor(s) 1864 may be implemented as a small device that may be embedded into front, rear, sides, and/or corners of vehicle 1800. In at least one embodiment, LIDAR sensor(s) 1864, in such an embodiment, may provide up to a 120-degree horizontal and 35-degree vertical field-of-view, with a 200 m range even for low-reflectivity objects. In at least one embodiment, front-mounted LIDAR sensor(s) 1864 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1800 up to approximately 200 m. In at least one embodiment, a flash LIDAR unit includes, without limitation, a receptor, which records laser pulse transit time and reflected light on each pixel, which in turn corresponds to range from vehicle 1800 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1800. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 1866. In at least one embodiment, IMU sensor(s) 1866 may be located at a center of rear axle of vehicle 1800, in at least one embodiment. In at least one embodiment, IMU sensor(s) 1866 may include, for example and without limitation, accelerometer(s), magnetometer(s), gyroscope(s), magnetic compass(es), and/or other sensor types. In at least one embodiment, such as in six-axis applications, IMU sensor(s) 1866 may include, without limitation, accelerometers and gyroscopes. In at least one embodiment, such as in nine-axis applications, IMU sensor(s) 1866 may include, without limitation, accelerometers, gyroscopes, and magnetometers.

In at least one embodiment, IMU sensor(s) 1866 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1866 may enable vehicle 1800 to estimate heading without requiring input from a magnetic sensor by directly observing and correlating changes in velocity from GPS to IMU sensor(s) 1866. In at least one embodiment, IMU sensor(s) 1866 and GNSS sensor(s) 1858 may be combined in a single integrated unit.

In at least one embodiment, vehicle 1800 may include microphone(s) 1896 placed in and/or around vehicle 1800. In at least one embodiment, microphone(s) 1896 may be used for emergency vehicle detection and identification, among other things.

In at least one embodiment, vehicle 1800 may further include any number of camera types, including stereo camera(s) 1868, wide-view camera(s) 1870, infrared camera(s) 1872, surround camera(s) 1874, long-range camera(s) 1898, mid-range camera(s) 1876, and/or other camera types. In at least one embodiment, cameras may be used to capture image data around an entire periphery of vehicle 1800. In at least one embodiment, types of cameras used depends vehicle 1800. In at least one embodiment, any combination of camera types may be used to provide necessary coverage around vehicle 1800. In at least one embodiment, number of cameras may differ depending on embodiment. For example, in at least one embodiment, vehicle 1800 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 18A and FIG. 18B.

In at least one embodiment, vehicle 1800 may further include vibration sensor(s) 1842. Vibration sensor(s) 1842 may measure vibrations of components of vehicle 1800, such as axle(s). For example, in at least one embodiment, changes in vibrations may indicate a change in road surfaces. In at least one embodiment, when two or more vibration sensors 1842 are used, differences between vibrations may be used to determine friction or slippage of road surface (e.g., when difference in vibration is between a power-driven axle and a freely rotating axle).

In at least one embodiment, vehicle 1800 may include ADAS system 1838. ADAS system 1838 may include, without limitation, an SoC, in some examples. In at least one embodiment, ADAS system 1838 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1860, LIDAR sensor(s) 1864, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1800 and automatically adjust speed of vehicle 1800 to maintain a safe distance from vehicles ahead. In at least one embodiment, lateral ACC system performs distance keeping, and advises vehicle 1800 to change lanes when necessary. In at least one embodiment, lateral ACC is related to other ADAS applications such as LC and CW.

In at least one embodiment, CACC system uses information from other vehicles that may be received via network interface 1824 and/or wireless antenna(s) 1826 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1800), while I2V communication concept provides information about traffic further ahead. In at least one embodiment, CACC system may include either or both I2V and V2V information sources. In at least one embodiment, given information of vehicles ahead of vehicle 1800, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1860, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1860, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1800 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1800 if vehicle 1800 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1860, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1800 is backing up. In at least one embodiment, RCTW system includes AEB system to ensure that vehicle brakes are applied to avoid a crash. In at least one embodiment, RCTW system may use one or more rear-facing RADAR sensor(s) 1860, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1800 itself decides, in case of conflicting results, whether to heed result from a primary computer or a secondary computer (e.g., first controller 1836 or second controller 1836). For example, in at least one embodiment, ADAS system 1838 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1838 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1804.

In at least one embodiment, ADAS system 1838 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1838 may be fed into primary computer's perception block and/or primary computer's dynamic driving task block. For example, in at least one embodiment, if ADAS system 1838 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1800 may further include infotainment SoC 1830 (e.g., an in-vehicle infotainment system (IVI)). Although illustrated and described as an SoC, infotainment system 1830, in at least one embodiment, may not be an SoC, and may include, without limitation, two or more discrete components. In at least one embodiment, infotainment SoC 1830 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1800. For example, infotainment SoC 1830 could include radios, disk players, navigation systems, video players, USB and Bluetooth connectivity, carputers, in-car entertainment, WiFi, steering wheel audio controls, hands free voice control, a heads-up display ("HUD"), HMI display 1834, a telematics device, a control panel (e.g., for controlling and/or interacting with various components, features, and/or systems), and/or other components. In at least one embodiment, infotainment SoC 1830 may further be used to provide information (e.g., visual and/or audible) to user(s) of vehicle, such as information from ADAS system 1838, autonomous driving information such as planned vehicle maneuvers, trajectories, surrounding environment information (e.g., intersection information, vehicle information, road information, etc.), and/or other information.

In at least one embodiment, infotainment SoC 1830 may include any amount and type of GPU functionality. In at least one embodiment, infotainment SoC 1830 may communicate over bus 1802 (e.g., CAN bus, Ethernet, etc.) with other devices, systems, and/or components of vehicle 1800. In at least one embodiment, infotainment SoC 1830 may be coupled to a supervisory MCU such that GPU of infotainment system may perform some self-driving functions in event that primary controller(s) 1836 (e.g., primary and/or backup computers of vehicle 1800) fail. In at least one embodiment, infotainment SoC 1830 may put vehicle 1800 into a chauffeur to safe stop mode, as described herein.

In at least one embodiment, vehicle 1800 may further include instrument cluster 1832 (e.g., a digital dash, an electronic instrument cluster, a digital instrument panel, etc.). Instrument cluster 1832 may include, without limitation, a controller and/or supercomputer (e.g., a discrete controller or supercomputer). In at least one embodiment, instrument cluster 1832 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1830 and instrument cluster 1832. In at least one embodiment, instrument cluster 1832 may be included as part of infotainment SoC 1830, or vice versa.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 18C for inferencing or predicting operations based, at least in part, on weight parameters calculated using neural network training operations, neural network functions and/or architectures, or neural network use cases described herein.

Figure 18D:
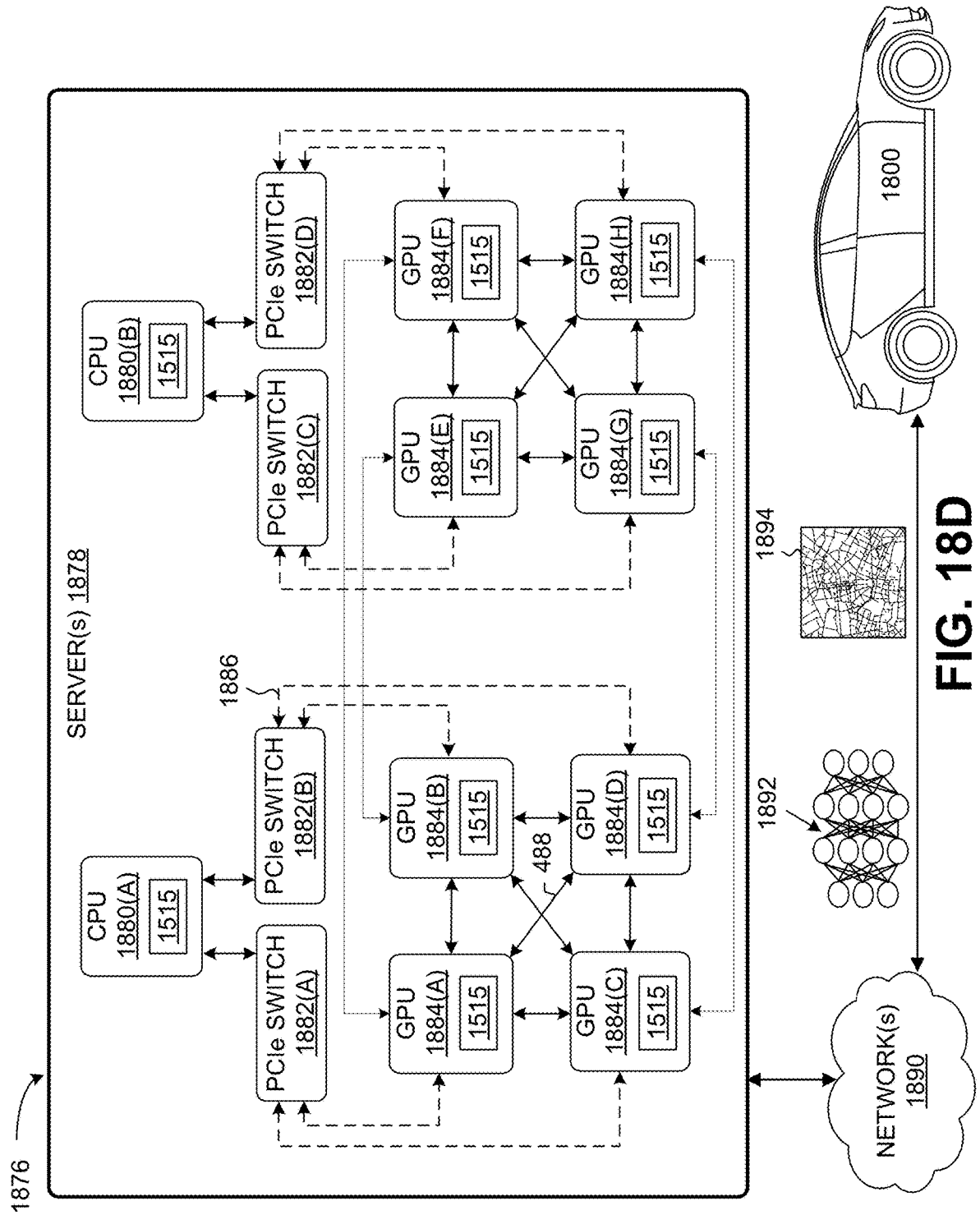
FIG. 18D is a diagram illustrating a system for communication between cloud-based server(s) and the autonomous vehicle of FIG. 18A, according to at least one embodiment.

FIG. 18D is a diagram of a system 1876 for communication between cloud-based server(s) and autonomous vehicle 1800 of FIG. 18A, according to at least one embodiment. In at least one embodiment, system 1876 may include, without limitation, server(s) 1878, network(s) 1890, and any number and type of vehicles, including vehicle 1800. server(s) 1878 may include, without limitation, a plurality of GPUs 1884(A)-1884(H) (collectively referred to herein as GPUs 1884), PCIe switches 1882(A)-1882(H) (collectively referred to herein as PCIe switches 1882), and/or CPUs 1880(A)-1880(B) (collectively referred to herein as CPUs 1880). GPUs 1884, CPUs 1880, and PCIe switches 1882 may be interconnected with high-speed interconnects such as, for example and without limitation, NVLink interfaces 1888 developed by NVIDIA and/or PCIe connections 1886. In at least one embodiment, GPUs 1884 are connected via an NVLink and/or NVSwitch SoC and GPUs 1884 and PCIe switches 1882 are connected via PCIe interconnects. In at least one embodiment, although eight GPUs 1884, two CPUs 1880, and four PCIe switches 1882 are illustrated, this is not intended to be limiting. In at least one embodiment, each of server(s) 1878 may include, without limitation, any number of GPUs 1884, CPUs 1880, and/or PCIe switches 1882, in any combination. For example, in at least one embodiment, server(s) 1878 could each include eight, sixteen, thirty-two, and/or more GPUs 1884.

In at least one embodiment, server(s) 1878 may receive, over network(s) 1890 and from vehicles, image data representative of images showing unexpected or changed road conditions, such as recently commenced road-work. In at least one embodiment, server(s) 1878 may transmit, over network(s) 1890 and to vehicles, neural networks 1892, updated neural networks 1892, and/or map information 1894, including, without limitation, information regarding traffic and road conditions. In at least one embodiment, updates to map information 1894 may include, without limitation, updates for HD map 1822, such as information regarding construction sites, potholes, detours, flooding, and/or other obstructions. In at least one embodiment, neural networks 1892, updated neural networks 1892, and/or map information 1894 may have resulted from new training and/or experiences represented in data received from any number of vehicles in environment, and/or based at least in part on training performed at a data center (e.g., using server(s) 1878 and/or other servers).

In at least one embodiment, server(s) 1878 may be used to train machine learning models (e.g., neural networks) based at least in part on training data. Training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1890, and/or machine learning models may be used by server(s) 1878 to remotely monitor vehicles.

In at least one embodiment, server(s) 1878 may receive data from vehicles and apply data to up-to-date real-time neural networks for real-time intelligent inferencing. In at least one embodiment, server(s) 1878 may include deep-learning supercomputers and/or dedicated AI computers powered by GPU(s) 1884, such as a DGX and DGX Station machines developed by NVIDIA. However, in at least one embodiment, server(s) 1878 may include deep learning infrastructure that use CPU-powered data centers.

In at least one embodiment, deep-learning infrastructure of server(s) 1878 may be capable of fast, real-time inferencing, and may use that capability to evaluate and verify health of processors, software, and/or associated hardware in vehicle 1800. For example, in at least one embodiment, deep-learning infrastructure may receive periodic updates from vehicle 1800, such as a sequence of images and/or objects that vehicle 1800 has located in that sequence of images (e.g., via computer vision and/or other machine learning object classification techniques). In at least one embodiment, deep-learning infrastructure may run its own neural network to identify objects and compare them with objects identified by vehicle 1800 and, if results do not match and deep-learning infrastructure concludes that AI in vehicle 1800 is malfunctioning, then server(s) 1878 may transmit a signal to vehicle 1800 instructing a fail-safe computer of vehicle 1800 to assume control, notify passengers, and complete a safe parking maneuver.

In at least one embodiment, server(s) 1878 may include GPU(s) 1884 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1515 are used to perform one or more embodiments. Details regarding hardware structure(x) 1515 are provided herein in conjunction with FIGS. 15A and/or 15B.

Computer Systems

Figure 19:
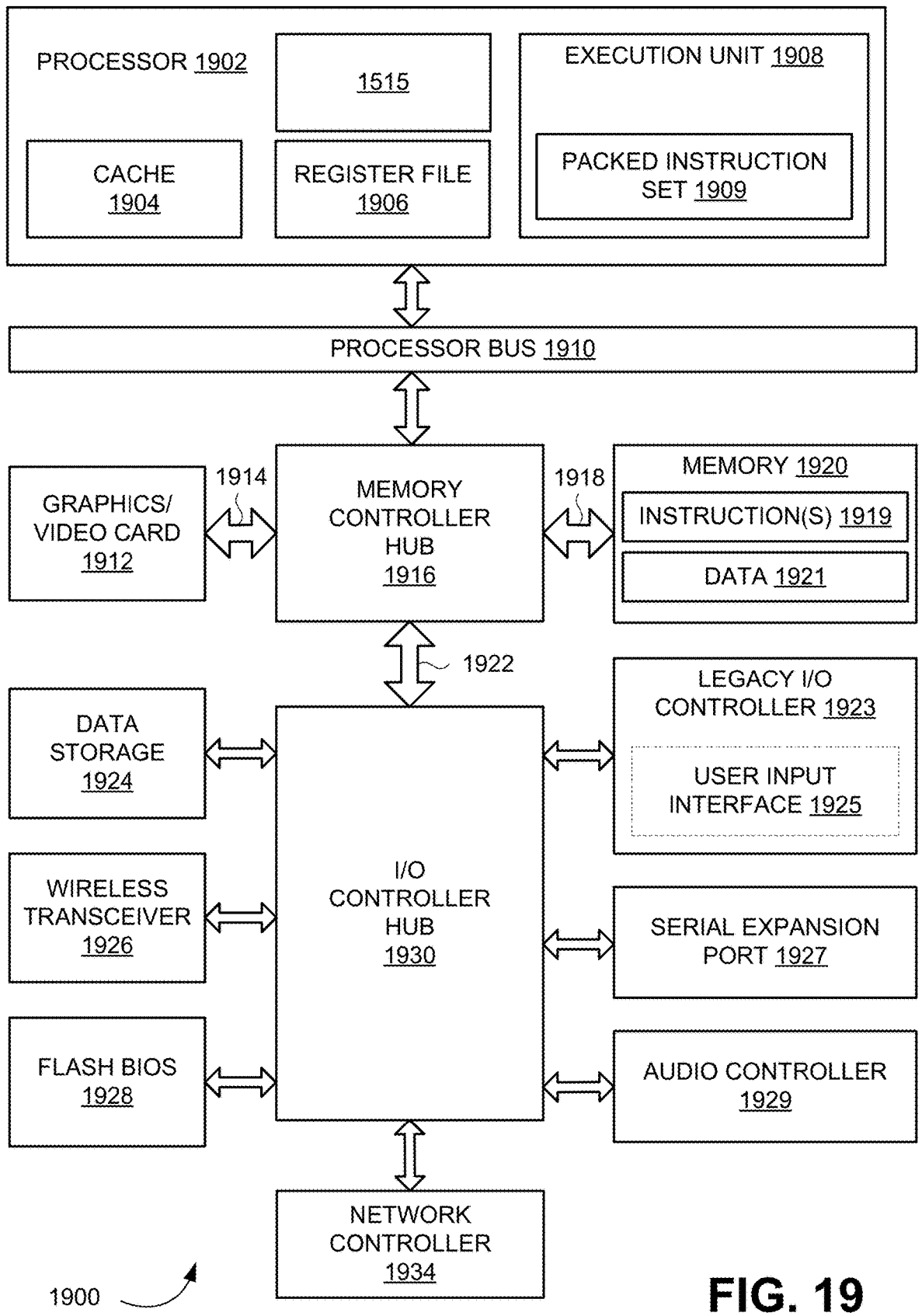
FIG. 19 is a block diagram illustrating a computer system, according to at least one embodiment.

FIG. 19 is a block diagram illustrating an exemplary computer system, which may be a system with interconnected devices and components, a system-on-a-chip (SOC) or some combination thereof 1900 formed with a processor that may include execution units to execute an instruction, according to at least one embodiment. In at least one embodiment, computer system 1900 may include, without limitation, a component, such as a processor 1902 to employ execution units including logic to perform algorithms for process data, in accordance with present disclosure, such as in embodiment described herein. In at least one embodiment, computer system 1900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1900 may include, without limitation, processor 1902 that may include, without limitation, one or more execution units 1908 to perform machine learning model training and/or inferencing according to techniques described herein. In at least one embodiment, system 19 is a single processor desktop or server system, but in another embodiment system 19 may be a multiprocessor system. In at least one embodiment, processor 1902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1902 may be coupled to a processor bus 1910 that may transmit data signals between processor 1902 and other components in computer system 1900.

In at least one embodiment, processor 1902 may include, without limitation, a Level 1 ("L1") internal cache memory ("cache") 1904. In at least one embodiment, processor 1902 may have a single internal cache or multiple levels of internal cache. In at least one embodiment, cache memory may reside external to processor 1902. Other embodiments may also include a combination of both internal and external caches depending on particular implementation and needs. In at least one embodiment, register file 1906 may store different types of data in various registers including, without limitation, integer registers, floating point registers, status registers, and instruction pointer register.

In at least one embodiment, execution unit 1908, including, without limitation, logic to perform integer and floating point operations, also resides in processor 1902. Processor 1902 may also include a microcode ("ucode") read only memory ("ROM") that stores microcode for certain macro instructions. In at least one embodiment, execution unit 1908 may include logic to handle a packed instruction set 1909. In at least one embodiment, by including packed instruction set 1909 in instruction set of a general-purpose processor 1902, along with associated circuitry to execute instructions, operations used by many multimedia applications may be performed using packed data in a general-purpose processor 1902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1908 may also be used in microcontrollers, embedded processors, graphics devices, DSPs, and other types of logic circuits. In at least one embodiment, computer system 1900 may include, without limitation, a memory 1920. In at least one embodiment, memory 1920 may be implemented as a Dynamic Random Access Memory ("DRAM") device, a Static Random Access Memory ("SRAM") device, flash memory device, or other memory device. Memory 1920 may store instruction(s) 1919 and/or data 1921 represented by data signals that may be executed by processor 1902.

In at least one embodiment, system logic chip may be coupled to processor bus 1910 and memory 1920. In at least one embodiment, system logic chip may include, without limitation, a memory controller hub ("MCH") 1916, and processor 1902 may communicate with MCH 1916 via processor bus 1910. In at least one embodiment, MCH 1916 may provide a high bandwidth memory path 1918 to memory 1920 for instruction and data storage and for storage of graphics commands, data and textures. In at least one embodiment, MCH 1916 may direct data signals between processor 1902, memory 1920, and other components in computer system 1900 and to bridge data signals between processor bus 1910, memory 1920, and a system I/O 1922. In at least one embodiment, system logic chip may provide a graphics port for coupling to a graphics controller. In at least one embodiment, MCH 1916 may be coupled to memory 1920 through a high bandwidth memory path 1918 and graphics/video card 1912 may be coupled to MCH 1916 through an Accelerated Graphics Port ("AGP") interconnect 1914.

In at least one embodiment, computer system 1900 may use system I/O 1922 that is a proprietary hub interface bus to couple MCH 1916 to I/O controller hub ("ICH") 1930. In at least one embodiment, ICH 1930 may provide direct connections to some I/O devices via a local I/O bus. In at least one embodiment, local I/O bus may include, without limitation, a high-speed I/O bus for connecting peripherals to memory 1920, chipset, and processor 1902. Examples may include, without limitation, an audio controller 1929, a firmware hub ("flash BIOS") 1928, a wireless transceiver 1926, a data storage 1924, a legacy I/O controller 1923 containing user input and keyboard interfaces, a serial expansion port 1927, such as Universal Serial Bus ("USB"), and a network controller 1934. Data storage 1924 may comprise a hard disk drive, a floppy disk drive, a CD-ROM device, a flash memory device, or other mass storage device.

In at least one embodiment, FIG. 19 illustrates a system, which includes interconnected hardware devices or "chips", whereas in other embodiments, FIG. 19 may illustrate an exemplary System on a Chip ("SoC"). In at least one embodiment, devices illustrated in FIG. 19 may be interconnected with proprietary interconnects, standardized interconnects (e.g., PCIe) or some combination thereof. In at least one embodiment, one or more components of system 1900 are interconnected using compute express link (CXL) interconnects.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 19 for inferencing or predicting operations based, at least in part, on weight parameters calculated using neural network training operations, neural network functions and/or architectures, or neural network use cases described herein.

Figure 20:
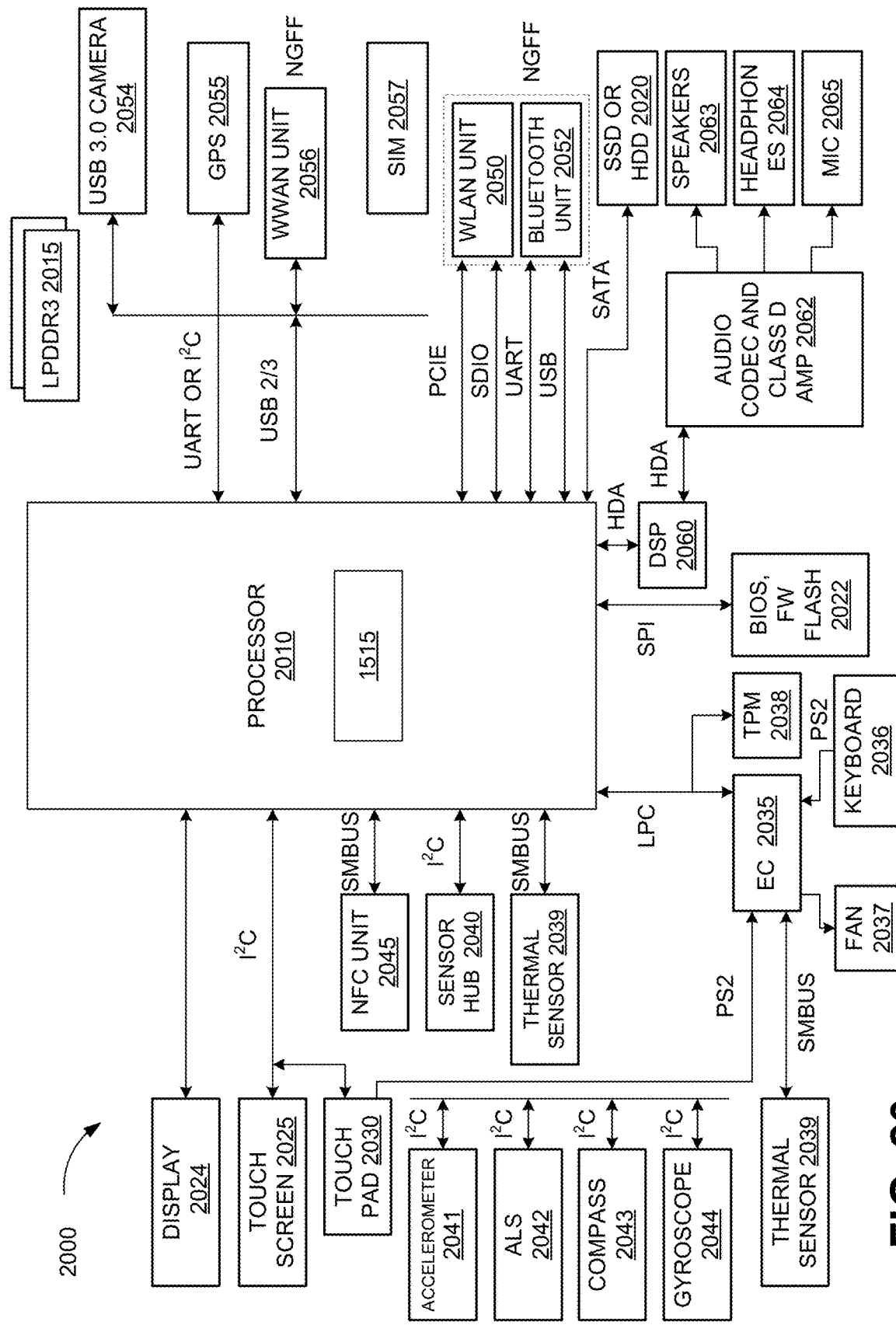
FIG. 20 is a block diagram illustrating computer system, according to at least one embodiment.

FIG. 20 is a block diagram illustrating an electronic device 2000 for utilizing a processor 2010, according to at least one embodiment. In at least one embodiment, electronic device 2000 may be, for example and without limitation, a notebook, a tower server, a rack server, a blade server, a laptop, a desktop, a tablet, a mobile device, a phone, an embedded computer, or any other suitable electronic device.

In at least one embodiment, system 2000 may include, without limitation, processor 2010 communicatively coupled to any suitable number or kind of components, peripherals, modules, or devices. In at least one embodiment, processor 2010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 20 illustrates a system, which includes interconnected hardware devices or "chips", whereas in other embodiments, FIG. 20 may illustrate an exemplary System on a Chip ("SoC"). In at least one embodiment, devices illustrated in FIG. 20 may be interconnected with proprietary interconnects, standardized interconnects (e.g., PCIe) or some combination thereof. In at least one embodiment, one or more components of FIG. 20 are interconnected using compute express link (CXL) interconnects.

In at least one embodiment, FIG. 20 may include a display 2024, a touch screen 2025, a touch pad 2030, a Near Field Communications unit ("NFC") 2045, a sensor hub 2040, a thermal sensor 2046, an Express Chipset ("EC") 2035, a Trusted Platform Module ("TPM") 2038, BIOS/firmware/flash memory ("BIOS, FW Flash") 2022, a DSP 2060, a drive "SSD or HDD") 2020 such as a Solid State Disk ("SSD") or a Hard Disk Drive ("HDD"), a wireless local area network unit ("WLAN") 2050, a Bluetooth unit 2052, a Wireless Wide Area Network unit ("WWAN") 2056, a Global Positioning System (GPS) 2055, a camera ("USB 3.0 camera") 2054 such as a USB 3.0 camera, or a Low Power Double Data Rate ("LPDDR") memory unit ("LPDDR3") 2015 implemented in, for example, LPDDR3 standard. These components may each be implemented in any suitable manner.

In at least one embodiment, other components may be communicatively coupled to processor 2010 through components discussed above. In at least one embodiment, an accelerometer 2041, Ambient Light Sensor ("ALS") 2042, compass 2043, and a gyroscope 2044 may be communicatively coupled to sensor hub 2040. In at least one embodiment, thermal sensor 2039, a fan 2037, a keyboard 2046, and a touch pad 2030 may be communicatively coupled to EC 2035. In at least one embodiment, speaker 2063, a headphones 2064, and a microphone ("mic") 2065 may be communicatively coupled to an audio unit ("audio codec and class d amp") 2064, which may in turn be communicatively coupled to DSP 2060. In at least one embodiment, audio unit 2064 may include, for example and without limitation, an audio coder/decoder ("codec") and a class D amplifier. In at least one embodiment, SIM card ("SIM") 2057 may be communicatively coupled to WWAN unit 2056. In at least one embodiment, components such as WLAN unit 2050 and Bluetooth unit 2052, as well as WWAN unit 2056 may be implemented in a Next Generation Form Factor ("NGFF").

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 20 for inferencing or predicting operations based, at least in part, on weight parameters calculated using neural network training operations, neural network functions and/or architectures, or neural network use cases described herein.

FIG. 21 illustrates a computer system 2100, according to at least one embodiment. In at least one embodiment, computer system 2100 is configured to implement various processes and methods described throughout this disclosure.

In at least one embodiment, computer system 2100 comprises, without limitation, at least one central processing unit ("CPU") 2102 that is connected to a communication bus 2110 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2100 includes, without limitation, a main memory 2104 and control logic (e.g., implemented as hardware, software, or a combination thereof) and data are stored in main memory 2104 which may take form of random access memory ("RAM"). In at least one embodiment, a network interface subsystem ("network interface") 2122 provides an interface to other computing devices and networks for receiving data from and transmitting data to other systems from computer system 2100.

In at least one embodiment, computer system 2100, in at least one embodiment, includes, without limitation, input devices 2108, parallel processing system 2112, and display devices 2106 which can be implemented using a conventional cathode ray tube ("CRT"), liquid crystal display ("LCD"), light emitting diode ("LED"), plasma display, or other suitable display technologies. In at least one embodiment, user input is received from input devices 2108 such as keyboard, mouse, touchpad, microphone, and more. In at least one embodiment, each of foregoing modules can be situated on a single semiconductor platform to form a processing system.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 21 for inferencing or predicting operations based, at least in part, on weight parameters calculated using neural network training operations, neural network functions and/or architectures, or neural network use cases described herein.

FIG. 22 illustrates a computer system 2200, according to at least one embodiment. In at least one embodiment, computer system 2200 includes, without limitation, a computer 2210 and a USB stick 2220. In at least one embodiment, computer 2210 may include, without limitation, any number and type of processor(s) (not shown) and a memory (not shown). In at least one embodiment, computer 2210 includes, without limitation, a server, a cloud instance, a laptop, and a desktop computer.

In at least one embodiment, USB stick 2220 includes, without limitation, a processing unit 2230, a USB interface 2240, and USB interface logic 2250. In at least one embodiment, processing unit 2230 may be any instruction execution system, apparatus, or device capable of executing instructions. In at least one embodiment, processing unit 2230 may include, without limitation, any number and type of processing cores (not shown). In at least one embodiment, processing core 2230 comprises an application specific integrated circuit ("ASIC") that is optimized to perform any amount and type of operations associated with machine learning. For instance, in at least one embodiment, processing core 2230 is a tensor processing unit ("TPC") that is optimized to perform machine learning inference operations. In at least one embodiment, processing core 2230 is a vision processing unit ("VPU") that is optimized to perform machine vision and machine learning inference operations.

In at least one embodiment, USB interface 2240 may be any type of USB connector or USB socket. For instance, in at least one embodiment, USB interface 2240 is a USB 3.0 Type-C socket for data and power. In at least one embodiment, USB interface 2240 is a USB 3.0 Type-A connector. In at least one embodiment, USB interface logic 2250 may include any amount and type of logic that enables processing unit 2230 to interface with or devices (e.g., computer 2210) via USB connector 2240.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 22 for inferencing or predicting operations based, at least in part, on weight parameters calculated using neural network training operations, neural network functions and/or architectures, or neural network use cases described herein.

Figure 23A:
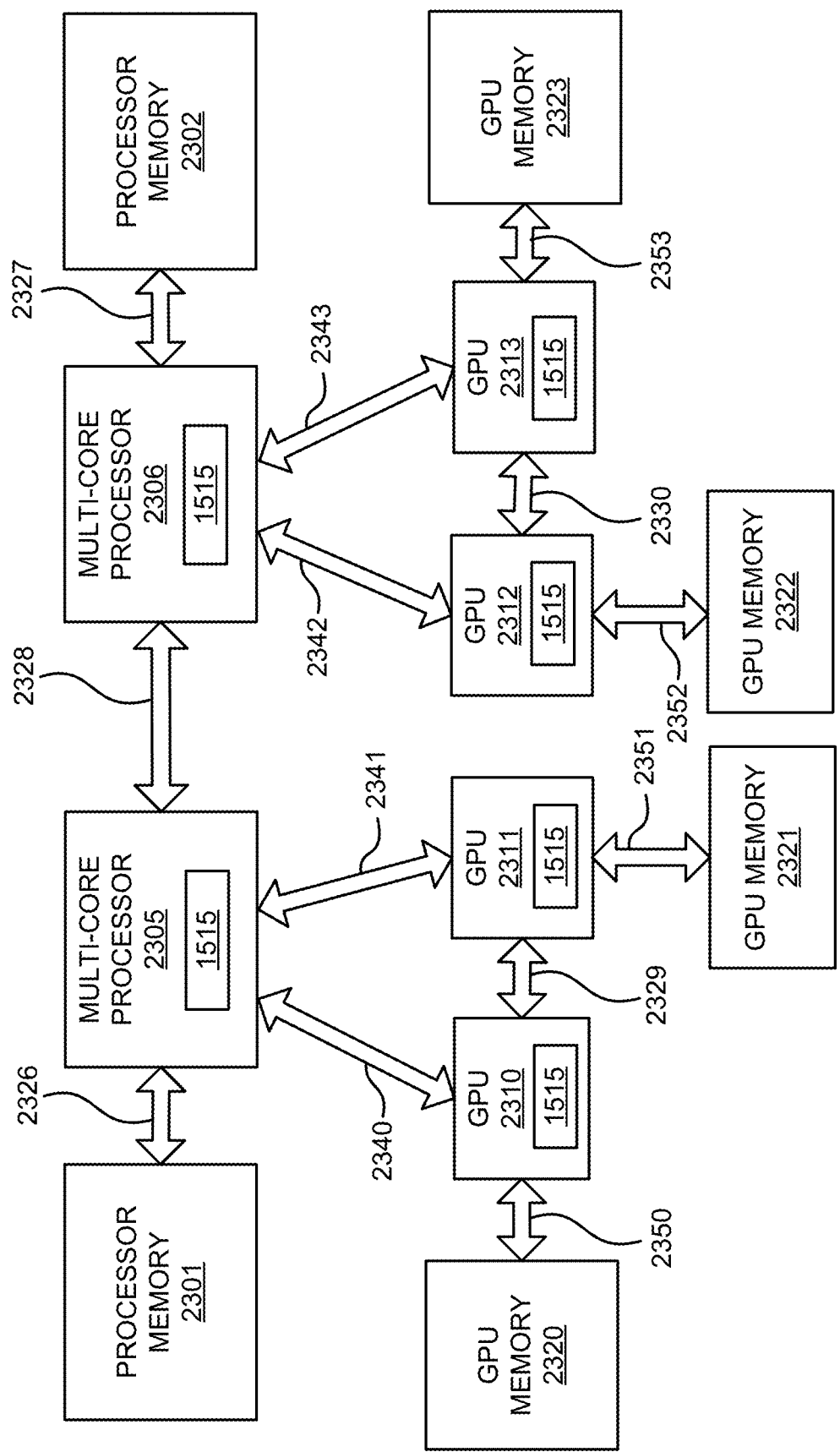
FIG. 23A illustrates a computer system, according to at least one embodiment.

FIG. 23A illustrates an exemplary architecture in which a plurality of GPUs 2310-2313 is communicatively coupled to a plurality of multi-core processors 2305-2306 over high-speed links 2340-2343 (e.g., buses, point-to-point interconnects, etc.). In one embodiment, high-speed links 2340-2343 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2310-2313 are interconnected over high-speed links 2329-2330, which may be implemented using same or different protocols/links than those used for high-speed links 2340-2343. Similarly, two or more of multi-core processors 2305-2306 may be connected over high speed link 2328 which may be symmetric multi-processor (SMP) buses operating at 20 GB/s, 30 GB/s, 120 GB/s or higher. Alternatively, all communication between various system components shown in FIG. 23A may be accomplished using same protocols/links (e.g., over a common interconnection fabric).

In one embodiment, each multi-core processor 2305-2306 is communicatively coupled to a processor memory 2301-2302, via memory interconnects 2326-2327, respectively, and each GPU 2310-2313 is communicatively coupled to GPU memory 2320-2323 over GPU memory interconnects 2350-2353, respectively. Memory interconnects 2326-2327 and 2350-2353 may utilize same or different memory access technologies. By way of example, and not limitation, processor memories 2301-2302 and GPU memories 2320-2323 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2301-2302 may be volatile memory and another portion may be non-volatile memory (e.g., using a two-level memory (2LM) hierarchy).

As described herein, although various processors 2305-2306 and GPUs 2310-2313 may be physically coupled to a particular memory 2301-2302, 2320-2323, respectively, a unified memory architecture may be implemented in which a same virtual system address space (also referred to as "effective address" space) is distributed among various physical memories. For example, processor memories 2301-2302 may each comprise 64 GB of system memory address space and GPU memories 2320-2323 may each comprise 32 GB of system memory address space (resulting in a total of 256 GB addressable memory in this example).

Figure 23B:
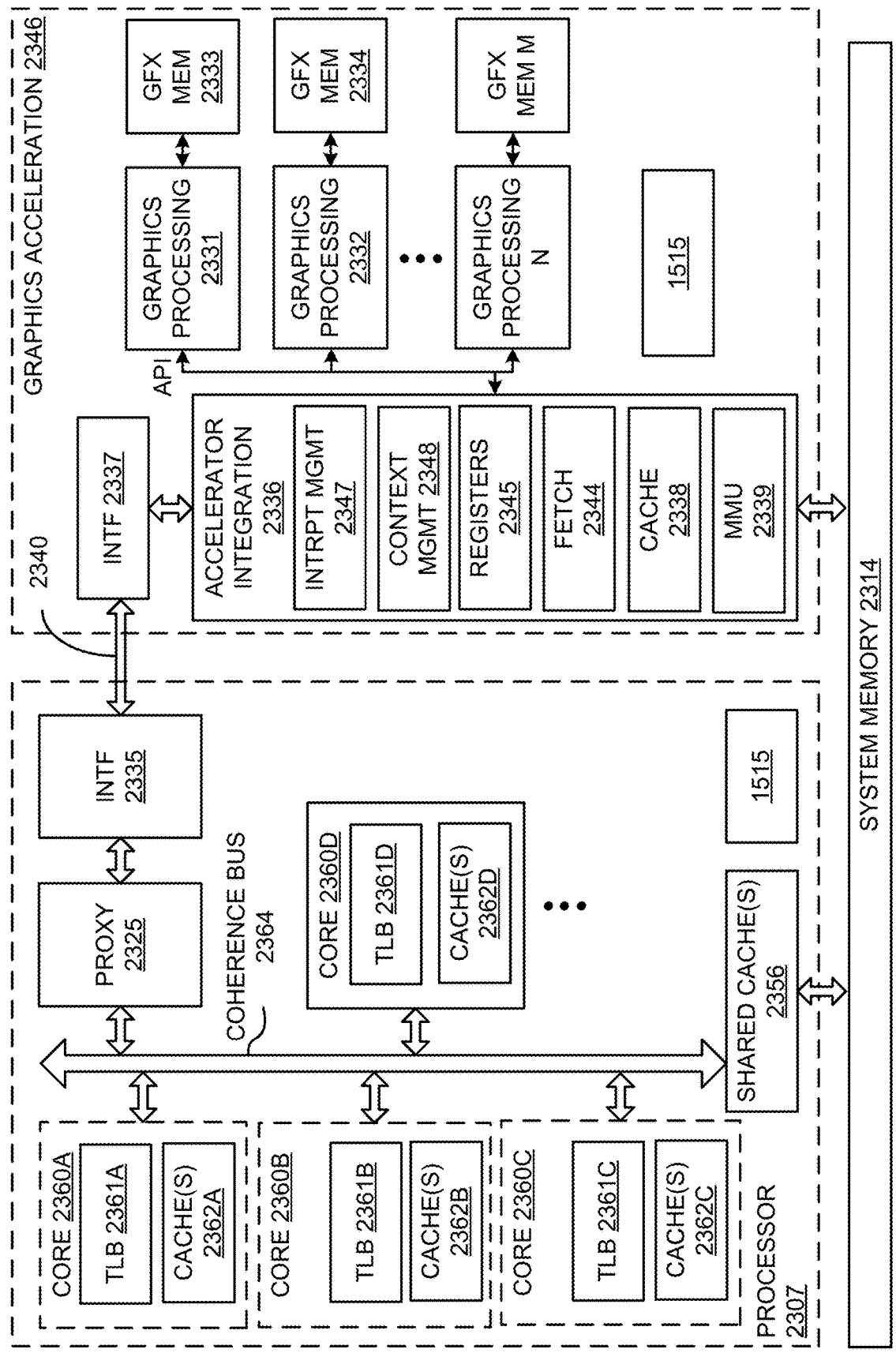
FIG. 23B illustrates a computer system, according to at least one embodiment.

FIG. 23B illustrates additional details for an interconnection between a multi-core processor 2307 and a graphics acceleration module 2346 in accordance with one exemplary embodiment. Graphics acceleration module 2346 may include one or more GPU chips integrated on a line card which is coupled to processor 2307 via high-speed link 2340. Alternatively, graphics acceleration module 2346 may be integrated on a same package or chip as processor 2307.

In at least one embodiment, illustrated processor 2307 includes a plurality of cores 2360A-2360D, each with a translation lookaside buffer 2361A-2361D and one or more caches 2362A-2362D. In at least one embodiment, cores 2360A-2360D may include various other components for executing instructions and processing data which are not illustrated. Caches 2362A-2362D may comprise level 1 (L1) and level 2 (L2) caches. In addition, one or more shared caches 2356 may be included in caches 2362A-2362D and shared by sets of cores 2360A-2360D. For example, one embodiment of processor 2307 includes 24 cores, each with its own L1 cache, twelve shared L2 caches, and twelve shared L3 caches. In this embodiment, one or more L2 and L3 caches are shared by two adjacent cores. Processor 2307 and graphics acceleration module 2346 connect with system memory 2314, which may include processor memories 2301-2302 of FIG. 23A.

Coherency is maintained for data and instructions stored in various caches 2362A-2362D, 2356 and system memory 2314 via inter-core communication over a coherence bus 2364. For example, each cache may have cache coherency logic/circuitry associated therewith to communicate to over coherence bus 2364 in response to detected reads or writes to particular cache lines. In one implementation, a cache snooping protocol is implemented over coherence bus 2364 to snoop cache accesses.

In one embodiment, a proxy circuit 2325 communicatively couples graphics acceleration module 2346 to coherence bus 2364, allowing graphics acceleration module 2346 to participate in a cache coherence protocol as a peer of cores 2360A-2360D. In particular, an interface 2335 provides connectivity to proxy circuit 2325 over high-speed link 2340 (e.g., a PCIe bus, NVLink, etc.) and an interface 2337 connects graphics acceleration module 2346 to link 2340.

In one implementation, an accelerator integration circuit 2336 provides cache management, memory access, context management, and interrupt management services on behalf of a plurality of graphics processing engines 2331, 2332, N of graphics acceleration module 2346. Graphics processing engines 2331, 2332, N may each comprise a separate graphics processing unit (GPU). Alternatively, graphics processing engines 2331, 2332, N may comprise different types of graphics processing engines within a GPU such as graphics execution units, media processing engines (e.g., video encoders/decoders), samplers, and blit engines. In at least one embodiment, graphics acceleration module 2346 may be a GPU with a plurality of graphics processing engines 2331-2332, N or graphics processing engines 2331-2332, N may be individual GPUs integrated on a common package, line card, or chip.

In one embodiment, accelerator integration circuit 2336 includes a memory management unit (MMU) 2339 for performing various memory management functions such as virtual-to-physical memory translations (also referred to as effective-to-real memory translations) and memory access protocols for accessing system memory 2314. MMU 2339 may also include a translation lookaside buffer (TLB) (not shown) for caching virtual/effective to physical/real address translations. In one implementation, a cache 2338 stores commands and data for efficient access by graphics processing engines 2331-2332, N. In one embodiment, data stored in cache 2338 and graphics memories 2333-2334, M is kept coherent with core caches 2362A-2362D, 2356 and system memory 2314. As mentioned, this may be accomplished via proxy circuit 2325 on behalf of cache 2338 and memories 2333-2334, M (e.g., sending updates to cache 2338 related to modifications/accesses of cache lines on processor caches 2362A-2362D, 2356 and receiving updates from cache 2338).

A set of registers 2345 store context data for threads executed by graphics processing engines 2331-2332, N and a context management circuit 2348 manages thread contexts. For example, context management circuit 2348 may perform save and restore operations to save and restore contexts of various threads during contexts switches (e.g., where a first thread is saved and a second thread is stored so that a second thread can be execute by a graphics processing engine). For example, on a context switch, context management circuit 2348 may store current register values to a designated region in memory (e.g., identified by a context pointer). It may then restore register values when returning to a context. In one embodiment, an interrupt management circuit 2347 receives and processes interrupts received from system devices.

In one implementation, virtual/effective addresses from a graphics processing engine 2331 are translated to real/physical addresses in system memory 2314 by MMU 2339. One embodiment of accelerator integration circuit 2336 supports multiple (e.g., 4, 8, 16) graphics accelerator modules 2346 and/or other accelerator devices. Graphics accelerator module 2346 may be dedicated to a single application executed on processor 2307 or may be shared between multiple applications. In one embodiment, a virtualized graphics execution environment is presented in which resources of graphics processing engines 2331-2332, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2336 performs as a bridge to a system for graphics acceleration module 2346 and provides address translation and system memory cache services. In addition, accelerator integration circuit 2336 may provide virtualization facilities for a host processor to manage virtualization of graphics processing engines 2331-2332, interrupts, and memory management.

Because hardware resources of graphics processing engines 2331-2332, N are mapped explicitly to a real address space seen by host processor 2307, any host processor can address these resources directly using an effective address value. One function of accelerator integration circuit 2336, in one embodiment, is physical separation of graphics processing engines 2331-2332, N so that they appear to a system as independent units.

In at least one embodiment, one or more graphics memories 2333-2334, M are coupled to each of graphics processing engines 2331-2332, N, respectively. Graphics memories 2333-2334, M store instructions and data being processed by each of graphics processing engines 2331-2332, N. Graphics memories 2333-2334, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 2340, biasing techniques are used to ensure that data stored in graphics memories 2333-2334, M is data which will be used most frequently by graphics processing engines 2331-2332, N and preferably not used by cores 2360A-2360D (at least not frequently). Similarly, a biasing mechanism attempts to keep data needed by cores (and preferably not graphics processing engines 2331-2332, N) within caches 2362A-2362D, 2356 of cores and system memory 2314.

Figure 23C:
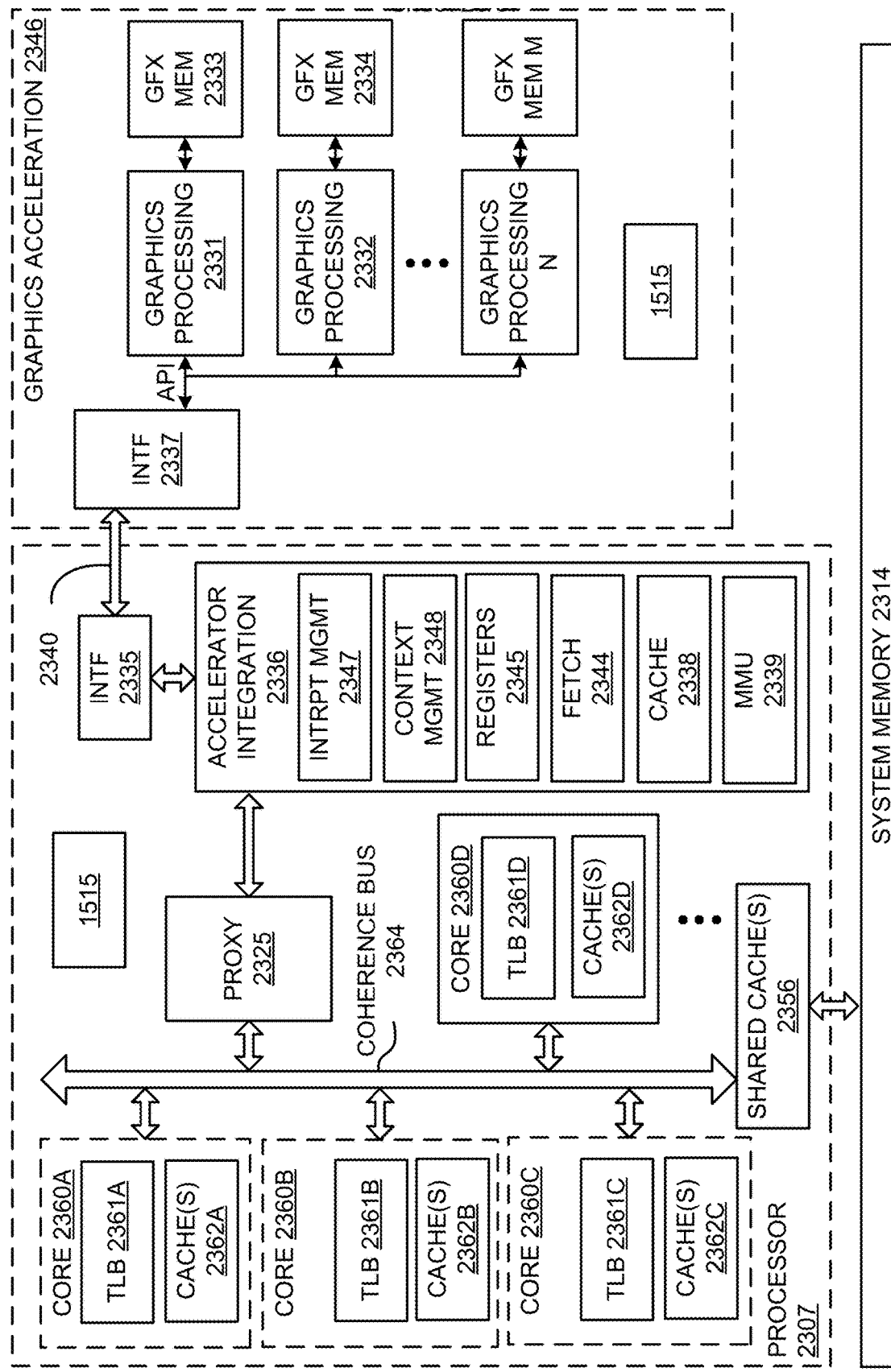
FIG. 23C illustrates a computer system, according to at least one embodiment.

FIG. 23C illustrates another exemplary embodiment in which accelerator integration circuit 2336 is integrated within processor 2307. In this embodiment, graphics processing engines 2331-2332, N communicate directly over high-speed link 2340 to accelerator integration circuit 2336 via interface 2337 and interface 2335 (which, again, may be utilize any form of bus or interface protocol). Accelerator integration circuit 2336 may perform same operations as those described with respect to FIG. 23B, but potentially at a higher throughput given its close proximity to coherence bus 2364 and caches 2362A-2362D, 2356. One embodiment supports different programming models including a dedicated-process programming model (no graphics acceleration module virtualization) and shared programming models (with virtualization), which may include programming models which are controlled by accelerator integration circuit 2336 and programming models which are controlled by graphics acceleration module 2346.

In at least one embodiment, graphics processing engines 2331-2332, N are dedicated to a single application or process under a single operating system. In at least one embodiment, a single application can funnel other application requests to graphics processing engines 2331-2332, N, providing virtualization within a VM/partition.

In at least one embodiment, graphics processing engines 2331-2332, N, may be shared by multiple VM/application partitions. In at least one embodiment, shared models may use a system hypervisor to virtualize graphics processing engines 2331-2332, N to allow access by each operating system. For single-partition systems without a hypervisor, graphics processing engines 2331-2332, N are owned by an operating system. In at least one embodiment, an operating system can virtualize graphics processing engines 2331-2332, N to provide access to each process or application.

In at least one embodiment, graphics acceleration module 2346 or an individual graphics processing engine 2331-2332, N selects a process element using a process handle. In one embodiment, process elements are stored in system memory 2314 and are addressable using an effective address to real address translation techniques described herein. In at least one embodiment, a process handle may be an implementation-specific value provided to a host process when registering its context with graphics processing engine 2331-

2332, N (that is, calling system software to add a process element to a process element linked list). In at least one embodiment, a lower 16-bits of a process handle may be an offset of the process element within a process element linked list.

Figure 23D:
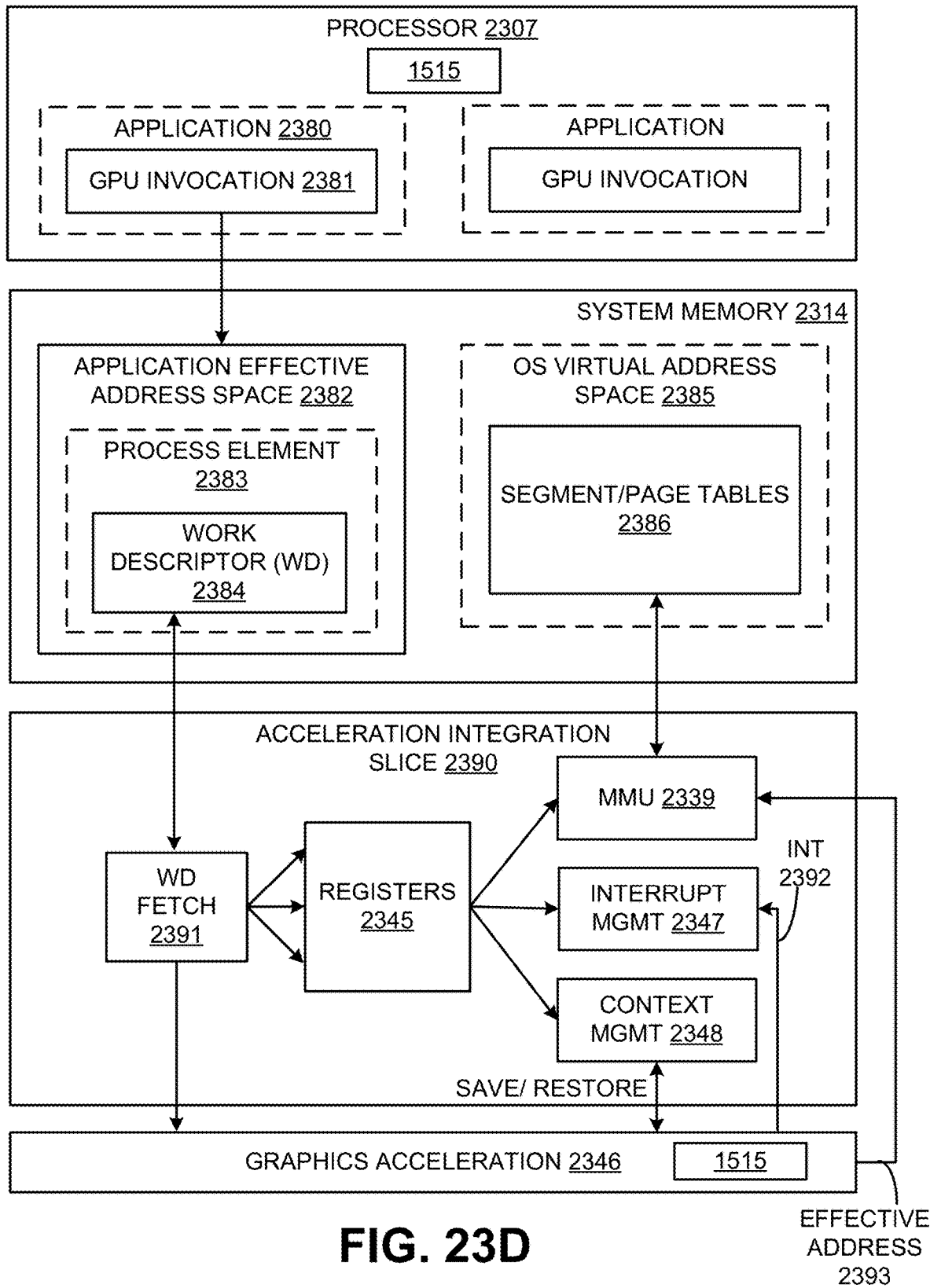
FIG. 23D illustrates a computer system, according to at least one embodiment.

FIG. 23D illustrates an exemplary accelerator integration slice 2390. As used herein, a "slice" comprises a specified portion of processing resources of accelerator integration circuit 2336. Application effective address space 2382 within system memory 2314 stores process elements 2383. In one embodiment, process elements 2383 are stored in response to GPU invocations 2381 from applications 2380 executed on processor 2307. A process element 2383 contains process state for corresponding application 2380. A work descriptor (WD) 2384 contained in process element 2383 can be a single job requested by an application or may contain a pointer to a queue of jobs. In at least one embodiment, WD 2384 is a pointer to a job request queue in an application's address space 2382.

Graphics acceleration module 2346 and/or individual graphics processing engines 2331-2332, N can be shared by all or a subset of processes in a system. In at least one embodiment, an infrastructure for setting up process state and sending a WD 2384 to a graphics acceleration module 2346 to start a job in a virtualized environment may be included.

In at least one embodiment, a dedicated-process programming model is implementation-specific. In this model, a single process owns graphics acceleration module 2346 or an individual graphics processing engine 2331. Because graphics acceleration module 2346 is owned by a single process, a hypervisor initializes accelerator integration circuit 2336 for an owning partition and an operating system initializes accelerator integration circuit 2336 for an owning process when graphics acceleration module 2346 is assigned.

In operation, a WD fetch unit 2391 in accelerator integration slice 2390 fetches next WD 2384 which includes an indication of work to be done by one or more graphics processing engines of graphics acceleration module 2346. Data from WD 2384 may be stored in registers 2345 and used by MMU 2339, interrupt management circuit 2347 and/or context management circuit 2348 as illustrated. For example, one embodiment of MMU 2339 includes segment/page walk circuitry for accessing segment/page tables 2386 within OS virtual address space 2385. Interrupt management circuit 2347 may process interrupt events 2392 received from graphics acceleration module 2346. When performing graphics operations, an effective address 2393 generated by a graphics processing engine 2331-2332, N is translated to a real address by MMU 2339.

In one embodiment, a same set of registers 2345 are duplicated for each graphics processing engine 2331-2332, N and/or graphics acceleration module 2346 and may be initialized by a hypervisor or operating system. Each of these duplicated registers may be included in an accelerator integration slice 2390. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |

TABLE 1-continued

| | Hypervisor Initialized Registers |
|---|---|
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2384 is specific to a particular graphics acceleration module 2346 and/or graphics processing engines 2331-2332, N. It contains all information required by a graphics processing engine 2331-2332, N to do work or it can be a pointer to a memory location where an application has set up a command queue of work to be completed.

Figure 23E:
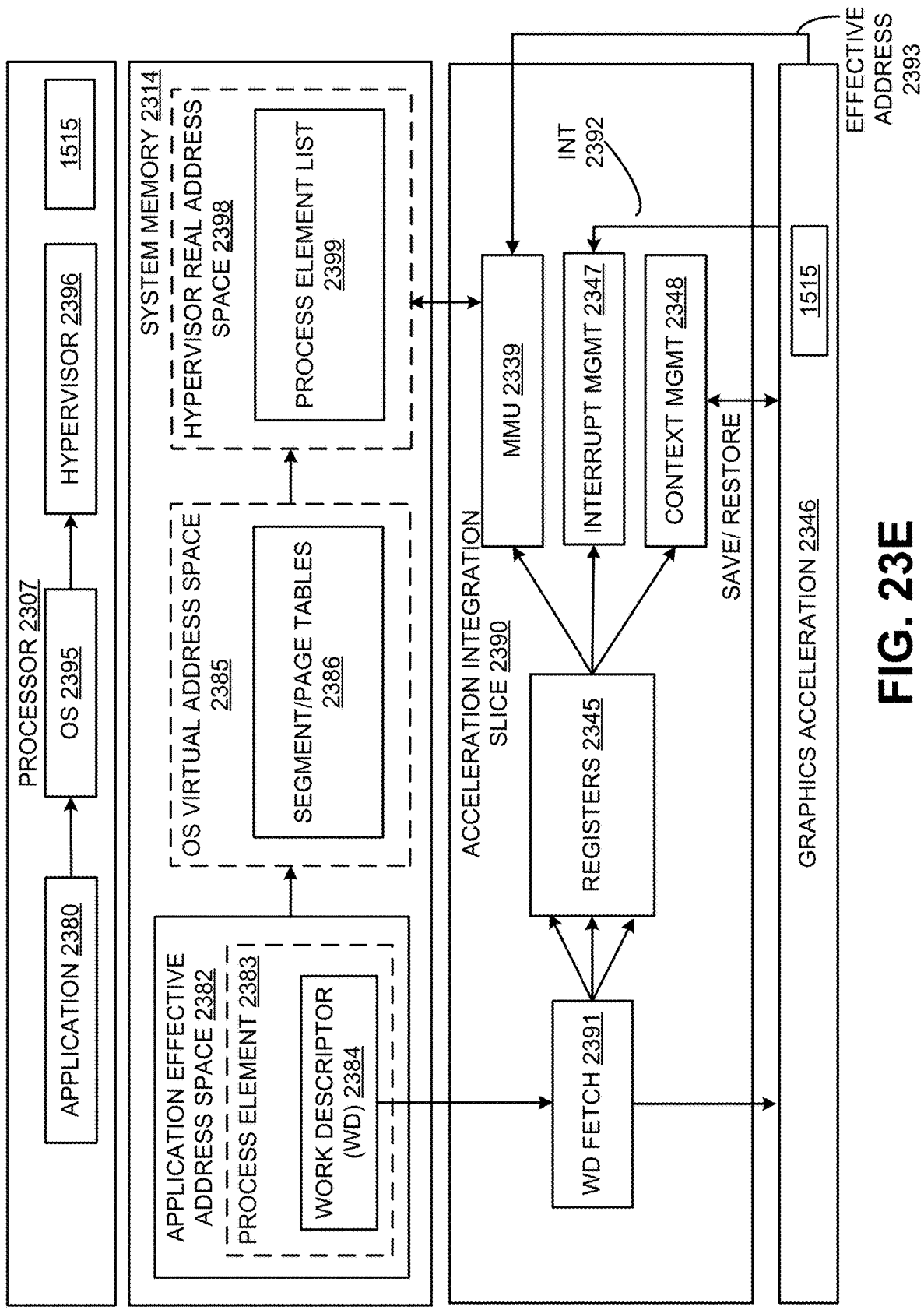
FIGS. 23E and 23F illustrate a shared programming model, according to at least one embodiment.

FIG. 23E illustrates additional details for one exemplary embodiment of a shared model. This embodiment includes a hypervisor real address space 2398 in which a process element list 2399 is stored. Hypervisor real address space 2398 is accessible via a hypervisor 2396 which virtualizes graphics acceleration module engines for operating system 2395.

In at least one embodiment, shared programming models allow for all or a subset of processes from all or a subset of partitions in a system to use a graphics acceleration module 2346. There are two programming models where graphics acceleration module 2346 is shared by multiple processes and partitions: time-sliced shared and graphics directed shared.

In this model, system hypervisor 2396 owns graphics acceleration module 2346 and makes its function available to all operating systems 2395. For a graphics acceleration module 2346 to support virtualization by system hypervisor 2396, graphics acceleration module 2346 may adhere to the following: 1) An application's job request must be autonomous (that is, state does not need to be maintained between jobs), or graphics acceleration module 2346 must provide a context save and restore mechanism. 2) An application's job request is guaranteed by graphics acceleration module 2346 to complete in a specified amount of time, including any translation faults, or graphics acceleration module 2346 provides an ability to preempt processing of a job. 3) Graphics acceleration module 2346 must be guaranteed fairness between processes when operating in a directed shared programming model.

In at least one embodiment, application 2380 is required to make an operating system 2395 system call with a graphics acceleration module 2346 type, a work descriptor (WD), an authority mask register (AMR) value, and a context save/restore area pointer (CSRP). In at least one embodiment, graphics acceleration module 2346 type describes a targeted acceleration function for a system call. In at least one embodiment, graphics acceleration module 2346 type may be a system-specific value. In at least one embodiment, WD is formatted specifically for graphics acceleration module 2346 and can be in a form of a graphics acceleration module 2346 command, an effective address pointer to a user-defined structure, an effective address pointer to a queue of commands, or any other data structure to describe work to be done by graphics acceleration module 2346. In one embodiment, an AMR value is an AMR state to use for a current process. In at least one embodiment, a value passed to an operating system is similar to an application setting an AMR. If accelerator integration circuit 2336 and graphics acceleration module 2346 implementations do not support a User Authority Mask Override Register (UAMOR), an operating system may apply a current UAMOR value to an AMR value before passing an AMR in a hypervisor call. Hypervisor 2396 may optionally apply a current Authority Mask Override Register (AMOR) value before placing an AMR into process element 2383. In at least one embodiment, CSRP is one of registers 2345 containing an effective address of an area in an application's address space 2382 for graphics acceleration module 2346 to save and restore context state. This pointer is optional if no state is required to be saved between jobs or when a job is preempted. In at least one embodiment, context save/restore area may be pinned system memory.

Upon receiving a system call, operating system 2395 may verify that application 2380 has registered and been given authority to use graphics acceleration module 2346. Operating system 2395 then calls hypervisor 2396 with information shown in Table 3.

TABLE 3

| | OS to Hypervisor Call Parameters |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 2396 verifies that operating system 2395 has registered and been given authority to use graphics acceleration module 2346. Hypervisor 2396 then puts process element 2383 into a process element linked list for a corresponding graphics acceleration module 2346 type. A process element may include information shown in Table 4.

TABLE 4

| | Process Element Information |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 2390 registers 2345.

Figure 23F:
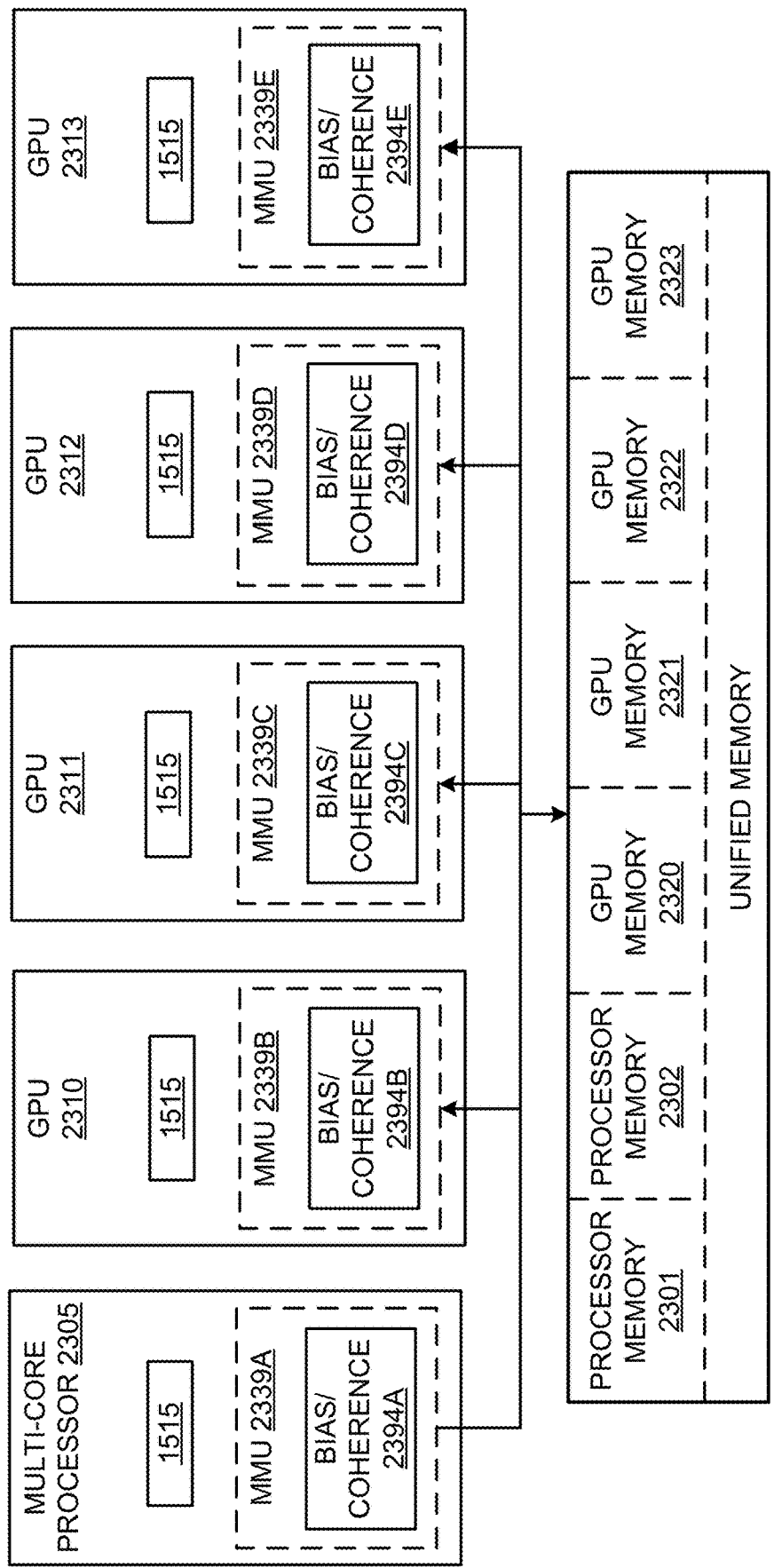

As illustrated in FIG. 23F, in at least one embodiment, a unified memory is used, addressable via a common virtual memory address space used to access physical processor memories 2301-2302 and GPU memories 2320-2323. In this implementation, operations executed on GPUs 2310-2313 utilize a same virtual/effective memory address space to access processor memories 2301-2302 and vice versa, thereby simplifying programmability. In one embodiment, a first portion of a virtual/effective address space is allocated to processor memory 2301, a second portion to second processor memory 2302, a third portion to GPU memory 2320, and so on. In at least one embodiment, an entire virtual/effective memory space (sometimes referred to as an effective address space) is thereby distributed across each of processor memories 2301-2302 and GPU memories 2320-2323, allowing any processor or GPU to access any physical memory with a virtual address mapped to that memory.

In one embodiment, bias/coherence management circuitry 2394A-2394E within one or more of MMUs 2339A-2339E ensures cache coherence between caches of one or more host processors (e.g., 2305) and GPUs 2310-2313 and implements biasing techniques indicating physical memories in which certain types of data should be stored. While multiple instances of bias/coherence management circuitry 2394A-2394E are illustrated in FIG. 23F, bias/coherence circuitry may be implemented within an MMU of one or more host processors 2305 and/or within accelerator integration circuit 2336.

One embodiment allows GPU-attached memory 2320-2323 to be mapped as part of system memory, and accessed using shared virtual memory (SVM) technology, but without suffering performance drawbacks associated with full system cache coherence. In at least one embodiment, an ability for GPU-attached memory 2320-2323 to be accessed as system memory without onerous cache coherence overhead provides a beneficial operating environment for GPU offload. This arrangement allows host processor 2305 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2320-2323 without cache coherence overheads can be critical to execution time of an offloaded computation. In cases with substantial streaming write memory traffic, for example, cache coherence overhead can significantly reduce an effective write bandwidth seen by a GPU 2310-2313. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 2320-2323, with or without a bias cache in GPU 2310-2313 (e.g., to cache frequently/recently used entries of a bias table). Alternatively, an entire bias table may be maintained within a GPU.

In at least one embodiment, a bias table entry associated with each access to GPU-attached memory 2320-2323 is accessed prior to actual access to a GPU memory, causing the following operations. First, local requests from GPU 2310-2313 that find their page in GPU bias are forwarded directly to a corresponding GPU memory 2320-2323. Local requests from a GPU that find their page in host bias are forwarded to processor 2305 (e.g., over a high-speed link as discussed above). In one embodiment, requests from processor 2305 that find a requested page in host processor bias complete a request like a normal memory read. Alternatively, requests directed to a GPU-biased page may be forwarded to GPU 2310-2313. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2305 bias to GPU bias, but is not for an opposite transition.

In one embodiment, cache coherency is maintained by temporarily rendering GPU-biased pages uncacheable by host processor 2305. To access these pages, processor 2305 may request access from GPU 2310 which may or may not grant access right away. Thus, to reduce communication between processor 2305 and GPU 2310 it is beneficial to ensure that GPU-biased pages are those which are required by a GPU but not host processor 2305 and vice versa.

Hardware structure(s) 1515 are used to perform one or more embodiments. Details regarding the hardware structure (x) 1515 are provided herein in conjunction with FIGS. 15A and/or 15B.

Figure 24:
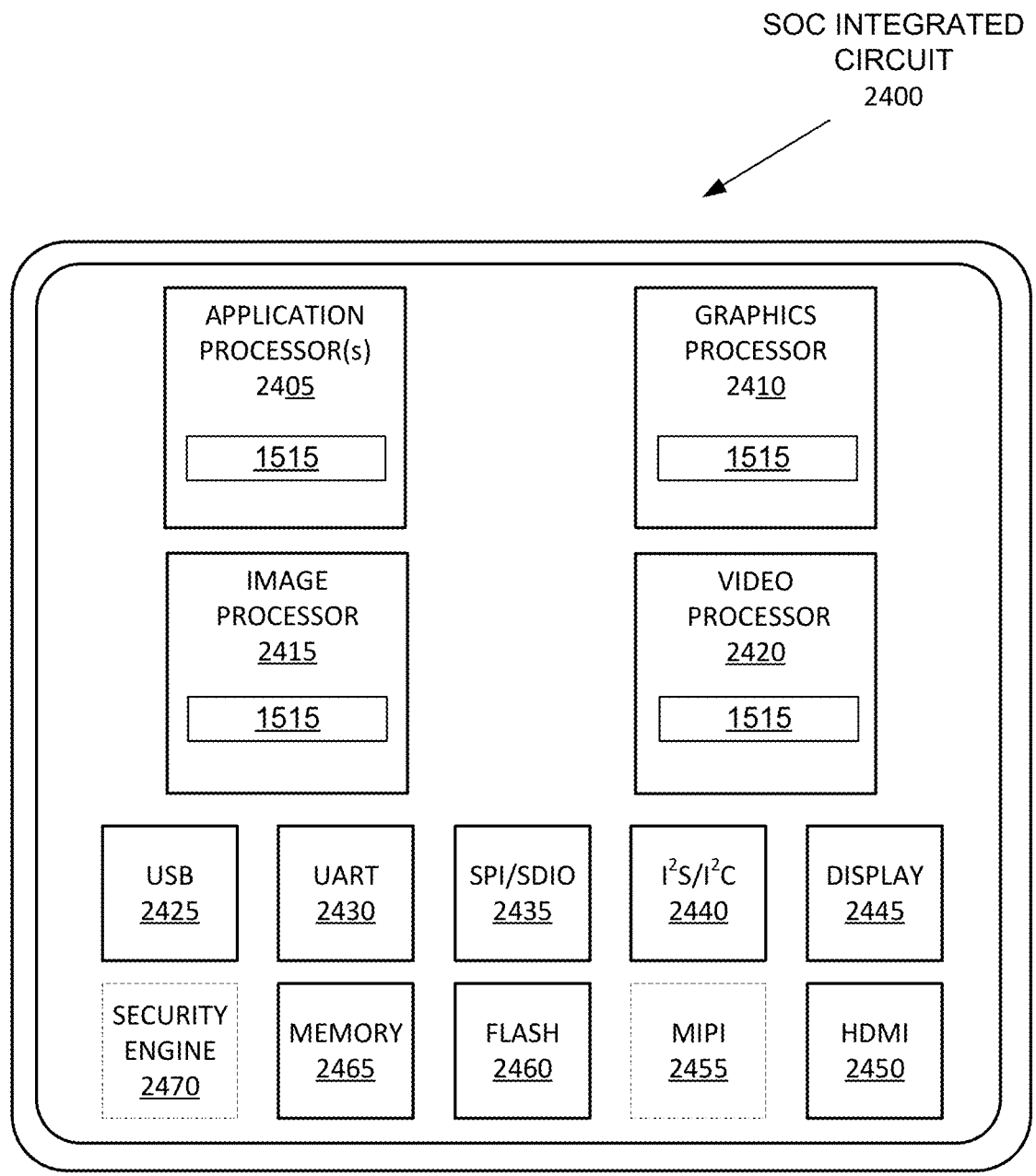
FIG. 24 illustrates exemplary integrated circuits and associated graphics processors, according to at least one embodiment.

FIG. 24 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 24 is a block diagram illustrating an exemplary system on a chip integrated circuit 2400 that may be fabricated using one or more IP cores, according to at least one embodiment. In at least one embodiment, integrated circuit 2400 includes one or more application processor(s) 2405 (e.g., CPUs), at least one graphics processor 2410, and may additionally include an image processor 2415 and/or a video processor 2420, any of which may be a modular IP core. In at least one embodiment, integrated circuit 2400 includes peripheral or bus logic including a USB controller 2425, UART controller 2430, an SPI/SDIO controller 2435, and an I.sup.2S/I.sup.2C controller 2440. In at least one embodiment, integrated circuit 2400 can include a display device 2445 coupled to one or more of a high-definition multimedia interface (HDMI) controller 2450 and a mobile industry processor interface (MIPI) display interface 2455. In at least one embodiment, storage may be provided by a flash memory subsystem 2460 including flash memory and a flash memory controller. In at least one embodiment, memory interface may be provided via a memory controller 2465 for access to SDRAM or SRAM memory devices. In at least one embodiment, some integrated circuits additionally include an embedded security engine 2470.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in integrated circuit 2400 for inferencing or predicting operations based, at least in part, on weight parameters calculated using neural network training operations, neural network functions and/or architectures, or neural network use cases described herein.

Figure 25A:
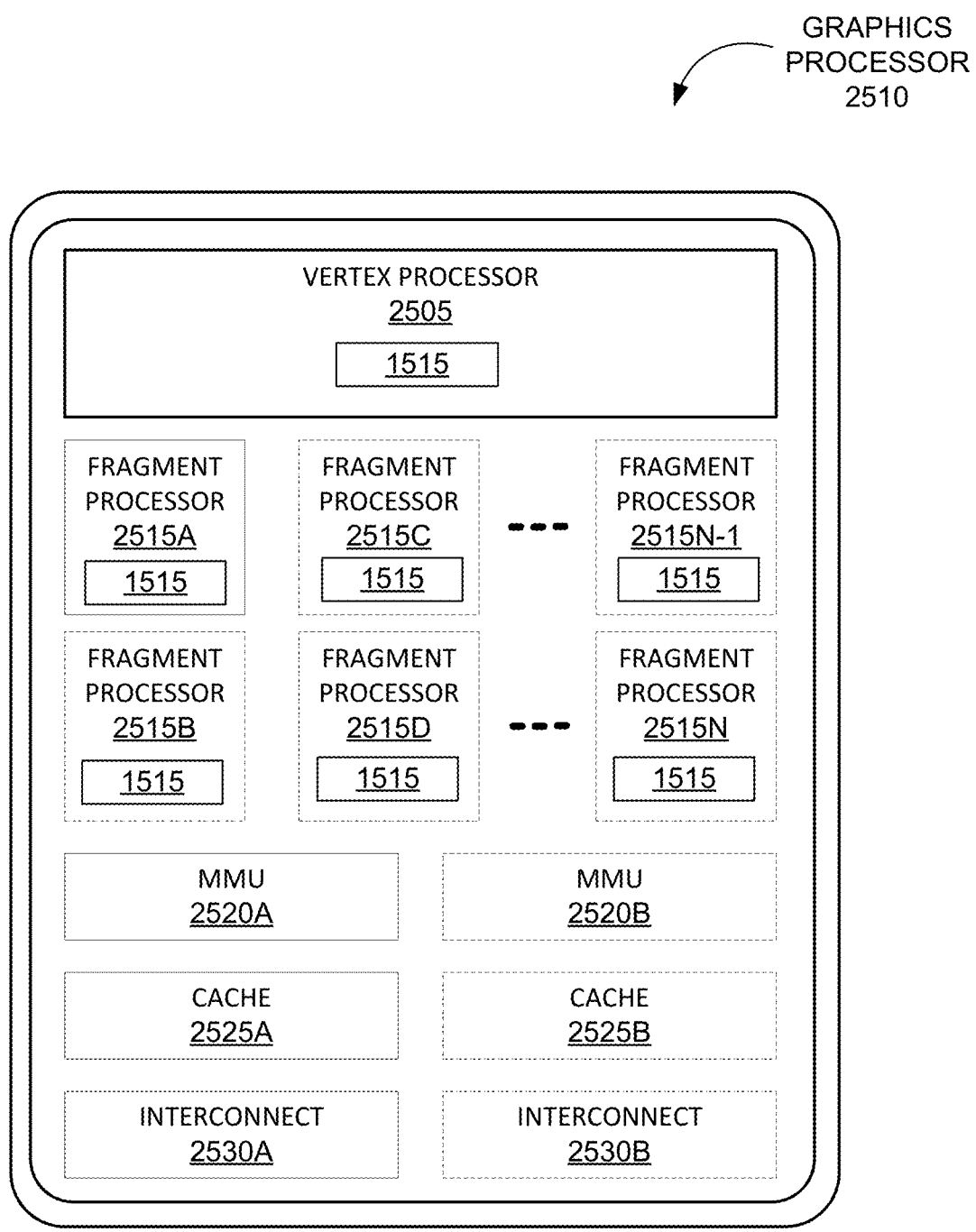
FIGS. 25A and 25B illustrate exemplary integrated circuits and associated graphics processors, according to at least one embodiment.
Figure 25B:
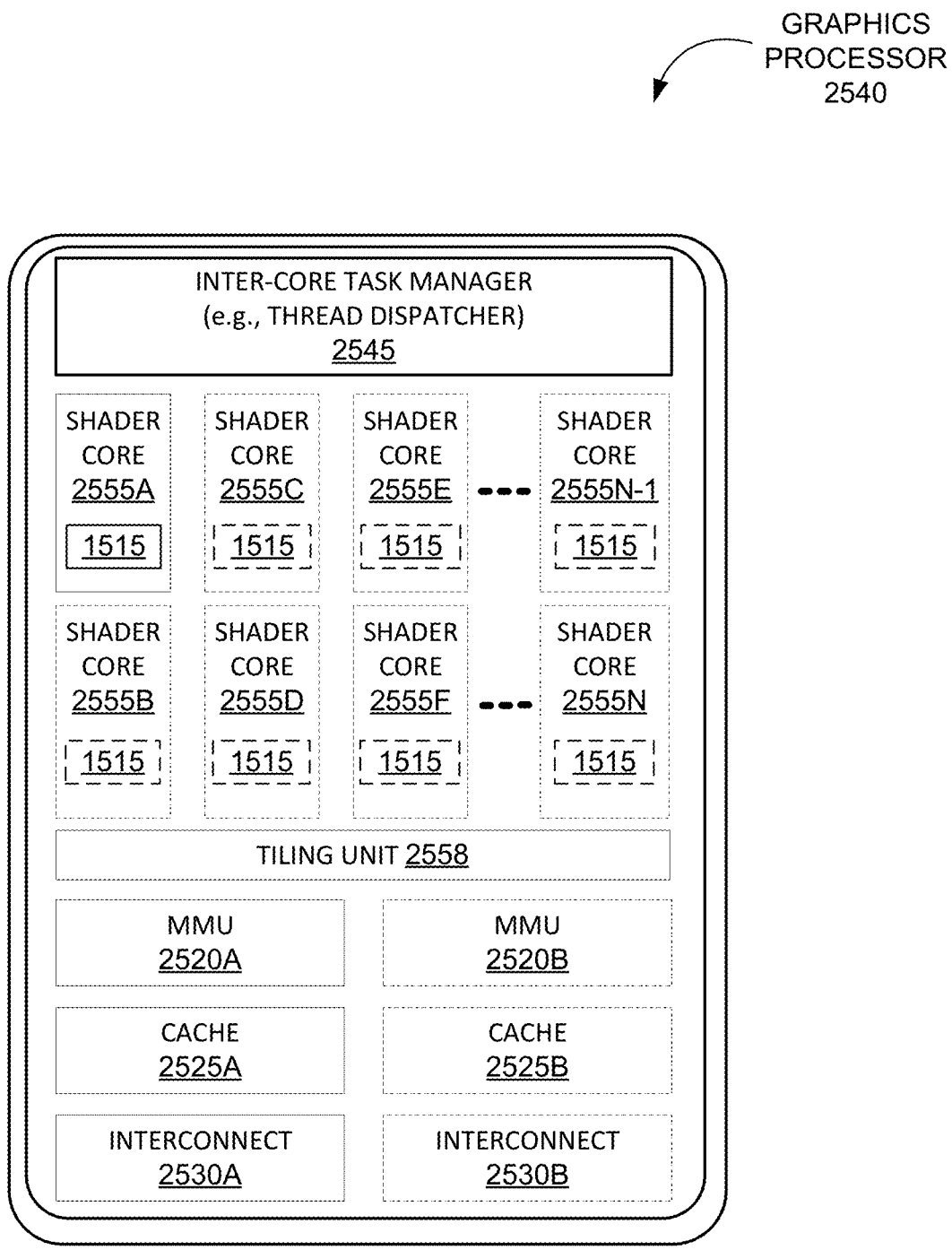

FIGS. 25A-25B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 25A-25B are block diagrams illustrating exemplary graphics processors for use within an SoC, according to embodiments described herein. FIG. 25A illustrates an exemplary graphics processor 2510 of a system on a chip integrated circuit that may be fabricated using one or more IP cores, according to at least one embodiment. FIG. 25B illustrates an additional exemplary graphics processor 2540 of a system on a chip integrated circuit that may be fabricated using one or more IP cores, according to at least one embodiment. In at least one embodiment, graphics processor 2510 of FIG. 25A is a low power graphics processor core. In at least one embodiment, graphics processor 2540 of FIG. 25B is a higher performance graphics processor core. In at least one embodiment, each of graphics processors 2510, 2540 can be variants of graphics processor 2410 of FIG. 24.

In at least one embodiment, graphics processor 2510 includes a vertex processor 2505 and one or more fragment processor(s) 2515A-2515N (e.g., 2515A, 2515B, 2515C, 2515D, through 2515N-1, and 2515N). In at least one embodiment, graphics processor 2510 can execute different shader programs via separate logic, such that vertex processor 2505 is optimized to execute operations for vertex shader programs, while one or more fragment processor(s) 2515A-2515N execute fragment (e.g., pixel) shading operations for fragment or pixel shader programs. In at least one embodiment, vertex processor 2505 performs a vertex processing stage of a 3D graphics pipeline and generates primitives and vertex data. In at least one embodiment, fragment processor(s) 2515A-2515N use primitive and vertex data generated by vertex processor 2505 to produce a framebuffer that is displayed on a display device. In at least one embodiment, fragment processor(s) 2515A-2515N are optimized to execute fragment shader programs as provided for in an OpenGL API, which may be used to perform similar operations as a pixel shader program as provided for in a Direct 3D API.

In at least one embodiment, graphics processor 2510 additionally includes one or more memory management units (MMUs) 2520A-2520B, cache(s) 2525A-2525B, and circuit interconnect(s) 2530A-2530B. In at least one embodiment, one or more MMU(s) 2520A-2520B provide for virtual to physical address mapping for graphics processor 2510, including for vertex processor 2505 and/or fragment processor(s) 2515A-2515N, which may reference vertex or image/texture data stored in memory, in addition to vertex or image/texture data stored in one or more cache(s) 2525A-2525B. In at least one embodiment, one or more MMU(s) 2520A-2520B may be synchronized with other MMUs within system, including one or more MMUs associated with one or more application processor(s) 2405, image processors 2415, and/or video processors 2420 of FIG. 24, such that each processor 2405-2420 can participate in a shared or unified virtual memory system. In at least one embodiment, one or more circuit interconnect(s) 2530A-2530B enable graphics processor 2510 to interface with other IP cores within SoC, either via an internal bus of SoC or via a direct connection.

In at least one embodiment, graphics processor 2540 includes one or more MMU(s) 2520A-2520B, caches 2525A-2525B, and circuit interconnects 2530A-2530B of graphics processor 2510 of FIG. 25A. In at least one embodiment, graphics processor 2540 includes one or more shader core(s) 2555A-2555N (e.g., 2555A, 2555B, 2555C, 2555D, 2555E, 2555F, through 2555N-1, and 2555N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2540 includes an inter-core task manager 2545, which acts as a thread dispatcher to dispatch execution threads to one or more shader cores 2555A-2555N and a tiling unit 2558 to accelerate tiling operations for tile-based rendering, in which rendering operations for a scene are subdivided in image space, for example to exploit local spatial coherence within a scene or to optimize use of internal caches.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in integrated circuit 25A and/or 25B for inferencing or predicting operations based, at least in part, on weight parameters calculated using neural network training operations, neural network functions and/or architectures, or neural network use cases described herein.

Figure 26A:
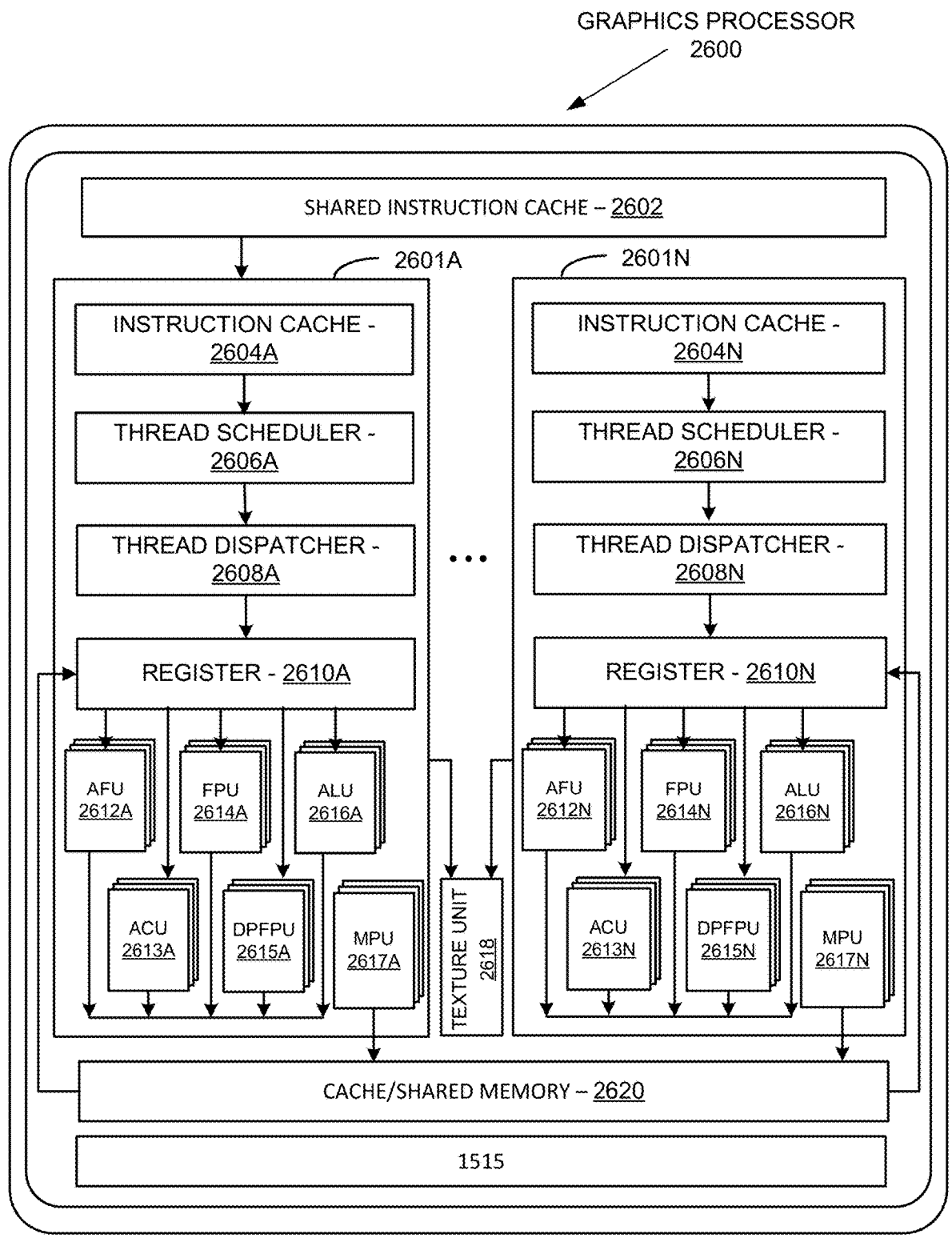
FIGS. 26A and 26B illustrate additional exemplary graphics processor logic according to at least one embodiment.
Figure 26B:
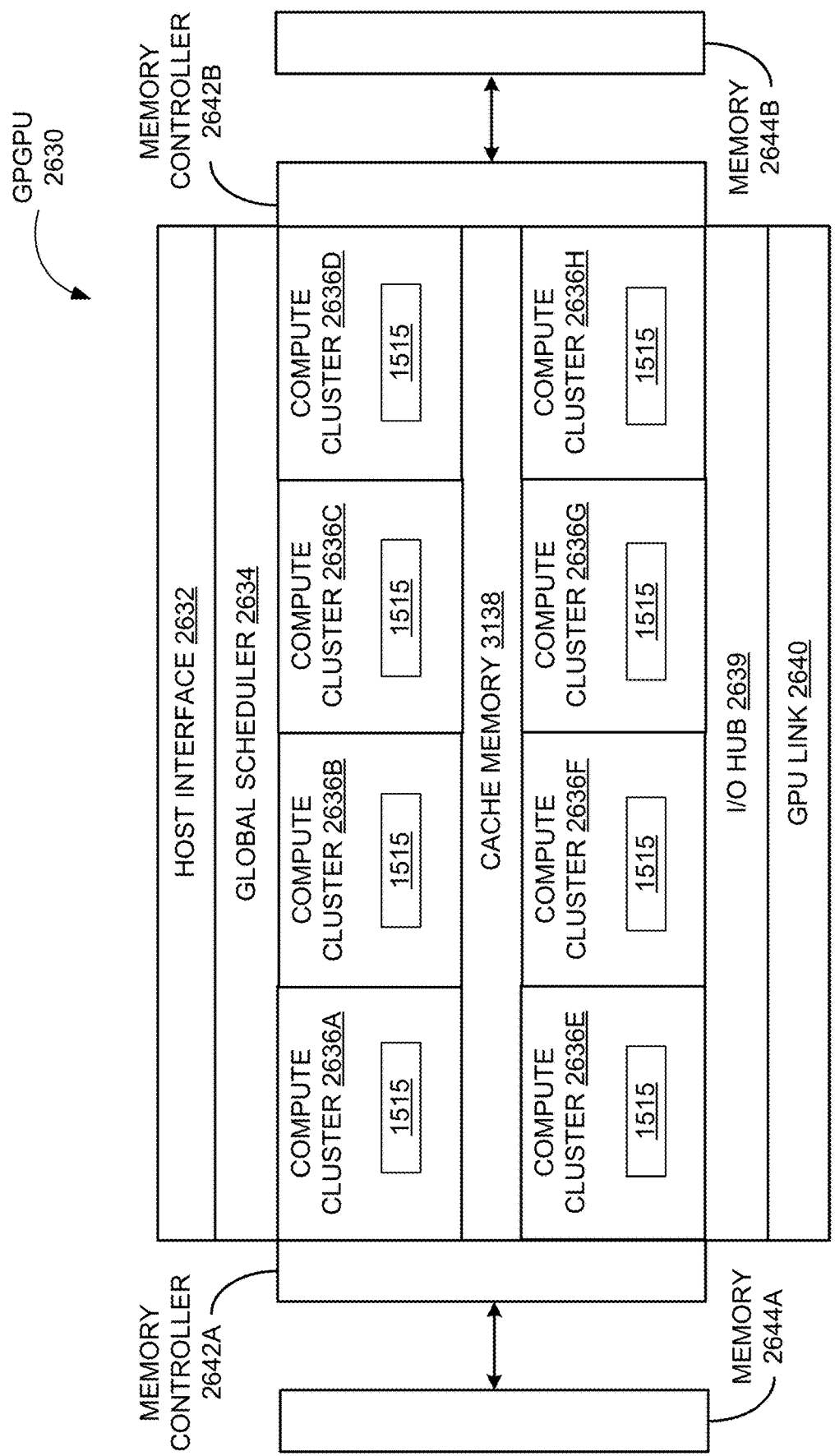

FIGS. 26A-26B illustrate additional exemplary graphics processor logic according to embodiments described herein. FIG. 26A illustrates a graphics core 2600 that may be included within graphics processor 2410 of FIG. 24, in at least one embodiment, and may be a unified shader core 2555A-2555N as in FIG. 25B in at least one embodiment. FIG. 26B illustrates a highly-parallel general-purpose graphics processing unit 2630 suitable for deployment on a multi-chip module in at least one embodiment.

In at least one embodiment, graphics core 2600 includes a shared instruction cache 2602, a texture unit 2618, and a cache/shared memory 2620 that are common to execution resources within graphics core 2600. In at least one embodiment, graphics core 2600 can include multiple slices 2601A-2601N or partition for each core, and a graphics processor can include multiple instances of graphics core 2600. Slices 2601A-2601N can include support logic including a local instruction cache 2604A-2604N, a thread scheduler 2606A-2606N, a thread dispatcher 2608A-2608N, and a set of registers 2610A-2610N. In at least one embodiment, slices 2601A-2601N can include a set of additional function units (AFUs 2612A-2612N), floating-point units (FPU 2614A-2614N), integer arithmetic logic units (ALUs 2616-2616N), address computational units (ACU 2613A-2613N), double-precision floating-point units (DPFPU 2615A-2615N), and matrix processing units (MPU 2617A-2617N).

In at least one embodiment, FPUs 2614A-2614N can perform single-precision (32-bit) and half-precision (16-bit) floating point operations, while DPFPUs 2615A-2615N perform double precision (64-bit) floating point operations. In at least one embodiment, ALUs 2616A-2616N can perform variable precision integer operations at 8-bit, 16-bit, and 32-bit precision, and can be configured for mixed precision operations. In at least one embodiment, MPUs 2617A-2617N can also be configured for mixed precision matrix operations, including half-precision floating point and 8-bit integer operations. In at least one embodiment, MPUs 2617-2617N can perform a variety of matrix operations to accelerate machine learning application frameworks, including enabling support for accelerated general matrix to matrix multiplication (GEMM). In at least one embodiment, AFUs 2612A-2612N can perform additional logic operations not supported by floating-point or integer units, including trigonometric operations (e.g., Sine, Cosine, etc.).

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics core 2600 for inferencing or predicting operations based, at least in part, on weight parameters calculated using neural network training operations, neural network functions and/or architectures, or neural network use cases described herein.

FIG. 26B illustrates a general-purpose processing unit (GPGPU) 2630 that can be configured to enable highly-parallel compute operations to be performed by an array of graphics processing units, in at least one embodiment. In at least one embodiment, GPGPU 2630 can be linked directly to other instances of GPGPU 2630 to create a multi-GPU cluster to improve training speed for deep neural networks. In at least one embodiment, GPGPU 2630 includes a host interface 2632 to enable a connection with a host processor. In at least one embodiment, host interface 2632 is a PCI Express interface. In at least one embodiment, host interface 2632 can be a vendor specific communications interface or communications fabric. In at least one embodiment, GPGPU 2630 receives commands from a host processor and uses a global scheduler 2634 to distribute execution threads associated with those commands to a set of compute clusters 2636A-2636H. In at least one embodiment, compute clusters 2636A-2636H share a cache memory 2638. In at least one embodiment, cache memory 2638 can serve as a higher-level cache for cache memories within compute clusters 2636A-2636H.

In at least one embodiment, GPGPU 2630 includes memory 2644A-2644B coupled with compute clusters 2636A-2636H via a set of memory controllers 2642A-2642B. In at least one embodiment, memory 2644A-2644B can include various types of memory devices including dynamic random access memory (DRAM) or graphics random access memory, such as synchronous graphics random access memory (SGRAM), including graphics double data rate (GDDR) memory.

In at least one embodiment, compute clusters 2636A-2636H each include a set of graphics cores, such as graphics core 2600 of FIG. 26A, which can include multiple types of integer and floating point logic units that can perform computational operations at a range of precisions including suited for machine learning computations. For example, in at least one embodiment, at least a subset of floating point units in each of compute clusters 2636A-2636H can be configured to perform 16-bit or 32-bit floating point operations, while a different subset of floating point units can be configured to perform 64-bit floating point operations.

In at least one embodiment, multiple instances of GPGPU 2630 can be configured to operate as a compute cluster. In at least one embodiment, communication used by compute clusters 2636A-2636H for synchronization and data exchange varies across embodiments. In at least one embodiment, multiple instances of GPGPU 2630 communicate over host interface 2632. In at least one embodiment, GPGPU 2630 includes an I/O hub 2639 that couples GPGPU 2630 with a GPU link 2640 that enables a direct connection to other instances of GPGPU 2630. In at least one embodiment, GPU link 2640 is coupled to a dedicated GPU-to-GPU bridge that enables communication and synchronization between multiple instances of GPGPU 2630. In at least one embodiment GPU link 2640 couples with a high speed interconnect to transmit and receive data to other GPGPUs or parallel processors. In at least one embodiment, multiple instances of GPGPU 2630 are located in separate data processing systems and communicate via a network device that is accessible via host interface 2632. In at least one embodiment GPU link 2640 can be configured to enable a connection to a host processor in addition to or as an alternative to host interface 2632.

In at least one embodiment, GPGPU 2630 can be configured to train neural networks. In at least one embodiment, GPGPU 2630 can be used within a inferencing platform. In at least one embodiment, in which GPGPU 2630 is used for inferencing, GPGPU may include fewer compute clusters 2636A-2636H relative to when GPGPU is used for training a neural network. In at least one embodiment, memory technology associated with memory 2644A-2644B may differ between inferencing and training configurations, with higher bandwidth memory technologies devoted to training configurations. In at least one embodiment, inferencing configuration of GPGPU 2630 can support inferencing specific instructions. For example, in at least one embodiment, an inferencing configuration can provide support for one or more 8-bit integer dot product instructions, which may be used during inferencing operations for deployed neural networks.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in GPGPU 2630 for inferencing or predicting operations based, at least in part, on weight parameters calculated using neural network training operations, neural network functions and/or architectures, or neural network use cases described herein.

Figure 27:
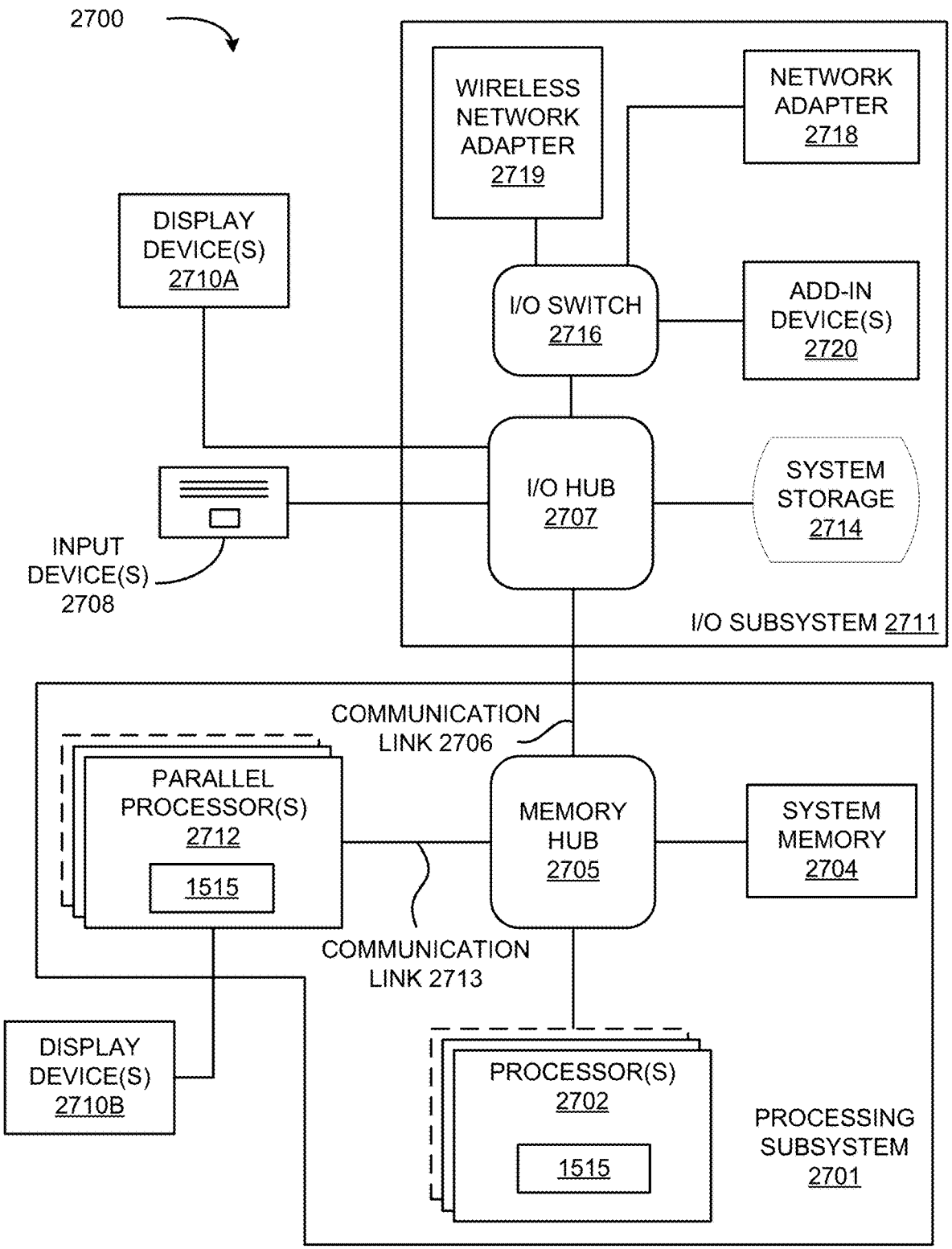
FIG. 27 illustrates a computer system, according to at least one embodiment.

FIG. 27 is a block diagram illustrating a computing system 2700 according to at least one embodiment. In at least one embodiment, computing system 2700 includes a processing subsystem 2701 having one or more processor(s) 2702 and a system memory 2704 communicating via an interconnection path that may include a memory hub 2705. In at least one embodiment, memory hub 2705 may be a separate component within a chipset component or may be integrated within one or more processor(s) 2702. In at least one embodiment, memory hub 2705 couples with an I/O subsystem 2711 via a communication link 2706. In at least one embodiment, I/O subsystem 2711 includes an I/O hub 2707 that can enable computing system 2700 to receive input from one or more input device(s) 2708. In at least one embodiment, I/O hub 2707 can enable a display controller, which may be included in one or more processor(s) 2702, to provide outputs to one or more display device(s) 2710A. In at least one embodiment, one or more display device(s) 2710A coupled with I/O hub 2707 can include a local, internal, or embedded display device.

In at least one embodiment, processing subsystem 2701 includes one or more parallel processor(s) 2712 coupled to memory hub 2705 via a bus or other communication link 2713. In at least one embodiment, communication link 2713 may be one of any number of standards based communication link technologies or protocols, such as, but not limited to PCI Express, or may be a vendor specific communications interface or communications fabric. In at least one embodiment, one or more parallel processor(s) 2712 form a computationally focused parallel or vector processing system that can include a large number of processing cores and/or processing clusters, such as a many integrated core (MIC) processor. In at least one embodiment, one or more parallel processor(s) 2712 form a graphics processing subsystem that can output pixels to one of one or more display device(s) 2710A coupled via I/O Hub 2707. In at least one embodiment, one or more parallel processor(s) 2712 can also include a display controller and display interface (not shown) to enable a direct connection to one or more display device(s) 2710B.

In at least one embodiment, a system storage unit 2714 can connect to I/O hub 2707 to provide a storage mechanism for computing system 2700. In at least one embodiment, an I/O switch 2716 can be used to provide an interface mechanism to enable connections between I/O hub 2707 and other components, such as a network adapter 2718 and/or wireless network adapter 2719 that may be integrated into platform, and various other devices that can be added via one or more add-in device(s) 2720. In at least one embodiment, network adapter 2718 can be an Ethernet adapter or another wired network adapter. In at least one embodiment, wireless network adapter 2719 can include one or more of a Wi-Fi, Bluetooth, near field communication (NFC), or other network device that includes one or more wireless radios.

In at least one embodiment, computing system 2700 can include other components not explicitly shown, including USB or other port connections, optical storage drives, video capture devices, and like, may also be connected to I/O hub 2707. In at least one embodiment, communication paths interconnecting various components in FIG. 27 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2712 incorporate circuitry optimized for graphics and video processing, including, for example, video output circuitry, and constitutes a graphics processing unit (GPU). In at least one embodiment, one or more parallel processor(s) 2712 incorporate circuitry optimized for general purpose processing. In at least embodiment, components of computing system 2700 may be integrated with one or more other system elements on a single integrated circuit. For example, in at least one embodiment, one or more parallel processor(s) 2712, memory hub 2705, processor(s) 2702, and I/O hub 2707 can be integrated into a system on chip (SoC) integrated circuit. In at least one embodiment, components of computing system 2700 can be integrated into a single package to form a system in package (SIP) configuration. In at least one embodiment, at least a portion of components of computing system 2700 can be integrated into a multi-chip module (MCM), which can be interconnected with other multi-chip modules into a modular computing system.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in system FIG. 2700 for inferencing or predicting operations based, at least in part, on weight parameters calculated using neural network training operations, neural network functions and/or architectures, or neural network use cases described herein.

Processors

Figure 28A:
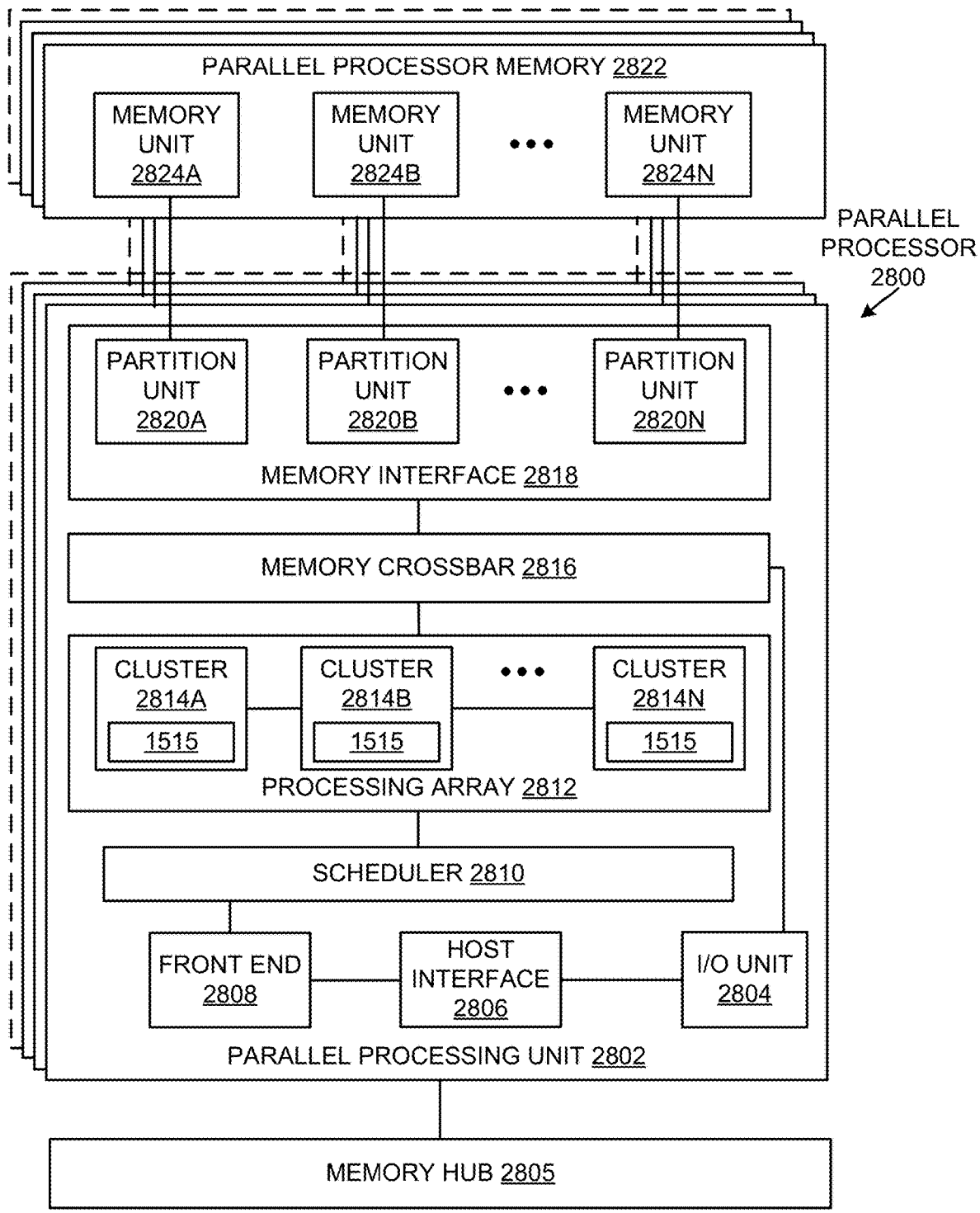
FIG. 28A illustrates a parallel processor, according to at least one embodiment.

FIG. 28A illustrates a parallel processor 2800 according to at least on embodiment. In at least one embodiment, various components of parallel processor 2800 may be implemented using one or more integrated circuit devices, such as programmable processors, application specific integrated circuits (ASICs), or field programmable gate arrays (FPGA). In at least one embodiment, illustrated parallel processor 2800 is a variant of one or more parallel processor(s) 2712 shown in FIG. 27 according to an exemplary embodiment.

In at least one embodiment, parallel processor 2800 includes a parallel processing unit 2802. In at least one embodiment, parallel processing unit 2802 includes an I/O unit 2804 that enables communication with other devices, including other instances of parallel processing unit 2802. In at least one embodiment, I/O unit 2804 may be directly connected to other devices. In at least one embodiment, I/O unit 2804 connects with other devices via use of a hub or switch interface, such as memory hub 2705. In at least one embodiment, connections between memory hub 2705 and I/O unit 2804 form a communication link 2713. In at least one embodiment, I/O unit 2804 connects with a host interface 2806 and a memory crossbar 2816, where host interface 2806 receives commands directed to performing processing operations and memory crossbar 2816 receives commands directed to performing memory operations.

In at least one embodiment, when host interface 2806 receives a command buffer via I/O unit 2804, host interface 2806 can direct work operations to perform those commands to a front end 2808. In at least one embodiment, front end 2808 couples with a scheduler 2810, which is configured to distribute commands or other work items to a processing cluster array 2812. In at least one embodiment, scheduler 2810 ensures that processing cluster array 2812 is properly configured and in a valid state before tasks are distributed to processing cluster array 2812 of processing cluster array 2812. In at least one embodiment, scheduler 2810 is implemented via firmware logic executing on a microcontroller. In at least one embodiment, microcontroller implemented scheduler 2810 is configurable to perform complex scheduling and work distribution operations at coarse and fine granularity, enabling rapid preemption and context switching of threads executing on processing array 2812. In at least one embodiment, host software can prove workloads for scheduling on processing array 2812 via one of multiple graphics processing doorbells. In at least one embodiment, workloads can then be automatically distributed across processing array 2812 by scheduler 2810 logic within a microcontroller including scheduler 2810.

In at least one embodiment, processing cluster array 2812 can include up to "N" processing clusters (e.g., cluster 2814A, cluster 2814B, through cluster 2814N). In at least one embodiment, each cluster 2814A-2814N of processing cluster array 2812 can execute a large number of concurrent threads. In at least one embodiment, scheduler 2810 can allocate work to clusters 2814A-2814N of processing cluster array 2812 using various scheduling and/or work distribution algorithms, which may vary depending on workload arising for each type of program or computation. In at least one embodiment, scheduling can be handled dynamically by scheduler 2810, or can be assisted in part by compiler logic during compilation of program logic configured for execution by processing cluster array 2812. In at least one embodiment, different clusters 2814A-2814N of processing cluster array 2812 can be allocated for processing different types of programs or for performing different types of computations.

In at least one embodiment, processing cluster array 2812 can be configured to perform various types of parallel processing operations. In at least one embodiment, processing cluster array 2812 is configured to perform general-purpose parallel compute operations. For example, in at least one embodiment, processing cluster array 2812 can include logic to execute processing tasks including filtering of video and/or audio data, performing modeling operations, including physics operations, and performing data transformations.

In at least one embodiment, processing cluster array 2812 is configured to perform parallel graphics processing operations. In at least one embodiment, processing cluster array 2812 can include additional logic to support execution of such graphics processing operations, including, but not limited to texture sampling logic to perform texture operations, as well as tessellation logic and other vertex processing logic. In at least one embodiment, processing cluster array 2812 can be configured to execute graphics processing related shader programs such as, but not limited to vertex shaders, tessellation shaders, geometry shaders, and pixel shaders. In at least one embodiment, parallel processing unit 2802 can transfer data from system memory via I/O unit 2804 for processing. In at least one embodiment, during processing, transferred data can be stored to on-chip memory (e.g., parallel processor memory 2822) during processing, then written back to system memory.

In at least one embodiment, when parallel processing unit 2802 is used to perform graphics processing, scheduler 2810 can be configured to divide a processing workload into approximately equal sized tasks, to better enable distribution of graphics processing operations to multiple clusters 2814A-2814N of processing cluster array 2812. In at least one embodiment, portions of processing cluster array 2812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2814A-2814N may be stored in buffers to allow intermediate data to be transmitted between clusters 2814A-2814N for further processing.

In at least one embodiment, processing cluster array 2812 can receive processing tasks to be executed via scheduler 2810, which receives commands defining processing tasks from front end 2808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2810 may be configured to fetch indices corresponding to tasks or may receive indices from front end 2808. In at least one embodiment, front end 2808 can be configured to ensure processing cluster array 2812 is configured to a valid state before a workload specified by incoming command buffers (e.g., batch-buffers, push buffers, etc.) is initiated.

In at least one embodiment, each of one or more instances of parallel processing unit 2802 can couple with parallel processor memory 2822. In at least one embodiment, parallel processor memory 2822 can be accessed via memory crossbar 2816, which can receive memory requests from processing cluster array 2812 as well as I/O unit 2804. In at least one embodiment, memory crossbar 2816 can access parallel processor memory 2822 via a memory interface 2818. In at least one embodiment, memory interface 2818 can include multiple partition units (e.g., partition unit 2820A, partition unit 2820B, through partition unit 2820N) that can each couple to a portion (e.g., memory unit) of parallel processor memory 2822. In at least one embodiment, a number of partition units 2820A-2820N is configured to be equal to a number of memory units, such that a first partition unit 2820A has a corresponding first memory unit 2824A, a second partition unit 2820B has a corresponding memory unit 2824B, and an Nth partition unit 2820N has a corresponding Nth memory unit 2824N. In at least one embodiment, a number of partition units 2820A-2820N may not be equal to a number of memory devices.

In at least one embodiment, memory units 2824A-2824N can include various types of memory devices, including dynamic random access memory (DRAM) or graphics random access memory, such as synchronous graphics random access memory (SGRAM), including graphics double data rate (GDDR) memory. In at least one embodiment, memory units 2824A-2824N may also include 3D stacked memory, including but not limited to high bandwidth memory (HBM). In at least one embodiment, render targets, such as frame buffers or texture maps may be stored across memory units 2824A-2824N, allowing partition units 2820A-2820N to write portions of each render target in parallel to efficiently use available bandwidth of parallel processor memory 2822. In at least one embodiment, a local instance of parallel processor memory 2822 may be excluded in favor of a unified memory design that utilizes system memory in conjunction with local cache memory.

In at least one embodiment, any one of clusters 2814A-2814N of processing cluster array 2812 can process data that will be written to any of memory units 2824A-2824N within parallel processor memory 2822. In at least one embodiment, memory crossbar 2816 can be configured to transfer an output of each cluster 2814A-2814N to any partition unit 2820A-2820N or to another cluster 2814A-2814N, which can perform additional processing operations on an output. In at least one embodiment, each cluster 2814A-2814N can communicate with memory interface 2818 through memory crossbar 2816 to read from or write to various external memory devices. In at least one embodiment, memory crossbar 2816 has a connection to memory interface 2818 to communicate with I/O unit 2804, as well as a connection to a local instance of parallel processor memory 2822, enabling processing units within different processing clusters 2814A-2814N to communicate with system memory or other memory that is not local to parallel processing unit 2802. In at least one embodiment, memory crossbar 2816 can use virtual channels to separate traffic streams between clusters 2814A-2814N and partition units 2820A-2820N.

In at least one embodiment, multiple instances of parallel processing unit 2802 can be provided on a single add-in card, or multiple add-in cards can be interconnected. In at least one embodiment, different instances of parallel processing unit 2802 can be configured to inter-operate even if different instances have different numbers of processing cores, different amounts of local parallel processor memory, and/or other configuration differences. For example, in at least one embodiment, some instances of parallel processing unit 2802 can include higher precision floating point units relative to other instances. In at least one embodiment, systems incorporating one or more instances of parallel processing unit 2802 or parallel processor 2800 can be implemented in a variety of configurations and form factors, including but not limited to desktop, laptop, or handheld personal computers, servers, workstations, game consoles, and/or embedded systems.

Figure 28B:
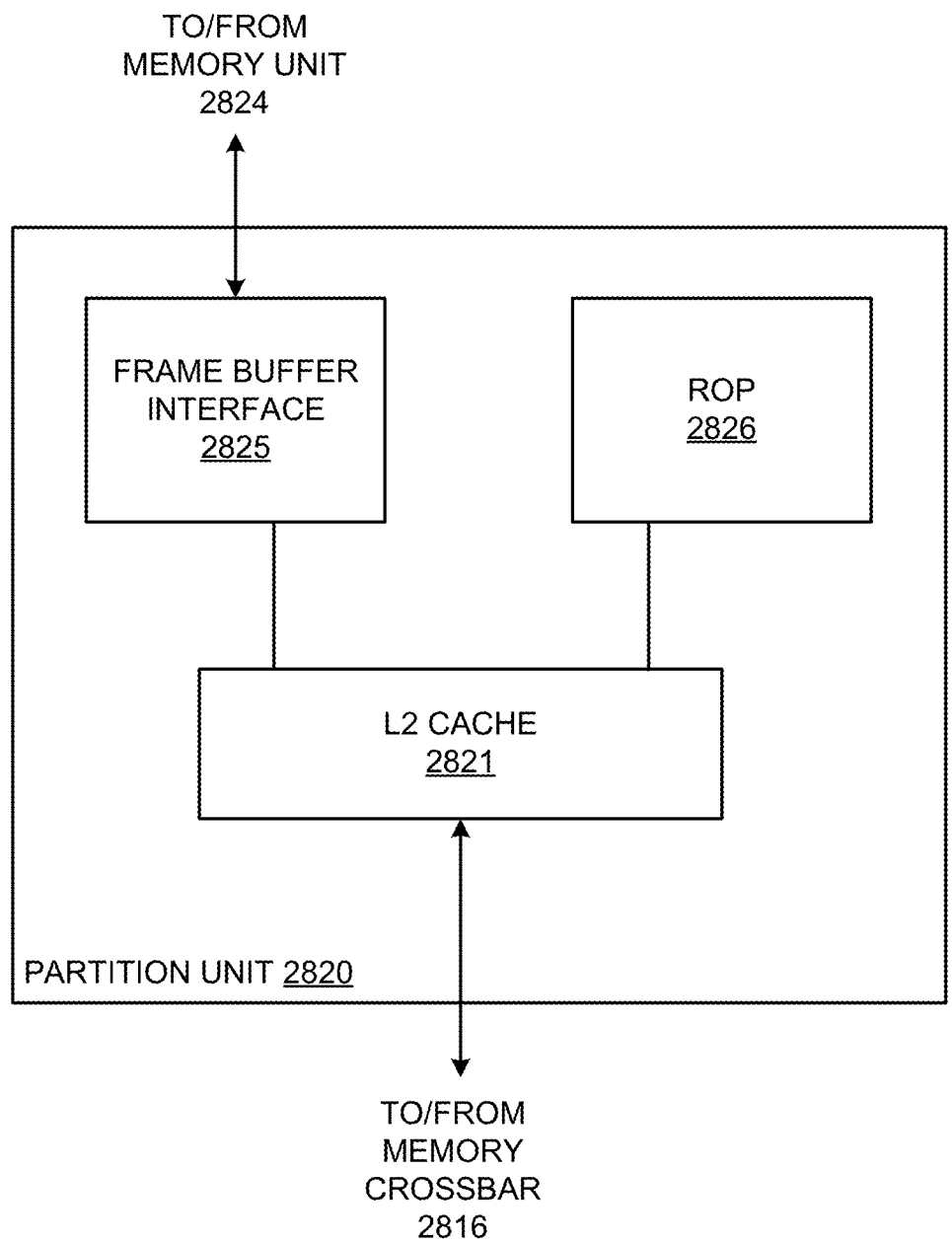
FIG. 28B illustrates a partition unit, according to at least one embodiment.

FIG. 28B is a block diagram of a partition unit 2820 according to at least one embodiment. In at least one embodiment, partition unit 2820 is an instance of one of partition units 2820A-2820N of FIG. 28A. In at least one embodiment, partition unit 2820 includes an L2 cache 2821, a frame buffer interface 2825, and a ROP 2826 (raster operations unit). L2 cache 2821 is a read/write cache that is configured to perform load and store operations received from memory crossbar 2816 and ROP 2826. In at least one embodiment, read misses and urgent write-back requests are output by L2 cache 2821 to frame buffer interface 2825 for processing. In at least one embodiment, updates can also be sent to a frame buffer via frame buffer interface 2825 for processing. In at least one embodiment, frame buffer interface 2825 interfaces with one of memory units in parallel processor memory, such as memory units 2824A-2824N of FIG. 28 (e.g., within parallel processor memory 2822).

In at least one embodiment, ROP 2826 is a processing unit that performs raster operations such as stencil, z test, blending, and like. In at least one embodiment, ROP 2826 then outputs processed graphics data that is stored in graphics memory. In at least one embodiment, ROP 2826 includes compression logic to compress depth or color data that is written to memory and decompress depth or color data that is read from memory. In at least one embodiment, compression logic can be lossless compression logic that makes use of one or more of multiple compression algorithms. Type of compression that is performed by ROP 2826 can vary based on statistical characteristics of data to be compressed. For example, in at least one embodiment, delta color compression is performed on depth and color data on a per-tile basis.

In at least one embodiment, ROP 2826 is included within each processing cluster (e.g., cluster 2814A-2814N of FIG. 28) instead of within partition unit 2820. In at least one embodiment, read and write requests for pixel data are transmitted over memory crossbar 2816 instead of pixel fragment data. In at least one embodiment, processed graphics data may be displayed on a display device, such as one of one or more display device(s) 2710 of FIG. 27, routed for further processing by processor(s) 2702, or routed for further processing by one of processing entities within parallel processor 2800 of FIG. 28A.

Figure 28C:
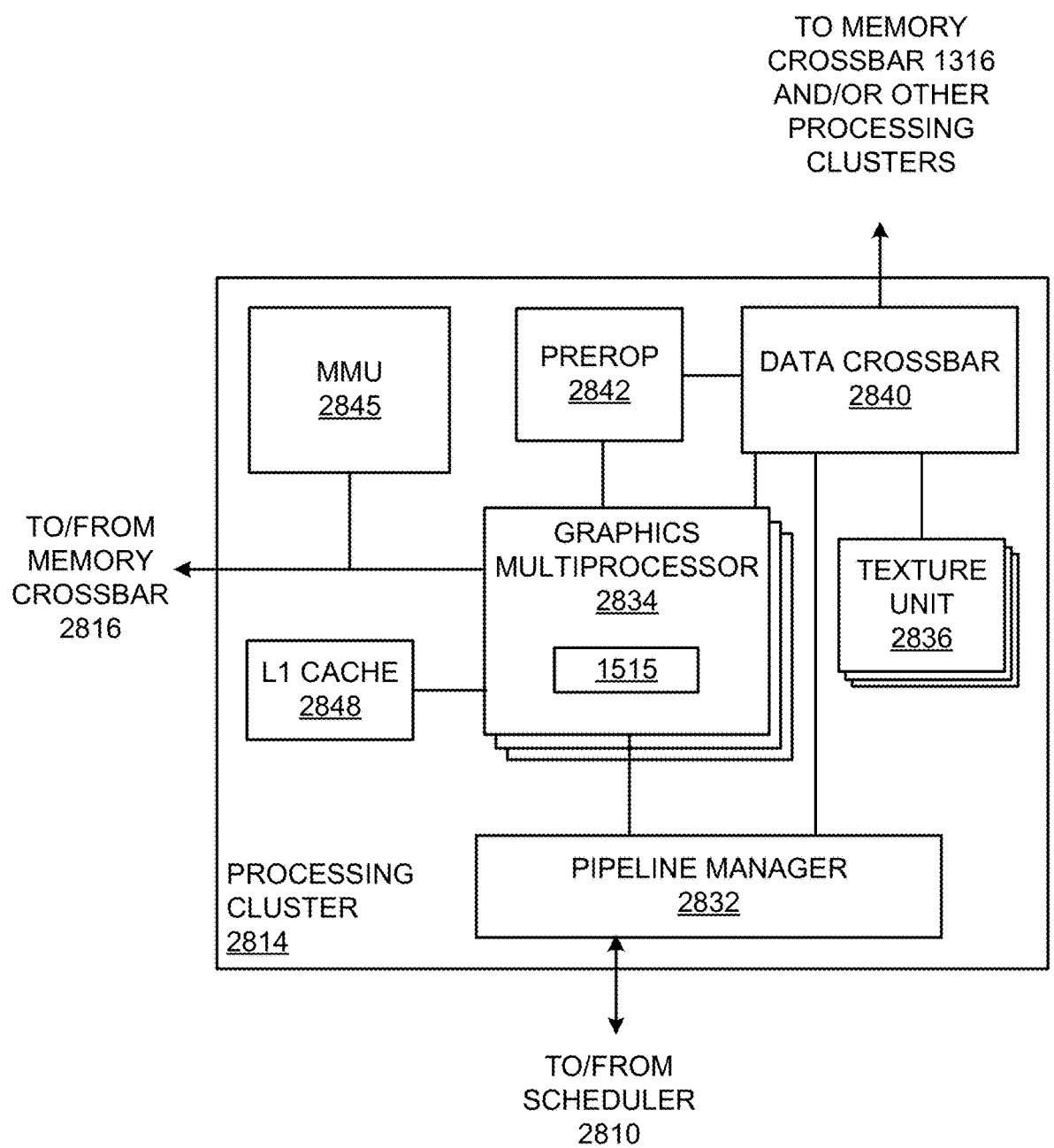
FIG. 28C illustrates a processing cluster, according to at least one embodiment.

FIG. 28C is a block diagram of a processing cluster 2814 within a parallel processing unit according to at least one embodiment. In at least one embodiment, a processing cluster is an instance of one of processing clusters 2814A-2814N of FIG. 28. In at least one embodiment, processing cluster 2814 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2814 can be controlled via a pipeline manager 2832 that distributes processing tasks to SIMT parallel processors. In at least one embodiment, pipeline manager 2832 receives instructions from scheduler 2810 of FIG. 28 and manages execution of those instructions via a graphics multiprocessor 2834 and/or a texture unit 2836. In at least one embodiment, graphics multiprocessor 2834 is an exemplary instance of a SIMT parallel processor. However, in at least one embodiment, various types of SIMT parallel processors of differing architectures may be included within processing cluster 2814. In at least one embodiment, one or more instances of graphics multiprocessor 2834 can be included within a processing cluster 2814. In at least one embodiment, graphics multiprocessor 2834 can process data and a data crossbar 2840 can be used to distribute processed data to one of multiple possible destinations, including other shader units. In at least one embodiment, pipeline manager 2832 can facilitate distribution of processed data by specifying destinations for processed data to be distributed via data crossbar 2840.

In at least one embodiment, each graphics multiprocessor 2834 within processing cluster 2814 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2814 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2834. In at least one embodiment, a thread group may include fewer threads than a number of processing engines within graphics multiprocessor 2834. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2834. In at least one embodiment, when a thread group includes more threads than number of processing engines within graphics multiprocessor 2834, processing can be performed over consecutive clock cycles. In at least one embodiment, multiple thread groups can be executed concurrently on a graphics multiprocessor 2834.

In at least one embodiment, graphics multiprocessor 2834 includes an internal cache memory to perform load and store operations. In at least one embodiment, graphics multiprocessor 2834 can forego an internal cache and use a cache memory (e.g., L1 cache 2848) within processing cluster 2814. In at least one embodiment, each graphics multiprocessor 2834 also has access to L2 caches within partition units (e.g., partition units 2820A-2820N of FIG. 28) that are shared among all processing clusters 2814 and may be used to transfer data between threads. In at least one embodiment, graphics multiprocessor 2834 may also access off-chip global memory, which can include one or more of local parallel processor memory and/or system memory. In at least one embodiment, any memory external to parallel processing unit 2802 may be used as global memory. In at least one embodiment, processing cluster 2814 includes multiple instances of graphics multiprocessor 2834 can share common instructions and data, which may be stored in L1 cache 2848.

In at least one embodiment, each processing cluster 2814 may include an MMU 2845 (memory management unit) that is configured to map virtual addresses into physical addresses. In at least one embodiment, one or more instances of MMU 2845 may reside within memory interface 2818 of FIG. 28. In at least one embodiment, MMU 2845 includes a set of page table entries (PTEs) used to map a virtual address to a physical address of a tile (talk more about tiling) and optionally a cache line index. In at least one embodiment, MMU 2845 may include address translation lookaside buffers (TLB) or caches that may reside within graphics multiprocessor 2834 or L1 cache or processing cluster 2814. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2814 may be configured such that each graphics multiprocessor 2834 is coupled to a texture unit 2836 for performing texture mapping operations, e.g., determining texture sample positions, reading texture data, and filtering texture data. In at least one embodiment, texture data is read from an internal texture L1 cache (not shown) or from an L1 cache within graphics multiprocessor 2834 and is fetched from an L2 cache, local parallel processor memory, or system memory, as needed. In at least one embodiment, each graphics multiprocessor 2834 outputs processed tasks to data crossbar 2840 to provide processed task to another processing cluster 2814 for further processing or to store processed task in an L2 cache, local parallel processor memory, or system memory via memory crossbar 2816. In at least one embodiment, preROP 2842 (pre-raster operations unit) is configured to receive data from graphics multiprocessor 2834, direct data to ROP units, which may be located with partition units as described herein (e.g., partition units 2820A-2820N of FIG. 28). In at least one embodiment, PreROP 2842 unit can perform optimizations for color blending, organize pixel color data, and perform address translations.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics processing cluster 2814 for inferencing or predicting operations based, at least in part, on weight parameters calculated using neural network training operations, neural network functions and/or architectures, or neural network use cases described herein.

Figure 28D:
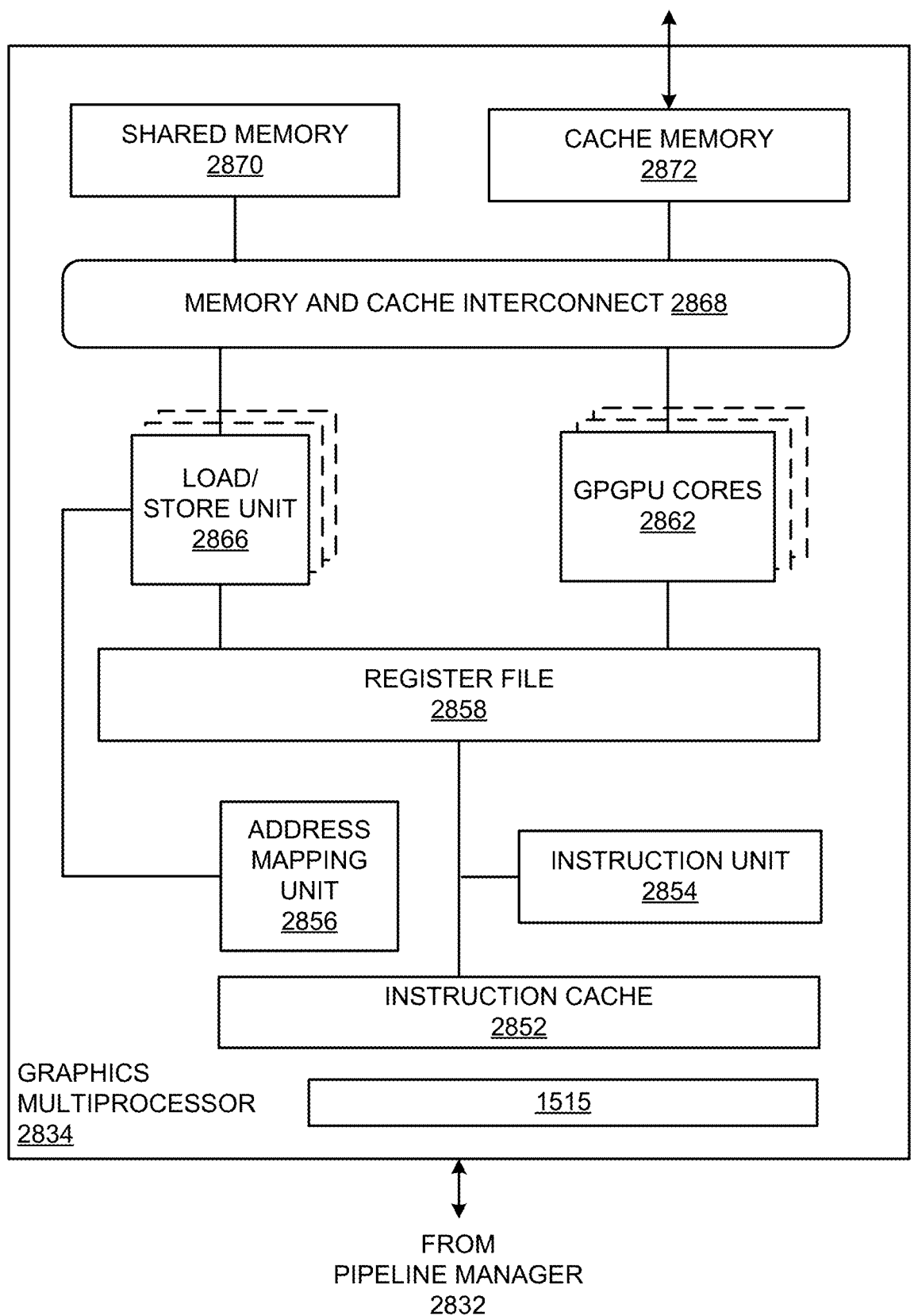
FIG. 28D illustrates a graphics multiprocessor, according to at least one embodiment.

FIG. 28D shows a graphics multiprocessor 2834 according to at least one embodiment. In at least one embodiment, graphics multiprocessor 2834 couples with pipeline manager 2832 of processing cluster 2814. In at least one embodiment, graphics multiprocessor 2834 has an execution pipeline including but not limited to an instruction cache 2852, an instruction unit 2854, an address mapping unit 2856, a register file 2858, one or more general purpose graphics processing unit (GPGPU) cores 2862, and one or more load/store units 2866. GPGPU cores 2862 and load/store units 2866 are coupled with cache memory 2872 and shared memory 2870 via a memory and cache interconnect 2868.

In at least one embodiment, instruction cache 2852 receives a stream of instructions to execute from pipeline manager 2832. In at least one embodiment, instructions are cached in instruction cache 2852 and dispatched for execution by instruction unit 2854. In at least one embodiment, instruction unit 2854 can dispatch instructions as thread groups (e.g., warps), with each thread of thread group assigned to a different execution unit within GPGPU core 2862. In at least one embodiment, an instruction can access any of a local, shared, or global address space by specifying an address within a unified address space. In at least one embodiment, address mapping unit 2856 can be used to translate addresses in a unified address space into a distinct memory address that can be accessed by load/store units 2866.

In at least one embodiment, register file 2858 provides a set of registers for functional units of graphics multiprocessor 2834. In at least one embodiment, register file 2858 provides temporary storage for operands connected to data paths of functional units (e.g., GPGPU cores 2862, load/store units 2866) of graphics multiprocessor 2834. In at least one embodiment, register file 2858 is divided between each of functional units such that each functional unit is allocated a dedicated portion of register file 2858. In at least one embodiment, register file 2858 is divided between different warps being executed by graphics multiprocessor 2834.

In at least one embodiment, GPGPU cores 2862 can each include floating point units (FPUs) and/or integer arithmetic logic units (ALUs) that are used to execute instructions of graphics multiprocessor 2834. GPGPU cores 2862 can be similar in architecture or can differ in architecture. In at least one embodiment, a first portion of GPGPU cores 2862 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2834 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2862 include SIMD logic capable of performing a single instruction on multiple sets of data. In at least one embodiment GPGPU cores 2862 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2868 is an interconnect network that connects each functional unit of graphics multiprocessor 2834 to register file 2858 and to shared memory 2870. In at least one embodiment, memory and cache interconnect 2868 is a crossbar interconnect that allows load/store unit 2866 to implement load and store operations between shared memory 2870 and register file 2858. In at least one embodiment, register file 2858 can operate at a same frequency as GPGPU cores 2862, thus data transfer between GPGPU cores 2862 and register file 2858 is very low latency. In at least one embodiment, shared memory 2870 can be used to enable communication between threads that execute on functional units within graphics multiprocessor 2834. In at least one embodiment, cache memory 2872 can be used as a data cache for example, to cache texture data communicated between functional units and texture unit 2836. In at least one embodiment, shared memory 2870 can also be used as a program managed cached. In at least one embodiment, threads executing on GPGPU cores 2862 can programmatically store data within shared memory in addition to automatically cached data that is stored within cache memory 2872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics multiprocessor 2834 for inferencing or predicting operations based, at least in part, on weight parameters calculated using neural network training operations, neural network functions and/or architectures, or neural network use cases described herein.

Figure 29:
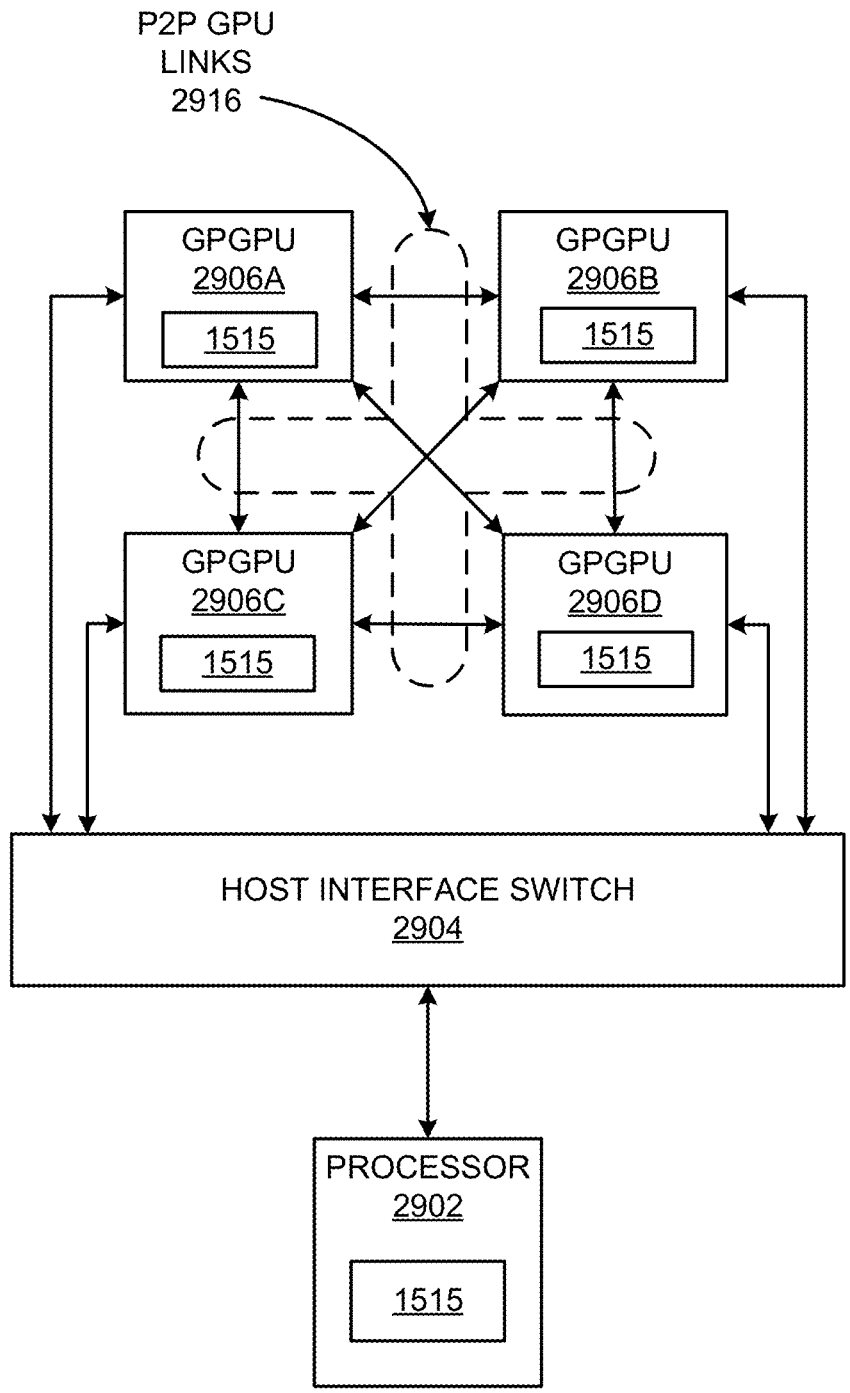
FIG. 29 illustrates a multi-graphics processing unit (GPU) system, according to at least one embodiment.

FIG. 29 illustrates a multi-GPU computing system 2900, according to at least one embodiment. In at least one embodiment, multi-GPU computing system 2900 can include a processor 2902 coupled to multiple general purpose graphics processing units (GPGPUs) 2906A-D via a host interface switch 2904. In at least one embodiment, host interface switch 2904 is a PCI express switch device that couples processor 2902 to a PCI express bus over which processor 2902 can communicate with GPGPUs 2906A-D. GPGPUs 2906A-D can interconnect via a set of high-speed point to point GPU to GPU links 2916. In at least one embodiment, GPU to GPU links 2916 connect to each of GPGPUs 2906A-D via a dedicated GPU link. In at least one embodiment, P2P GPU links 2916 enable direct communication between each of GPGPUs 2906A-D without requiring communication over host interface bus 2904 to which processor 2902 is connected. In at least one embodiment, with GPU-to-GPU traffic directed to P2P GPU links 2916, host interface bus 2904 remains available for system memory access or to communicate with other instances of multi-GPU computing system 2900, for example, via one or more network devices. While in at least one embodiment GPGPUs 2906A-D connect to processor 2902 via host interface switch 2904, in at least one embodiment processor 2902 includes direct support for P2P GPU links 2916 and can connect directly to GPGPUs 2906A-D.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in multi-GPU computing system 2900 for inferencing or predicting operations based, at least in part, on weight parameters calculated using neural network training operations, neural network functions and/or architectures, or neural network use cases described herein.

Figure 30:
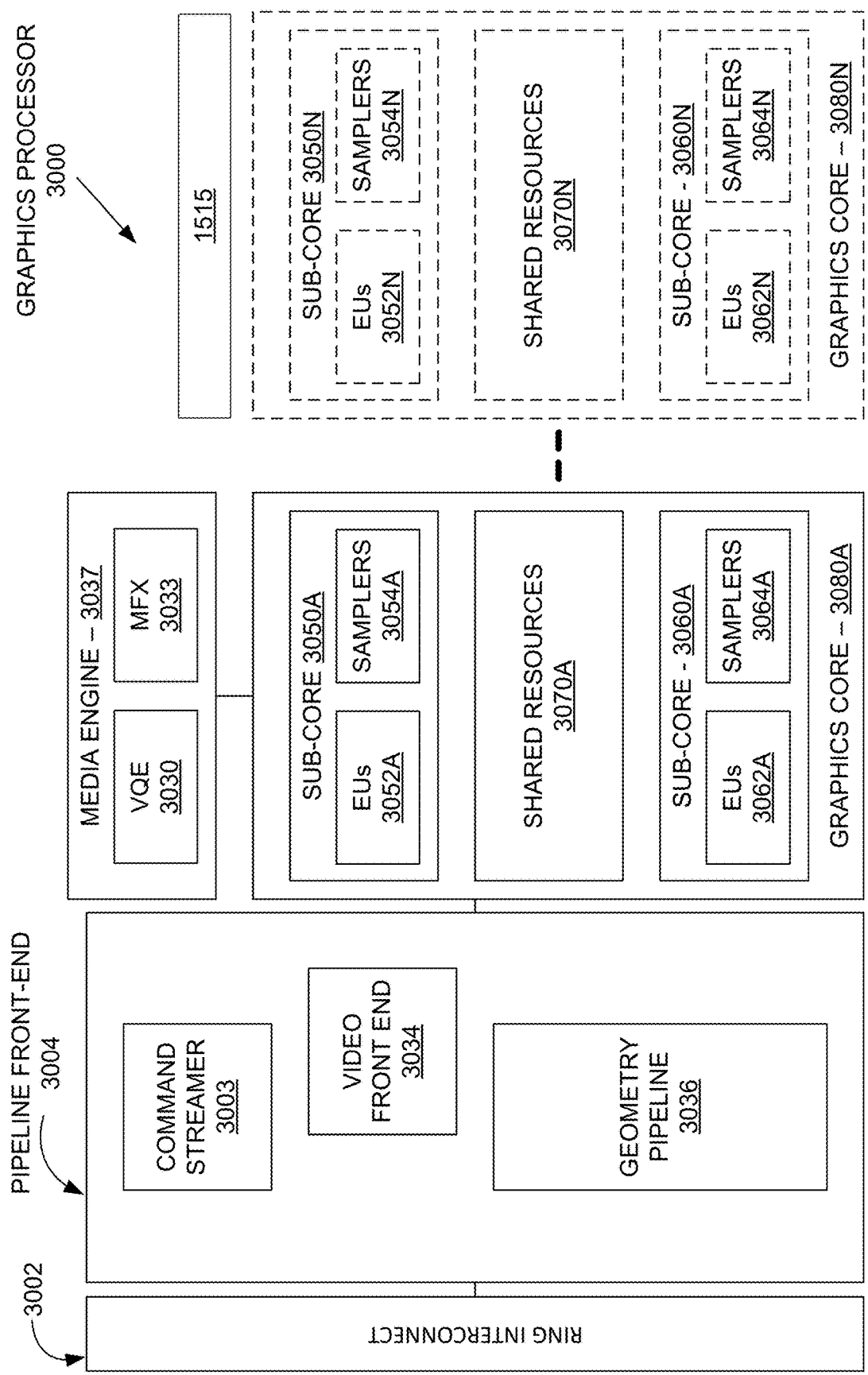
FIG. 30 illustrates a graphics processor, according to at least one embodiment.

FIG. 30 is a block diagram of a graphics processor 3000, according to at least one embodiment. In at least one embodiment, graphics processor 3000 includes a ring interconnect 3002, a pipeline front-end 3004, a media engine 3037, and graphics cores 3080A-3080N. In at least one embodiment, ring interconnect 3002 couples graphics processor 3000 to other processing units, including other graphics processors or one or more general-purpose processor cores. In at least one embodiment, graphics processor 3000 is one of many processors integrated within a multi-core processing system.

In at least one embodiment, graphics processor 3000 receives batches of commands via ring interconnect 3002. In at least one embodiment, incoming commands are interpreted by a command streamer 3003 in pipeline front-end 3004. In at least one embodiment, graphics processor 3000 includes scalable execution logic to perform 3D geometry processing and media processing via graphics core(s) 3080A-3080N. In at least one embodiment, for 3D geometry processing commands, command streamer 3003 supplies commands to geometry pipeline 3036. In at least one embodiment, for at least some media processing commands, command streamer 3003 supplies commands to a video front end 3034, which couples with a media engine 3037. In at least one embodiment, media engine 3037 includes a Video Quality Engine (VQE) 3030 for video and image post-processing and a multi-format encode/decode (MFX) 3033 engine to provide hardware-accelerated media data encode and decode. In at least one embodiment, geometry pipeline 3036 and media engine 3037 each generate execution threads for thread execution resources provided by at least one graphics core 3080A.

In at least one embodiment, graphics processor 3000 includes scalable thread execution resources featuring modular cores 3080A-3080N (sometimes referred to as core slices), each having multiple sub-cores 3050A-550N, 3060A-3060N (sometimes referred to as core sub-slices). In at least one embodiment, graphics processor 3000 can have any number of graphics cores 3080A through 3080N. In at least one embodiment, graphics processor 3000 includes a graphics core 3080A having at least a first sub-core 3050A and a second sub-core 3060A. In at least one embodiment, graphics processor 3000 is a low power processor with a single sub-core (e.g., 3050A). In at least one embodiment, graphics processor 3000 includes multiple graphics cores 3080A-3080N, each including a set of first sub-cores 3050A-3050N and a set of second sub-cores 3060A-3060N. In at least one embodiment, each sub-core in first sub-cores 3050A-3050N includes at least a first set of execution units 3052A-3052N and media/texture samplers 3054A-3054N. In at least one embodiment, each sub-core in second sub-cores 3060A-3060N includes at least a second set of execution units 3062A-3062N and samplers 3064A-3064N. In at least one embodiment, each sub-core 3050A-3050N, 3060A-3060N shares a set of shared resources 3070A-3070N. In at least one embodiment, shared resources include shared cache memory and pixel operation logic.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, inference and/or training logic 1515 may be used in graphics processor 3000 for inferencing or predicting operations based, at least in part, on weight parameters calculated using neural network training operations, neural network functions and/or architectures, or neural network use cases described herein.

Figure 31:
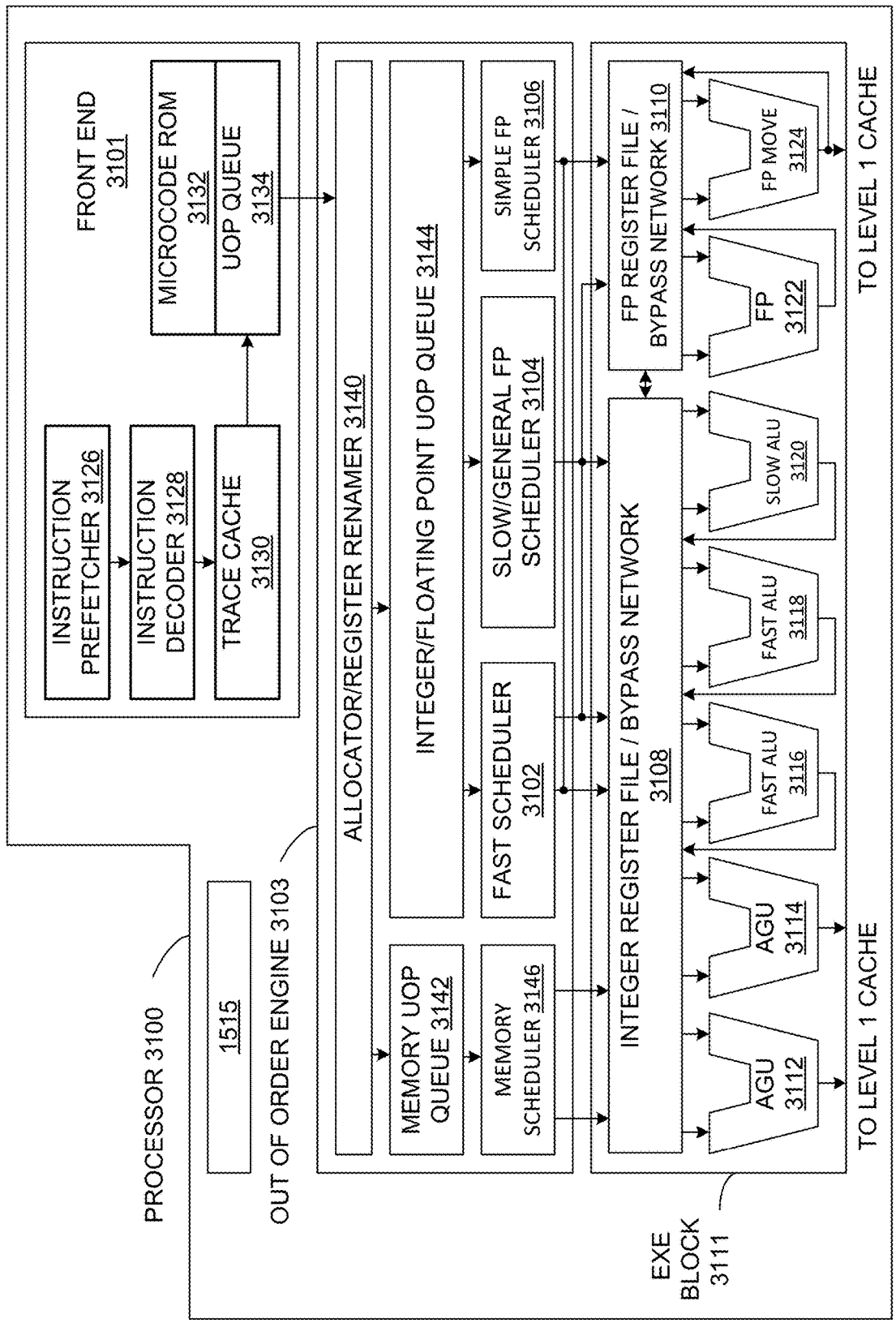
FIG. 31 is a block diagram illustrating a processor microarchitecture for a processor, according to at least one embodiment.

FIG. 31 is a block diagram illustrating micro-architecture for a processor 3100 that may include logic circuits to perform instructions, according to at least one embodiment. In at least one embodiment, processor 3100 may perform instructions, including x86 instructions, ARM instructions, specialized instructions for application-specific integrated circuits (ASICs), etc. In at least one embodiment, processor 3110 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3110 may perform instructions to accelerate machine learning or deep learning algorithms, training, or inferencing.

In at least one embodiment, processor 3100 includes an in-order front end ("front end") 3101 to fetch instructions to be executed and prepare instructions to be used later in processor pipeline. In at least one embodiment, front end 3101 may include several units. In at least one embodiment, an instruction prefetcher 3126 fetches instructions from memory and feeds instructions to an instruction decoder 3128 which in turn decodes or interprets instructions. For example, in at least one embodiment, instruction decoder 3128 decodes a received instruction into one or more operations called "micro-instructions" or "micro-operations" (also called "micro ops" or "uops") that machine may execute. In at least one embodiment, instruction decoder 3128 parses instruction into an opcode and corresponding data and control fields that may be used by micro-architecture to perform operations in accordance with at least one embodiment. In at least one embodiment, a trace cache 3130 may assemble decoded uops into program ordered sequences or traces in a uop queue 3134 for execution. In at least one embodiment, when trace cache 3130 encounters a complex instruction, a microcode ROM 3132 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3128 may access microcode ROM 3132 to perform instruction. In at least one embodiment, an instruction may be decoded into a small number of micro-ops for processing at instruction decoder 3128. In at least one embodiment, an instruction may be stored within microcode ROM 3132 should a number of micro-ops be needed to accomplish operation. In at least one embodiment, trace cache 3130 refers to an entry point programmable logic array ("PLA") to determine a correct micro-instruction pointer for reading microcode sequences to complete one or more instructions from microcode ROM 3132 in accordance with at least one embodiment. In at least one embodiment, after microcode ROM 3132 finishes sequencing micro-ops for an instruction, front end 3101 of machine may resume fetching micro-ops from trace cache 3130.

In at least one embodiment, out-of-order execution engine ("out of order engine") 3103 may prepare instructions for execution. In at least one embodiment, out-of-order execution logic has a number of buffers to smooth out and re-order flow of instructions to optimize performance as they go down pipeline and get scheduled for execution. out-of-order execution engine 3103 includes, without limitation, an allocator/register renamer 3140, a memory uop queue 3142, an integer/floating point uop queue 3144, a memory scheduler 3146, a fast scheduler 3102, a slow/general floating point scheduler ("slow/general FP scheduler") 3104, and a simple floating point scheduler ("simple FP scheduler") 3106. In at least one embodiment, fast schedule 3102, slow/general floating point scheduler 3104, and simple floating point scheduler 3106 are also collectively referred to herein as "uop schedulers 3102, 3104, 3106." Allocator/register renamer 3140 allocates machine buffers and resources that each uop needs in order to execute. In at least one embodiment, allocator/register renamer 3140 renames logic registers onto entries in a register file. In at least one embodiment, allocator/register renamer 3140 also allocates an entry for each uop in one of two uop queues, memory uop queue 3142 for memory operations and integer/floating point uop queue 3144 for non-memory operations, in front of memory scheduler 3146 and uop schedulers 3102, 3104, 3106. In at least one embodiment, uop schedulers 3102, 3104, 3106, determine when a uop is ready to execute based on readiness of their dependent input register operand sources and availability of execution resources uops need to complete their operation. In at least one embodiment, fast scheduler 3102 of at least one embodiment may schedule on each half of main clock cycle while slow/general floating point scheduler 3104 and simple floating point scheduler 3106 may schedule once per main processor clock cycle. In at least one embodiment, uop schedulers 3102, 3104, 3106 arbitrate for dispatch ports to schedule uops for execution.

In at least one embodiment, execution block b 11 includes, without limitation, an integer register file/bypass network 3108, a floating point register file/bypass network ("FP register file/bypass network") 3110, address generation units ("AGUs") 3112 and 3114, fast Arithmetic Logic Units (ALUs) ("fast ALUs") 3116 and 3118, a slow Arithmetic Logic Unit ("slow ALU") 3120, a floating point ALU ("FP") 3122, and a floating point move unit ("FP move") 3124. In at least one embodiment, integer register file/bypass network 3108 and floating point register file/bypass network 3110 are also referred to herein as "register files 3108, 3110." In at least one embodiment, AGUSs 3112 and 3114, fast ALUs 3116 and 3118, slow ALU 3120, floating point ALU 3122, and floating point move unit 3124 are also referred to herein as "execution units 3112, 3114, 3116, 3118, 3120, 3122, and 3124." In at least one embodiment, execution block b 11 may include, without limitation, any number (including zero) and type of register files, bypass networks, address generation units, and execution units, in any combination.

In at least one embodiment, register files 3108, 3110 may be arranged between uop schedulers 3102, 3104, 3106, and execution units 3112, 3114, 3116, 3118, 3120, 3122, and 3124. In at least one embodiment, integer register file/bypass network 3108 performs integer operations. In at least one embodiment, floating point register file/bypass network 3110 performs floating point operations. In at least one embodiment, each of register files 3108, 3110 may include, without limitation, a bypass network that may bypass or forward just completed results that have not yet been written into register file to new dependent uops. In at least one embodiment, register files 3108, 3110 may communicate data with each other. In at least one embodiment, integer register file/bypass network 3108 may include, without limitation, two separate register files, one register file for low-order thirty-two bits of data and a second register file for high order thirty-two bits of data. In at least one embodiment, floating point register file/bypass network 3110 may include, without limitation, 128-bit wide entries because floating point instructions typically have operands from 64 to 128 bits in width.

In at least one embodiment, execution units 3112, 3114, 3116, 3118, 3120, 3122, 3124 may execute instructions. In at least one embodiment, register files 3108, 3110 store integer and floating point data operand values that microinstructions need to execute. In at least one embodiment, processor 3100 may include, without limitation, any number and combination of execution units 3112, 3114, 3116, 3118, 3120, 3122, 3124. In at least one embodiment, floating point ALU 3122 and floating point move unit 3124, may execute floating point, MMX, SIMD, AVX and SSE, or other operations, including specialized machine learning instructions. In at least one embodiment, floating point ALU 3122 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3116, 3118. In at least one embodiment, fast ALUS 3116, 3118 may execute fast operations with an effective latency of half a clock cycle. In at least one embodiment, most complex integer operations go to slow ALU 3120 as slow ALU 3120 may include, without limitation, integer execution hardware for long-latency type of operations, such as a multiplier, shifts, flag logic, and branch processing. In at least one embodiment, memory load/store operations may be executed by AGUS 3112, 3114. In at least one embodiment, fast ALU 3116, fast ALU 3118, and slow ALU 3120 may perform integer operations on 64-bit data operands. In at least one embodiment, fast ALU 3116, fast ALU 3118, and slow ALU 3120 may be implemented to support a variety of data bit sizes including sixteen, thirty-two, 128, 256, etc. In at least one embodiment, floating point ALU 3122 and floating point move unit 3124 may be implemented to support a range of operands having bits of various widths. In at least one embodiment, floating point ALU 3122 and floating point move unit 3124 may operate on 128-bit wide packed data operands in conjunction with SIMD and multimedia instructions.

In at least one embodiment, uop schedulers 3102, 3104, 3106, dispatch dependent operations before parent load has finished executing. In at least one embodiment, as uops may be speculatively scheduled and executed in processor 3100, processor 3100 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into EXE Block 3111 and other memory or registers shown or not shown. For example, in at least one embodiment, training and/or inferencing techniques described herein may use one or more of ALUs illustrated in EXE Block 3111. Moreover, weight parameters may be stored in on-chip or off-chip memory and/or registers (shown or not shown) that configure ALUs of EXE Block 3111 to perform one or more machine learning algorithms, neural network architectures, use cases, or training techniques described herein.

Figure 32:
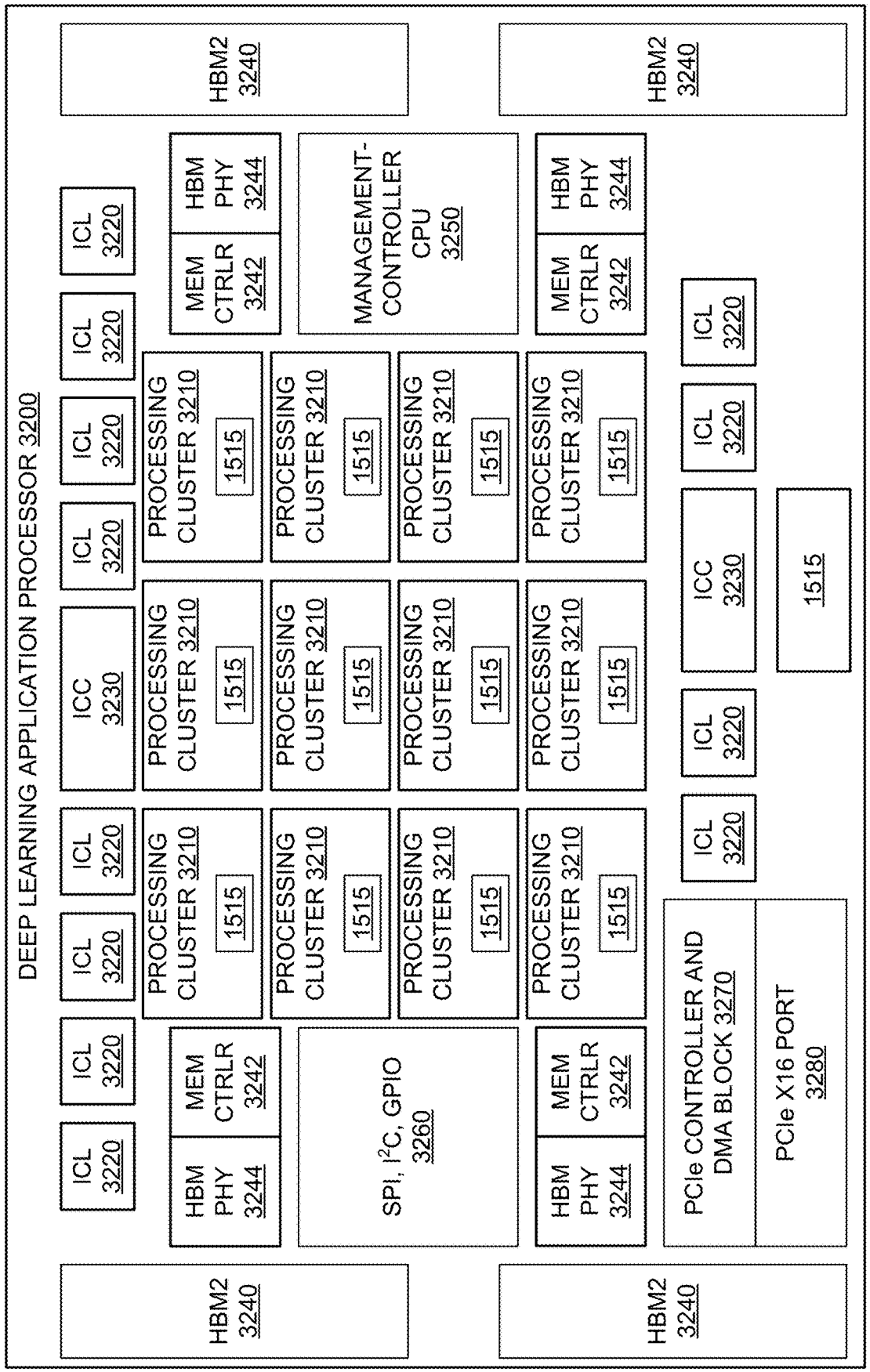
FIG. 32 illustrates a deep learning application processor, according to at least one embodiment.

FIG. 32 illustrates a deep learning application processor 3200, according to at least one embodiment. In at least one embodiment, deep learning application processor 3200 uses instructions that, if executed by deep learning application processor 3200, cause deep learning application processor 3200 to perform some or all of processes and techniques described throughout this disclosure. In at least one embodiment, deep learning application processor 3200 is an application-specific integrated circuit (ASIC). In at least one embodiment, application processor 3200 performs matrix multiply operations either "hard-wired" into hardware as a result of performing one or more instructions or both. In at least one embodiment, deep learning application processor 3200 includes, without limitation, processing clusters 3210(1)-3210(12), Inter-Chip Links ("ICLs") 3220(1)-3220(12), Inter-Chip Controllers ("ICCs") 3230(1)-3230(2), high bandwidth memory second generation ("HBM2") 3240(1)-3240(4), memory controllers ("Mem Ctrlrs") 3242(1)-3242(4), high bandwidth memory physical layer ("HBM PHY") 3244(1)-3244(4), a management-controller central processing unit ("management-controller CPU") 3250, a Serial Peripheral Interface, Inter-Integrated Circuit, and General Purpose Input/Output block ("SPI, I2C, GPIO") 3260, a peripheral component interconnect express controller and direct memory access block ("PCIe Controller and DMA") 3270, and a sixteen-lane peripheral component interconnect express port ("PCI Express x 16") 3280.

In at least one embodiment, processing clusters 3210 may perform deep learning operations, including inference or prediction operations based on weight parameters calculated one or more training techniques, including those described herein. In at least one embodiment, each processing cluster 3210 may include, without limitation, any number and type of processors. In at least one embodiment, deep learning application processor 3200 may include any number and type of processing clusters 3200. In at least one embodiment, Inter-Chip Links 3220 are bi-directional. In at least one embodiment, Inter-Chip Links 3220 and Inter-Chip Controllers 3230 enable multiple deep learning application processors 3200 to exchange information, including activation information resulting from performing one or more machine learning algorithms embodied in one or more neural networks. In at least one embodiment, deep learning application processor 3200 may include any number (including zero) and type of ICLs 3220 and ICCs 3230.

In at least one embodiment, HBM2s 3240 provide a total of 32 Gigabytes (GB) of memory. HBM2 3240($i$) is associated with both memory controller 3242($i$) and HBM PHY 3244($i$). In at least one embodiment, any number of HBM2s 3240 may provide any type and total amount of high bandwidth memory and may be associated with any number (including zero) and type of memory controllers 3242 and HBM PHYs 3244. In at least one embodiment, SPI, I2C, GPIO 3260, PCIe Controller and DMA 3270, and/or PCIe 3280 may be replaced with any number and type of blocks that enable any number and type of communication standards in any technically feasible fashion.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to deep learning application processor 3200. In at least one embodiment, deep learning application processor 3200 is used to infer or predict information based on a trained machine learning model (e.g., neural network) that has been trained by another processor or system or by deep learning application processor 3200. In at least one embodiment, processor 3200 may be used to perform one or more neural network use cases described herein.

Figure 33:
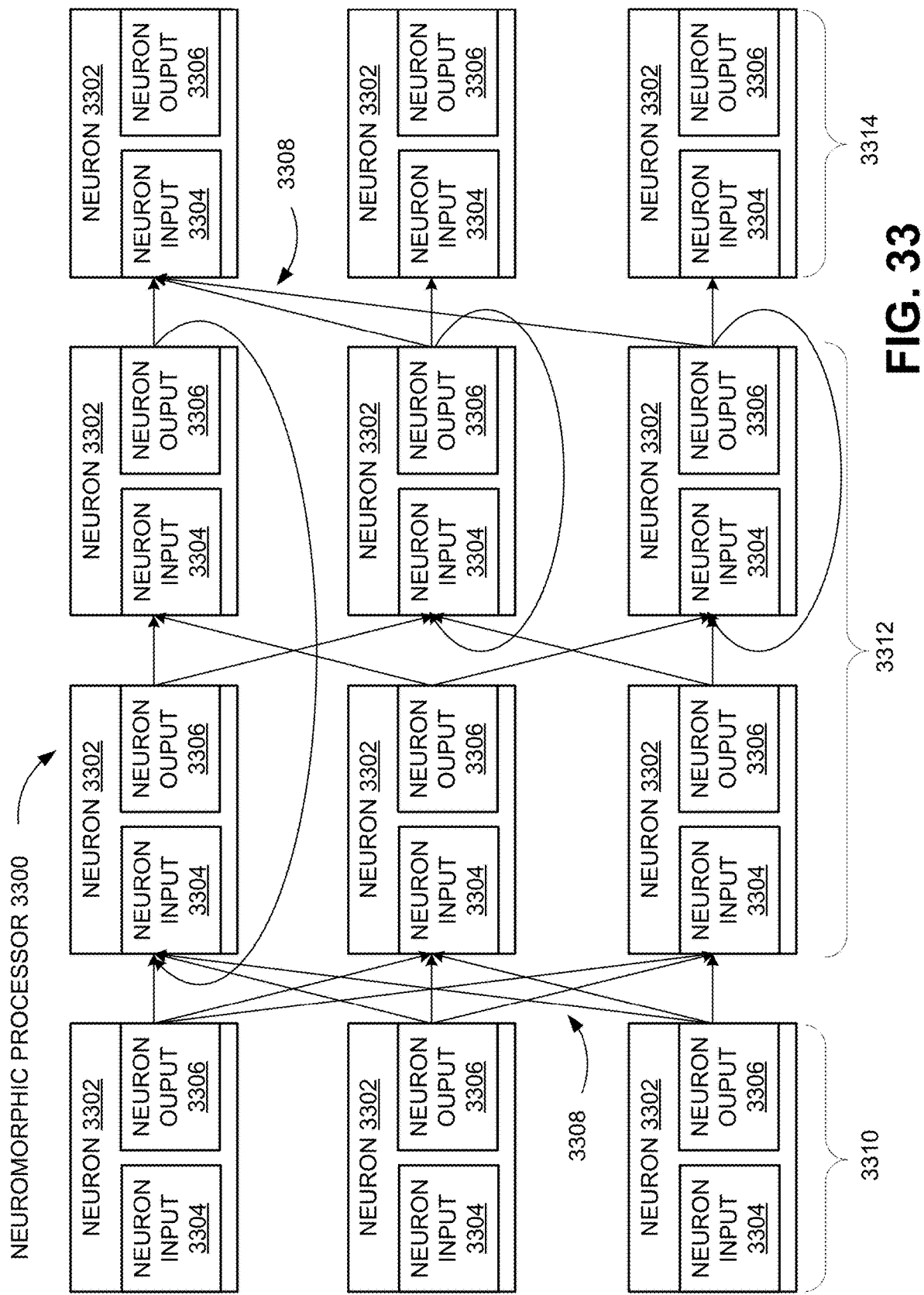
FIG. 33 is a block diagram illustrating an example neuromorphic processor, according to at least one embodiment.

FIG. 33 is a block diagram of a neuromorphic processor 3300, according to at least one embodiment. In at least one embodiment, neuromorphic processor 3300 may receive one or more inputs from sources external to neuromorphic processor 3300. In at least one embodiment, these inputs may be transmitted to one or more neurons 3302 within neuromorphic processor 3300. In at least one embodiment, neurons 3302 and components thereof may be implemented using circuitry or logic, including one or more arithmetic logic units (ALUs). In at least one embodiment, neuromorphic processor 3300 may include, without limitation, thousands or millions of instances of neurons 3302, but any suitable number of neurons 3302 may be used. In at least one embodiment, each instance of neuron 3302 may include a neuron input 3304 and a neuron output 3306. In at least one embodiment, neurons 3302 may generate outputs that may be transmitted to inputs of other instances of neurons 3302. For example, in at least one embodiment, neuron inputs 3304 and neuron outputs 3306 may be interconnected via synapses 3308.

In at least one embodiment, neurons 3302 and synapses 3308 may be interconnected such that neuromorphic processor 3300 operates to process or analyze information received by neuromorphic processor 3300. In at least one embodiment, neurons 3302 may transmit an output pulse (or "fire" or "spike") when inputs received through neuron input 3304 exceed a threshold. In at least one embodiment, neurons 3302 may sum or integrate signals received at neuron inputs 3304. For example, in at least one embodiment, neurons 3302 may be implemented as leaky integrate-and-fire neurons, wherein if a sum (referred to as a "membrane potential") exceeds a threshold value, neuron 3302 may generate an output (or "fire") using a transfer function such as a sigmoid or threshold function. In at least one embodiment, a leaky integrate-and-fire neuron may sum signals received at neuron inputs 3304 into a membrane potential and may also apply a decay factor (or leak) to reduce a membrane potential. In at least one embodiment, a leaky integrate-and-fire neuron may fire if multiple input signals are received at neuron inputs 3304 rapidly enough to exceed a threshold value (i.e., before a membrane potential decays too low to fire). In at least one embodiment, neurons 3302 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3302 may include, without limitation, comparator circuits or logic that generate an output spike at neuron output 3306 when result of applying a transfer function to neuron input 3304 exceeds a threshold. In at least one embodiment, once neuron 3302 fires, it may disregard previously received input information by, for example, resetting a membrane potential to 0 or another suitable default value. In at least one embodiment, once membrane potential is reset to 0, neuron 3302 may resume normal operation after a suitable period of time (or refractory period).

In at least one embodiment, neurons 3302 may be interconnected through synapses 3308. In at least one embodiment, synapses 3308 may operate to transmit signals from an output of a first neuron 3302 to an input of a second neuron 3302. In at least one embodiment, neurons 3302 may transmit information over more than one instance of synapse 3308. In at least one embodiment, one or more instances of neuron output 3306 may be connected, via an instance of synapse 3308, to an instance of neuron input 3304 in same neuron 3302. In at least one embodiment, an instance of neuron 3302 generating an output to be transmitted over an instance of synapse 3308 may be referred to as a "pre-synaptic neuron" with respect to that instance of synapse 3308. In at least one embodiment, an instance of neuron 3302 receiving an input transmitted over an instance of synapse 3308 may be referred to as a "post-synaptic neuron" with respect to that instance of synapse 3308. Because an instance of neuron 3302 may receive inputs from one or more instances of synapse 3308, and may also transmit outputs over one or more instances of synapse 3308, a single instance of neuron 3302 may therefore be both a "pre-synaptic neuron" and "post-synaptic neuron," with respect to various instances of synapses 3308, in at least one embodiment.

In at least one embodiment, neurons 3302 may be organized into one or more layers. Each instance of neuron 3302 may have one neuron output 3306 that may fan out through one or more synapses 3308 to one or more neuron inputs 3304. In at least one embodiment, neuron outputs 3306 of neurons 3302 in a first layer 3310 may be connected to neuron inputs 3304 of neurons 3302 in a second layer 3312. In at least one embodiment, layer 3310 may be referred to as a "feed-forward layer." In at least one embodiment, each instance of neuron 3302 in an instance of first layer 3310 may fan out to each instance of neuron 3302 in second layer 3312. In at least one embodiment, first layer 3310 may be referred to as a "fully connected feed-forward layer." In at least one embodiment, each instance of neuron 3302 in an instance of second layer 3312 may fan out to fewer than all instances of neuron 3302 in a third layer 3314. In at least one embodiment, second layer 3312 may be referred to as a "sparsely connected feed-forward layer." In at least one embodiment, neurons 3302 in second layer 3312 may fan out to neurons 3302 in multiple other layers, including to neurons 3302 in (same) second layer 3312. In at least one embodiment, second layer 3312 may be referred to as a "recurrent layer." Neuromorphic processor 3300 may include, without limitation, any suitable combination of recurrent layers and feed-forward layers, including, without limitation, both sparsely connected feed-forward layers and fully connected feed-forward layers.

In at least one embodiment, neuromorphic processor 3300 may include, without limitation, a reconfigurable interconnect architecture or dedicated hard wired interconnects to connect synapse 3308 to neurons 3302. In at least one embodiment, neuromorphic processor 3300 may include, without limitation, circuitry or logic that allows synapses to be allocated to different neurons 3302 as needed based on neural network topology and neuron fan-in/out. For example, in at least one embodiment, synapses 3308 may be connected to neurons 3302 using an interconnect fabric, such as network-on-chip, or with dedicated connections. In at least one embodiment, synapse interconnections and components thereof may be implemented using circuitry or logic.

Figure 34:
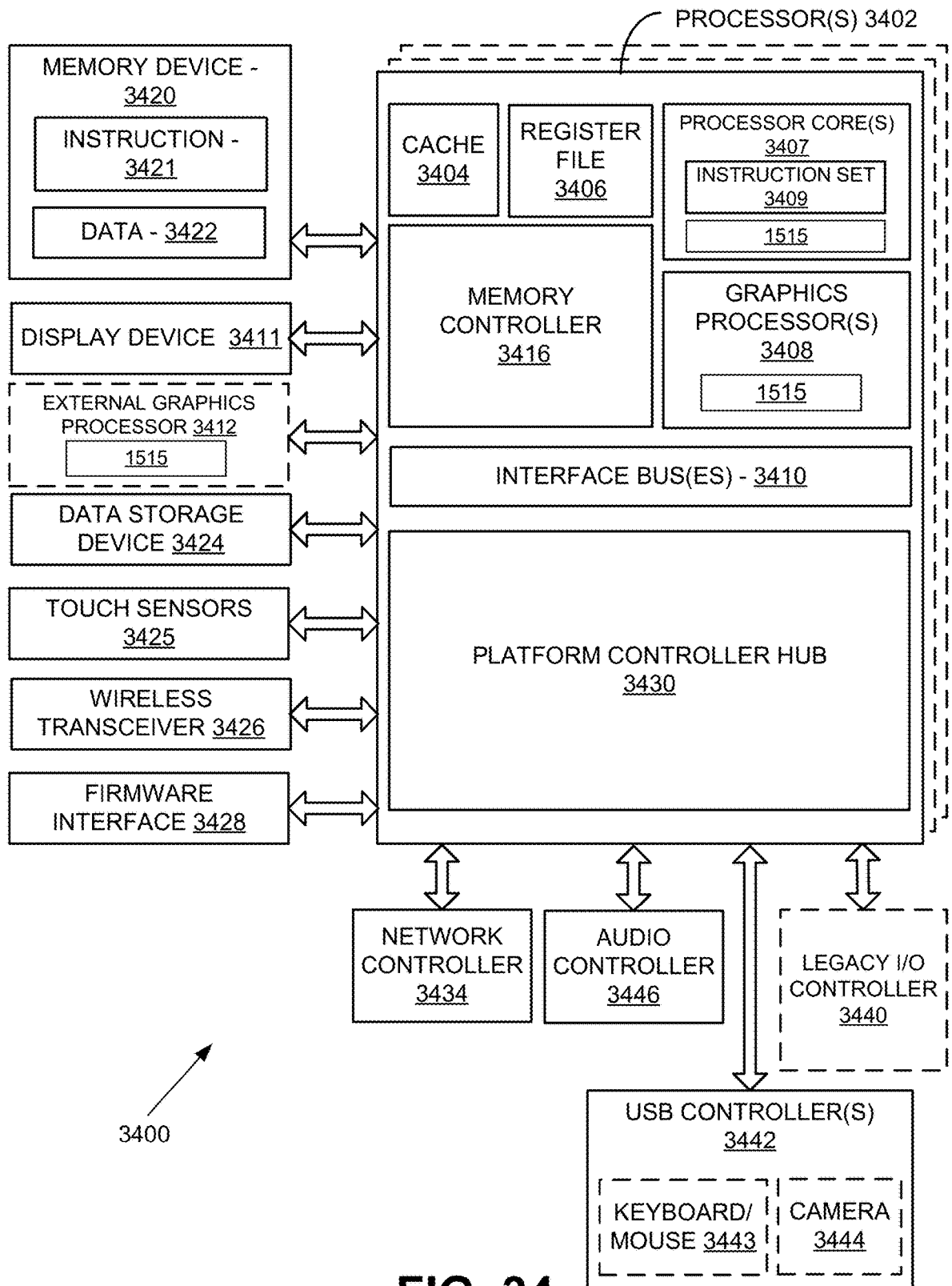
FIG. 34 illustrates at least portions of a graphics processor, according to one or more embodiments.

FIG. 34 is a block diagram of a processing system, according to at least one embodiment. In at least one embodiment, system 3400 includes one or more processors 3402 and one or more graphics processors 3408, and may be a single processor desktop system, a multiprocessor workstation system, or a server system having a large number of processors 3402 or processor cores 3407. In at least one embodiment, system 3400 is a processing platform incorporated within a system-on-a-chip (SoC) integrated circuit for use in mobile, handheld, or embedded devices.

In at least one embodiment, system 3400 can include, or be incorporated within a server-based gaming platform, a game console, including a game and media console, a mobile gaming console, a handheld game console, or an online game console. In at least one embodiment, system 3400 is a mobile phone, smart phone, tablet computing device or mobile Internet device. In at least one embodiment, processing system 3400 can also include, couple with, or be integrated within a wearable device, such as a smart watch wearable device, smart eyewear device, augmented reality device, or virtual reality device. In at least one embodiment, processing system 3400 is a television or set top box device having one or more processors 3402 and a graphical interface generated by one or more graphics processors 3408.

In at least one embodiment, one or more processors 3402 each include one or more processor cores 3407 to process instructions which, when executed, perform operations for system and user software. In at least one embodiment, each of one or more processor cores 3407 is configured to process a specific instruction set 3409. In at least one embodiment, instruction set 3409 may facilitate Complex Instruction Set Computing (CISC), Reduced Instruction Set Computing (RISC), or computing via a Very Long Instruction Word (VLIW). In at least one embodiment, processor cores 3407 may each process a different instruction set 3409, which may include instructions to facilitate emulation of other instruction sets. In at least one embodiment, processor core 3407 may also include other processing devices, such a Digital Signal Processor (DSP).

In at least one embodiment, processor 3402 includes cache memory 3404. In at least one embodiment, processor 3402 can have a single internal cache or multiple levels of internal cache. In at least one embodiment, cache memory is shared among various components of processor 3402. In at least one embodiment, processor 3402 also uses an external cache (e.g., a Level-3 (L3) cache or Last Level Cache (LLC)) (not shown), which may be shared among processor cores 3407 using known cache coherency techniques. In at least one embodiment, register file 3406 is additionally included in processor 3402 which may include different types of registers for storing different types of data (e.g., integer registers, floating point registers, status registers, and an instruction pointer register). In at least one embodiment, register file 3406 may include general-purpose registers or other registers.

In at least one embodiment, one or more processor(s) 3402 are coupled with one or more interface bus(es) 3410 to transmit communication signals such as address, data, or control signals between processor 3402 and other components in system 3400. In at least one embodiment interface bus 3410, in one embodiment, can be a processor bus, such as a version of a Direct Media Interface (DMI) bus. In at least one embodiment, interface 3410 is not limited to a DMI bus, and may include one or more Peripheral Component Interconnect buses (e.g., PCI, PCI Express), memory busses, or other types of interface busses. In at least one embodiment processor(s) 3402 include an integrated memory controller 3416 and a platform controller hub 3430. In at least one embodiment, memory controller 3416 facilitates communication between a memory device and other components of system 3400, while platform controller hub (PCH) 3430 provides connections to I/O devices via a local I/O bus.

In at least one embodiment, memory device 3420 can be a dynamic random access memory (DRAM) device, a static random access memory (SRAM) device, flash memory device, phase-change memory device, or some other memory device having suitable performance to serve as process memory. In at least one embodiment memory device 3420 can operate as system memory for system 3400, to store data 3422 and instructions 3421 for use when one or more processors 3402 executes an application or process. In at least one embodiment, memory controller 3416 also couples with an optional external graphics processor 3412, which may communicate with one or more graphics processors 3408 in processors 3402 to perform graphics and media operations. In at least one embodiment, a display device 3411 can connect to processor(s) 3402. In at least one embodiment display device 3411 can include one or more of an internal display device, as in a mobile electronic device or a laptop device or an external display device attached via a display interface (e.g., DisplayPort, etc.). In at least one embodiment, display device 3411 can include a head mounted display (HMD) such as a stereoscopic display device for use in virtual reality (VR) applications or augmented reality (AR) applications.

In at least one embodiment, platform controller hub 3430 enables peripherals to connect to memory device 3420 and processor 3402 via a high-speed I/O bus. In at least one embodiment, I/O peripherals include, but are not limited to, an audio controller 3446, a network controller 3434, a firmware interface 3428, a wireless transceiver 3426, touch sensors 3425, a data storage device 3424 (e.g., hard disk drive, flash memory, etc.). In at least one embodiment, data storage device 3424 can connect via a storage interface (e.g., SATA) or via a peripheral bus, such as a Peripheral Component Interconnect bus (e.g., PCI, PCI Express). In at least one embodiment, touch sensors 3425 can include touch screen sensors, pressure sensors, or fingerprint sensors. In at least one embodiment, wireless transceiver 3426 can be a Wi-Fi transceiver, a Bluetooth transceiver, or a mobile network transceiver such as a 3G, 4G, or Long Term Evolution (LTE) transceiver. In at least one embodiment, firmware interface 3428 enables communication with system firmware, and can be, for example, a unified extensible firmware interface (UEFI). In at least one embodiment, network controller 3434 can enable a network connection to a wired network. In at least one embodiment, a high-performance network controller (not shown) couples with interface bus 3410. In at least one embodiment, audio controller 3446 is a multi-channel high definition audio controller. In at least one embodiment, system 3400 includes an optional legacy I/O controller 3440 for coupling legacy (e.g., Personal System 2 (PS/2)) devices to system. In at least one embodiment, platform controller hub 3430 can also connect to one or more Universal Serial Bus (USB) controllers 3442 connect input devices, such as keyboard and mouse 3443 combinations, a camera 3444, or other USB input devices.

In at least one embodiment, an instance of memory controller 3416 and platform controller hub 3430 may be integrated into a discreet external graphics processor, such as external graphics processor 3412. In at least one embodiment, platform controller hub 3430 and/or memory controller 3416 may be external to one or more processor(s) 3402. For example, in at least one embodiment, system 3400 can include an external memory controller 3416 and platform controller hub 3430, which may be configured as a memory controller hub and peripheral controller hub within a system chipset that is in communication with processor(s) 3402.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3400. For example, in at least one embodiment, training and/or inferencing techniques described herein may use one or more of ALUs embodied in 3D pipeline 3412. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3400 to perform one or more machine learning algorithms, neural network architectures, use cases, or training techniques described herein.

Figure 35:
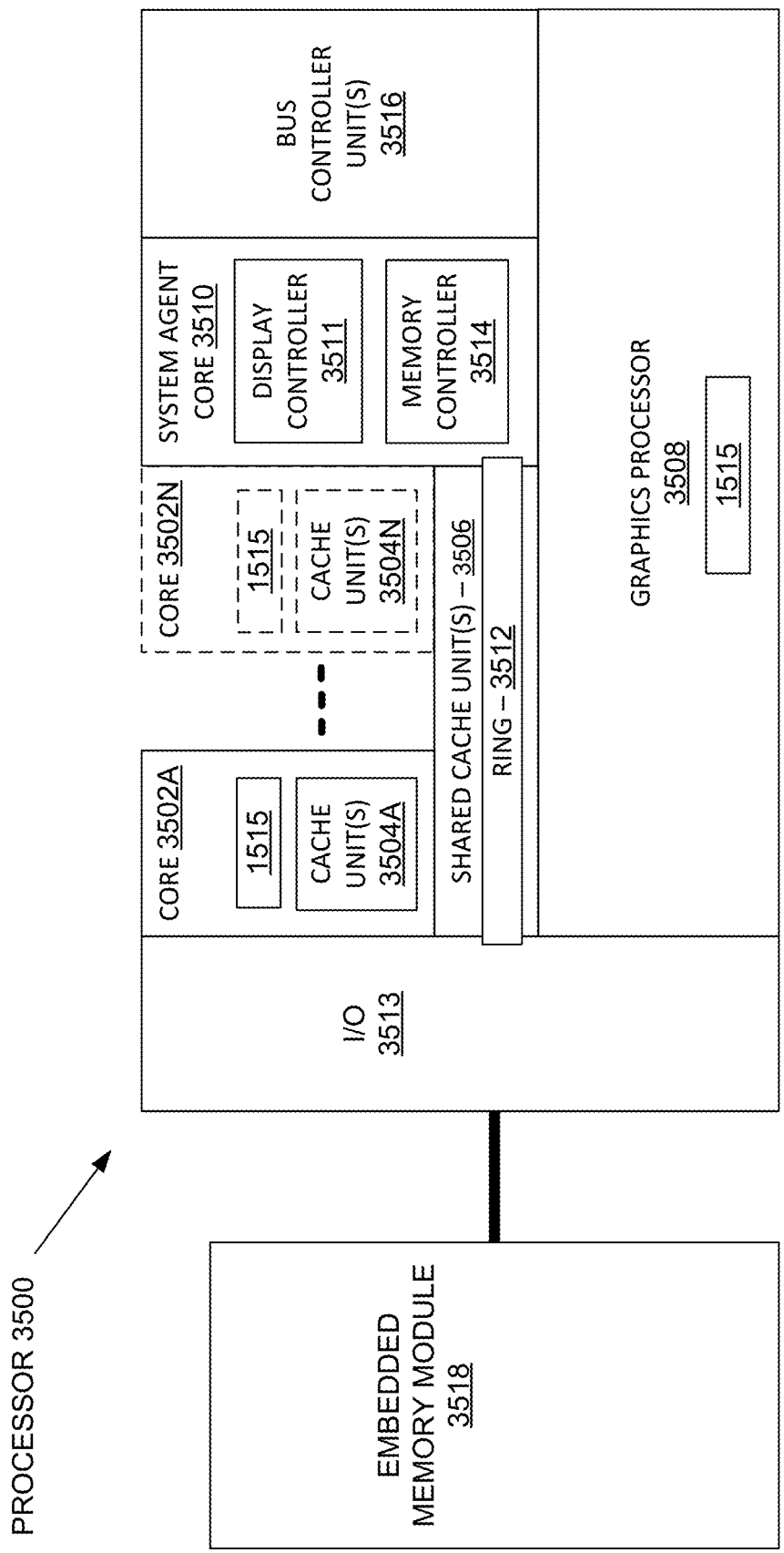
FIG. 35 illustrates at least portions of a graphics processor, according to one or more embodiments.

FIG. 35 is a block diagram of a processor 3500 having one or more processor cores 3502A-3502N, an integrated memory controller 3514, and an integrated graphics processor 3508, according to at least one embodiment. In at least one embodiment, processor 3500 can include additional cores up to and including additional core 3502N represented by dashed lined boxes. In at least one embodiment, each of processor cores 3502A-3502N includes one or more internal cache units 3504A-3504N. In at least one embodiment, each processor core also has access to one or more shared cached units 3506.

In at least one embodiment, internal cache units 3504A-3504N and shared cache units 3506 represent a cache memory hierarchy within processor 3500. In at least one embodiment, cache memory units 3504A-3504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3506 and 3504A-3504N.

In at least one embodiment, processor 3500 may also include a set of one or more bus controller units 3516 and a system agent core 3510. In at least one embodiment, one or more bus controller units 3516 manage a set of peripheral buses, such as one or more PCI or PCI express busses. In at least one embodiment, system agent core 3510 provides management functionality for various processor components. In at least one embodiment, system agent core 3510 includes one or more integrated memory controllers 3514 to manage access to various external memory devices (not shown).

In at least one embodiment, one or more of processor cores 3502A-3502N include support for simultaneous multi-threading. In at least one embodiment, system agent core 3510 includes components for coordinating and operating cores 3502A-3502N during multi-threaded processing. In at least one embodiment, system agent core 3510 may additionally include a power control unit (PCU), which includes logic and components to regulate one or more power states of processor cores 3502A-3502N and graphics processor 3508.

In at least one embodiment, processor 3500 additionally includes graphics processor 3508 to execute graphics processing operations. In at least one embodiment, graphics processor 3508 couples with shared cache units 3506, and system agent core 3510, including one or more integrated memory controllers 3514. In at least one embodiment, system agent core 3510 also includes a display controller 3511 to drive graphics processor output to one or more coupled displays. In at least one embodiment, display controller 3511 may also be a separate module coupled with graphics processor 3508 via at least one interconnect, or may be integrated within graphics processor 3508.

In at least one embodiment, a ring based interconnect unit 3512 is used to couple internal components of processor 3500. In at least one embodiment, an alternative interconnect unit may be used, such as a point-to-point interconnect, a switched interconnect, or other techniques. In at least one embodiment, graphics processor 3508 couples with ring interconnect 3512 via an I/O link 3513.

In at least one embodiment, I/O link 3513 represents at least one of multiple varieties of I/O interconnects, including an on package I/O interconnect which facilitates communication between various processor components and a high-performance embedded memory module 3518, such as an eDRAM module. In at least one embodiment, each of processor cores 3502A-3502N and graphics processor 3508 use embedded memory modules 3518 as a shared Last Level Cache.

In at least one embodiment, processor cores 3502A-3502N are homogenous cores executing a common instruction set architecture. In at least one embodiment, processor cores 3502A-3502N are heterogeneous in terms of instruction set architecture (ISA), where one or more of processor cores 3502A-3502N execute a common instruction set, while one or more other cores of processor cores 3502A-35-02N executes a subset of a common instruction set or a different instruction set. In at least one embodiment, processor cores 3502A-3502N are heterogeneous in terms of microarchitecture, where one or more cores having a relatively higher power consumption couple with one or more power cores having a lower power consumption. In at least one embodiment, processor 3500 can be implemented on one or more chips or as an SoC integrated circuit.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3510. For example, in at least one embodiment, training and/or inferencing techniques described herein may use one or more of ALUs embodied in 3D pipeline 3412, graphics core(s) 3515A, shared function logic 3516, graphics core(s) 3515B, shared function logic 3520, or other logic in FIG. 35. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3510 to perform one or more machine learning algorithms, neural network architectures, use cases, or training techniques described herein.

Figure 36:
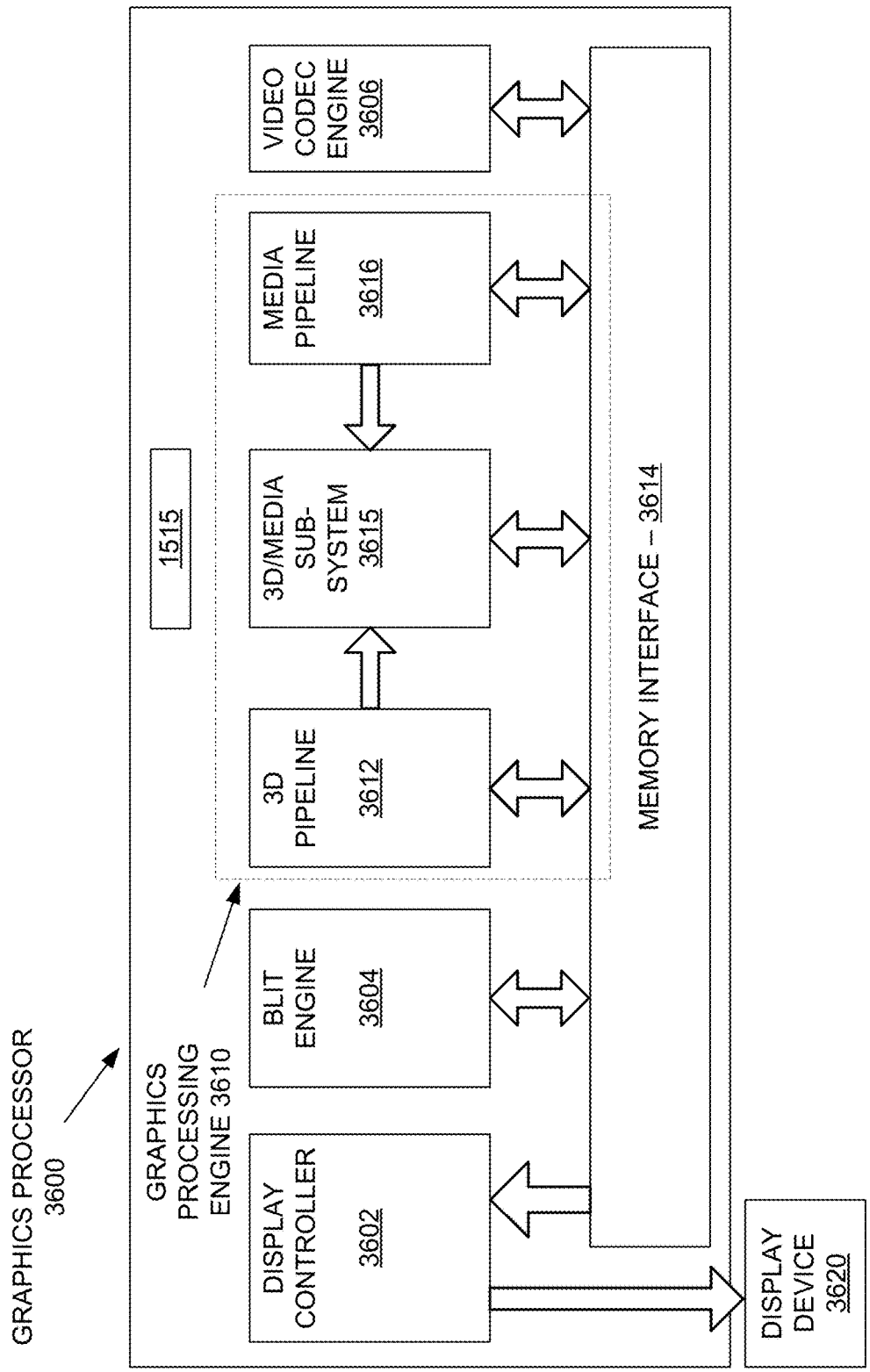
FIG. 36 illustrates at least portions of a graphics processor, according to one or more embodiments.

FIG. 36 is a block diagram of a graphics processor 3600, which may be a discrete graphics processing unit, or may be a graphics processor integrated with a plurality of processing cores. In at least one embodiment, graphics processor 3600 communicates via a memory mapped I/O interface to registers on graphics processor 3600 and with commands placed into memory. In at least one embodiment, graphics processor 3600 includes a memory interface 3614 to access memory. In at least one embodiment, memory interface 3614 is an interface to local memory, one or more internal caches, one or more shared external caches, and/or to system memory.

In at least one embodiment, graphics processor 3600 also includes a display controller 3602 to drive display output data to a display device 3620. In at least one embodiment, display controller 3602 includes hardware for one or more overlay planes for display device 3620 and composition of multiple layers of video or user interface elements. In at least one embodiment, display device 3620 can be an internal or external display device. In at least one embodiment, display device 3620 is a head mounted display device, such as a virtual reality (VR) display device or an augmented reality (AR) display device. In at least one embodiment, graphics processor 3600 includes a video codec engine 3606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3600 includes a block image transfer (BLIT) engine 3604 to perform two-dimensional (2D) rasterizer operations including, for example, bit-boundary block transfers. However, in at least one embodiment, 2D graphics operations are performed using one or more components of graphics processing engine (GPE) 3610. In at least one embodiment, GPE 3610 is a compute engine for performing graphics operations, including three-dimensional (3D) graphics operations and media operations.

In at least one embodiment, GPE 3610 includes a 3D pipeline 3612 for performing 3D operations, such as rendering three-dimensional images and scenes using processing functions that act upon 3D primitive shapes (e.g., rectangle, triangle, etc.). 3D pipeline 3612 includes programmable and fixed function elements that perform various tasks and/or spawn execution threads to a 3D/Media subsystem 3615. While 3D pipeline 3612 can be used to perform media operations, in at least one embodiment, GPE 3610 also includes a media pipeline 3616 that is used to perform media operations, such as video post-processing and image enhancement.

In at least one embodiment, media pipeline 3616 includes fixed function or programmable logic units to perform one or more specialized media operations, such as video decode acceleration, video de-interlacing, and video encode acceleration in place of, or on behalf of video codec engine 3606. In at least one embodiment, media pipeline 3616 additionally includes a thread spawning unit to spawn threads for execution on 3D/Media sub-system 3615. In at least one embodiment, spawned threads perform computations for media operations on one or more graphics execution units included in 3D/Media sub-system 3615.

In at least one embodiment, 3D/Media subsystem 3615 includes logic for executing threads spawned by 3D pipeline 3612 and media pipeline 3616. In at least one embodiment, 3D pipeline 3612 and media pipeline 3616 send thread execution requests to 3D/Media subsystem 3615, which includes thread dispatch logic for arbitrating and dispatching various requests to available thread execution resources. In at least one embodiment, execution resources include an array of graphics execution units to process 3D and media threads. In at least one embodiment, 3D/Media subsystem 3615 includes one or more internal caches for thread instructions and data. In at least one embodiment, subsystem 3615 also includes shared memory, including registers and addressable memory, to share data between threads and to store output data.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3600. For example, in at least one embodiment, training and/or inferencing techniques described herein may use one or more of ALUs embodied in 3D pipeline 3612. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3600 to perform one or more machine learning algorithms, neural network architectures, use cases, or training techniques described herein.

Figure 37:
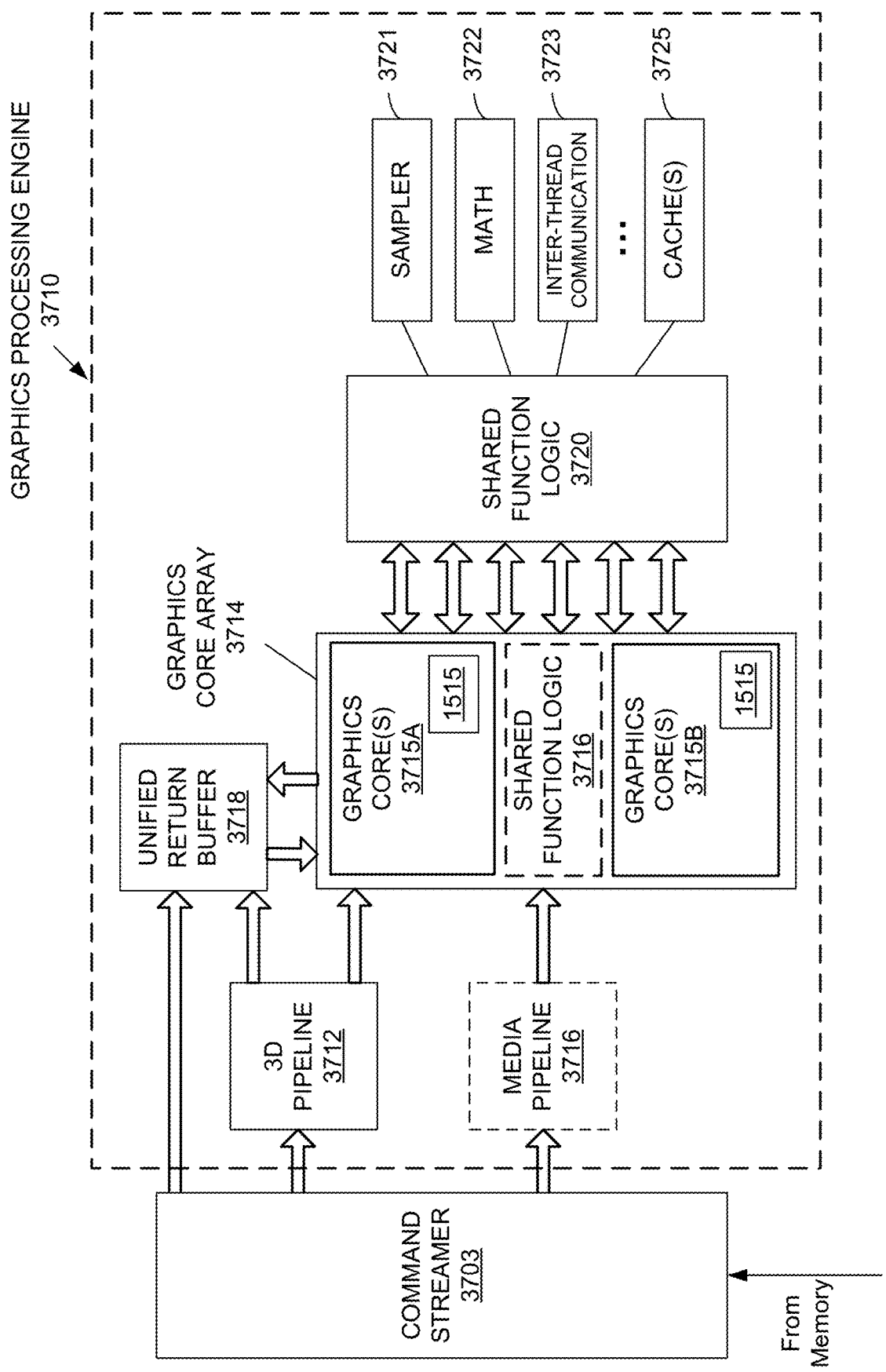
FIG. 37 is a block diagram of a graphics processing engine 3710 of a graphics processor in accordance with at least one embodiment.

FIG. 37 is a block diagram of a graphics processing engine 3710 of a graphics processor in accordance with at least one embodiment. In at least one embodiment, graphics processing engine (GPE) 3710 is a version of GPE 3610 shown in FIG. 36. In at least one embodiment, media pipeline 3616 is optional and may not be explicitly included within GPE 3710. In at least one embodiment, a separate media and/or image processor is coupled to GPE 3710.

In at least one embodiment, GPE 3710 is coupled to or includes a command streamer 3703, which provides a command stream to 3D pipeline 3612 and/or media pipelines 3616. In at least one embodiment, command streamer 3703 is coupled to memory, which can be system memory, or one or more of internal cache memory and shared cache memory. In at least one embodiment, command streamer 3703 receives commands from memory and sends commands to 3D pipeline 3612 and/or media pipeline 3616. In at least one embodiment, commands are instructions, primitives, or micro-operations fetched from a ring buffer, which stores commands for 3D pipeline 3612 and media pipeline 3616. In at least one embodiment, a ring buffer can additionally include batch command buffers storing batches of multiple commands. In at least one embodiment, commands for 3D pipeline 3612 can also include references to data stored in memory, such as but not limited to vertex and geometry data for 3D pipeline 3612 and/or image data and memory objects for media pipeline 3616. In at least one embodiment, 3D pipeline 3612 and media pipeline 3616 process commands and data by performing operations or by dispatching one or more execution threads to a graphics core array 3714. In at least one embodiment graphics core array 3714 includes one or more blocks of graphics cores (e.g., graphics core(s) 3715A, graphics core(s) 3715B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1515 in FIG. 15A and FIG. 15B.

In at least one embodiment, 3D pipeline 3612 includes fixed function and programmable logic to process one or more shader programs, such as vertex shaders, geometry shaders, pixel shaders, fragment shaders, compute shaders, or other shader programs, by processing instructions and dispatching execution threads to graphics core array 3714. In at least one embodiment, graphics core array 3714 provides a unified block of execution resources for use in processing shader programs. In at least one embodiment, multi-purpose execution logic (e.g., execution units) within graphics core(s) 3715A-3715B of graphic core array 3714 includes support for various 3D API shader languages and can execute multiple simultaneous execution threads associated with multiple shaders.

In at least one embodiment, graphics core array 3714 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3714 can output data to memory in a unified return buffer (URB) 3718. URB 3718 can store data for multiple threads. In at least one embodiment, URB 3718 may be used to send data between different threads executing on graphics core array 3714. In at least one embodiment, URB 3718 may additionally be used for synchronization between threads on graphics core array 3714 and fixed function logic within shared function logic 3720.

In at least one embodiment, graphics core array 3714 is scalable, such that graphics core array 3714 includes a variable number of graphics cores, each having a variable number of execution units based on a target power and performance level of GPE 3710. In at least one embodiment, execution resources are dynamically scalable, such that execution resources may be enabled or disabled as needed.

In at least one embodiment, graphics core array 3714 is coupled to shared function logic 3720 that includes multiple resources that are shared between graphics cores in graphics core array 3714. In at least one embodiment, shared functions performed by shared function logic 3720 are embodied in hardware logic units that provide specialized supplemental functionality to graphics core array 3714. In at least one embodiment, shared function logic 3720 includes but is not limited to sampler 3721, math 3722, and inter-thread communication (ITC) 3723 logic. In at least one embodiment, one or more cache(s) 3725 are in included in or couple to shared function logic 3720.

In at least one embodiment, a shared function is used if demand for a specialized function is insufficient for inclusion within graphics core array 3714. In at least one embodiment, a single instantiation of a specialized function is used in shared function logic 3720 and shared among other execution resources within graphics core array 3714. In at least one embodiment, specific shared functions within shared function logic 3720 that are used extensively by graphics core array 3714 may be included within shared function logic 3716 within graphics core array 3714. In at least one embodiment, shared function logic 3716 within graphics core array 3714 can include some or all logic within shared function logic 3720. In at least one embodiment, all logic elements within shared function logic 3720 may be duplicated within shared function logic 3716 of graphics core array 3714. In at least one embodiment, shared function logic 3720 is excluded in favor of shared function logic 3716 within graphics core array 3714.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment portions or all of inference and/or training logic 1515 may be incorporated into graphics processor 3710. For example, in at least one embodiment, training and/or inferencing techniques described herein may use one or more of ALUs embodied in 3D pipeline 3612, graphics core(s) 3715A, shared function logic 3716, graphics core(s) 3715B, shared function logic 3720, or other logic in FIG. 37. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3710 to perform one or more machine learning algorithms, neural network architectures, use cases, or training techniques described herein.

Figure 38:
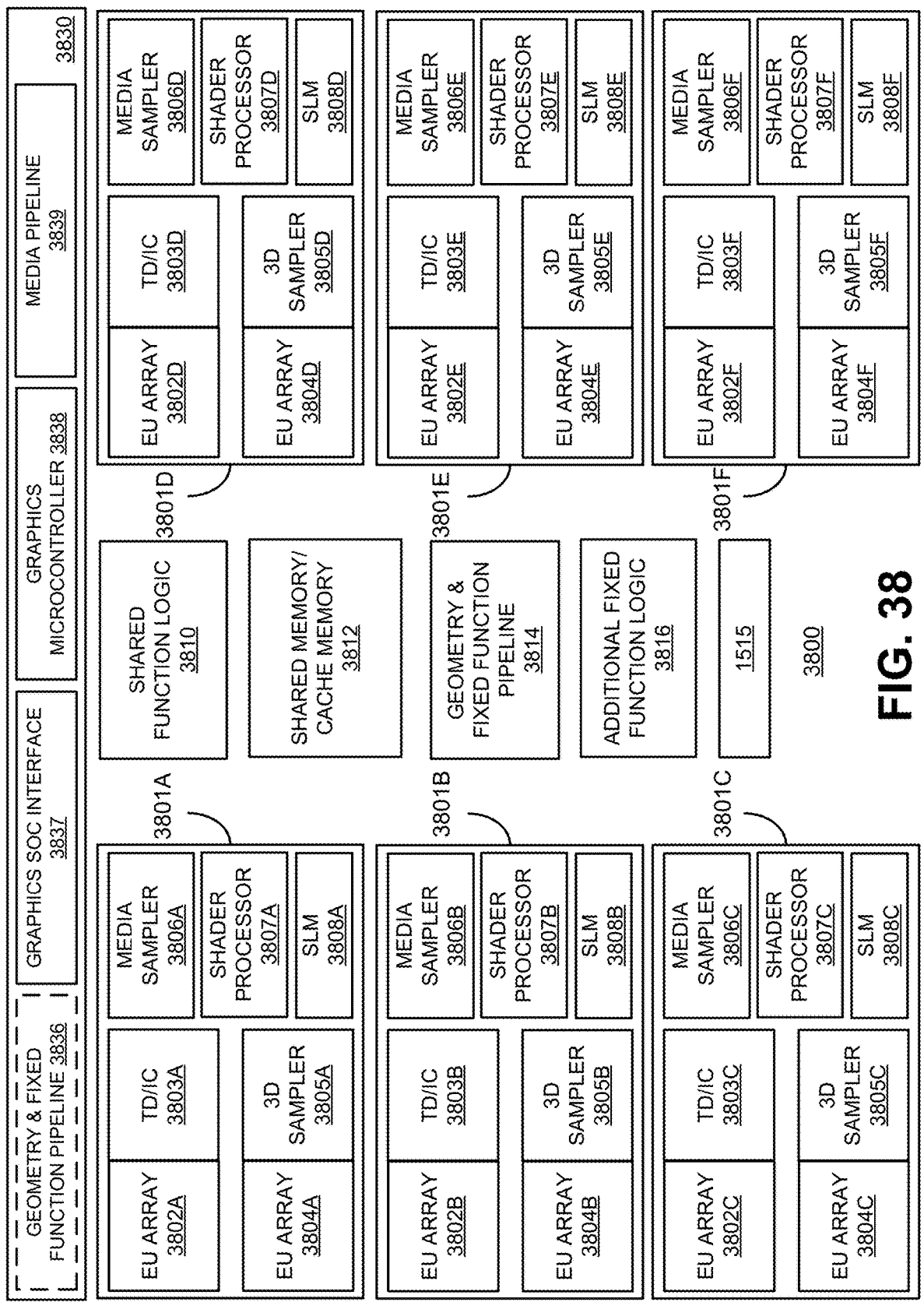
FIG. 38 is a block diagram of at least portions of a graphics processor core, according to at least one embodiment.

FIG. 38 is a block diagram of hardware logic of a graphics processor core 3800, according to at least one embodiment described herein. In at least one embodiment, graphics processor core 3800 is included within a graphics core array. In at least one embodiment, graphics processor core 3800, sometimes referred to as a core slice, can be one or multiple graphics cores within a modular graphics processor. In at least one embodiment, graphics processor core 3800 is exemplary of one graphics core slice, and a graphics processor as described herein may include multiple graphics core slices based on target power and performance envelopes. In at least one embodiment, each graphics core 3800 can include a fixed function block 3830 coupled with multiple sub-cores 3801A-3801F, also referred to as sub-slices, that include modular blocks of general-purpose and fixed function logic.

In at least one embodiment, fixed function block 3830 includes a geometry/fixed function pipeline 3836 that can be shared by all sub-cores in graphics processor 3800, for example, in lower performance and/or lower power graphics processor implementations. In at least one embodiment, geometry/fixed function pipeline 3836 includes a 3D fixed function pipeline, a video front-end unit, a thread spawner and thread dispatcher, and a unified return buffer manager, which manages unified return buffers.

In at least one embodiment fixed function block 3830 also includes a graphics SoC interface 3837, a graphics microcontroller 3838, and a media pipeline 3839. Graphics SoC interface 3837 provides an interface between graphics core 3800 and other processor cores within a system on a chip integrated circuit. In at least one embodiment, graphics microcontroller 3838 is a programmable sub-processor that is configurable to manage various functions of graphics processor 3800, including thread dispatch, scheduling, and pre-emption. In at least one embodiment, media pipeline 3839 includes logic to facilitate decoding, encoding, pre-processing, and/or post-processing of multimedia data, including image and video data. In at least one embodiment, media pipeline 3839 implement media operations via requests to compute or sampling logic within sub-cores 3801-3801F.

In at least one embodiment, SoC interface 3837 enables graphics core 3800 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3837 can also enable communication with fixed function devices within an SoC, such as camera imaging pipelines, and enables use of and/or implements global memory atomics that may be shared between graphics core 3800 and CPUs within an SoC. In at least one embodiment, SoC interface 3837 can also implement power management controls for graphics core 3800 and enable an interface between a clock domain of graphic core 3800 and other clock domains within an SoC. In at least one embodiment, SoC interface 3837 enables receipt of command buffers from a command streamer and global thread dispatcher that are configured to provide commands and instructions to each of one or more graphics cores within a graphics processor. In at least one embodiment, commands and instructions can be dispatched to media pipeline 3839, when media operations are to be performed, or a geometry and fixed function pipeline (e.g., geometry and fixed function pipeline 3836, geometry and fixed function pipeline 3814) when graphics processing operations are to be performed.

In at least one embodiment, graphics microcontroller 3838 can be configured to perform various scheduling and management tasks for graphics core 3800. In at least one embodiment, graphics microcontroller 3838 can perform graphics and/or compute workload scheduling on various graphics parallel engines within execution unit (EU) arrays 3802A-3802F, 3804A-3804F within sub-cores 3801A-3801F. In at least one embodiment, host software executing on a CPU core of an SoC including graphics core 3800 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 3838 can also facilitate low-power or idle states for graphics core 3800, providing graphics core 3800 with an ability to save and restore registers within graphics core 3800 across low-power state transitions independently from an operating system and/or graphics driver software on a system.

In at least one embodiment, graphics core 3800 may have greater than or fewer than illustrated sub-cores 3801A-3801F, up to N modular sub-cores. For each set of N sub-cores, in at least one embodiment, graphics core 3800 can also include shared function logic 3810, shared and/or cache memory 3812, a geometry/fixed function pipeline 3814, as well as additional fixed function logic 3816 to accelerate various graphics and compute processing operations. In at least one embodiment, shared function logic 3810 can include logic units (e.g., sampler, math, and/or inter-thread communication logic) that can be shared by each N sub-cores within graphics core 3800. Shared and/or cache memory 3812 can be a last-level cache for N sub-cores 3801A-3801F within graphics core 3800 and can also serve as shared memory that is accessible by multiple sub-cores. In at least one embodiment, geometry/fixed function pipeline 3814 can be included instead of geometry/fixed function pipeline 3836 within fixed function block 3830 and can include same or similar logic units.

In at least one embodiment, graphics core 3800 includes additional fixed function logic 3816 that can include various fixed function acceleration logic for use by graphics core 3800. In at least one embodiment, additional fixed function logic 3816 includes an additional geometry pipeline for use in position only shading. In position-only shading, at least two geometry pipelines exist, whereas in a full geometry pipeline within geometry/fixed function pipeline 3816, 3836, and a cull pipeline, which is an additional geometry pipeline which may be included within additional fixed function logic 3816. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3816 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3816 can also include machine-learning acceleration logic, such as fixed function matrix multiplication logic, for implementations including optimizations for machine learning training or inferencing.

In at least one embodiment, within each graphics sub-core 3801A-3801F includes a set of execution resources that may be used to perform graphics, media, and compute operations in response to requests by graphics pipeline, media pipeline, or shader programs. In at least one embodiment, graphics sub-cores 3801A-3801F include multiple EU arrays 3802A-3802F, 3804A-3804F, thread dispatch and inter-thread communication (TD/IC) logic 3803A-3803F, a 3D (e.g., texture) sampler 3805A-3805F, a media sampler 3806A-3806F, a shader processor 3807A-3807F, and shared local memory (SLM) 3808A-3808F. EU arrays 3802A-3802F, 3804A-3804F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3803A-3803F performs local thread dispatch and thread control operations for execution units within a sub-core and facilitate communication between threads executing on execution units of a sub-core. In at least one embodiment, 3D sampler 3805A-3805F can read texture or other 3D graphics related data into memory. In at least one embodiment, 3D sampler can read texture data differently based on a configured sample state and texture format associated with a given texture. In at least one embodiment, media sampler 3806A-3806F can perform similar read operations based on a type and format associated with media data. In at least one embodiment, each graphics sub-core 3801A-3801F can alternately include a unified 3D and media sampler. In at least one embodiment, threads executing on execution units within each of sub-cores 3801A-3801F can make use of shared local memory 3808A-3808F within each sub-core, to enable threads executing within a thread group to execute using a common pool of on-chip memory.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, portions or all of inference and/or training logic 1515 may be incorporated into graphics processor 3810. For example, in at least one embodiment, training and/or inferencing techniques described herein may use one or more of ALUs embodied in 3D pipeline 3810, graphics microcontroller 3838, geometry & fixed function pipeline 3814 and 3836, or other logic in FIG. 35. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of graphics processor 3800 to perform one or more machine learning algorithms, neural network architectures, use cases, or training techniques described herein.

Figure 39A:
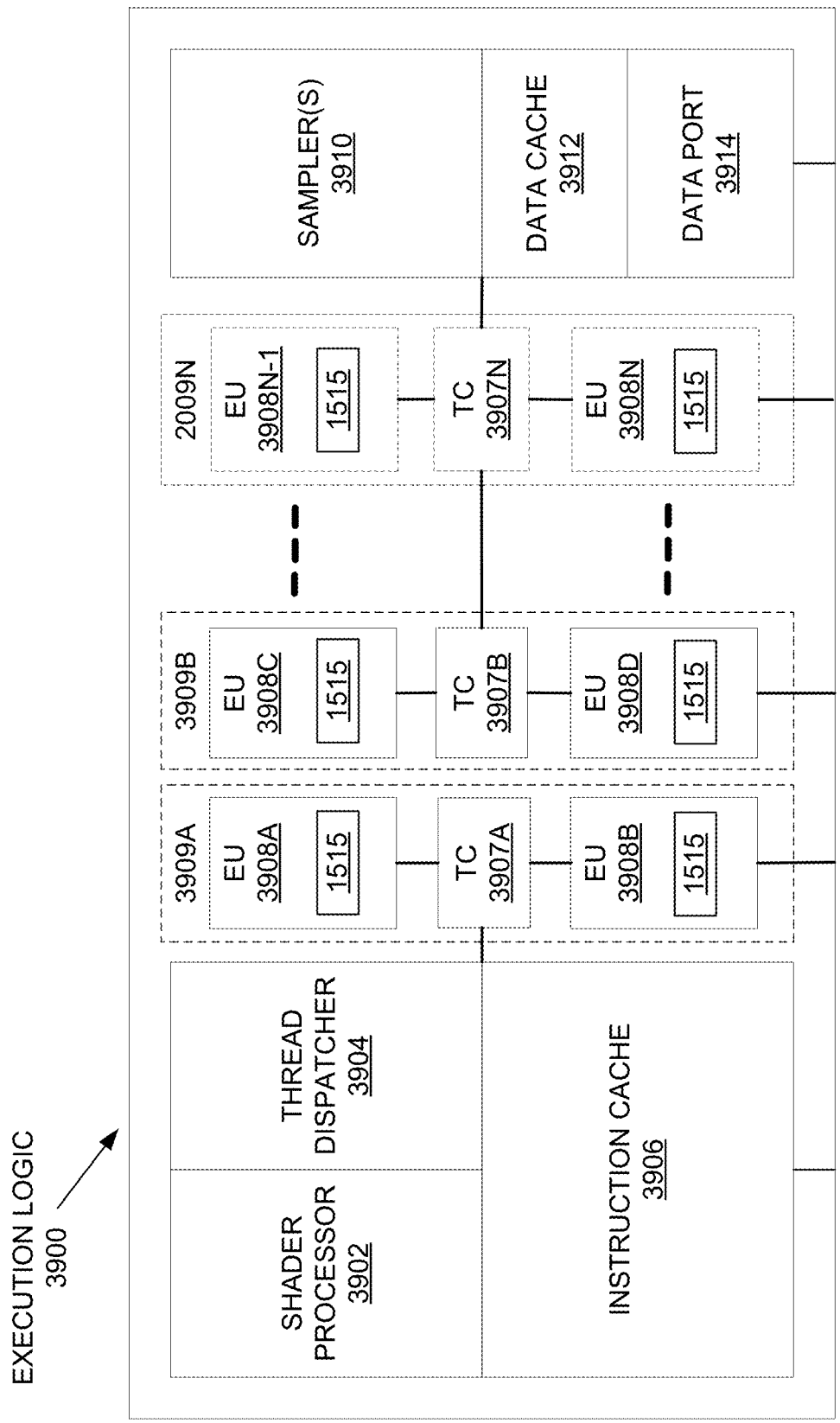
FIGS. 39A and 39B illustrate thread execution logic 3900 including an array of processing elements of a graphics processor core according to at least one embodiment.
Figure 39B:
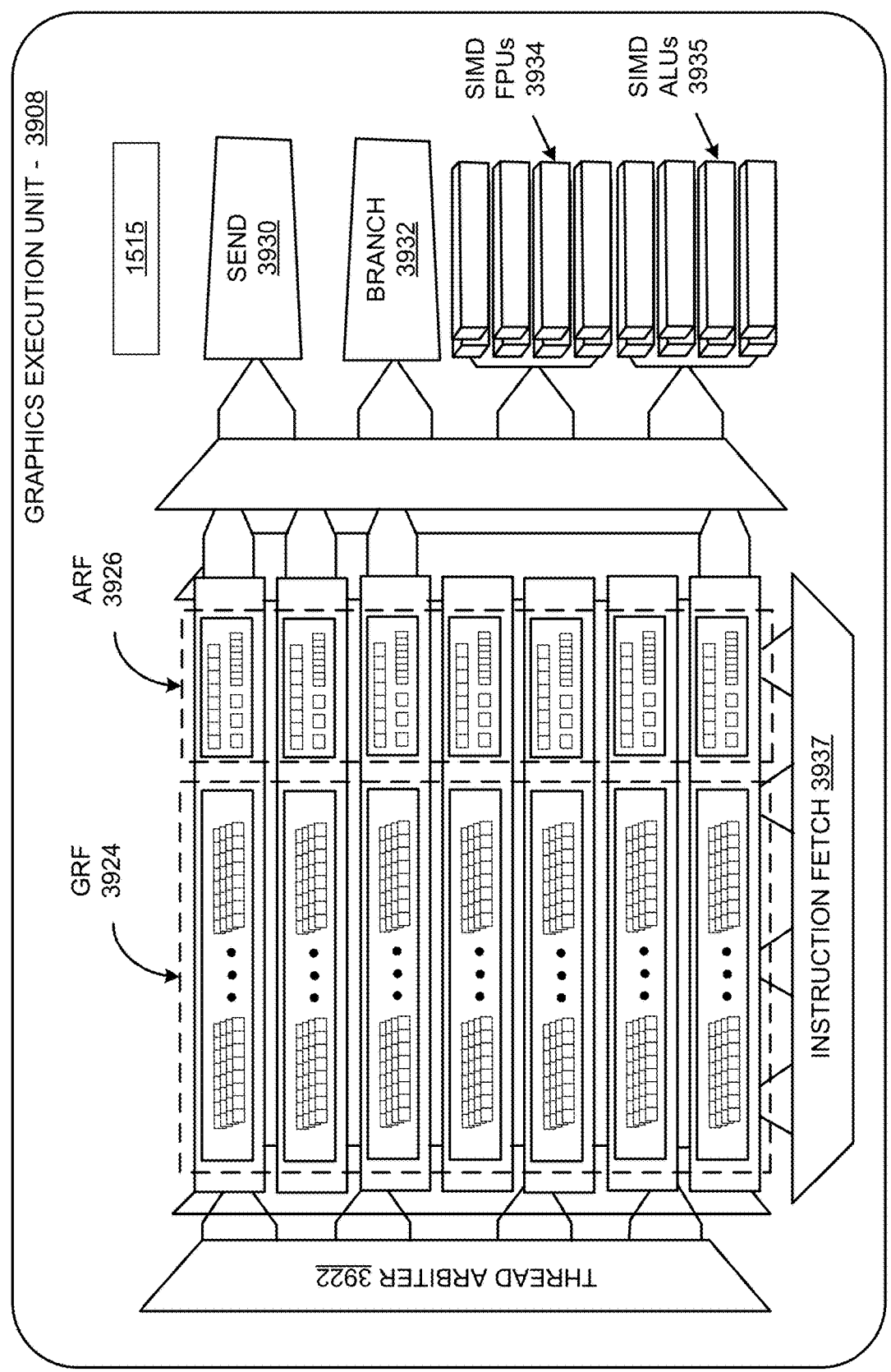

FIGS. 39A-39B illustrate thread execution logic 3900 including an array of processing elements of a graphics processor core according to at least one embodiment. FIG. 39A illustrates at least one embodiment, in which thread execution logic 3900 is used. FIG. 39B illustrates exemplary internal details of an execution unit, according to at least one embodiment.

As illustrated in FIG. 39A, in at least one embodiment, thread execution logic 3900 includes a shader processor 3902, a thread dispatcher 3904, instruction cache 3906, a scalable execution unit array including a plurality of execution units 3908A-3908N, a sampler 3910, a data cache 3912, and a data port 3914. In at least one embodiment a scalable execution unit array can dynamically scale by enabling or disabling one or more execution units (e.g., any of execution unit 3908A, 3908B, 3908C, 3908D, through 3908N-1 and 3908N) based on computational requirements of a workload, for example. In at least one embodiment, scalable execution units are interconnected via an interconnect fabric that links to each of execution unit. In at least one embodiment, thread execution logic 3900 includes one or more connections to memory, such as system memory or cache memory, through one or more of instruction cache 3906, data port 3914, sampler 3910, and execution units 3908A-3908N. In at least one embodiment, each execution unit (e.g., 3908A) is a stand-alone programmable general-purpose computational unit that is capable of executing multiple simultaneous hardware threads while processing multiple data elements in parallel for each thread. In at least one embodiment, array of execution units 3908A-3908N is scalable to include any number individual execution units.

In at least one embodiment, execution units 3908A-3908N are primarily used to execute shader programs. In at least one embodiment, shader processor 3902 can process various shader programs and dispatch execution threads associated with shader programs via a thread dispatcher 3904. In at least one embodiment, thread dispatcher 3904 includes logic to arbitrate thread initiation requests from graphics and media pipelines and instantiate requested threads on one or more execution units in execution units 3908A-3908N. For example, in at least one embodiment, a geometry pipeline can dispatch vertex, tessellation, or geometry shaders to thread execution logic for processing. In at least one embodiment, thread dispatcher 3904 can also process runtime thread spawning requests from executing shader programs.

In at least one embodiment, execution units 3908A-3908N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3908A-3908N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3908A-3908N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3908A-3908N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3908A-3908N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3909A-3909N having thread control logic (3907A-3907N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 3909A-3909N includes at least two execution units. For example, in at least one embodiment, fused execution unit 3909A includes a first EU 3908A, second EU 3908B, and thread control logic 3907A that is common to first EU 3908A and second EU 3908B. In at least one embodiment, thread control logic 3907A controls threads executed on fused graphics execution unit 3909A, allowing each EU within fused execution units 3909A-3909N to execute using a common instruction pointer register.

In at least one embodiment, one or more internal instruction caches (e.g., 3906) are included in thread execution logic 3900 to cache thread instructions for execution units. In at least one embodiment, one or more data caches (e.g., 3912) are included to cache thread data during thread execution. In at least one embodiment, a sampler 3910 is included to provide texture sampling for 3D operations and media sampling for media operations. In at least one embodiment, sampler 3910 includes specialized texture or media sampling functionality to process texture or media data during sampling process before providing sampled data to an execution unit.

During execution, in at least one embodiment, graphics and media pipelines send thread initiation requests to thread execution logic 3900 via thread spawning and dispatch logic. In at least one embodiment, once a group of geometric objects has been processed and rasterized into pixel data, pixel processor logic (e.g., pixel shader logic, fragment shader logic, etc.) within shader processor 3902 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 3902 then executes an application programming interface (API)-supplied pixel or fragment shader program. In at least one embodiment, to execute a shader program, shader processor 3902 dispatches threads to an execution unit (e.g., 3908A) via thread dispatcher 3904. In at least one embodiment, shader processor 3902 uses texture sampling logic in sampler 3910 to access texture data in texture maps stored in memory. In at least one embodiment, arithmetic operations on texture data and input geometry data compute pixel color data for each geometric fragment, or discards one or more pixels from further processing.

In at least one embodiment, data port 3914 provides a memory access mechanism for thread execution logic 3900 to output processed data to memory for further processing on a graphics processor output pipeline. In at least one embodiment, data port 3914 includes or couples to one or more cache memories (e.g., data cache 3912) to cache data for memory access via a data port.

As illustrated in FIG. 39B, in at least one embodiment, a graphics execution unit 3908 can include an instruction fetch unit 3937, a general register file array (GRF) 3924, an architectural register file array (ARF) 3926, a thread arbiter 3922, a send unit 3930, a branch unit 3932, a set of SIMD floating point units (FPUs) 3934, and In at least one embodiment a set of dedicated integer SIMD ALUs 3935. In at least one embodiment, GRF 3924 and ARF 3926 includes a set of general register files and architecture register files associated with each simultaneous hardware thread that may be active in graphics execution unit 3908. In at least one embodiment, per thread architectural state is maintained in ARF 3926, while data used during thread execution is stored in GRF 3924. In at least one embodiment, execution state of each thread, including instruction pointers for each thread, can be held in thread-specific registers in ARF 3926.

In at least one embodiment, graphics execution unit 3908 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3908 can co-issue multiple instructions, which may each be different instructions. In at least one embodiment, thread arbiter 3922 of graphics execution unit thread 3908 can dispatch instructions to one of send unit 3930, branch unit 3942, or SIMD FPU(s) 3934 for execution. In at least one embodiment, each execution thread can access 128 general-purpose registers within GRF 3924, where each register can store 32 bytes, accessible as a SIMD 8-element vector of 32-bit data elements. In at least one embodiment, each execution unit thread has access to 4 Kbytes within GRF 3924, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 3924 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 3930. In at least one embodiment, branch instructions are dispatched to a dedicated branch unit 3932 to facilitate SIMD divergence and eventual convergence.

In at least one embodiment graphics execution unit 3908 includes one or more SIMD floating point units (FPU(s)) 3934 to perform floating-point operations. In at least one embodiment, FPU(s) 3934 also support integer computation. In at least one embodiment FPU(s) 3934 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 3935 are also present, and may be specifically optimized to perform operations associated with machine learning computations.

In at least one embodiment, arrays of multiple instances of graphics execution unit 3908 can be instantiated in a graphics sub-core grouping (e.g., a sub-slice). In at least one embodiment execution unit 3908 can execute instructions across a plurality of execution channels. In at least one embodiment, each thread executed on graphics execution unit 3908 is executed on a different channel.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, portions or all of inference and/or training logic 1515 may be incorporated into execution logic 3900. Moreover, in at least one embodiment, inferencing and/or training operations described herein may be done using logic other than logic illustrated in FIG. 15A or 15B. In at least one embodiment, weight parameters may be stored in on-chip or off-chip memory and/or registers (shown or not shown) that configure ALUs of execution logic 3900 to perform one or more machine learning algorithms, neural network architectures, use cases, or training techniques described herein.

Figure 40:
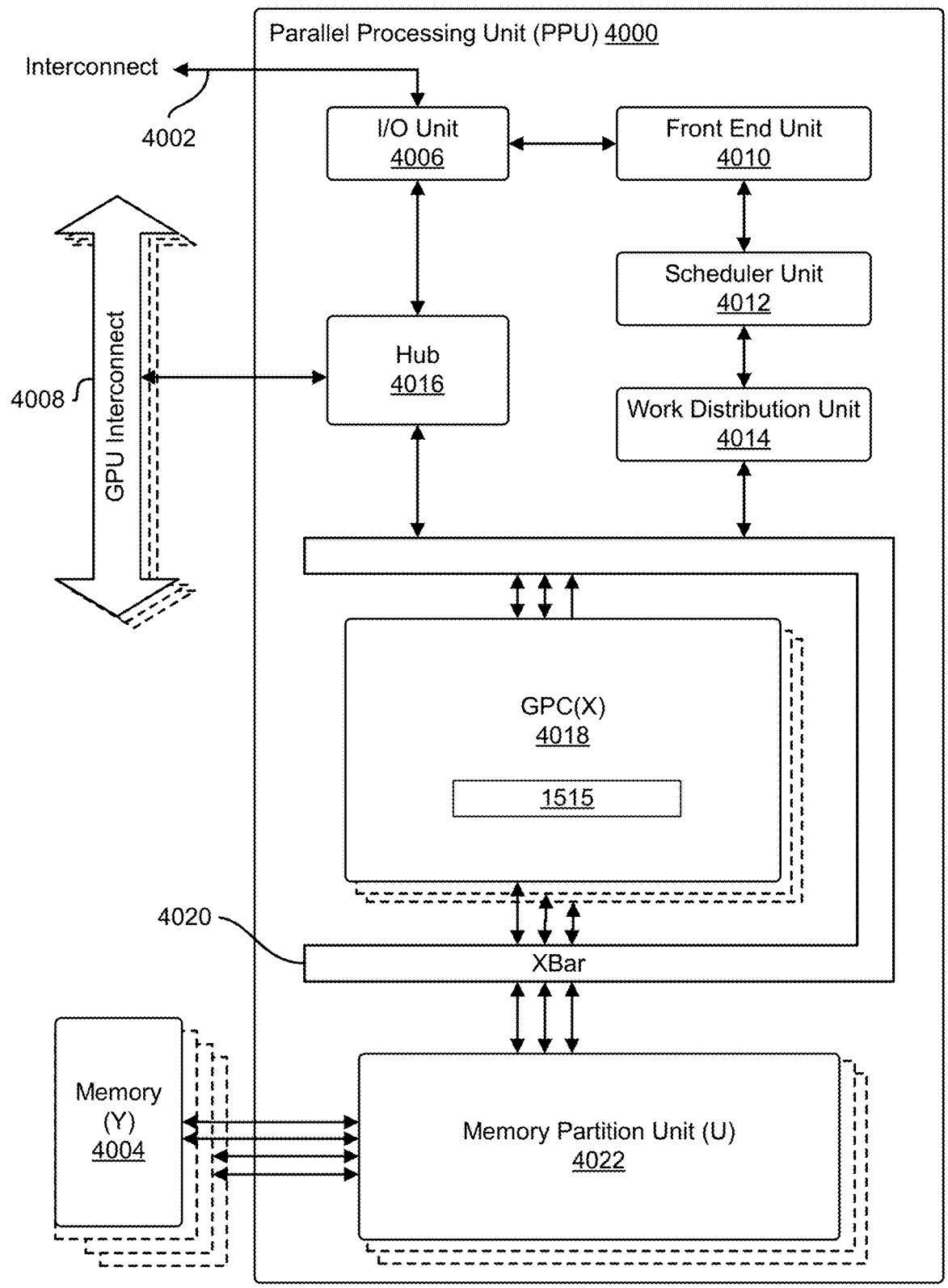
FIG. 40 illustrates a parallel processing unit ("PPU"), according to at least one embodiment.

FIG. 40 illustrates a parallel processing unit ("PPU") 4000, according to at least one embodiment. In at least one embodiment, PPU 4000 is configured with machine-readable code that, if executed by PPU 4000, causes PPU 4000 to perform some or all of processes and techniques described throughout this disclosure. In at least one embodiment, PPU 4000 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4000. In at least one embodiment, PPU 4000 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4000 is utilized to perform computations such as linear algebra operations and machine-learning operations. FIG. 40 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4000 are configured to accelerate High Performance Computing ("HPC"), data center, and machine learning applications. In at least one embodiment, PPU 4000 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4000 includes, without limitation, an Input/Output ("I/O") unit 4006, a front-end unit 4010, a scheduler unit 4012, a work distribution unit 4014, a hub 4016, a crossbar ("Xbar") 4020, one or more general processing clusters ("GPCs") 4018, and one or more partition units ("memory partition units") 4022. In at least one embodiment, PPU 4000 is connected to a host processor or other PPUs 4000 via one or more high-speed GPU interconnects ("GPU interconnects") 4008. In at least one embodiment, PPU 4000 is connected to a host processor or other peripheral devices via an interconnect 4002. In at least one embodiment, PPU 4000 is connected to a local memory comprising one or more memory devices ("memory") 4004. In at least one embodiment, memory devices 4004 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4008 may refer to a wire-based multi-lane communications link that is used by systems to scale and include one or more PPUs 4000 combined with one or more central processing units ("CPUs"), supports cache coherence between PPUs 4000 and CPUs, and CPU mastering. In at least one embodiment, data and/or commands are transmitted by high-speed GPU interconnect 4008 through hub 4016 to/from other units of PPU 4000 such as one or more copy engines, video encoders, video decoders, power management units, and other components which may not be explicitly illustrated in FIG. 40.

In at least one embodiment, I/O unit 4006 is configured to transmit and receive communications (e.g., commands, data) from a host processor (not illustrated in FIG. 40) over system bus 4002. In at least one embodiment, I/O unit 4006 communicates with host processor directly via system bus 4002 or through one or more intermediate devices such as a memory bridge. In at least one embodiment, I/O unit 4006 may communicate with one or more other processors, such as one or more of PPUs 4000 via system bus 4002. In at least one embodiment, I/O unit 4006 implements a Peripheral Component Interconnect Express ("PCIe") interface for communications over a PCIe bus. In at least one embodiment, I/O unit 4006 implements interfaces for communicating with external devices.

In at least one embodiment, I/O unit 4006 decodes packets received via system bus 4002. In at least one embodiment, at least some packets represent commands configured to cause PPU 4000 to perform various operations. In at least one embodiment, I/O unit 4006 transmits decoded commands to various other units of PPU 4000 as specified by commands. In at least one embodiment, commands are transmitted to front-end unit 4010 and/or transmitted to hub 4016 or other units of PPU 4000 such as one or more copy engines, a video encoder, a video decoder, a power management unit, etc. (not explicitly illustrated in FIG. 40). In at least one embodiment, I/O unit 4006 is configured to route communications between and among various logical units of PPU 4000.

In at least one embodiment, a program executed by host processor encodes a command stream in a buffer that provides workloads to PPU 4000 for processing. In at least one embodiment, a workload comprises instructions and data to be processed by those instructions. In at least one embodiment, buffer is a region in a memory that is accessible (e.g., read/write) by both host processor and PPU 4000—a host interface unit may be configured to access buffer in a system memory connected to system bus 4002 via memory requests transmitted over system bus 4002 by I/O unit 4006. In at least one embodiment, host processor writes command stream to buffer and then transmits a pointer to start of command stream to PPU 4000 such that front-end unit 4010 receives pointers to one or more command streams and manages one or more command streams, reading commands from command streams and forwarding commands to various units of PPU 4000.

In at least one embodiment, front-end unit 4010 is coupled to scheduler unit 4012 that configures various GPCs 4018 to process tasks defined by one or more command streams. In at least one embodiment, scheduler unit 4012 is configured to track state information related to various tasks managed by scheduler unit 4012 where state information may indicate which of GPCs 4018 a task is assigned to, whether task is active or inactive, a priority level associated with task, and so forth. In at least one embodiment, scheduler unit 4012 manages execution of a plurality of tasks on one or more of GPCs 4018.

In at least one embodiment, scheduler unit 4012 is coupled to work distribution unit 4014 that is configured to dispatch tasks for execution on GPCs 4018. In at least one embodiment, work distribution unit 4014 tracks a number of scheduled tasks received from scheduler unit 4012 and work distribution unit 4014 manages a pending task pool and an active task pool for each of GPCs 4018. In at least one embodiment, pending task pool comprises a number of slots (e.g., 32 slots) that contain tasks assigned to be processed by a particular GPC 4018; active task pool may comprise a number of slots (e.g., 4 slots) for tasks that are actively being processed by GPCs 4018 such that as one of GPCs 4018 completes execution of a task, that task is evicted from active task pool for GPC 4018 and one of other tasks from pending task pool is selected and scheduled for execution on GPC 4018. In at least one embodiment, if an active task is idle on GPC 4018, such as while waiting for a data dependency to be resolved, then active task is evicted from GPC 4018 and returned to pending task pool while another task in pending task pool is selected and scheduled for execution on GPC 4018.

In at least one embodiment, work distribution unit 4014 communicates with one or more GPCs 4018 via XBar 4020. In at least one embodiment, XBar 4020 is an interconnect network that couples many of units of PPU 4000 to other units of PPU 4000 and can be configured to couple work distribution unit 4014 to a particular GPC 4018. In at least one embodiment, one or more other units of PPU 4000 may also be connected to XBar 4020 via hub 4016.

In at least one embodiment, tasks are managed by scheduler unit 4012 and dispatched to one of GPCs 4018 by work distribution unit 4014. GPC 4018 is configured to process task and generate results. In at least one embodiment, results may be consumed by other tasks within GPC 4018, routed to a different GPC 4018 via XBar 4020, or stored in memory 4004. In at least one embodiment, results can be written to memory 4004 via partition units 4022, which implement a memory interface for reading and writing data to/from memory 4004. In at least one embodiment, results can be transmitted to another PPU 4004 or CPU via high-speed GPU interconnect 4008. In at least one embodiment, PPU 4000 includes, without limitation, a number U of partition units 4022 that is equal to number of separate and distinct memory devices 4004 coupled to PPU 4000. In at least one embodiment, partition unit 4022 will be described in more detail herein in conjunction with FIG. 42.

In at least one embodiment, a host processor executes a driver kernel that implements an application programming interface ("API") that enables one or more applications executing on host processor to schedule operations for execution on PPU 4000. In at least one embodiment, multiple compute applications are simultaneously executed by PPU 4000 and PPU 4000 provides isolation, quality of service ("QoS"), and independent address spaces for multiple compute applications. In at least one embodiment, an application generates instructions (e.g., in form of API calls) that cause driver kernel to generate one or more tasks for execution by PPU 4000 and driver kernel outputs tasks to one or more streams being processed by PPU 4000. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 42.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to PPU 4000. In at least one embodiment, deep learning application processor 4000 is used to infer or predict information based on a trained machine learning model (e.g., neural network) that has been trained by another processor or system or by PPU 4000. In at least one embodiment, PPU 4000 may be used to perform one or more neural network use cases described herein.

Figure 41:
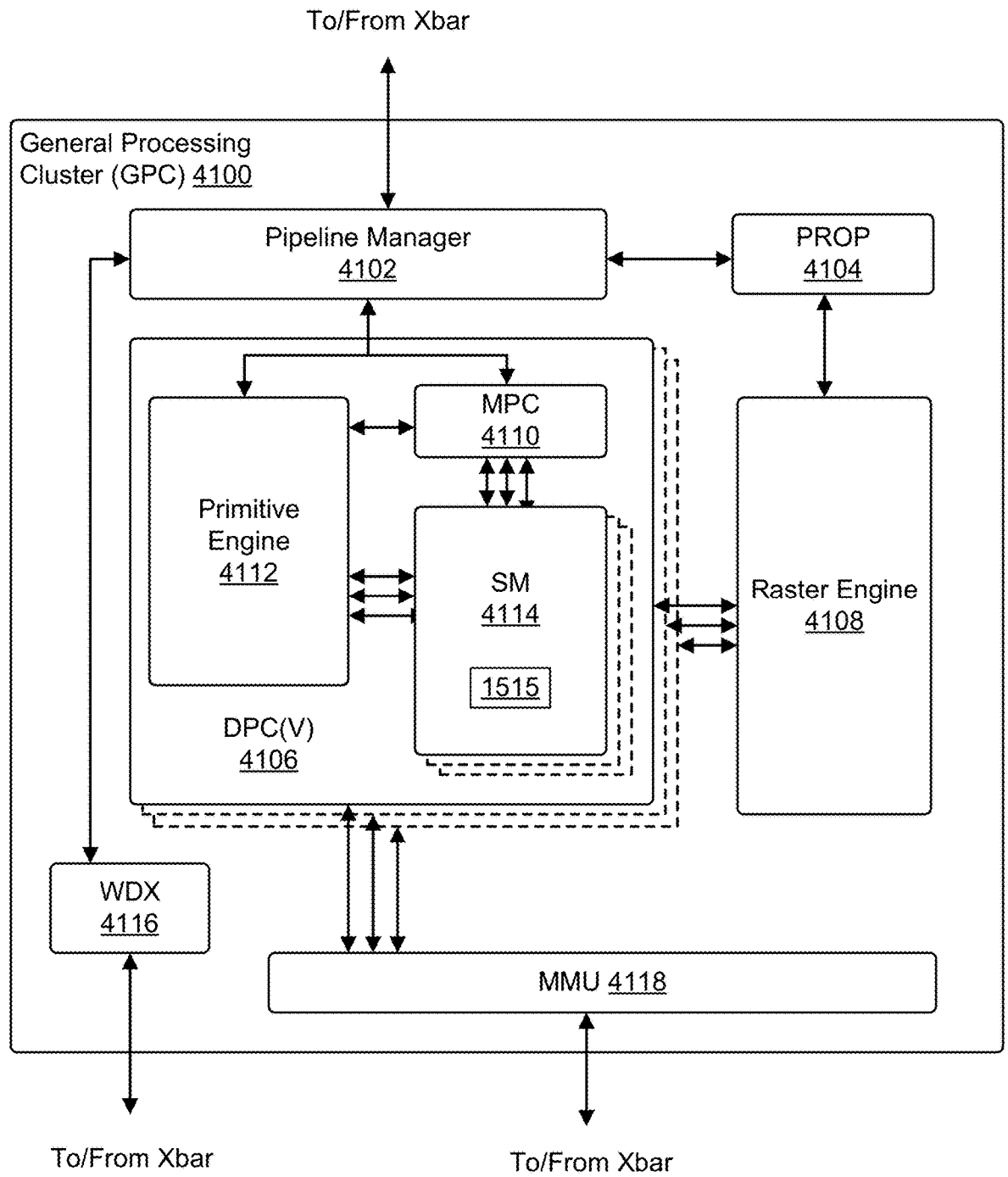
FIG. 41 illustrates a general processing cluster ("GPC"), according to at least one embodiment.

FIG. 41 illustrates a general processing cluster ("GPC") 4100, according to at least one embodiment. In at least one embodiment, GPC 4100 is GPC 4018 of FIG. 40. In at least one embodiment, each GPC 4100 includes, without limitation, a number of hardware units for processing tasks and each GPC 4100 includes, without limitation, a pipeline manager 4102, a pre-raster operations unit ("PROP") 4104, a raster engine 4108, a work distribution crossbar ("WDX") 4116, a memory management unit ("MMU") 4118, one or more Data Processing Clusters ("DPCs") 4106, and any suitable combination of parts.

In at least one embodiment, operation of GPC 4100 is controlled by pipeline manager 4102. In at least one embodiment, pipeline manager 4102 manages configuration of one or more DPCs 4106 for processing tasks allocated to GPC 4100. In at least one embodiment, pipeline manager 4102 configures at least one of one or more DPCs 4106 to implement at least a portion of a graphics rendering pipeline. In at least one embodiment, DPC 4106 is configured to execute a vertex shader program on a programmable streaming multi-processor ("SM") 4114. In at least one embodiment, pipeline manager 4102 is configured to route packets received from a work distribution unit to appropriate logical units within GPC 4100, in at least one embodiment, and some packets may be routed to fixed function hardware units in PROP 4104 and/or raster engine 4108 while other packets may be routed to DPCs 4106 for processing by a primitive engine 4112 or SM 4114. In at least one embodiment, pipeline manager 4102 configures at least one of DPCs 4106 to implement a neural network model and/or a computing pipeline.

In at least one embodiment, PROP unit 4104 is configured, in at least one embodiment, to route data generated by raster engine 4108 and DPCs 4106 to a Raster Operations ("ROP") unit in partition unit 4022, described in more detail above in conjunction with FIG. 40. In at least one embodiment, PROP unit 4104 is configured to perform optimizations for color blending, organize pixel data, perform address translations, and more. In at least one embodiment, raster engine 4108 includes, without limitation, a number of fixed function hardware units configured to perform various raster operations, in at least one embodiment, and raster engine 4108 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4108 comprises fragments to be processed by any suitable entity such as by a fragment shader implemented within DPC 4106.

In at least one embodiment, each DPC 4106 included in GPC 4100 comprise, without limitation, an M-Pipe Controller ("MPC") 4110; primitive engine 4112; one or more SMs 4114; and any suitable combination thereof. In at least one embodiment, MPC 4110 controls operation of DPC 4106, routing packets received from pipeline manager 4102 to appropriate units in DPC 4106. In at least one embodiment, packets associated with a vertex are routed to primitive engine 4112, which is configured to fetch vertex attributes associated with vertex from memory; in contrast, packets associated with a shader program may be transmitted to SM 4114.

In at least one embodiment, SM 4114 comprises, without limitation, a programmable streaming processor that is configured to process tasks represented by a number of threads. In at least one embodiment, SM 4114 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4114 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4114 are described in more detail herein.

In at least one embodiment, MMU 4118 provides an interface between GPC 4100 and memory partition unit (e.g., partition unit 4022 of FIG. 40) and MMU 4118 provides translation of virtual addresses into physical addresses, memory protection, and arbitration of memory requests. In at least one embodiment, MMU 4118 provides one or more translation lookaside buffers ("TLBs") for performing translation of virtual addresses into physical addresses in memory.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to GPC 4100. In at least one embodiment, GPC 4100 is used to infer or predict information based on a trained machine learning model (e.g., neural network) that has been trained by another processor or system or by GPC 4100. In at least one embodiment, GPC 4100 may be used to perform one or more neural network use cases described herein.

Figure 42:
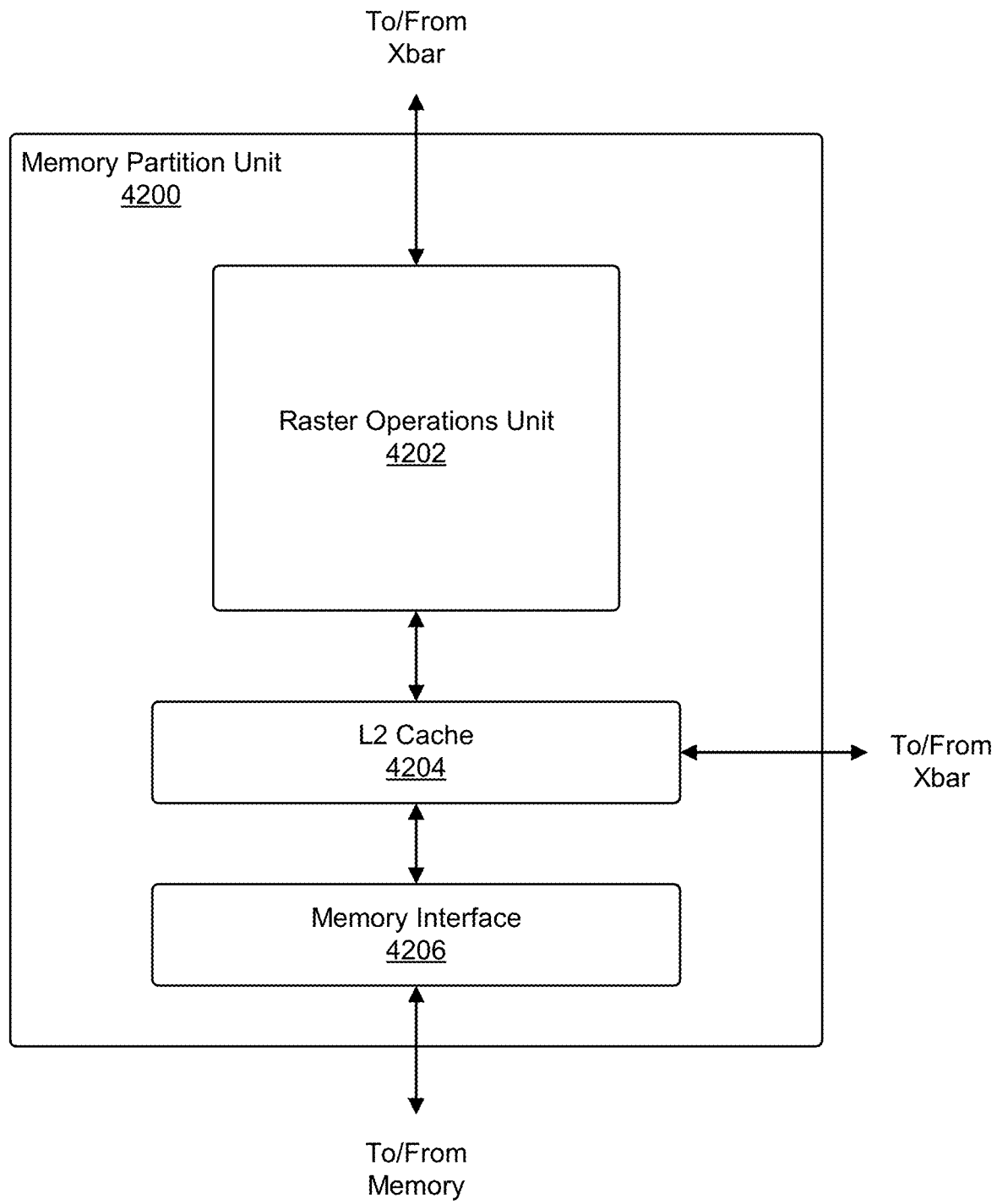
FIG. 42 illustrates a memory partition unit of a parallel processing unit ("PPU"), according to at least one embodiment.

FIG. 42 illustrates a memory partition unit 4200 of a parallel processing unit ("PPU"), in a42ordance with at least one embodiment. In at least one embodiment, memory partition unit 4200 includes, without limitation, a Raster Operations ("ROP") unit 4202; a level two ("L2") cache 4204; a memory interface 4206; and any suitable combination thereof. Memory interface 4206 is coupled to memory. Memory interface 4206 may implement 32, 64, 128, 1024-bit data buses, or like, for high-speed data transfer. In at least one embodiment, PPU incorporates U memory interfaces 4206, one memory interface 4206 per pair of partition units 4200, where each pair of partition units 4200 is connected to a corresponding memory device. For example, in at least one embodiment, PPU may be connected to up to Y memory devices, such as high bandwidth memory stacks or graphics double-data-rate, version 5, synchronous dynamic random a42ess memory ("GDDR5 SDRAM").

In at least one embodiment, memory interface 4206 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 4200 supports a unified memory to provide a single unified virtual address space for central processing unit ("CPU") and PPU memory, enabling data sharing between virtual memory systems. In at least one embodiment frequency of a42esses by a PPU to memory located on other processors is traced to ensure that memory pages are moved to physical memory of PPU that is a42essing pages more frequently. In at least one embodiment, high-speed GPU interconnect 4008 supports address translation services allowing PPU to directly a42ess a CPU's page tables and providing full a42ess to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4200 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4004 of FIG. 40 or other system memory is fetched by memory partition unit 4200 and stored in L2 cache 4204, which is located on-chip and is shared between various GPCs, in a42ordance with at least one embodiment. Each memory partition unit 4200, in at least one embodiment, includes, without limitation, at least a portion of L2 cache associated with a corresponding memory device. In at least one embodiment, lower level caches are implemented in various units within GPCs. In at least one embodiment, each of SMs 4114 may implement a level one ("L1") cache wherein L1 cache is private memory that is dedicated to a particular SM 4114 and data from L2 cache 4204 is fetched and stored in each of L1 caches for processing in functional units of SMs 4114. In at least one embodiment, L2 cache 4204 is coupled to memory interface 4206 and XBar 4020.

ROP unit 4202 performs graphics raster operations related to pixel color, such as color compression, pixel blending, and more, in at least one embodiment. ROP unit 4202, in at least one embodiment, implements depth testing in conjunction with raster engine 4108, receiving a depth for a sample location associated with a pixel fragment from culling engine of raster engine 4108. In at least one embodiment, depth is tested against a corresponding depth in a depth buffer for a sample location associated with fragment. In at least one embodiment, if fragment passes depth test for sample location, then ROP unit 4202 updates depth buffer and transmits a result of depth test to raster engine 4108. It will be appreciated that number of partition units 4200 may be different than number of GPCs and, therefore, each ROP unit 4202 can, in at least one embodiment, be coupled to each of GPCs. In at least one embodiment, ROP unit 4202 tracks packets received from different GPCs and determines which that a result generated by ROP unit 4202 is routed to through XBar 4020.

Figure 43:
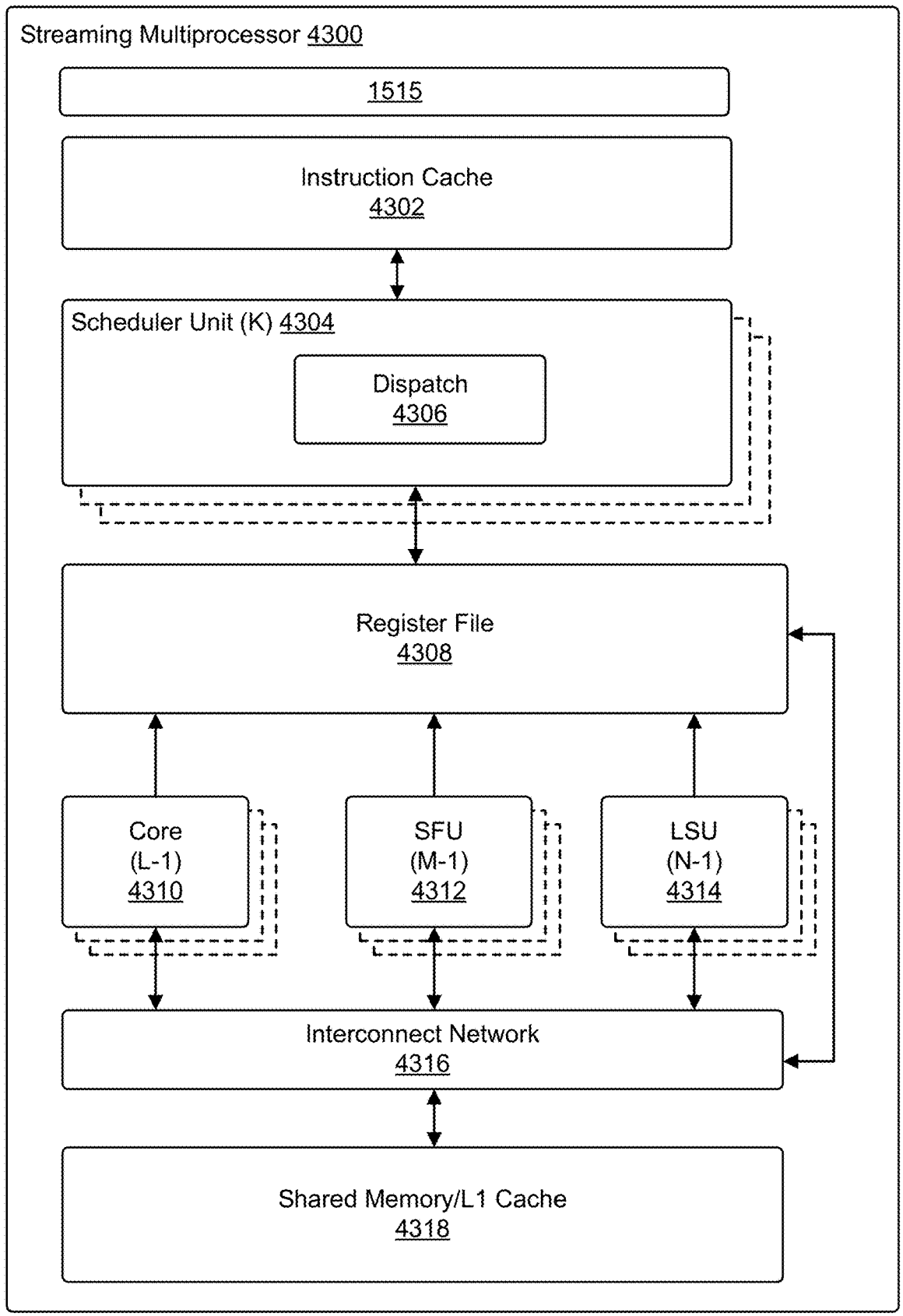
FIG. 43 illustrates a streaming multi-processor, according to at least one embodiment.

FIG. 43 illustrates a streaming multi-processor ("SM") 4300, according to at least one embodiment. In at least one embodiment, SM 4300 is SM of FIG. 41. In at least one embodiment, SM 4300 includes, without limitation, an instruction cache 4302; one or more scheduler units 4304; a register file 4308; one or more processing cores ("cores") 4310; one or more special function units ("SFUs") 4312; one or more load/store units ("LSUs") 4314; an interconnect network 4316; a shared memory/level one ("L1") cache 4318; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4300. In at least one embodiment, scheduler unit 4304 receives tasks from work distribution unit and manages instruction scheduling for one or more thread blocks assigned to SM 4300. In at least one embodiment, scheduler unit 4304 schedules thread blocks for execution as warps of parallel threads, wherein each thread block is allocated at least one warp. In at least one embodiment, each warp executes threads. In at least one embodiment, scheduler unit 4304 manages a plurality of different thread blocks, allocating warps to different thread blocks and then dispatching instructions from plurality of different cooperative groups to various functional units (e.g., processing cores 4310, SFUs 4312, and LSUs 4314) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at subblock (i.e., as small as a single thread) and multi-block granularities, and to perform collective operations such as synchronization on threads in a cooperative group. Programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4306 is configured to transmit instructions to one or more of functional units and scheduler unit 4304 includes, without limitation, two dispatch units 4306 that enable two different instructions from same warp to be dispatched during each clock cycle. In at least one embodiment, each scheduler unit 4304 includes a single dispatch unit 4306 or a43itional dispatch units 4306.

In at least one embodiment, each SM 4300, in at least one embodiment, includes, without limitation, register file 4308 that provides a set of registers for functional units of SM 4300. In at least one embodiment, register file 4308 is divided between each of functional units such that each functional unit is allocated a dedicated portion of register file 4308. In at least one embodiment, register file 4308 is divided between different warps being executed by SM 4300 and register file 4308 provides temporary storage for operands connected to data paths of functional units. In at least one embodiment, each SM 4300 comprises, without limitation, a plurality of L processing cores 4310. In at least one embodiment, SM 4300 includes, without limitation, a large number (e.g., 128 or more) of distinct processing cores 4310. In at least one embodiment, each processing core 4310, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4310 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point a43ition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4300 comprises, without limitation, M SFUs 4312 that perform special functions (e.g., attribute evaluation, reciprocal square root, and like). In at least one embodiment, SFUs 4312 include, without limitation, a tree traversal unit configured to traverse a hierarchical tree data structure. In at least one embodiment, SFUs 4312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4300. In at least one embodiment, texture maps are stored in shared memory/L1 cache 4318. In at least one embodiment, texture units implement texture operations such as filtering operations using mip-maps (e.g., texture maps of varying levels of detail), in accordance with at least one embodiment. In at least one embodiment, each SM 4300 includes, without limitation, two texture units.

Each SM 4300 comprises, without limitation, N LSUs 4314 that implement load and store operations between shared memory/L1 cache 4318 and register file 4308, in at least one embodiment. Each SM 4300 includes, without limitation, interconnect network 4316 that connects each of functional units to register file 4308 and LSU 4314 to register file 4308 and shared memory/L1 cache 4318 in at least one embodiment. In at least one embodiment, interconnect network 4316 is a crossbar that can be configured to connect any of functional units to any of registers in register file 4308 and connect LSUs 4314 to register file 4308 and memory locations in shared memory/L1 cache 4318.

In at least one embodiment, shared memory/L1 cache 4318 is an array of on-chip memory that allows for data storage and communication between SM 4300 and primitive engine and between threads in SM 4300, in at least one embodiment. In at least one embodiment, shared memory/L1 cache 4318 comprises, without limitation, 128 KB of storage capacity and is in path from SM 4300 to partition unit. In at least one embodiment, shared memory/L1 cache 4318, in at least one embodiment, is used to cache reads and writes. In at least one embodiment, one or more of shared memory/L1 cache 4318, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4318 enables shared memory/L1 cache 4318 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4300 to execute program and perform calculations, shared memory/L1 cache 4318 to communicate between threads, and LSU 4314 to read and write global memory through shared memory/L1 cache 4318 and memory partition unit. In at least one embodiment, when configured for general purpose parallel computation, SM 4300 writes commands that scheduler unit 4304 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. Graphics card may be configured to interface with a PCIe slot on a motherboard of a desktop computer. In at least one embodiment, PPU may be an integrated graphics processing unit ("iGPU") included in chipset of motherboard.

Inference and/or training logic 1515 are used to perform inferencing and/or training operations associated with one or more embodiments. Details regarding inference and/or training logic 1515 are provided herein in conjunction with FIGS. 15A and/or 15B. In at least one embodiment, deep learning application processor is used to train a machine learning model, such as a neural network, to predict or infer information provided to SM 4300. In at least one embodiment, SM 4300 is used to infer or predict information based on a trained machine learning model (e.g., neural network) that has been trained by another processor or system or by SM 4300. In at least one embodiment, SM 4300 may be used to perform one or more neural network use cases described herein.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 2104 and/or secondary storage. Computer programs, if executed by one or more processors, enable system 2100 to perform various functions in accordance with at least one embodiment. Memory 2104, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2102; parallel processing system 2112; an integrated circuit capable of at least a portion of capabilities of both CPU 2102; parallel processing system 2112; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2100 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 2112 includes, without limitation, a plurality of parallel processing units ("PPUs") 2114 and associated memories 2116. In at least one embodiment, PPUs 2114 are connected to a host processor or other peripheral devices via an interconnect 2118 and a switch 2120 or multiplexer. In at least one embodiment, parallel processing system 2112 distributes computational tasks across PPUs 2114 which can be parallelizable—for example, as part of distribution of computational tasks across multiple graphics processing unit ("GPU") thread blocks. In at least one embodiment, memory is shared and accessible (e.g., for read and/or write access) across some or all of PPUs 2114, although such shared memory may incur performance penalties relative to use of local memory and registers resident to a PPU 2114. In at least one embodiment, operation of PPUs 2114 is synchronized through use of a command such as _syncthreads( ), wherein all threads in a block (e.g., executed across multiple PPUs 2114) to reach a certain point of execution of code before proc21ding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. Set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method comprising:
   determining, from an image of a hand, at least one first joint angle of a first joint of at least one digit of a model of the hand;
   determining a distance and a direction from the at least one digit to another digit of the model of the hand;
   translating the at least one first joint angle of the first joint to at least one second joint angle of a corresponding second joint of a robotic hand based at least in part on the distance, the direction, and a cost function that maintains at least a minimum separation between at least a pair of robotic digits of the robotic hand;

determining a set of movements that repositions the robotic hand from a first pose to a second pose based at least in part on the at least one second joint angle of the corresponding second joint; and causing the robotic hand to perform the set of movements.

2. The computer-implemented method of claim 1, further comprising:

obtaining the image from a depth camera;

determining a point cloud of the hand from the image; and determining the at least one first joint angle of the first joint of the at least one digit of the model of the hand using the point cloud.

3. The computer-implemented method of claim 2, wherein:

the depth camera is an RGB depth camera, a radar imager, a medical imaging system, or a LIDAR system.

4. The computer-implemented method of claim 1, further comprising:

determining a third pose of the model of the hand, wherein the third pose includes information that identifies a location of each of five fingers of the hand; and the third pose includes information that identifies one or more joint locations of the hand.

5. The computer-implemented method of claim 1, wherein:

the at least one first joint angle of the first joint is translated to the at least one second joint angle of the corresponding second joint by at least performing kinematic retargeting of the at least one first joint angle of the first joint.

6. The computer-implemented method of claim 1, wherein the set of movements are determined using Reimannian motion policies.

7. The computer-implemented method of claim 1, wherein the robotic hand is an articulated robotic hand, a robotic gripper, or a probe.

8. The computer-implemented method of claim 1, wherein:

the robotic hand includes one or more tactile sensors that provide tactile sensor information; and the tactile sensor information includes a 2-dimensional array of force values for a digit of the robotic hand.

9. The computer-implemented method of claim 1, wherein translating the at least one first joint angle to the at least one second joint angle comprises minimizing the cost function.

10. The computer-implemented method of claim 1, wherein the distance and the direction are determined as components of a vector, and the at least one first joint angle is translated to the at least one second joint angle based at least in part on the vector.

11. A system comprising:

one or more processors; and computer-readable memory storing executable instructions that, as a result of being executed by the one or more processors, cause the system to:

determine, from an image of an appendage performing a task, at least one first joint angle of a first joint of at least one digit of the appendage;

determine a distance and a direction from the at least one digit to another digit of the appendage;

determine at least one second joint angle of a second joint of a robotic gripper based at least in part on the distance, the direction, and a cost function that maintains at least a minimum separation between individually movable portions of the robotic gripper;

determine a set of movements that repositions the robotic gripper from a first pose to a second pose based at least in part on the at least one second joint angle of the second joint of the robotic gripper; and perform the set of movements to position the robotic gripper in the second pose to cause the robotic gripper to perform the task.

12. The system of claim 11, wherein the executable instructions cause the system to further:

generate a point cloud from the image of the appendage; and determine the at least one first joint angle of the first joint of the at least one digit of the appendage from the point cloud.

13. The system of claim 11, wherein the set of movements are performed in accordance with Reimannian motion policies.

14. The system of claim 11, wherein the appendage is a human hand or human foot.

15. The system of claim 11, wherein the executable instructions cause the system to apply a scale factor to the at least one first joint angle of the first joint to determine the at least one second joint angle of the second joint of the robotic gripper.

16. The system of claim 11, wherein the executable instructions cause the system to determine:

a third pose of the appendage, wherein the third pose of the appendage specifies a set of joint angles of the first joint comprising the at least one first joint angle of the first joint.

17. The system of claim 11, wherein the second pose specifies a set of target joint angles of the second joint of the robotic gripper and a position of the robotic gripper.

18. The system of claim 11, wherein the at least one second joint angle of the second joint of the robotic gripper is determined using a subset of the at least one first joint angle of the first joint of the at least one digit of the appendage.

19. The system of claim 11, wherein the cost function comprises at least the distance and the direction.

20. Non-transitory computer-readable media storing instructions that, as a result of being executed by one or more processors of a computer system, cause the computer system to:

determine, from an image of a human performing a task, at least one first joint angle of a joint of at least one digit of a model of an appendage of the human;

determine a distance and a direction from the at least one digit to another digit of the model of the appendage;

translate the at least one first joint angle of the first joint to at least one second joint angle of a second joint of a robotic hand based at least in part on the distance, the direction, and a cost function that maintains at least a minimum separation between at least a pair of robotic digits of the robotic hand;

determine a set of movements that repositions the robotic hand from a first pose to a second pose based at least in part on the at least one second joint angle of the second joint of the robotic hand; and cause the robotic hand to perform the set of movements.

21. The non-transitory computer-readable media of claim 20, wherein the instructions cause the computer system to further:

obtain the image from a depth camera;
determine a point cloud of the appendage from the image; and
determine the at least one first joint angle of the first joint based at least in part on the point cloud.

22. The non-transitory computer-readable media of claim 21, wherein the depth camera is an RGB depth camera, a radar imager, a medical imaging system, or a LIDAR system.

23. The non-transitory computer-readable media of claim 20, wherein the instructions cause the computer system to determine a third pose of the model of the appendage,
the third pose includes information that identifies a location of each of five fingers of a hand, and
the third pose includes information that identifies one or more joint locations of the hand.

24. The non-transitory computer-readable media of claim 20, wherein the instructions cause the computer system to further:
determine a point cloud of the appendage from the image, wherein the point cloud provides three-dimensional data describing a hand from which the at least one first joint angle of the first joint can be determined.

25. The non-transitory computer-readable media of claim 20, wherein:
the at least one first joint angle of the first joint is translated to the at least one second joint angle of the second joint of the robotic hand by at least performing kinematic retargeting of the at least one first joint angle of the first joint of the at least one digit of the model of the appendage.

26. The non-transitory computer-readable media of claim 20, wherein:
the robotic hand includes one or more tactile sensors that provide tactile sensor information; and
the tactile sensor information includes a 2-dimensional array of force values for a digit of the robotic hand.

27. The non-transitory computer-readable media of claim 20, wherein the robotic hand is an articulated robotic hand, a robotic gripper, or a probe.

28. The non-transitory computer-readable media of claim 20, wherein the instructions cause the computer system to further:
determine a point cloud of the appendage from the image; and
determine a joint structure and joint angles of the first joint of the at least one digit of the model of the appendage of the human.

29. The non-transitory computer-readable media of claim 20, wherein the first pose of the robotic hand is a present pose of the robotic hand.

30. A robot comprising:
an arm that includes one or more articulated members connected via one or more servo motors;
a robotic appendage connected to the arm;
one or more processors; and
the non-transitory computer-readable media of claim 20 connected to the one or more processors.

31. The non-transitory computer-readable media of claim 20, wherein the cost function is to avoid collisions between at least the pair of robotic digits.

* * * * *